US009714347B2

(12) United States Patent
Barbieru et al.

(10) Patent No.: US 9,714,347 B2
(45) Date of Patent: Jul. 25, 2017

(54) METAL FREE ACID DYES, PROCESS FOR THE PRODUCTION THEREOF AND THEIR USE

(71) Applicant: DyStar Colours Distribution GmbH, Raunheim (DE)

(72) Inventors: Roxana Barbieru, Singapore (SG); Sivamurugan Vajiravelu, Singapore (SG); Say Wan Yong, Singapore (SG); Ravi Vedarethinam, Singapore (SG)

(73) Assignee: DyStar Colours Distribution GmbH (DE)

( * ) Notice: Subject to any disclaimer, the term of this patent is extended or adjusted under 35 U.S.C. 154(b) by 0 days.

(21) Appl. No.: 14/650,395

(22) PCT Filed: Dec. 3, 2013

(86) PCT No.: PCT/EP2013/075382
§ 371 (c)(1),
(2) Date: Jun. 8, 2015

(87) PCT Pub. No.: WO2014/090634
PCT Pub. Date: Jun. 19, 2014

(65) Prior Publication Data

US 2015/0315386 A1 Nov. 5, 2015

(30) Foreign Application Priority Data

Dec. 10, 2012 (EP) .................................... 12196206

(51) Int. Cl.
*C09B 31/00* (2006.01)
*C09B 39/00* (2006.01)
*D06P 1/06* (2006.01)
*C09B 33/12* (2006.01)

(52) U.S. Cl.
CPC .............. *C09B 39/00* (2013.01); *C09B 33/12* (2013.01); *D06P 1/06* (2013.01)

(58) Field of Classification Search
CPC ............ C09B 33/12; C09B 39/00; D06P 1/06
USPC ............................................................. 8/681
See application file for complete search history.

(56) References Cited

U.S. PATENT DOCUMENTS 3,945,990 A 3/1976 Ikeda et al.
5,006,128 A 4/1991 Pedrazzi
5,519,121 A 5/1996 Renner et al.
8,506,697 B2 8/2013 Morita et al.
2008/0022467 A1 * 1/2008 Baettig .................. C09B 43/16 8/641

FOREIGN PATENT DOCUMENTS

EP 1882723 A1 1/2008
GB 2036780 A 7/1980
WO WO-2007012828 A2 2/2007
WO WO-2011122426 A1 10/2011

OTHER PUBLICATIONS

STIC Search Report dated Nov. 9, 2015.*
International Search Report for PCT/EP2013/075382 mailed May 20, 2014.

* cited by examiner

*Primary Examiner* — Eisa Elhilo
(74) *Attorney, Agent, or Firm* — Drinker Biddle & Reath LLP

(57) ABSTRACT

The present invention relates to dyes of formula (1)

(1)

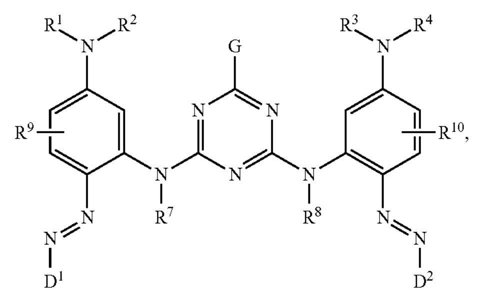

a process for preparing them and their use for dyeing and printing hydroxyl- and/or carboxamido-containing materials.

15 Claims, No Drawings

METAL FREE ACID DYES, PROCESS FOR THE PRODUCTION THEREOF AND THEIR USE

CROSS-REFERENCE TO RELATED APPLICATIONS

This application is a national stage application (under 35 U.S.C. §371) of PCT/EP2013/075382, filed Dec. 3, 2013, which claims benefit of European Application No. 12196206.2, filed Dec. 10, 2012, both of which are incorporated herein by reference in their entirety.

The present invention relates to the technical field of dyestuffs for dyeing and printing of hydroxyl- and/or carboxamido containing material.

Disazo compounds comprising a triazine moiety are known and can be used as colorants in different applications, see for example GB 2,036,780, U.S. Pat. No. 3,945,990, U.S. Pat. No. 5,006,128 and U.S. Pat. No. 5,519,121.

In the context of the dyeing and printing of hydroxyl- and/or carboxamido-containing material the known dyes have a number of technical disadvantages, which need to be overcome.

Surprisingly, it has now been found that the dyes of the formula (1) as described below show highly advantageous properties over the known dyes. These include high tinctorial strength with high brilliancy as well as high fastness properties such as wash, contact and light fastness on the materials mentioned above, on blends containing them as well as on microfibres. Most importantly, dyes of formula (1) are metal free and provide dyeings that are levelled.

The present invention refers to a Dye of formula (1)

(1)

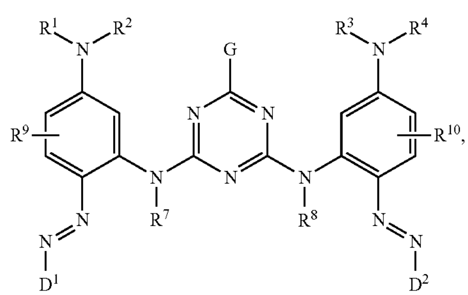

wherein independent from each other

G is a rest of formula (i) or (ii)

(i)

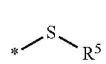

(ii)

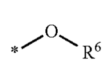

$R^1$, $R^2$, $R^3$ and $R^4$ is hydrogen, $(C_1-C_{12})$-alkyl, $(C_2-C_6)$-alkenyl, $(C_3-C_8)$-cycloalkyl or aryl-$(C_1-C_{12})$-alkyl, with the alkyl chain being linear or branched, and optionally being interrupted by one or more heteroatoms and/or substituted by one or more substituents selected from the group consisting of hydroxy, carboxy, $SO_3M$, halogen, cyano, nitro, acyl, trifluoromethyl, acyloxy, aryloyloxy and carbamoyl, $R^5$ and $R^6$ is hydrogen, $(C_1-C_{12})$-alkyl, substituted $(C_1-C_{12})$-alkyl with the substituents being selected from the group consisting of hydroxy, carboxy, $SO_3M$, halogen, cyano, nitro, acyl, trifluoromethyl, acyloxy, aryloyloxy and carbamoyl, $(C_3-C_8)$-cycloalkyl, a group of formula (iii)

(iii)

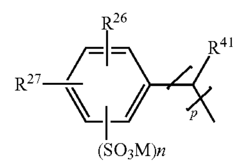

wherein $R^{26}$ and $R^{27}$ is hydrogen, $(C_1-C_{12})$-alkyl, $(C_1-C_{12})$-alkyl substituted by hydroxy, $(C_1-C_{12})$-alkoxy, trifluoromethyl, cyano, nitro, halogen, —NHCO$(C_1-C_6)$-alkyl or —NHSO$_2(C_1-C_6)$-alkyl, $CONH_2$ or $SO_2NH_2$, $R^{41}$ is hydrogen or $(C_1-C_6)$-alkyl, n is 0, 1 or 2, p is 0 or 1 to 6, or $(C_1-C_{12})$-alkyl, whereby the alkyl chain can be interrupted by one or more heteroatoms, $R^7$ and $R^8$ is hydrogen, $(C_1-C_6)$-alkyl or phenyl, $R^9$ and $R^{10}$ is hydrogen, $(C_1-C_6)$-alkyl, $(C_1-C_6)$-alkoxy, trifluoromethyl, hydroxy, cyano, nitro, halogen, —NHCHO, —NHCO$(C_1-C_6)$-alkyl, —NHCOaryl, —NHSO$_2(C_1-C_6)$-alkyl or —NHSO$_2$aryl, $D^1$ and $D^2$ is a rest of a phenyl-, naphthyl- or heterocyclic-derivative, which comprises at least one group —$SO_3M$, wherein M is hydrogen, an alkali metal, ammonium, substituted or unsubstituted tetra$(C_1-C_{12})$-alkyl ammonium or one equivalent of an alkali earth metal.

$(C_1-C_{12})$-alkyl groups appearing in this application may be straight-chain or branched and are for example methyl, ethyl, n-propyl, isopropyl, n-butyl, sec-butyl, tert-butyl, isobutyl, n-pentyl, isopentyl, methylbutyl and n-hexyl. The same logic applies to alkoxy groups which for example are methoxy and ethoxy.

Rests of phenyl-, naphtyl- or heterocyclic-derivatives are rests, which are based on phenyl-, naphtyl- or heterocyclic structures. These structures may be substituted or unsubstituted in general. In the present invention these structures carry at least one group —$SO_3M$, when they are $D^1$ or $D^2$ as outlined above. Preferred phenyl-, naphthyl- and heterocyclic structures are mentioned below.

Cycloalkyl groups are preferably $(C_3-C_8)$-cycloalkyl and especially preferably cyclopentyl and cyclohexyl. The term cyloalkyl comprises for the purpose of the present application substituted cycloalkyl groups and unsaturated cycloalkyl groups as well. A preferred group of this type is cyclopentenyl or cyclohexenyl. Preferred substituents are alkyl, hydroxyalkyl, halogen, hydroxyl, alkoxy, acyl, cyano, nitro, amino, monoalkylamino, dialkylamino, mono(hydroxyalkyl)amino, bis-(hydroxyalkyl)amino, monoalkyl-mono(hydroxyalkyl)amino, carbamoyl, sulfamoyl, acylamino, ureido, aminosulfonylamino, alkoxycarbonyl and acyloxy.

($C_2$-$C_6$)-alkenyl groups may be straight-chain or branched and are for example vinyl and allyl. The term alkenyl comprises for the purpose of the present application alkynyl groups as well, for example ethynyl and propargyl.

Heteroaryl groups or a heteroaryl rest appearing in this application are preferably pyridine, pyrimidine, pyridazine, pyrazine, pyrrole, benzimidazole, benzotriazole, imidazole, pyrazole, 1,2,4-thiadiazole, 1,2,4-triazole, tetrazole, thiophene, thiazole, isothiazole, benzothiazole, benzoisothiazole, 1,3,4-thiadiazole, furane, oxazole, 1,2,4-oxadiazole, 1,3,4-oxadiazole, benzoxazole or isoxazole. The terms heteroaryl comprises the above groups in unsubstituted as well as in substituted form. Preferred substituents are alkyl, hydroxyalkyl, halogen, hydroxyl, alkoxy, alkylthio, acyl, nitro, cyano, amino, monoalkylamino, dialkylamino, mono (hydroxyalkyl)amino, bis(hydroxylalkyl)amino, monoalkyl-mono(hydroxyalkyl)amino, carbamoyl, sulfamoyl, acylamino, ureido, aminosulfonylamino, alkoxycarbonyl and acyloxy.

Heterocycloalkyl groups are preferably pyrrolidine, piperidine, morpholine, tetrahydrofuran or piperazine. The term heterocycloalkyl comprises the above groups in unsubstituted as well as in substituted form. Preferred substituents are alkyl, hydroxyalkyl, halogen, hydroxyl, alkoxy, alkylthio, acyl, nitro, cyano, amino, monoalkylamino, dialkylamino, mono(hydroxyalkyl)amino, bis-(hydroxyalkyl) amino, monoalkyl-mono(hydroxyalkyl)amino, carbamoyl, sulfamoyl, acylamino, aminocarbonylamino, aminosulfonylamino, alkoxycarbonyl and acyloxy.

Aryl or aryl rest appearing in this application is in particular phenyl or naphthyl. The terms phenyl and naphthyl comprise unsubstituted as well as substituted phenyl and naphthyl. Preferred substituents are alkyl, cycloalkyl, heterocycloalkyl, hydroxyalkyl, halogen, hydroxyl, alkoxy, alkylthio, acyl, nitro, cyano, amino, monoalkylamino, dialkylamino, mono(hydroxyalkyl)amino, bis (hydroxyalkyl)amino, monoalkyl-mono(hydroxyalkyl)amino, carbamoyl, sulfamoyl, acylamino, ureido, aminosulfonylamino, alkoxycarbonyl or acyloxy.

Halogen is preferably chlorine, bromine or fluorine.

There also exist preferred structures. Thus a Dye as described above, wherein independent from each other $R^1$ to $R^4$ are identical and are hydrogen, ($C_1$-$C_4$)-alkyl or ($C_1$-$C_6$)-alkyl substituted by hydroxyl, cyano or alkenyl, $R^5$ and $R^6$ are identical and are
- hydrogen,
- ($C_1$-$C_6$)-alkyl,
- ($C_1$-$C_6$)-alkyl substituted by hydroxy,
- ($C_3$-$C_8$)-cycloalkyl or ($C_1$-$C_6$)-alkyl substituted by —$SO_3M$ or a group of formula (iii) as defined in claim 1, wherein each $R^{26}$ and $R^{27}$ independent from each other is
  - hydrogen,
  - ($C_1$-$C_6$)-alkyl,
  - ($C_1$-$C_6$)-alkyl substituted by hydroxy,
  - ($C_1$-$C_6$)-alkoxy, trifluoromethyl, hydroxy, cyano, halogen,
  - n is 0 or 1,
  - p is 0 or 1 to 4, $R^7$ and $R^8$ are identical and are hydrogen, methyl or ethyl and $R^9$ and $R^{10}$ are identical and are hydrogen, methyl, ethyl, halogen, trifluoromethyl, methoxy or ethoxy is preferred.

"Independent from each other" in this context means that a selection of e.g. $R^7$ and $R^8$ being identical and being e.g. hydrogen has no influence on what is selected for e.g. $R^9$ and $R^{10}$. $R^9$ and $R^{10}$ in this case may be different to each other or identical. A dye where $R^1$ to $R^4$ are identical and $R^5$ and $R^6$ are identical and $R^7$ and $R^8$ are identical and $R^9$ and $R^{10}$ are identical is preferred.

Even more preferred is a Dye as described above, having formula (1a), ($1a^1$), ($1a^2$) or ($1a^3$)

(1a)

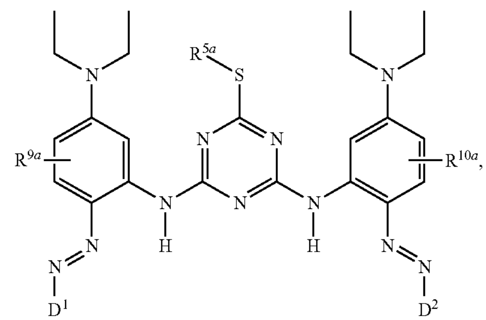

($1a^1$)

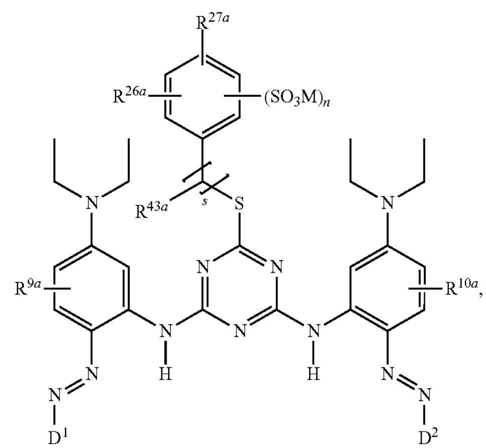

($1a^2$)

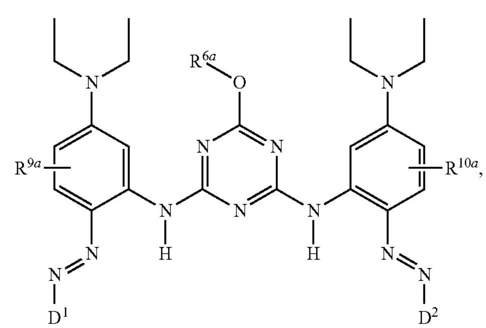

-continued (1a³)

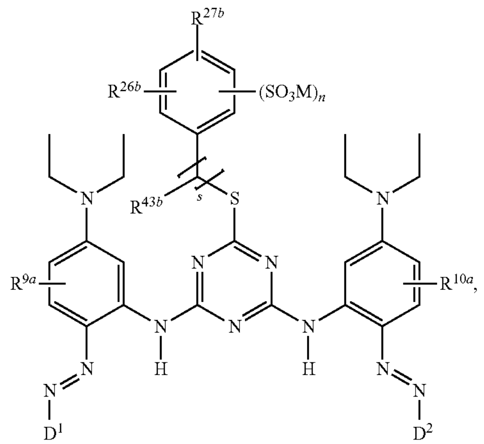

wherein $R^{5a}$ and $R^{6a}$ are hydrogen, $(C_1-C_6)$-alkyl, $(C_1-C_6)$-alkyl substituted by hydroxy, $(C_3-C_8)$-cycloalkyl or $(C_1-C_6)$-alkyl substituted by $SO_3M$, $R^{9a}$ and $R^{10a}$ are identical and are hydrogen or methoxy, each of $R^{26a}$, $R^{27a}$, $R^{26b}$ and $R^{27b}$ is hydrogen, $(C_1-C_4)$-alkyl, $(C_1-C_4)$-alkoxy, trifluoromethyl, cyano, nitro or halogen, $R^{43a}$ and $R^{43b}$ is hydrogen or $(C_1-C_4)$ alkyl, s is 0 or 1 to 6 and $D^1$ and $D^2$ are as defined above, Still more preferred is a Dye as described above, in which independent from each other $D^1$ and $D^2$ is selected from the group consisting of groups of formula (I) to (XIV):

(I)

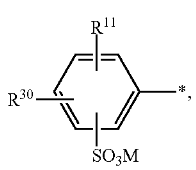

wherein $R^{11}$ and $R^{30}$ independent of each other is hydrogen, $(C_1-C_4)$-alkyl, $(C_1-C_4)$-alkoxy, trifluoromethyl, cyano, nitro, $NHC(O)R^{31}$, $CONH_2$, $S(O)_2R^{32}$ or halogen, $R^{31}$ and $R^{32}$ is hydrogen, $(C_1-C_4)$-alkyl or $(C_1-C_4)$-alkyl substituted by hydroxyl, M is hydrogen, an alkali metal, ammonium or one equivalent of an alkali earth metal, formula (II)

(II)

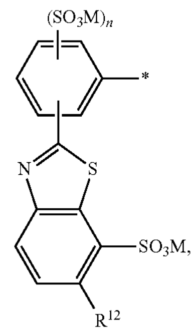

wherein $R^{12}$ is hydrogen or $(C_1-C_4)$-alkyl, n is 0 or 1 and

M is defined as given above, formula (III)

(III)

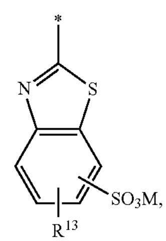

wherein $R^{13}$ is hydrogen, $(C_1-C_4)$-alkyl, $(C_1-C_4)$-alkoxy, cyano, nitro, $CONH_2$ or halogen and M is defined as given above, formula (IV)

(IV)

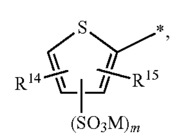

wherein $R^{14}$ is hydrogen, cyano, $CONH_2$, $C(O)R^{33}$ or $COOR^{34}$, $R^{33}$ is hydrogen or $(C_1-C_4)$-alkyl, $R^{34}$ is hydrogen or $(C_1-C_4)$-alkyl, $R^{15}$ is hydrogen, —CHO or a group of formula (a) or (c)

(a)

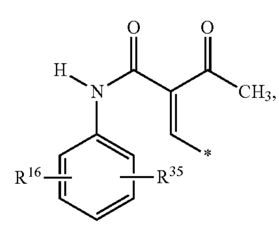

-continued (c)

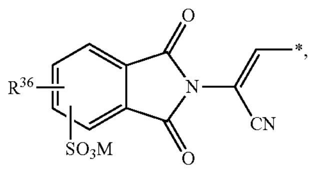

wherein $R^{16}$, $R^{35}$ and $R^{36}$ independent of each other is hydrogen, halogen, ($C_1$-$C_4$)-alkyl, ($C_1$-$C_4$)-alkoxy, $SO_3M$ or —$CONH_2$, m is 0 or 1 and M is defined as given above, formula (V)

(V)

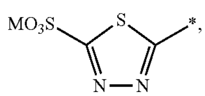

wherein

M is defined as given above, formula (VI)

(VI)

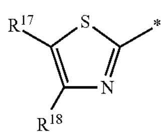

wherein $R^{17}$ is —$SO_3M$, —CHO, —CH═C(CN)$_2$, a group of formula (a) as defined above or a group of formula (b) or (d)

(b)

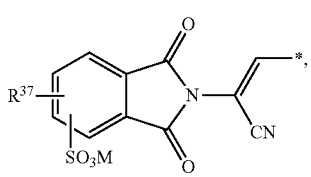

(d)

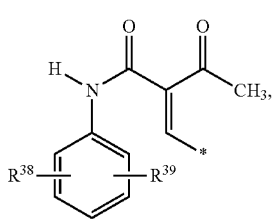

wherein $R^{37}$, $R^{38}$ and $R^{39}$ independent of each other is hydrogen, halogen, ($C_1$-$C_4$)-alkyl, ($C_1$-$C_4$)-alkoxy, $SO_3M$ or —$CONH_2$, $R^{18}$ is —$SO_3M$, ($C_1$-$C_4$)-alkyl, sulfophenyl ($C_1$-$C_4$)-alkylamino, ($C_1$-$C_{12}$)-alkylamino, ($C_5$-$C_6$)-cycloalkylamino, morpholino or piperidino and M is defined as given above, formula (VII)

(VII)

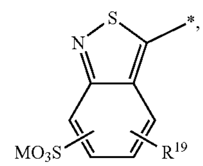

wherein $R^{19}$ is hydrogen, ($C_1$-$C_4$)-alkyl, ($C_1$-$C_4$)-alkoxy, nitro, NHC(O)$R^{40}$, $NHSO_2R^{47}$ or halogen, $R^{40}$ is hydrogen or ($C_1$-$C_6$) alkyl, $R^{47}$ is ($C_1$-$C_6$)-alkyl, formula (VIII)

(VIII)

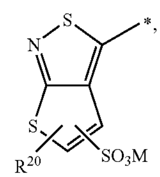

wherein $R^{20}$ is hydrogen, ($C_1$-$C_4$)-alkyl, ($C_1$-$C_4$)-alkoxy, cyano, nitro, $CONH_2$ or halogen, formula (IX)

(IX)

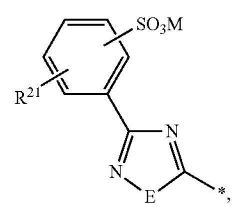

wherein $R^{21}$ is hydrogen, ($C_1$-$C_4$)-alkyl, ($C_1$-$C_4$)-alkoxy, halogen, cyano, nitro or $CONH_2$ and E is sulphur or oxygen, formula (X)

(X)

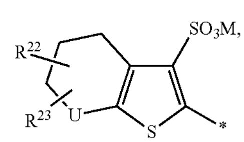

wherein $R^{22}$ and $R^{23}$ independent of each other is hydrogen, ($C_1$-$C_4$)-alkyl, ($C_1$-$C_4$)-alkoxy, halogen, cyano or $CONH_2$ and U is methylene or C═O, formula (XI)

(XI)

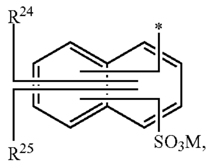

wherein $R^{24}$ and $R^{25}$ independent of each other is hydrogen, ($C_1$-$C_4$)-alkyl, ($C_1$-$C_4$)-alkoxy, halogen, cyano, nitro, trifluoromethyl or $CONH_2$, formula (XII)

(XII)

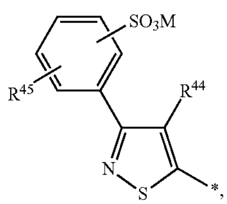

wherein $R^{44}$ and $R^{45}$ independent of each other is hydrogen, ($C_1$-$C_4$)-alkyl, ($C_1$-$C_4$)-alkoxy, halogen, cyano, nitro, trifluoromethyl, $CONH_2$ or $SO_3M$, formula (XIII)

(XIII)

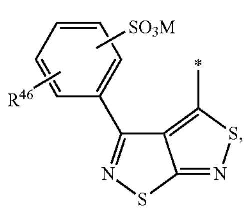

wherein $R^{46}$ is hydrogen, ($C_1$-$C_4$)-alkyl, ($C_1$-$C_4$)-alkoxy, halogen, cyano, nitro, trifluoromethyl, $CONH_2$ or $SO_3M$, and formula (XIV)

(XIV)

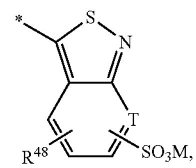

wherein $R^{48}$ is hydrogen, ($C_1$-$C_4$)-alkyl, ($C_1$-$C_4$)-alkoxy, nitro, $NHC(O)R^{49}$, $NHSO_2R^{50}$ or halogen, $R^{49}$ is hydrogen or ($C_1$-$C_6$)-alkyl, $R^{50}$ is ($C_1$-$C_6$)-alkyl;

and

M is defined as given above.

M is preferably hydrogen, lithium, sodium or potassium,

There exist groups of preferred dyes. One preferred group consists of dyes as described above, wherein $D^1$ and $D^2$ are selected from the same group (I) to (XIV). Another preferred group consists of dyes as described above, wherein $D^1$ and $D^2$ are selected from different groups (I) to (XIV). Most preferred, however, is a Dye as described above, wherein $D^1$ and $D^2$ are identical.

The most preferred dyes of the present invention are the dyes of the formulae (1aa) to (1an), ($1a^1a$) to ($1a^1n$), ($1a^2a$) to ($1a^2n$) and ($1a^3a$) to ($1a^3n$)

(1aa)

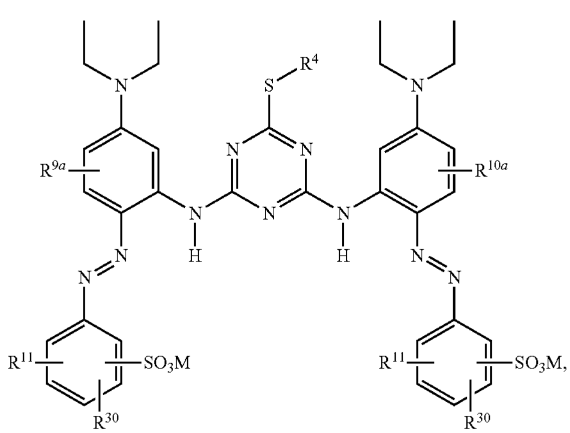

-continued
(1ab)
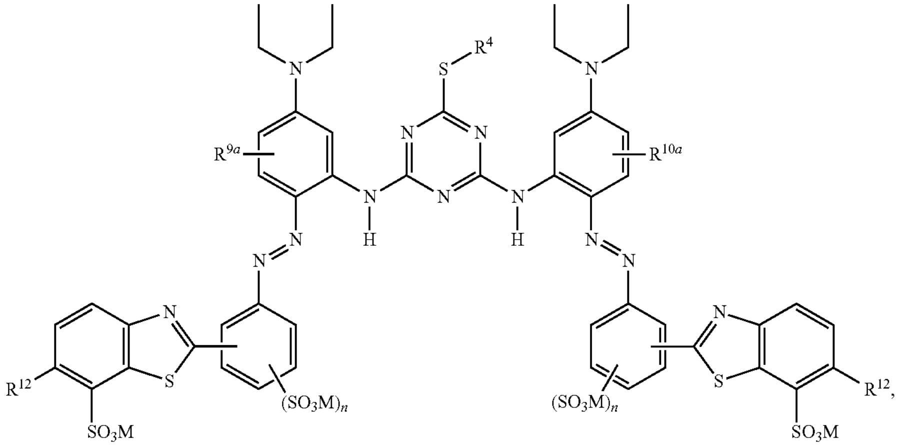
(1ac)
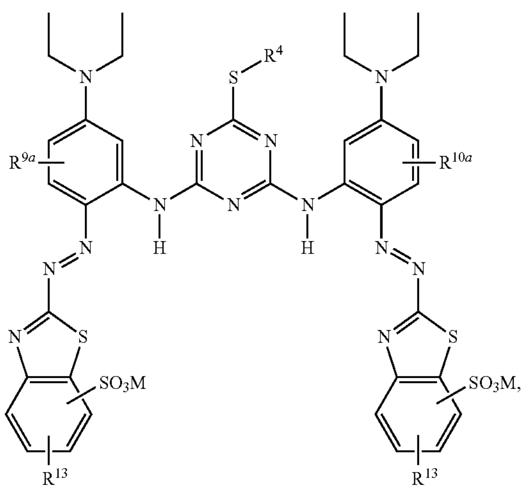
(1ad)
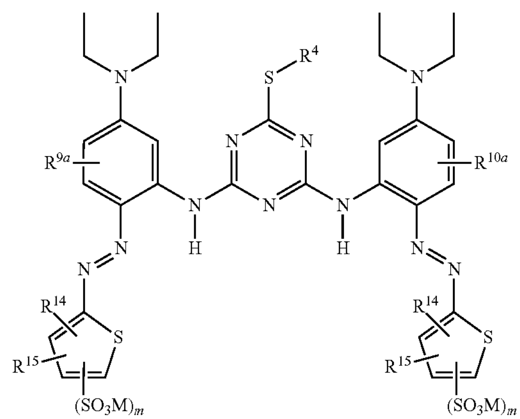
(1ae)
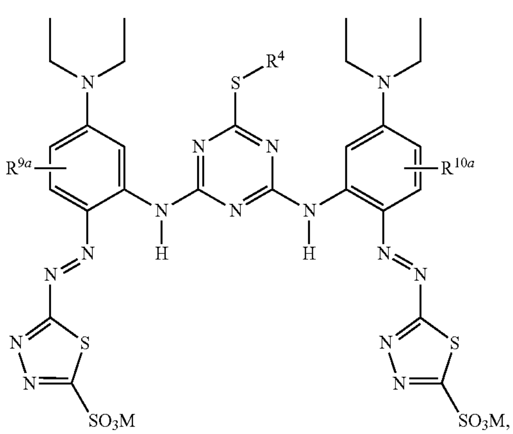
(1af)
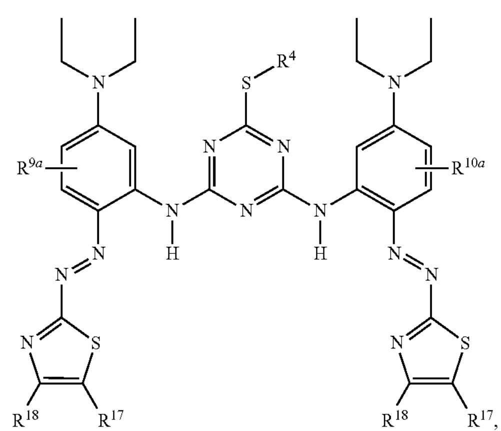

-continued
(1ag)
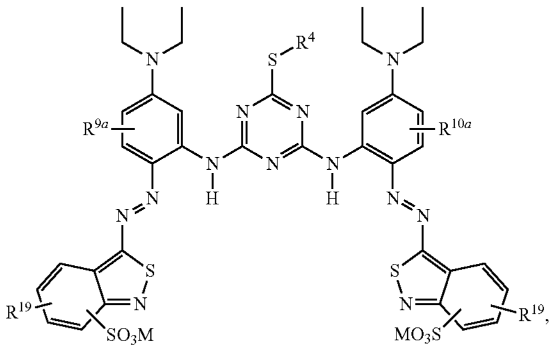
(1ah)
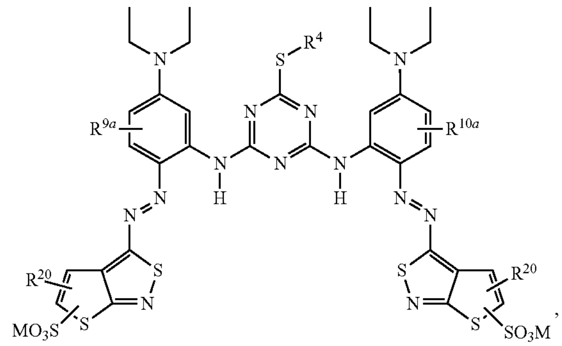
(1ai)
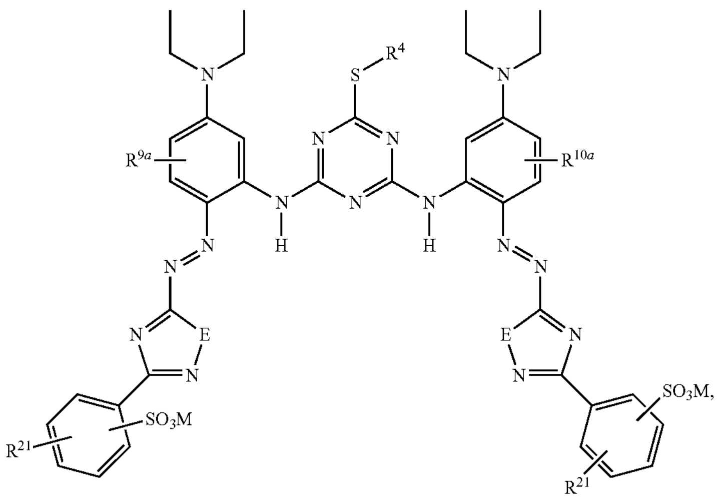
(1aj)
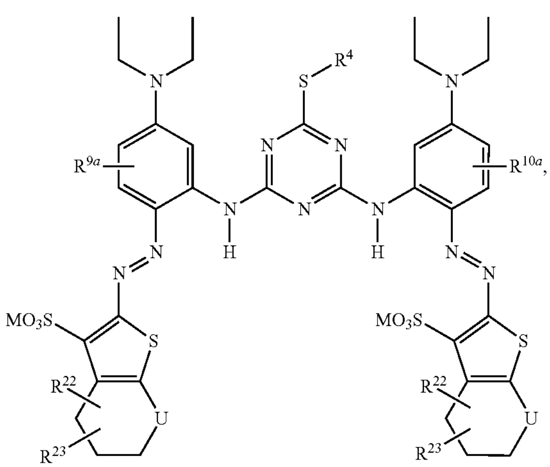

-continued
(1ak)
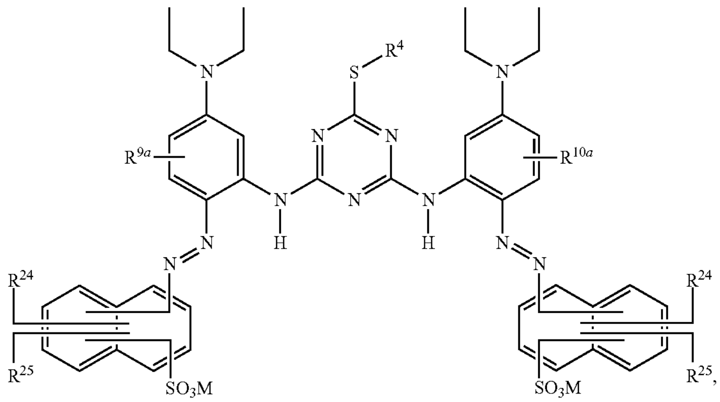
(1al)
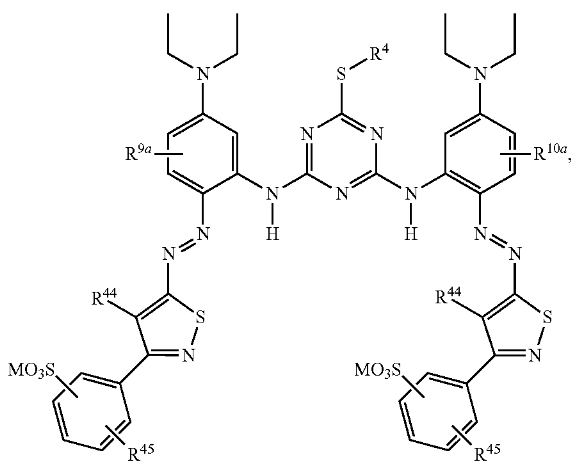
(1am)
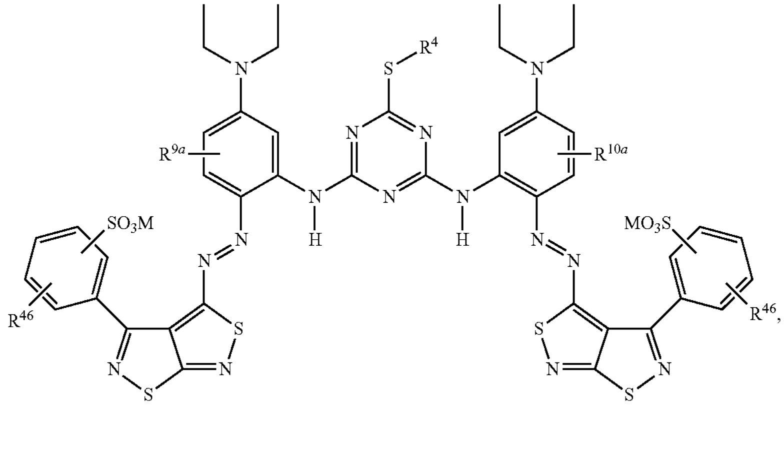

-continued
(1an)
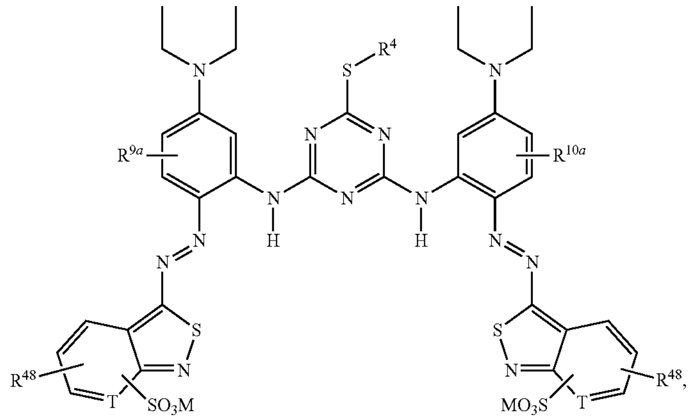
(1a1a)
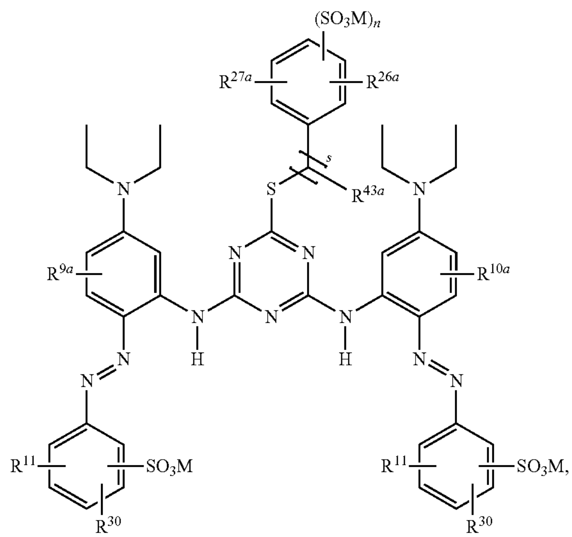
(1a1b)
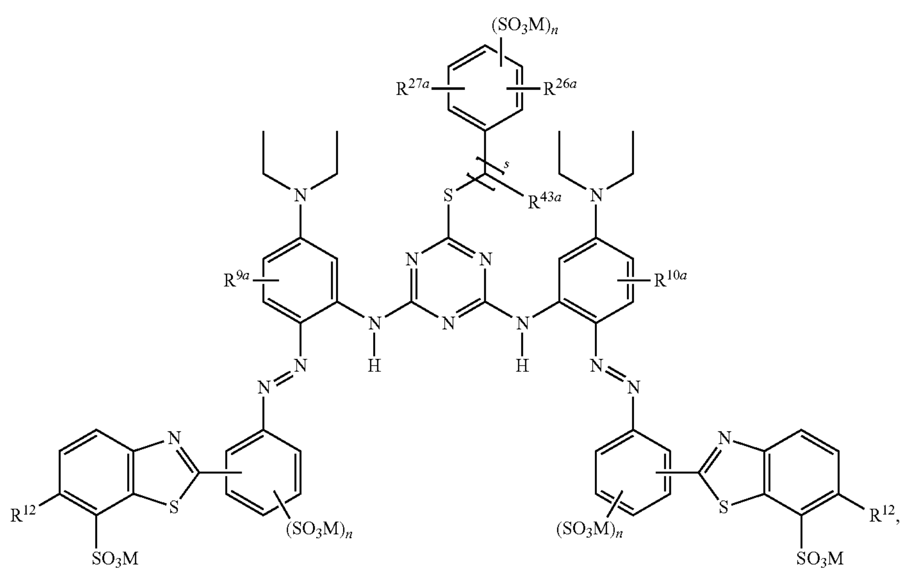

-continued
(1a[1]c)
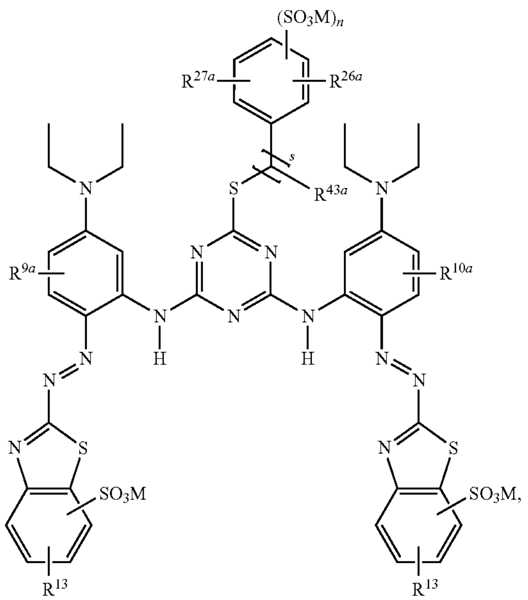
(1a[1]d)
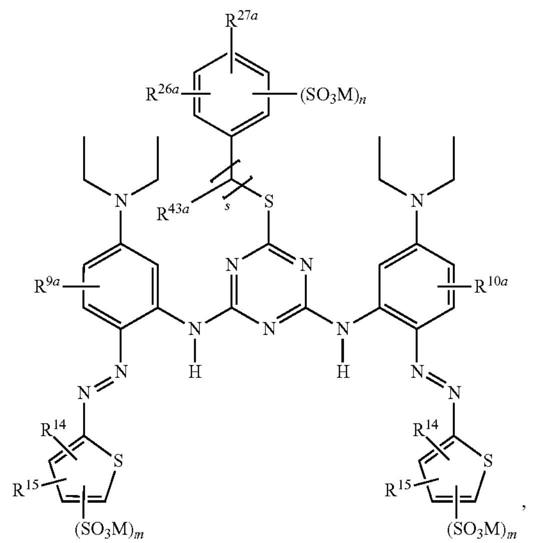
(1a[1]e)
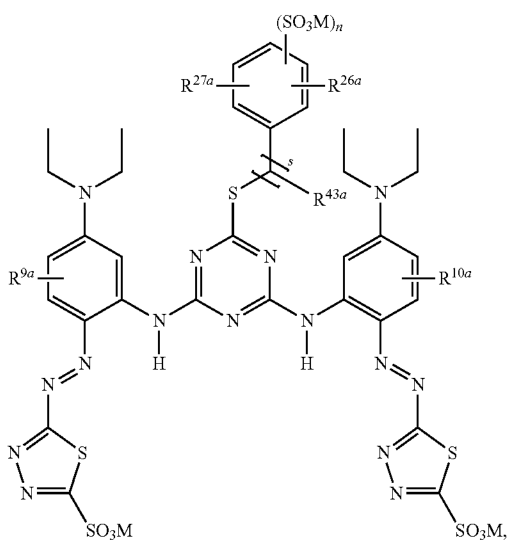
(1a[1]f)
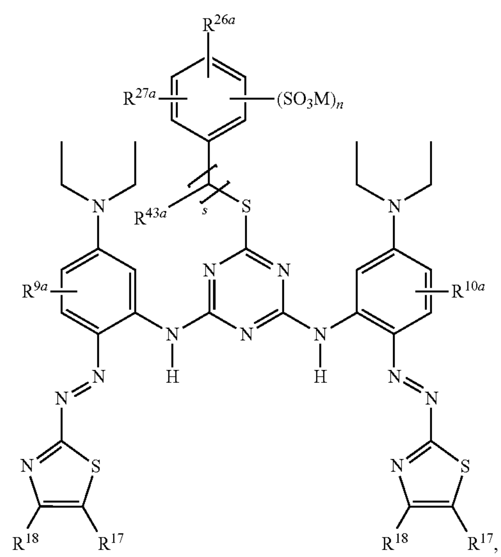
(1a[1]g)
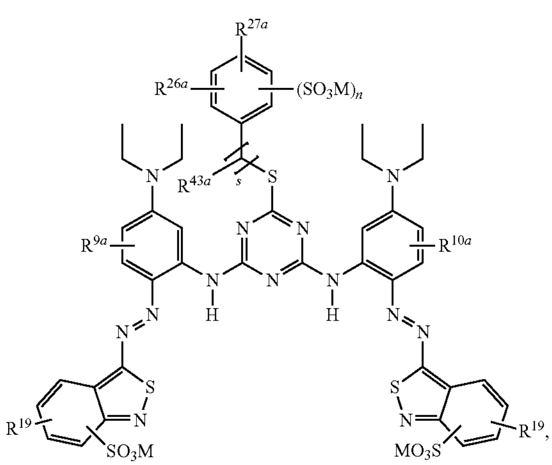
(1a[1]h)
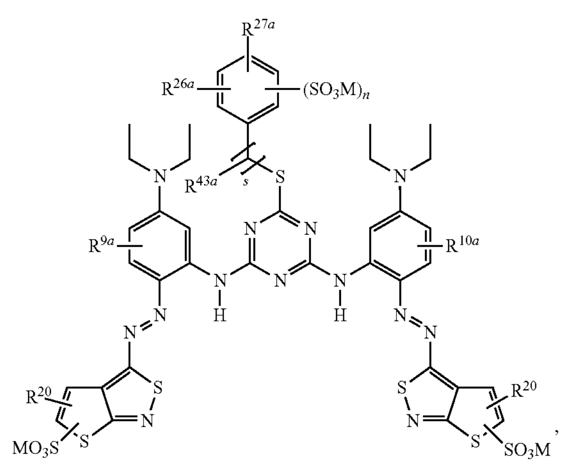

-continued
(1a[1]i)
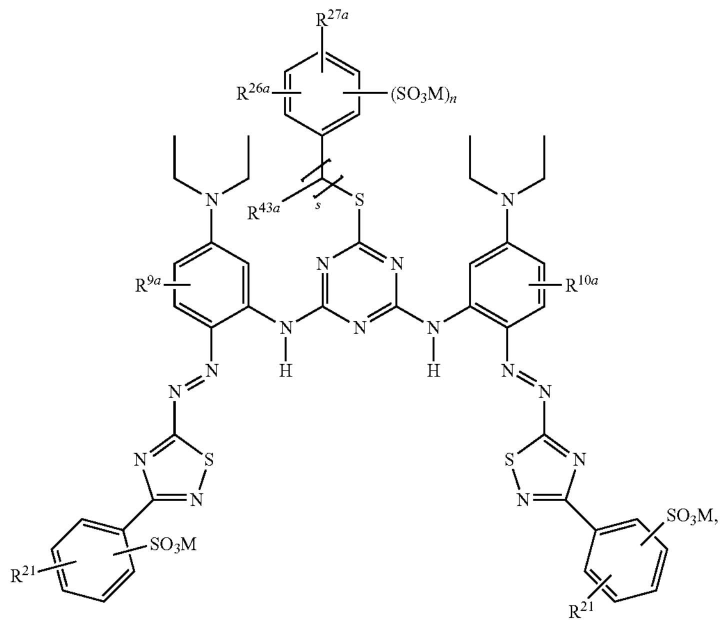
(1a[1]j)
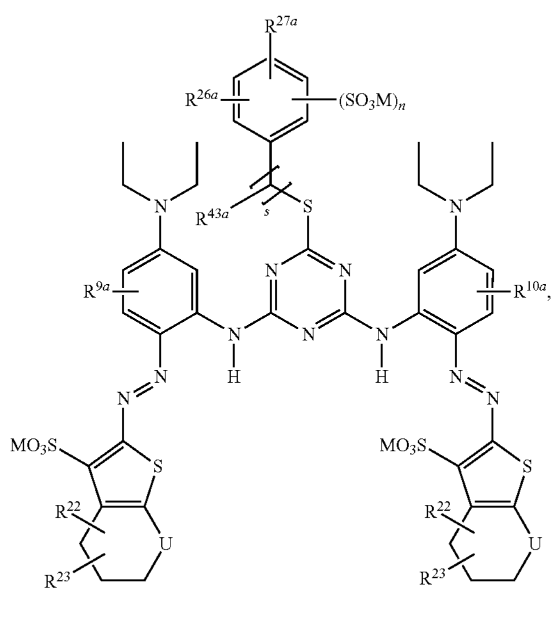

-continued
(1a¹k)
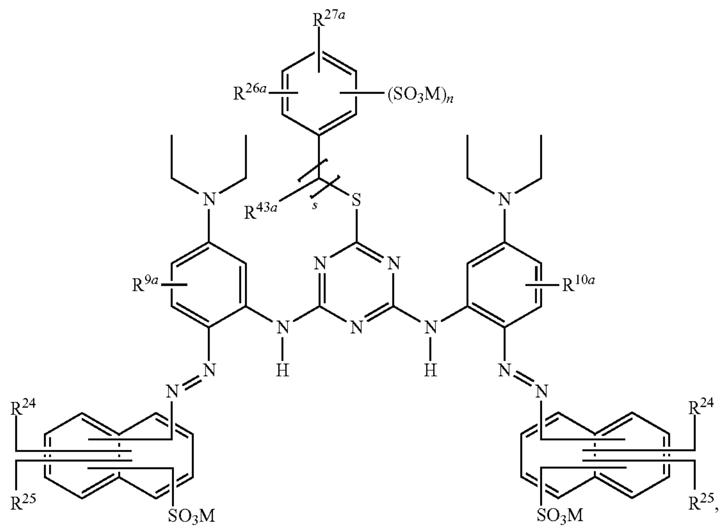
(1a¹l)
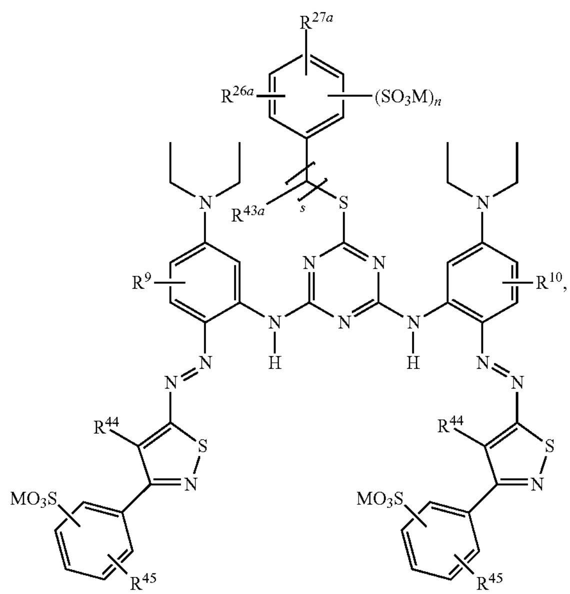
(1a¹m)
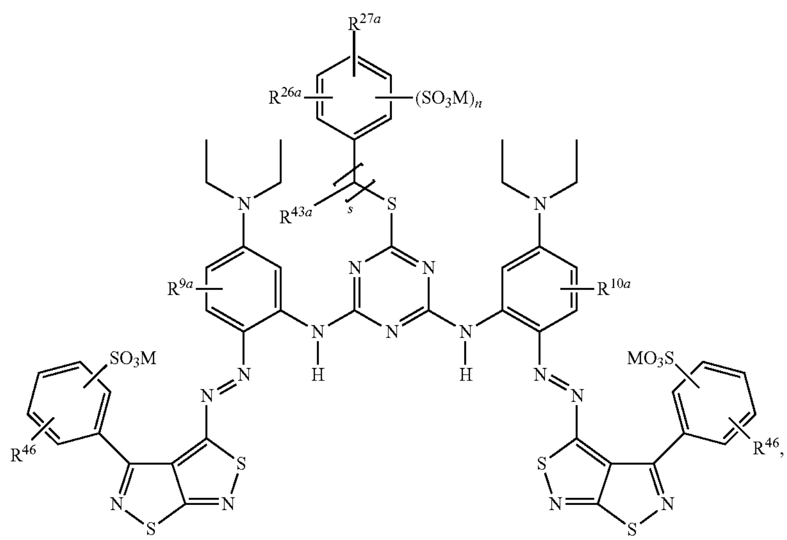

-continued
(1a¹n)
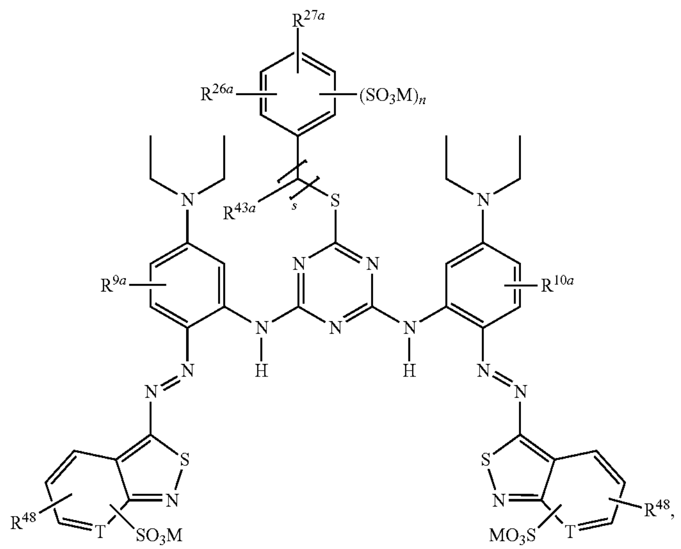
(1a²a)
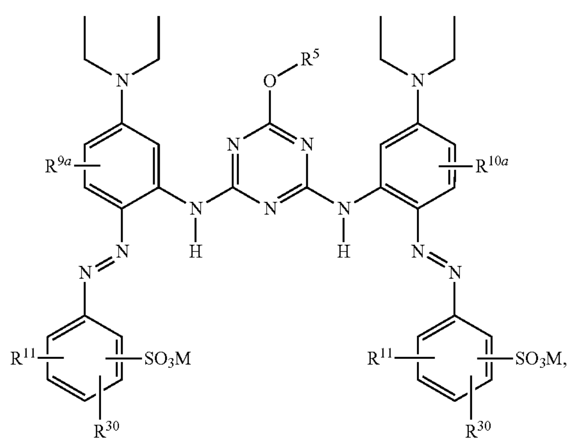
(1a²b)
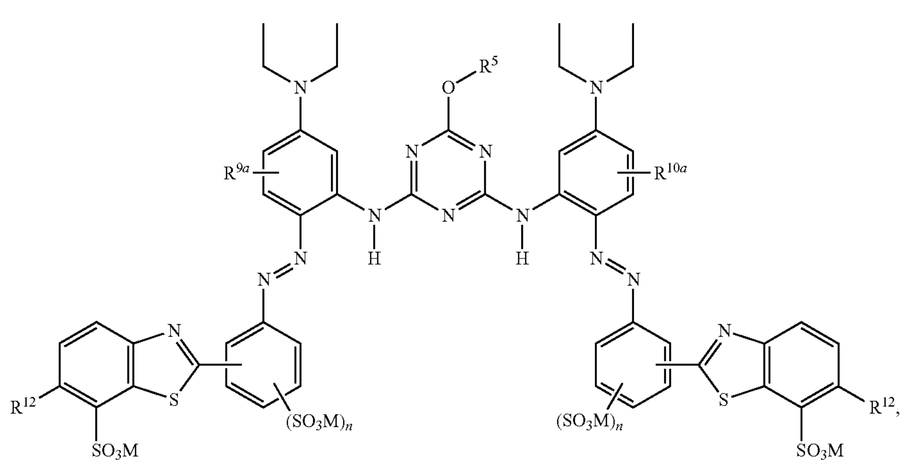

-continued
(1a²c)
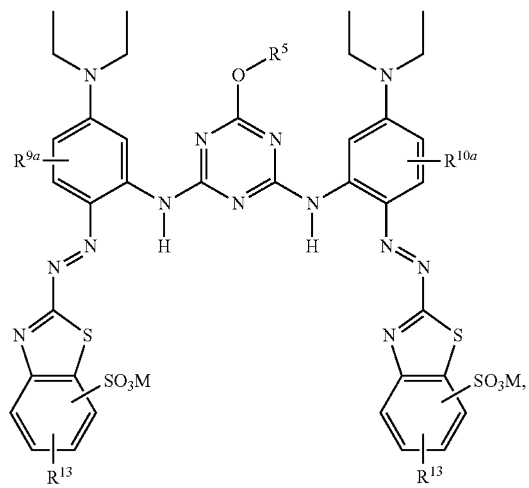
(1a²d)
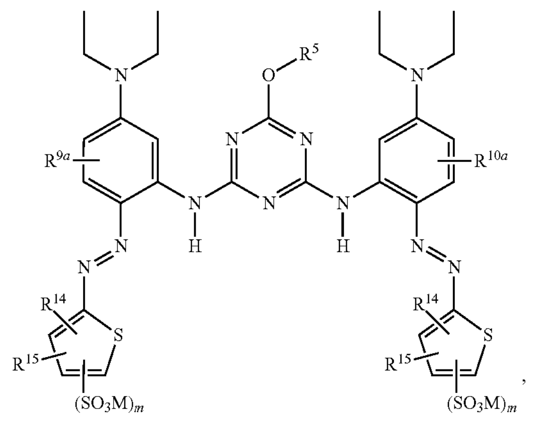
(1a²e)
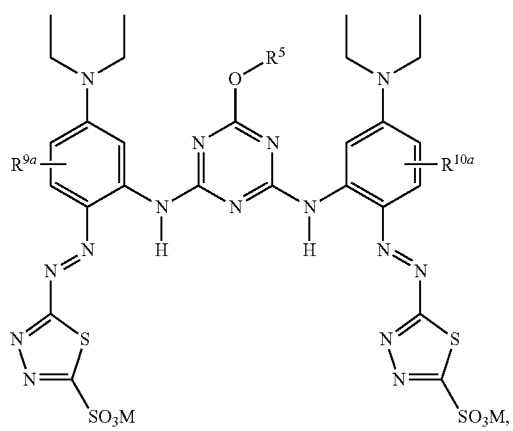
(1a²f)
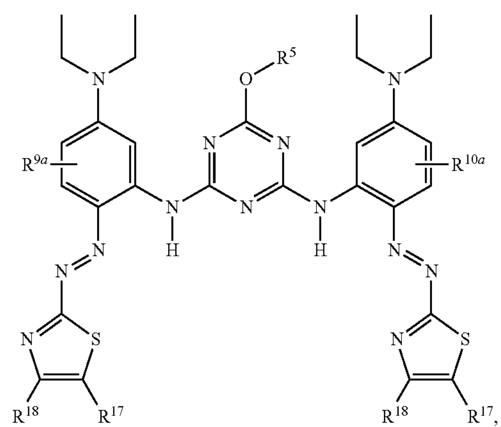
(1a²g)
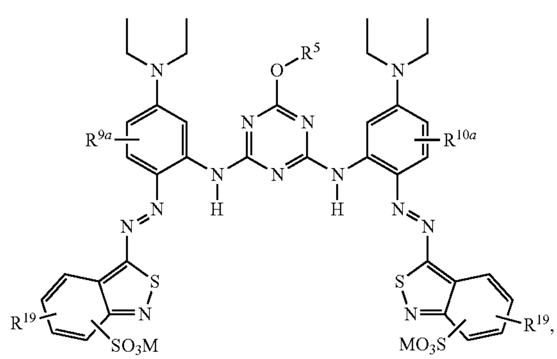
(1a²h)
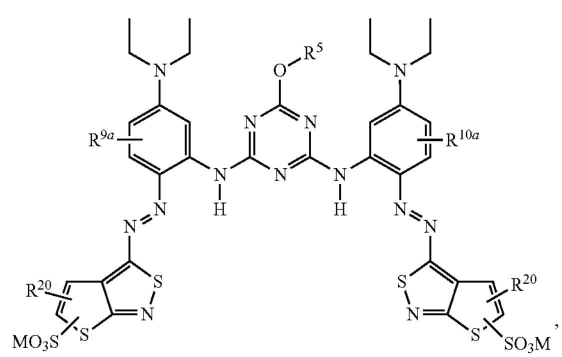

-continued
(1a²i)
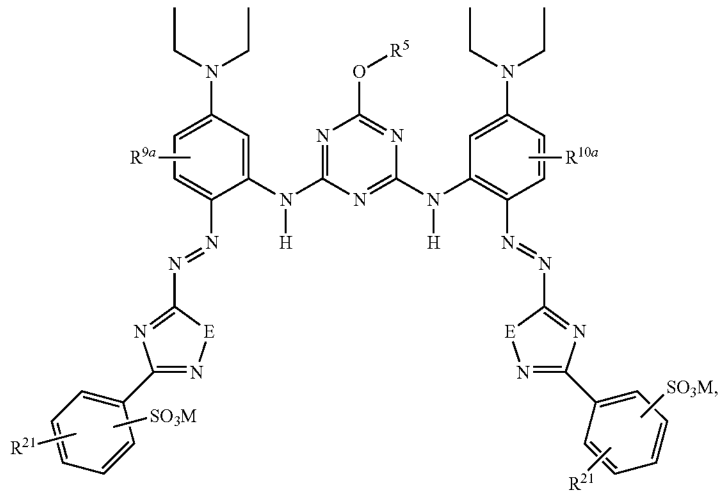
(1a²j)
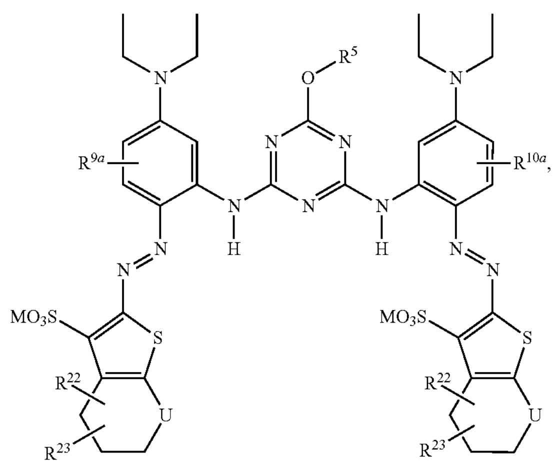
(1a²k)
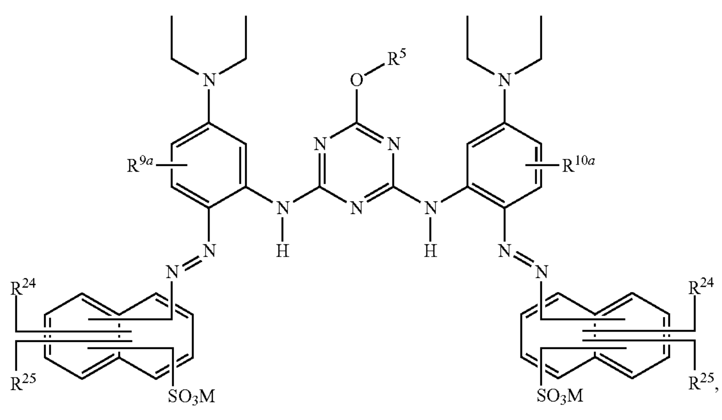

-continued
(1a²l)
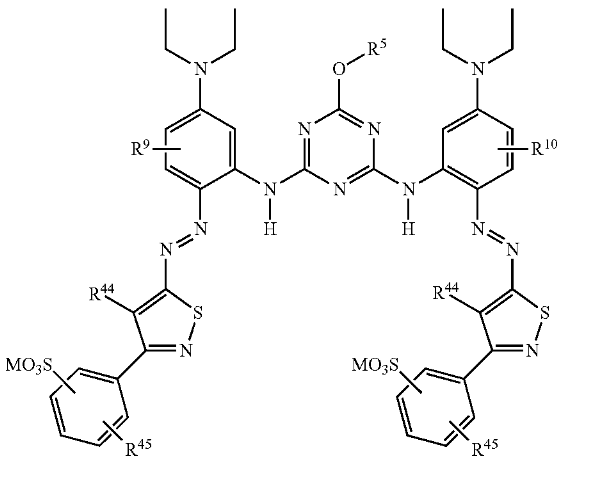
(1a²m)
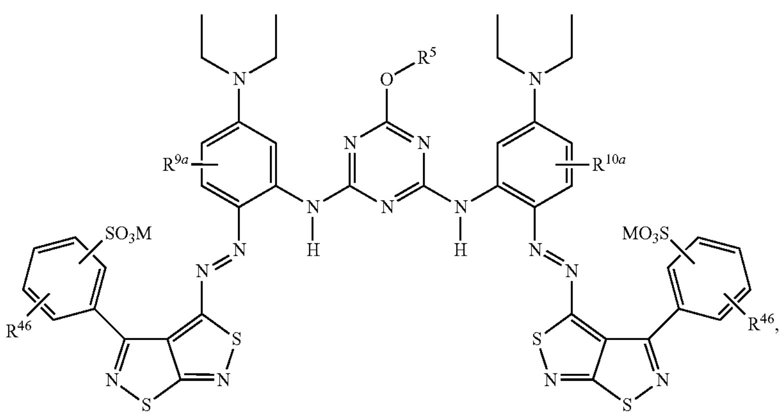
(1a²n)
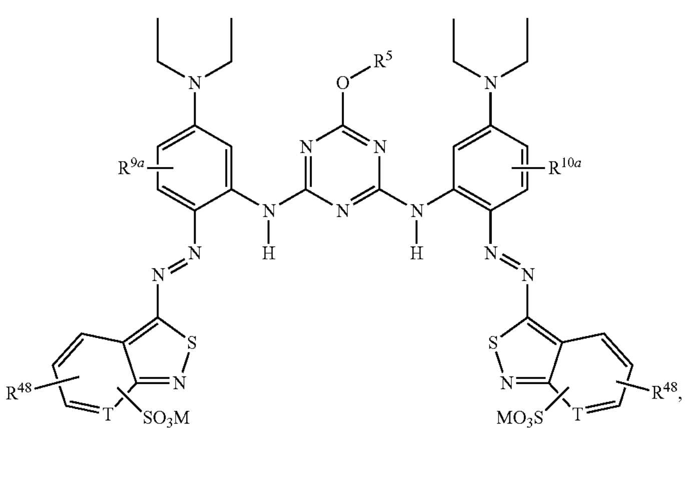

-continued
(1a$^3$a)
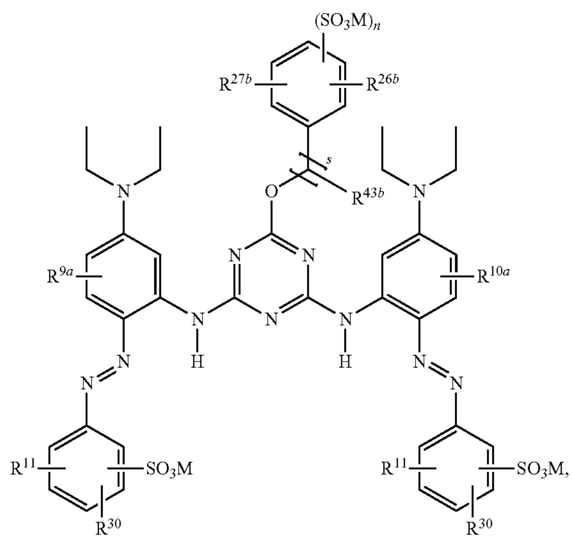
(1a$^3$b)
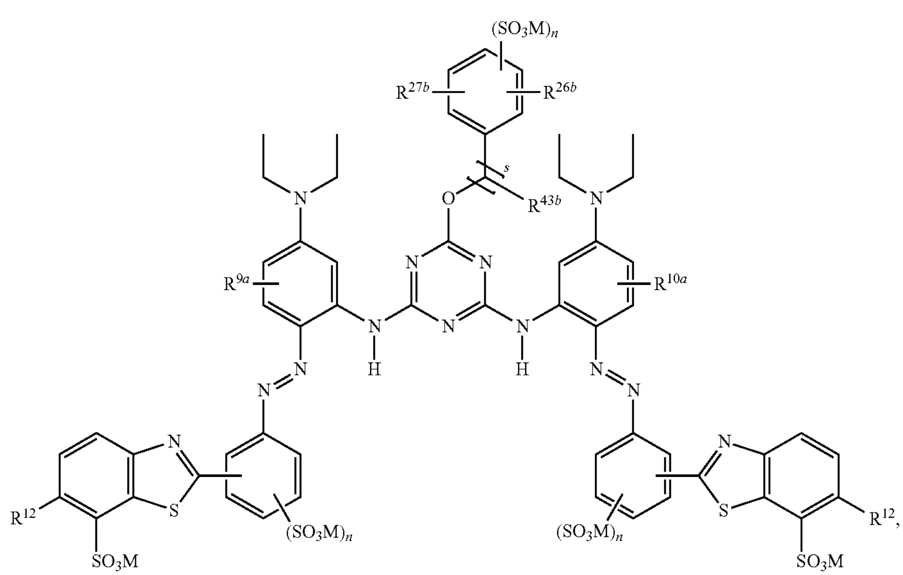

-continued
(1a3c)
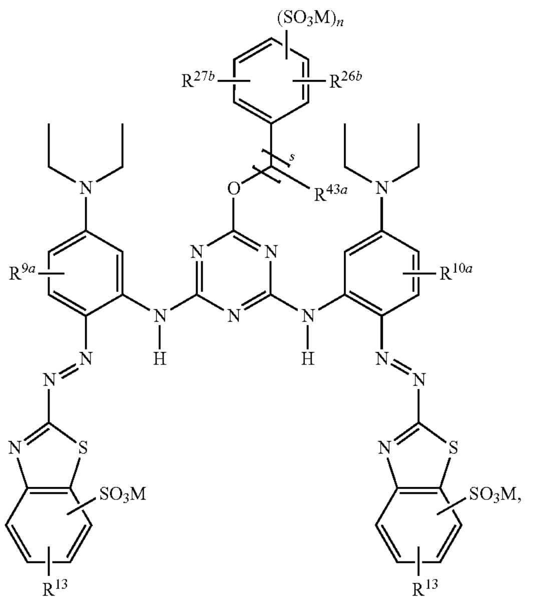
(1a3d)
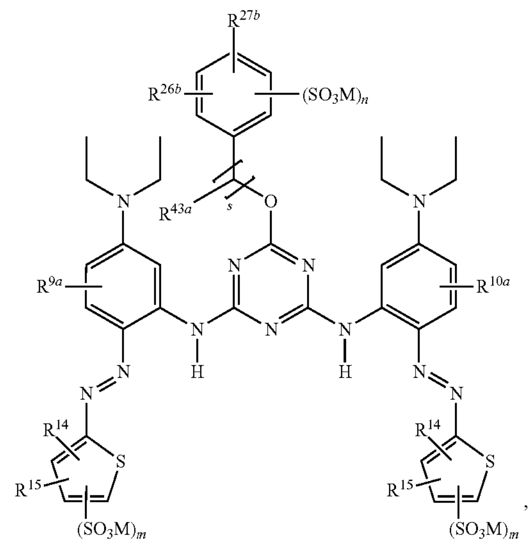
(1a3e)
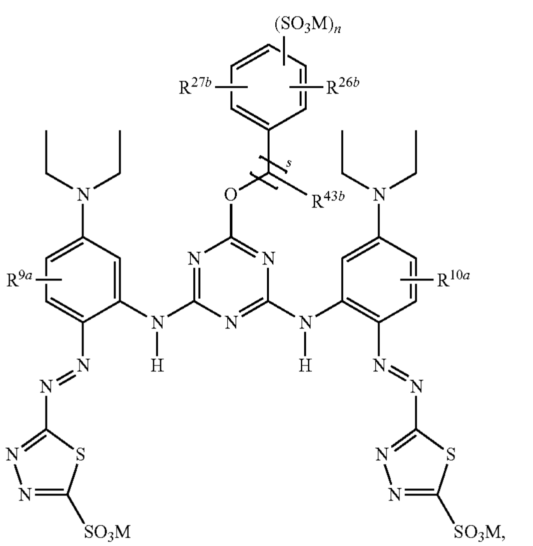
(1a3f)
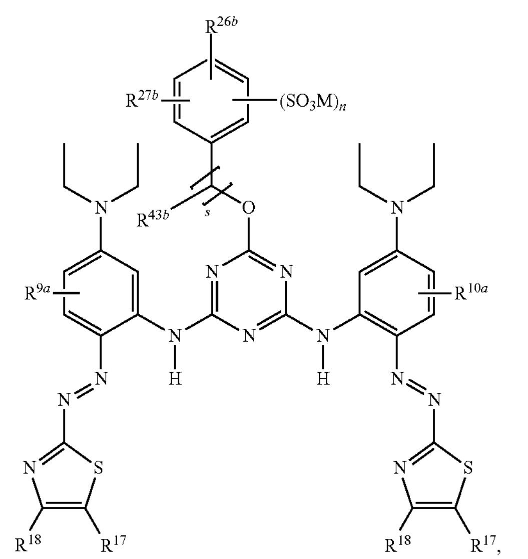
(1a3g)
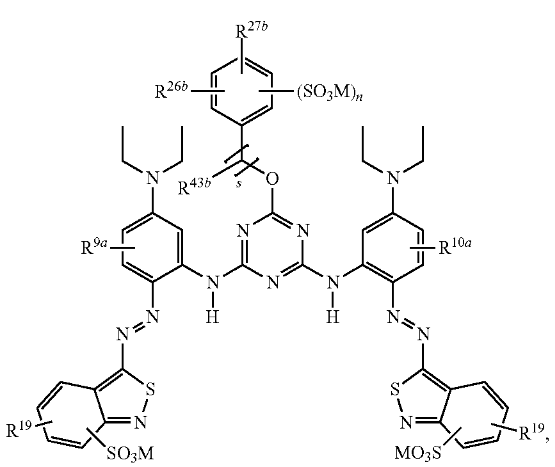
(1a3h)
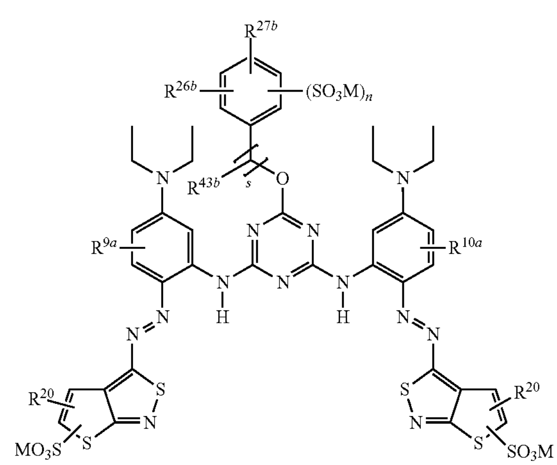

-continued
(1a³i)
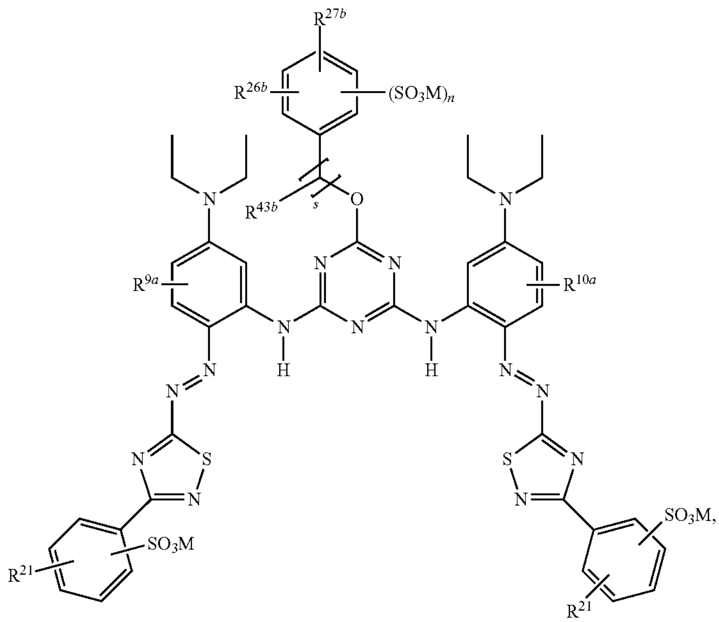
(1a³j)
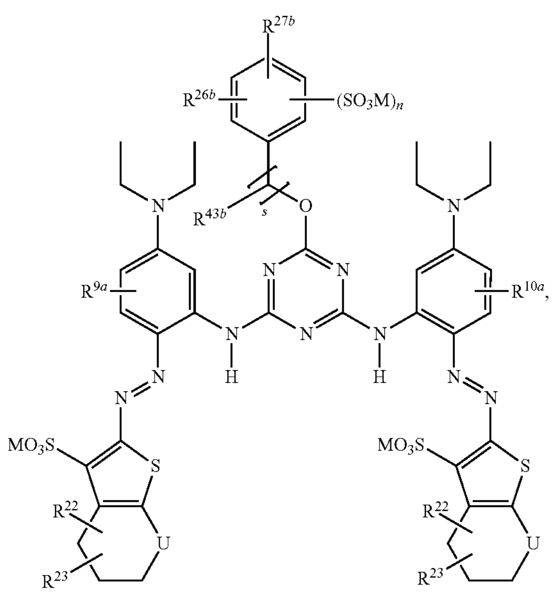

-continued
(1a3k)
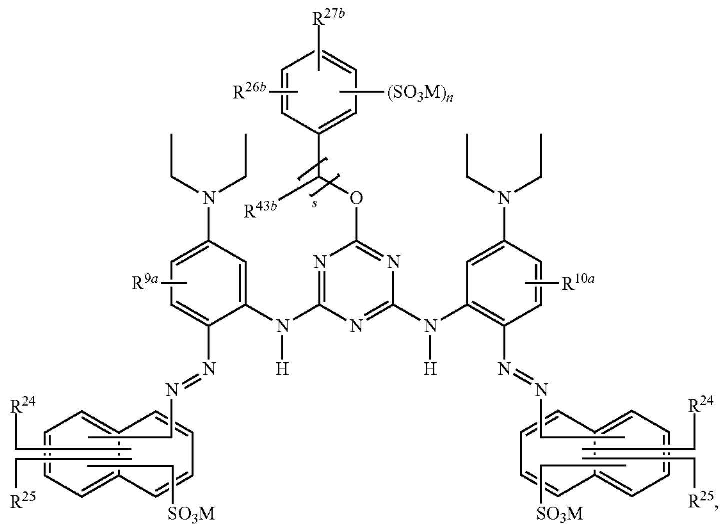
(1a3l)
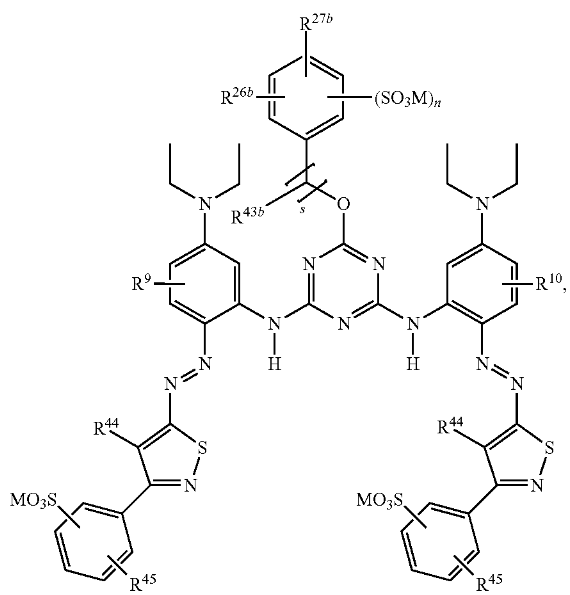
(1a3m)
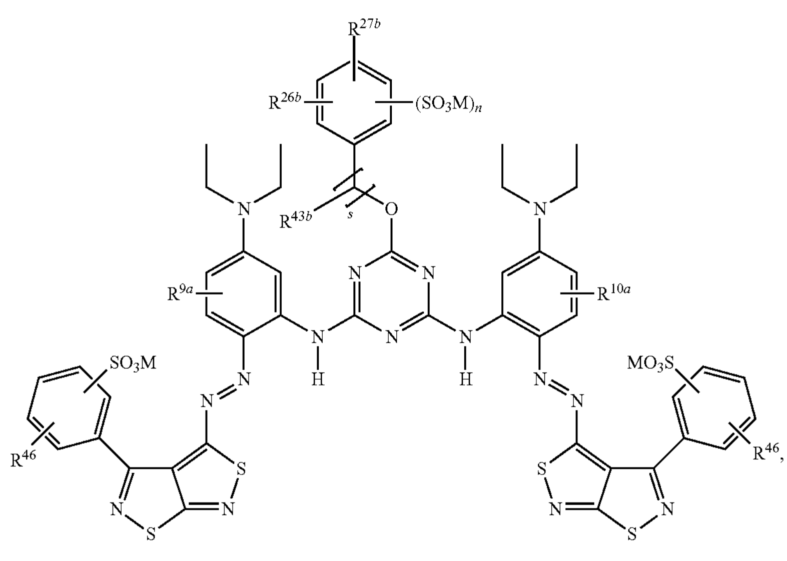

-continued
(1a^3n)
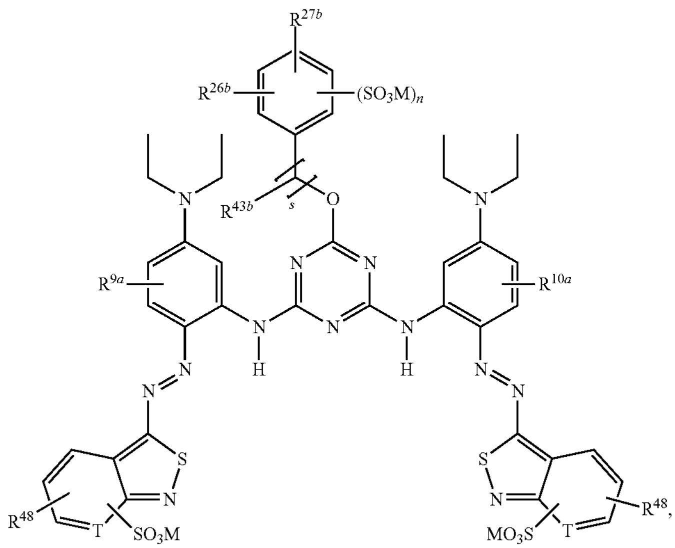
wherein $R^4$, $R^5$, $R^{9a}$, $R^{10a}$, $R^{11}$ to $R^{15}$, $R^{17}$, $R^{18}$, $R^{22}$ to $R^{25}$, $R^{26a}$, $R^{27a}$, $R^{30}$, $R^{43a}$, $R^{44}$, $R^{45}$, $R^{46}$, $R^{48}$, E, T, U, M, n, s and m are defined as given above.
Examples of preferred embodiments of this invention are the dyes from 1-1 to 1-288 (Table 1) and mixtures thereof.
TABLE 1
| Example | Structure |
| --- | --- |
| 1-1 | 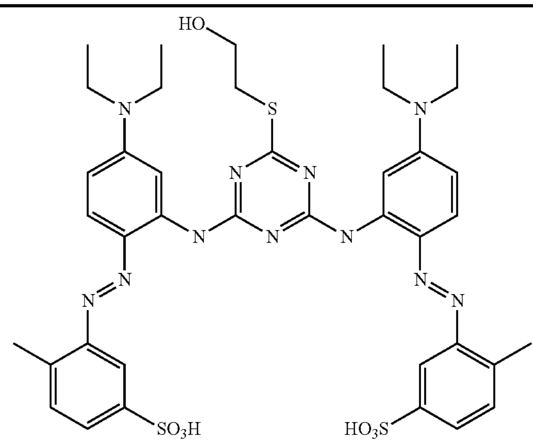 |
| 1-2 | 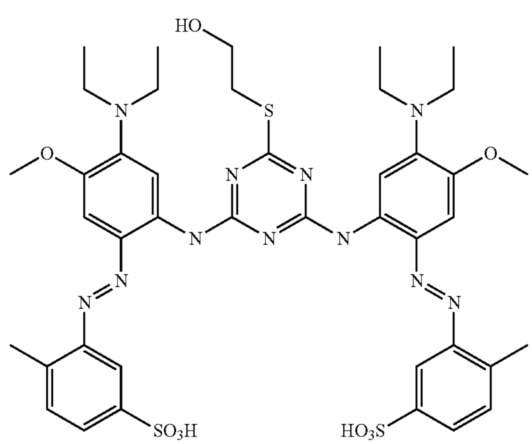 |

TABLE 1-continued
| Example | Structure |
| --- | --- |
| 1-3 | 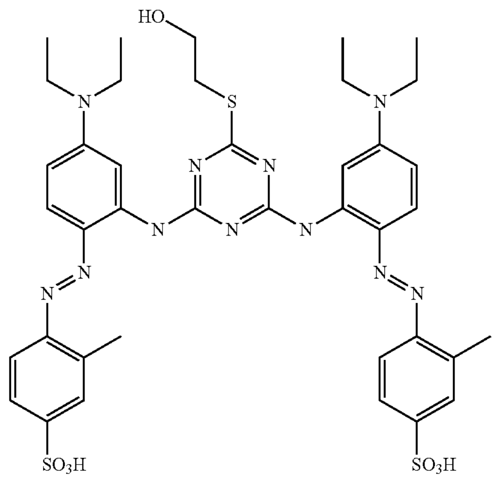 [SMILES: CCN(CC)c1ccc(/N=N/c2ccc(S(=O)(=O)O)cc2C)c(Nc2nc(Nc3cc(N(CC)CC)ccc3/N=N/c3ccc(S(=O)(=O)O)cc3C)nc(SCCO)n2)c1] |
| 1-4 | 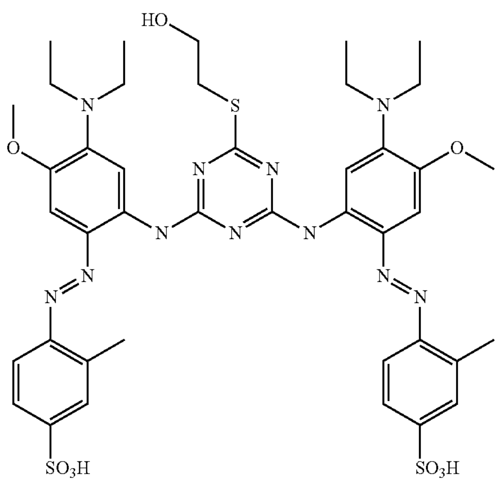 [SMILES: CCN(CC)c1cc(Nc2nc(Nc3cc(N(CC)CC)c(OC)cc3/N=N/c3ccc(S(=O)(=O)O)cc3C)nc(SCCO)n2)c(/N=N/c2ccc(S(=O)(=O)O)cc2C)cc1OC] |
| 1-5 | 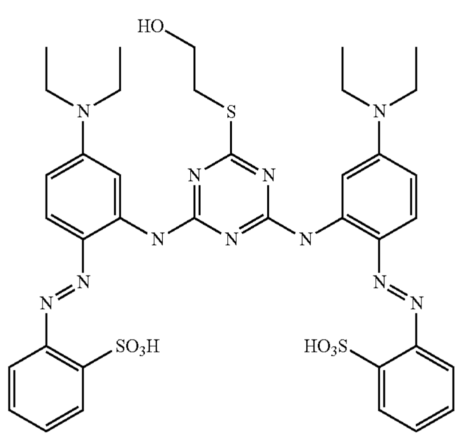 [SMILES: CCN(CC)c1ccc(/N=N/c2ccccc2S(=O)(=O)O)c(Nc2nc(Nc3cc(N(CC)CC)ccc3/N=N/c3ccccc3S(=O)(=O)O)nc(SCCO)n2)c1] |

TABLE 1-continued
| Example | Structure |
|---|---|
| 1-6 | 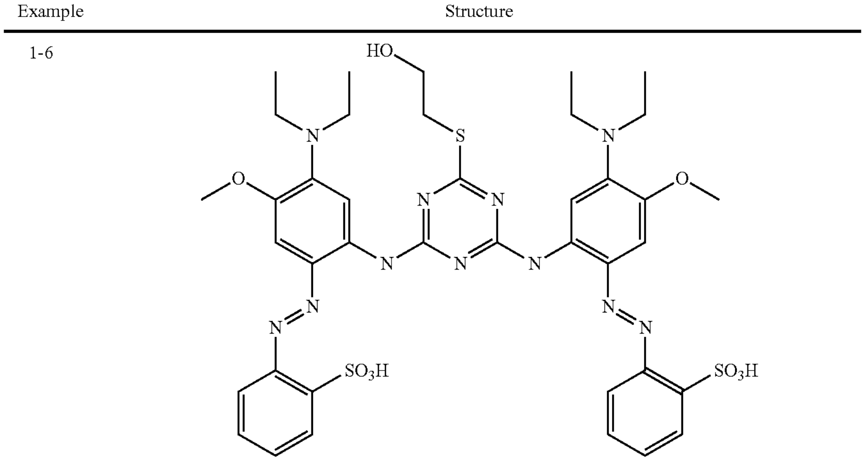 |
| 1-7 | 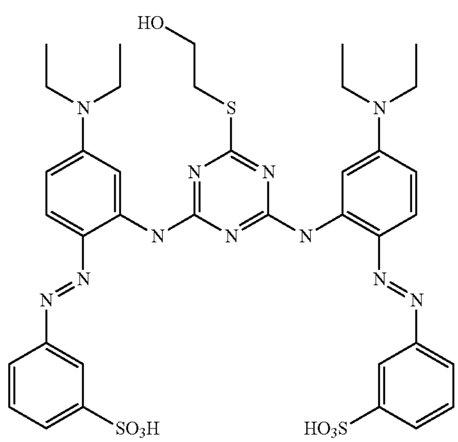 [SMILES: CCN(CC)c1ccc(/N=N/c2cccc(S(=O)(=O)O)c2)c(Nc2nc(Nc3cc(N(CC)CC)ccc3/N=N/c3cccc(S(=O)(=O)O)c3)nc(SCCO)n2)c1] |
| 1-8 | 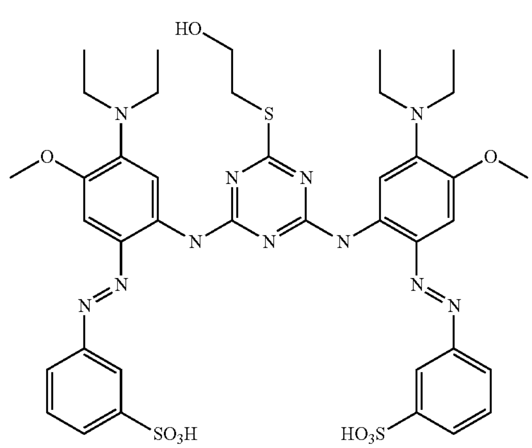 |

TABLE 1-continued
| Example | Structure |
|---|---|
| 1-9 | 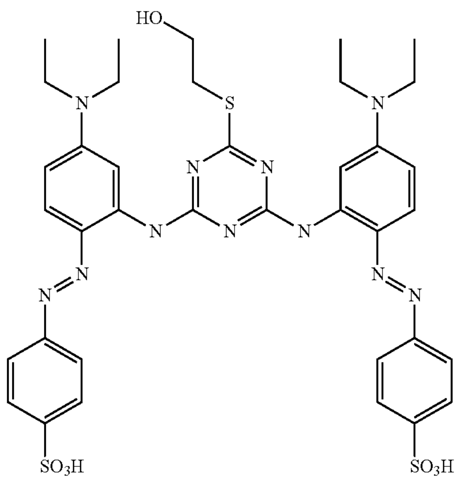 [SMILES: CCN(CC)c1ccc(/N=N/c2ccc(S(=O)(=O)O)cc2)c(Nc2nc(Nc3cc(N(CC)CC)ccc3/N=N/c3ccc(S(=O)(=O)O)cc3)nc(SCCO)n2)c1] |
| 1-10 | 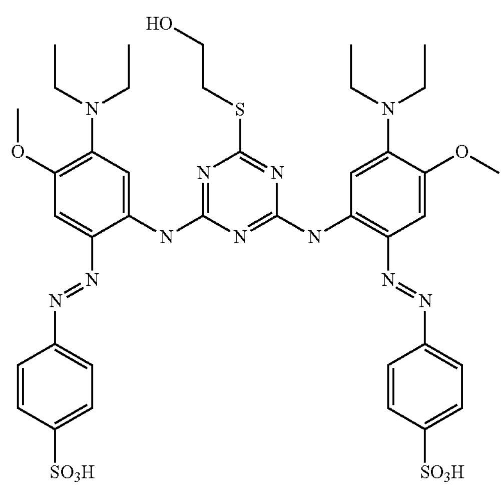 [SMILES: CCN(CC)c1cc(Nc2nc(Nc3cc(N(CC)CC)c(OC)cc3/N=N/c3ccc(S(=O)(=O)O)cc3)nc(SCCO)n2)c(/N=N/c2ccc(S(=O)(=O)O)cc2)cc1OC] |
| 1-11 | 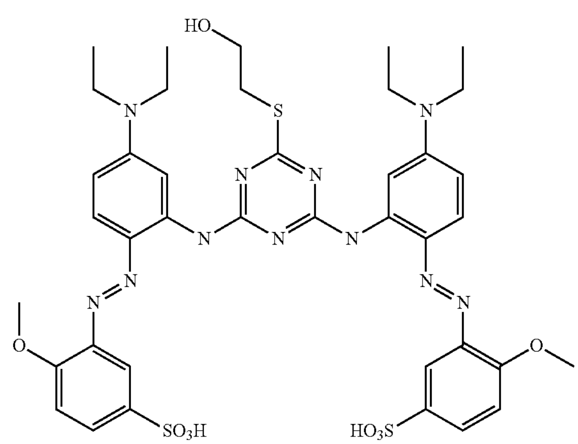 [SMILES: CCN(CC)c1ccc(/N=N/c2cc(S(=O)(=O)O)ccc2OC)c(Nc2nc(Nc3cc(N(CC)CC)ccc3/N=N/c3cc(S(=O)(=O)O)ccc3OC)nc(SCCO)n2)c1] |

TABLE 1-continued
| Example | Structure |
|---|---|
| 1-12 | 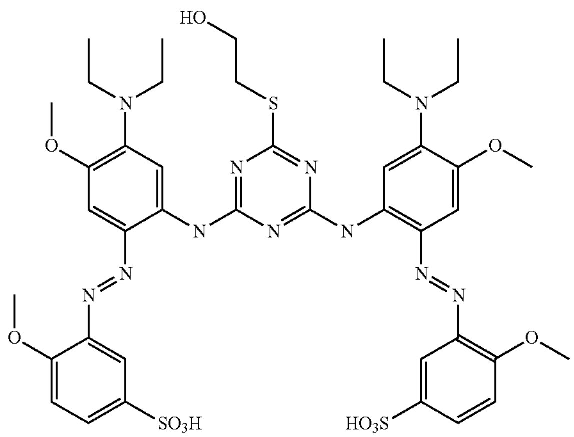 [SMILES: CCN(CC)c1cc(Nc2nc(Nc3cc(N(CC)CC)c(OC)cc3/N=N/c3cc(S(=O)(=O)O)ccc3OC)nc(SCCO)n2)c(/N=N/c2cc(S(=O)(=O)O)ccc2OC)cc1OC] |
| 1-13 | 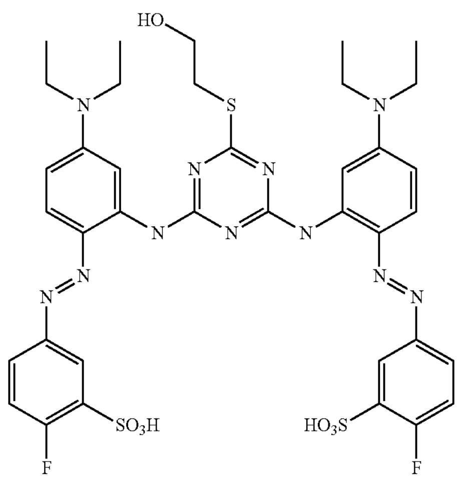 [SMILES: CCN(CC)c1ccc(/N=N/c2ccc(F)c(S(=O)(=O)O)c2)c(Nc2nc(Nc3cc(N(CC)CC)ccc3/N=N/c3ccc(F)c(S(=O)(=O)O)c3)nc(SCCO)n2)c1] |
| 1-14 | 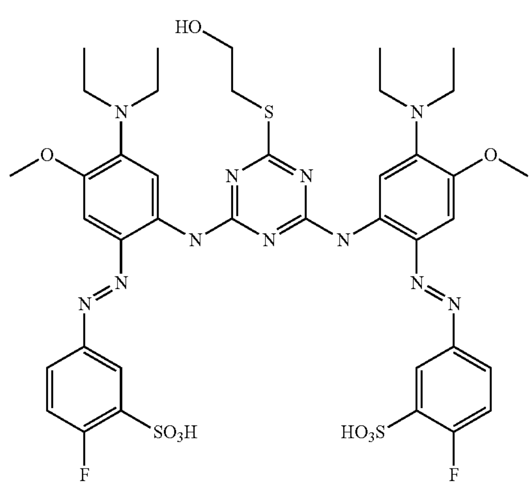 |

TABLE 1-continued
| Example | Structure |
|---|---|
| 1-15 | 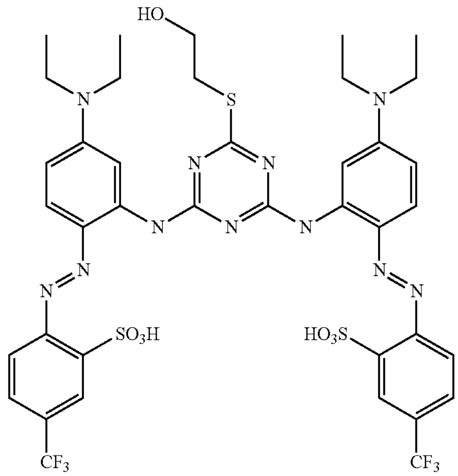 [SMILES: CCN(CC)c1ccc(/N=N/c2ccc(C(F)(F)F)cc2S(=O)(=O)O)c(Nc2nc(Nc3cc(N(CC)CC)ccc3/N=N/c3ccc(C(F)(F)F)cc3S(=O)(=O)O)nc(SCCO)n2)c1] |
| 1-16 | 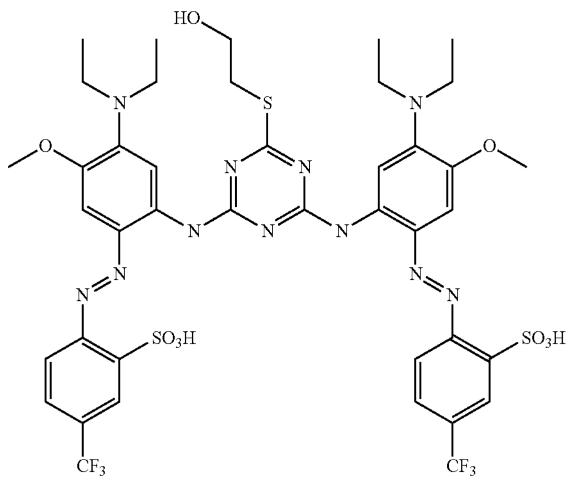 [SMILES: CCN(CC)c1cc(Nc2nc(Nc3cc(N(CC)CC)c(OC)cc3/N=N/c3ccc(C(F)(F)F)cc3S(=O)(=O)O)nc(SCCO)n2)c(/N=N/c2ccc(C(F)(F)F)cc2S(=O)(=O)O)cc1OC] |
| 1-17 | 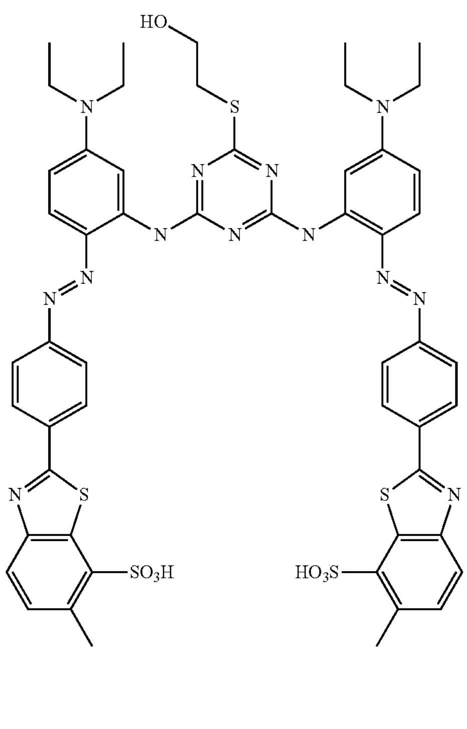 [SMILES: CCN(CC)c1ccc(/N=N/c2ccc(-c3nc4ccc(C)c(S(=O)(=O)O)c4s3)cc2)c(Nc2nc(Nc3cc(N(CC)CC)ccc3/N=N/c3ccc(-c4nc5ccc(C)c(S(=O)(=O)O)c5s4)cc3)nc(SCCO)n2)c1] |

TABLE 1-continued
| Example | Structure |
|---|---|
| 1-18 | 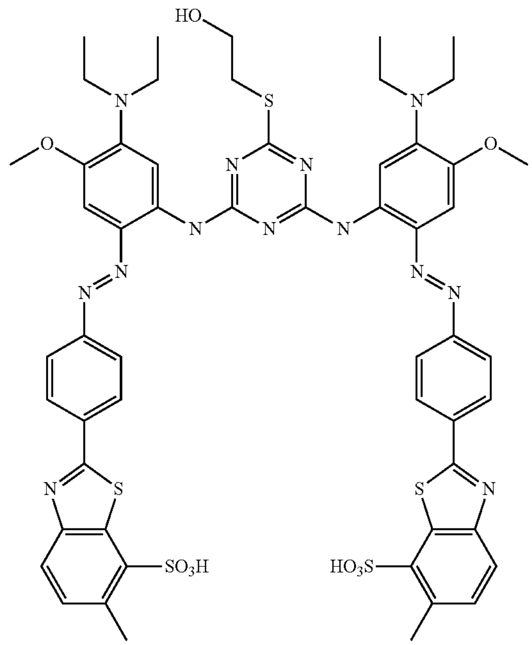 |
| 1-19 | 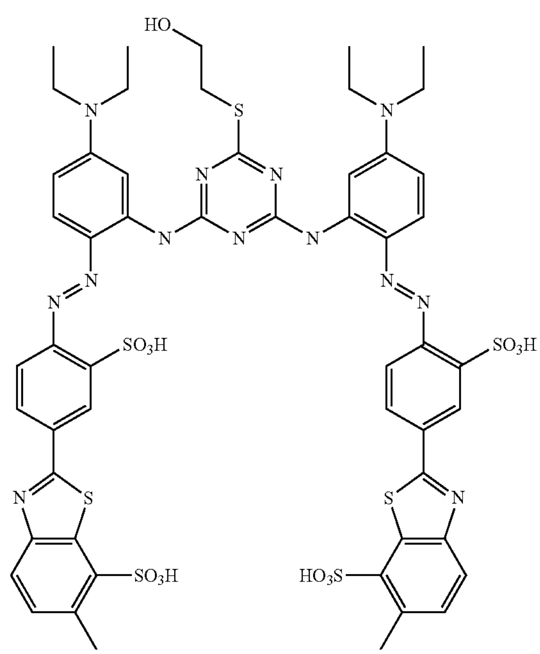 [SMILES: CCN(CC)c1ccc(/N=N/c2ccc(-c3nc4ccc(C)c(S(=O)(=O)O)c4s3)cc2S(=O)(=O)O)c(Nc2nc(Nc3cc(N(CC)CC)ccc3/N=N/c3ccc(-c4nc5ccc(C)c(S(=O)(=O)O)c5s4)cc3S(=O)(=O)O)nc(SCCO)n2)c1] |

TABLE 1-continued
| Example | Structure |
|---|---|
| 1-20 | 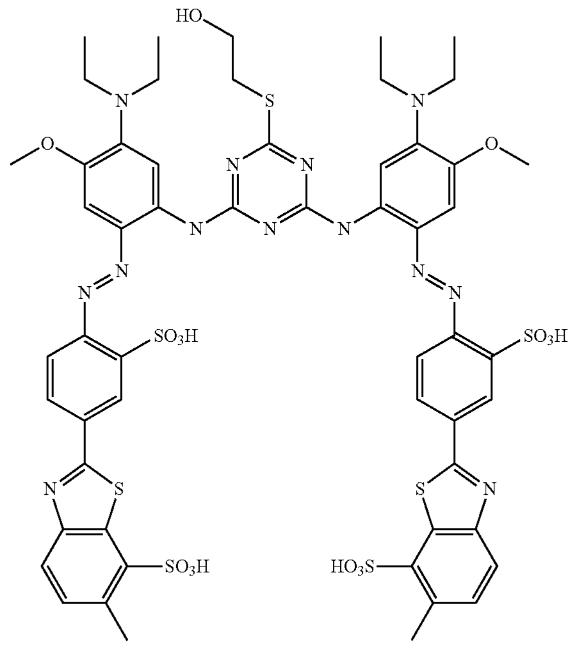 [SMILES: CCN(CC)c1cc(Nc2nc(Nc3cc(N(CC)CC)c(OC)cc3/N=N/c3ccc(-c4nc5ccc(C)c(S(=O)(=O)O)c5s4)cc3S(=O)(=O)O)nc(SCCO)n2)c(/N=N/c2ccc(-c3nc4ccc(C)c(S(=O)(=O)O)c4s3)cc2S(=O)(=O)O)cc1OC] |
| 1-21 | 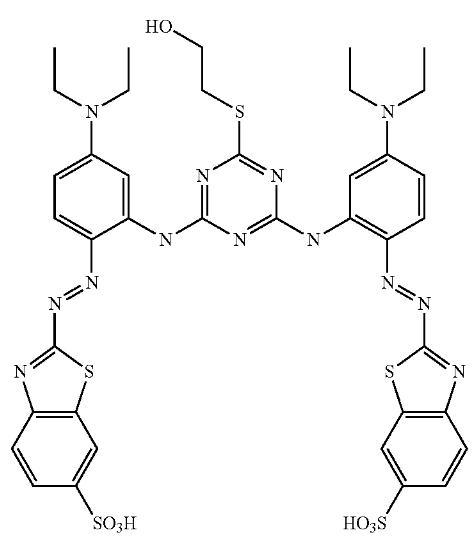 [SMILES: CCN(CC)c1ccc(/N=N/c2nc3ccc(S(=O)(=O)O)cc3s2)c(Nc2nc(Nc3cc(N(CC)CC)ccc3/N=N/c3nc4ccc(S(=O)(=O)O)cc4s3)nc(SCCO)n2)c1] |

TABLE 1-continued
| Example | Structure |
| --- | --- |
| 1-22 | 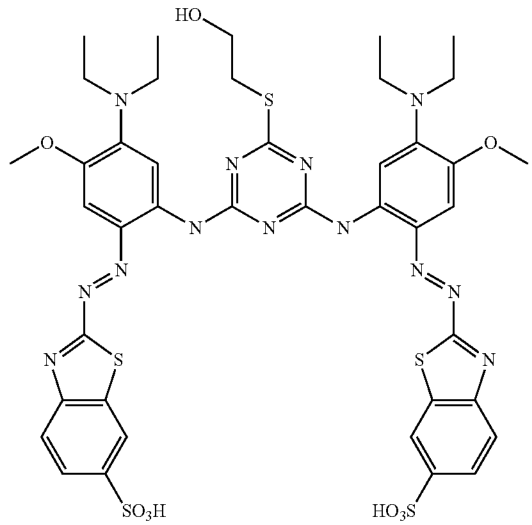 |
| 1-23 | 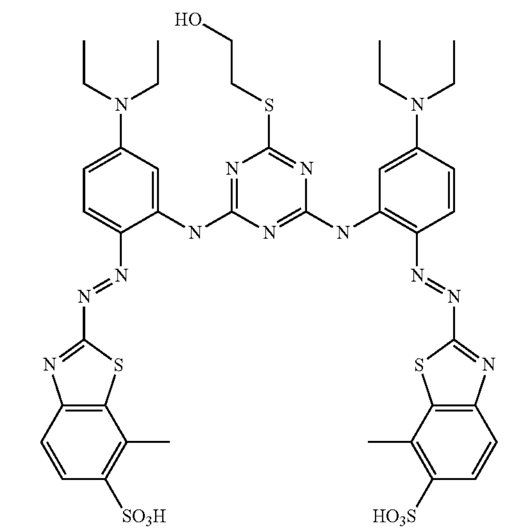 [SMILES: CCN(CC)c1ccc(/N=N/c2nc3ccc(S(=O)(=O)O)c(C)c3s2)c(Nc2nc(Nc3cc(N(CC)CC)ccc3/N=N/c3nc4ccc(S(=O)(=O)O)c(C)c4s3)nc(SCCO)n2)c1] |
| 1-24 | 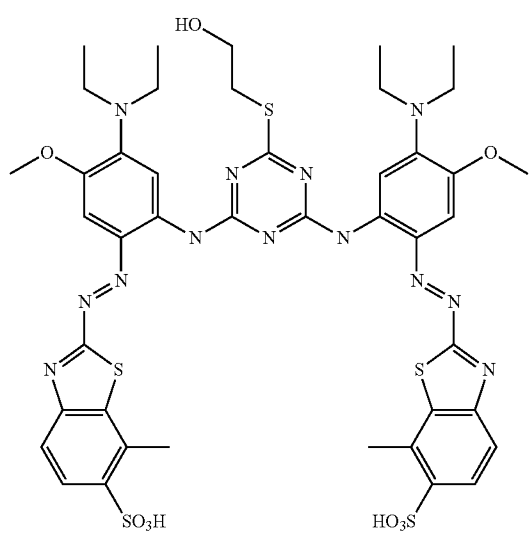 |

TABLE 1-continued
| Example | Structure |
| --- | --- |
| 1-25 | 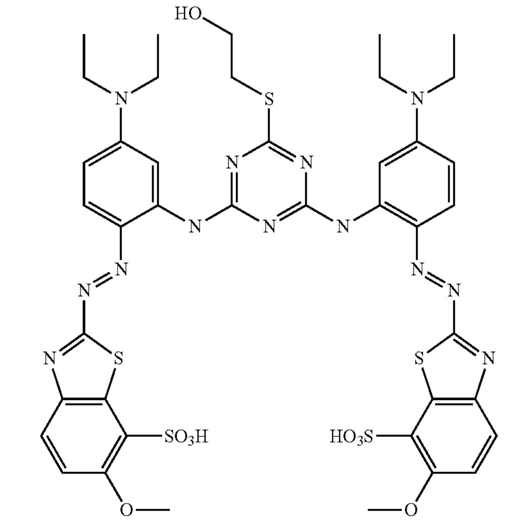 [SMILES: CCN(CC)c1ccc(/N=N/c2nc3ccc(OC)c(S(=O)(=O)O)c3s2)c(Nc2nc(Nc3cc(N(CC)CC)ccc3/N=N/c3nc4ccc(OC)c(S(=O)(=O)O)c4s3)nc(SCCO)n2)c1] |
| 1-26 | 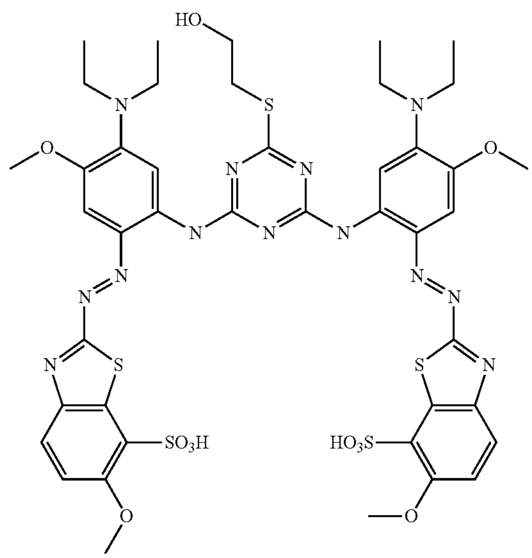 |
| 1-27 | 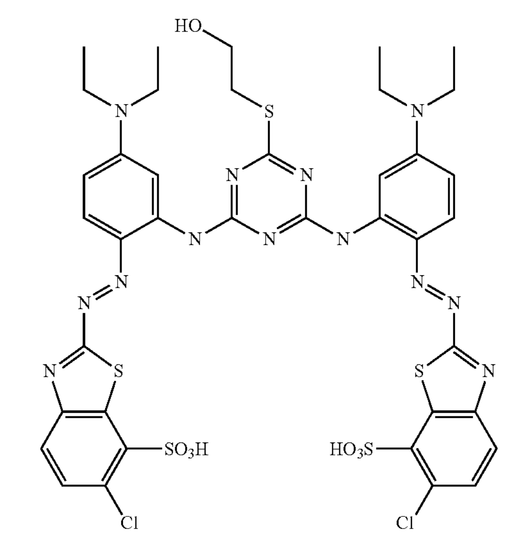 [SMILES: CCN(CC)c1ccc(/N=N/c2nc3ccc(Cl)c(S(=O)(=O)O)c3s2)c(Nc2nc(Nc3cc(N(CC)CC)ccc3/N=N/c3nc4ccc(Cl)c(S(=O)(=O)O)c4s3)nc(SCCO)n2)c1] |

TABLE 1-continued
| Example | Structure |
| --- | --- |
| 1-28 | 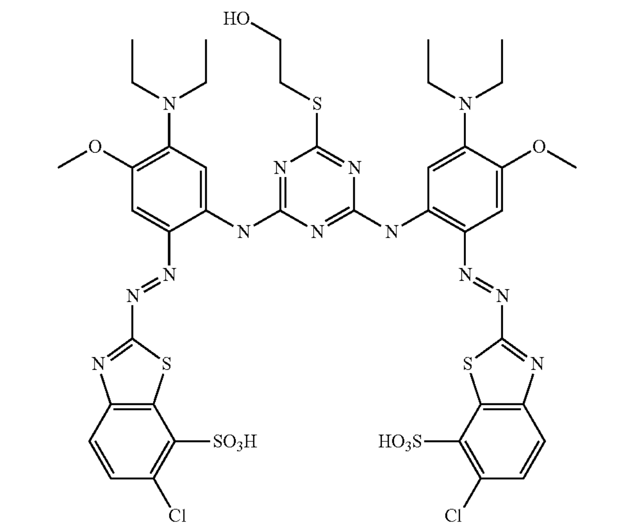 |
| 1-29 | 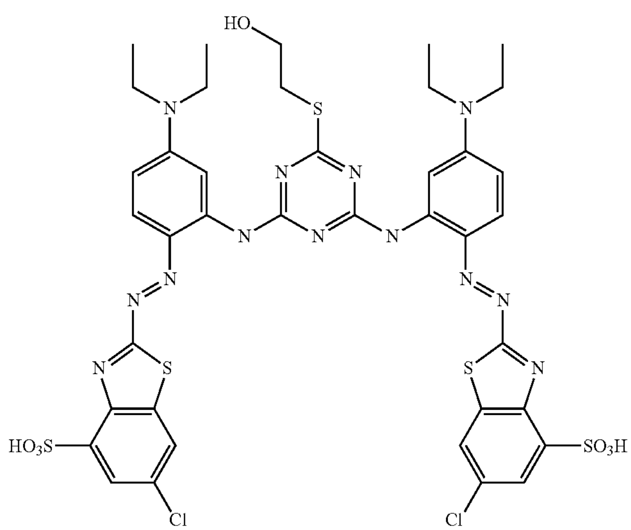 [SMILES: CCN(CC)c1ccc(/N=N/c2nc3c(S(=O)(=O)O)cc(Cl)cc3s2)c(Nc2nc(Nc3cc(N(CC)CC)ccc3/N=N/c3nc4c(S(=O)(=O)O)cc(Cl)cc4s3)nc(SCCO)n2)c1] |
| 1-30 | 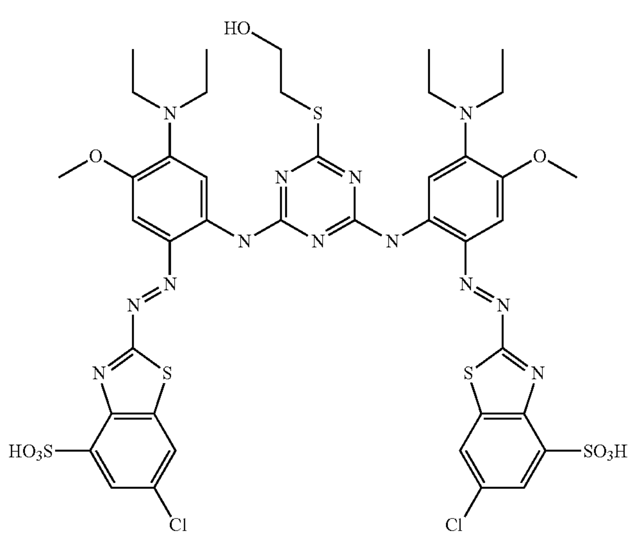 [SMILES: CCN(CC)c1cc(Nc2nc(Nc3cc(N(CC)CC)c(OC)cc3/N=N/c3nc4c(S(=O)(=O)O)cc(Cl)cc4s3)nc(SCCO)n2)c(/N=N/c2nc3c(S(=O)(=O)O)cc(Cl)cc3s2)cc1OC] |

TABLE 1-continued
| Example | Structure |
| --- | --- |
| 1-31 | 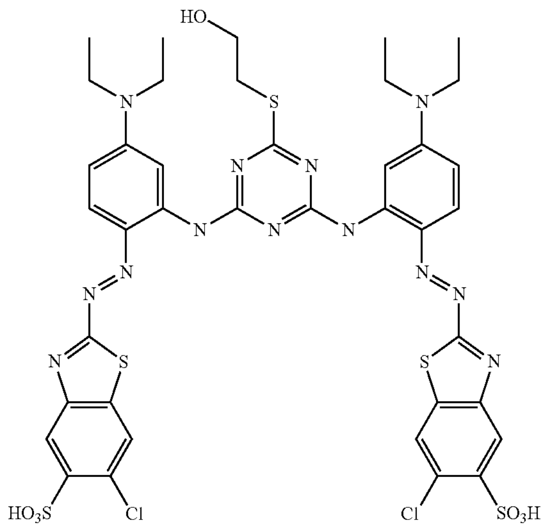 |
| 1-32 | 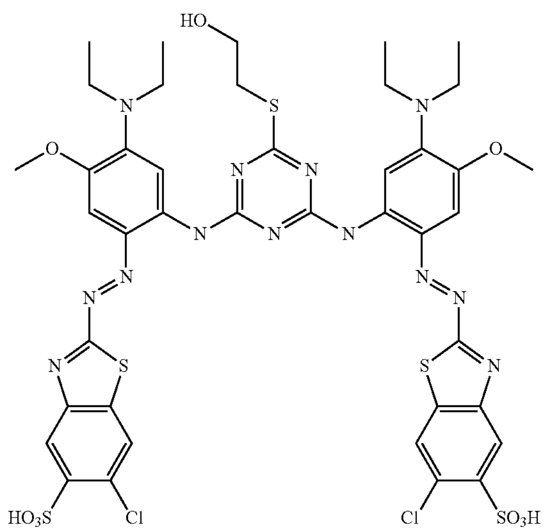 |
| 1-33 | 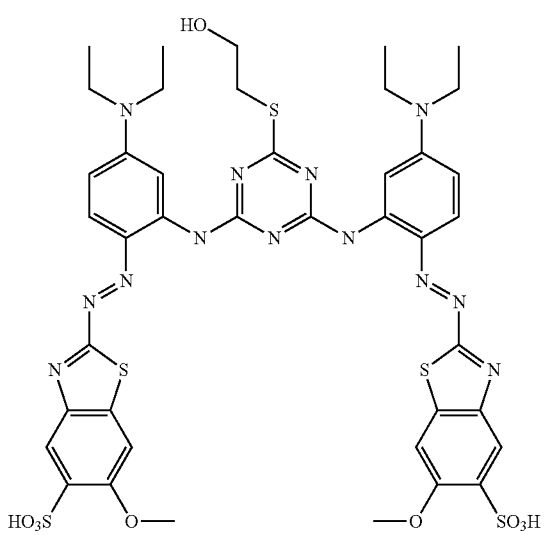 [SMILES: CCN(CC)c1ccc(/N=N/c2nc3cc(S(=O)(=O)O)c(OC)cc3s2)c(Nc2nc(Nc3cc(N(CC)CC)ccc3/N=N/c3nc4cc(S(=O)(=O)O)c(OC)cc4s3)nc(SCCO)n2)c1] |

TABLE 1-continued
| Example | Structure |
| --- | --- |
| 1-34 | 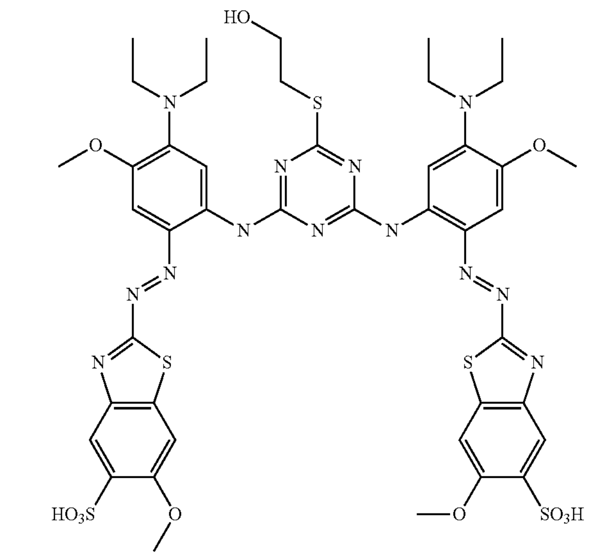 |
| 1-35 | 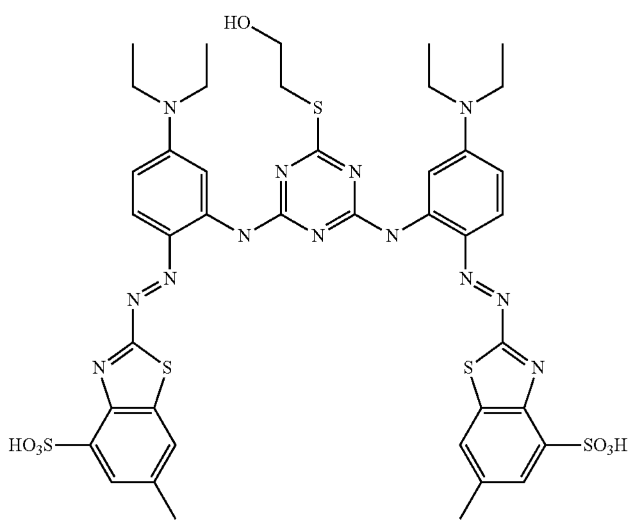 [SMILES: CCN(CC)c1ccc(/N=N/c2nc3c(S(=O)(=O)O)cc(C)cc3s2)c(Nc2nc(Nc3cc(N(CC)CC)ccc3/N=N/c3nc4c(S(=O)(=O)O)cc(C)cc4s3)nc(SCCO)n2)c1] |
| 1-36 | 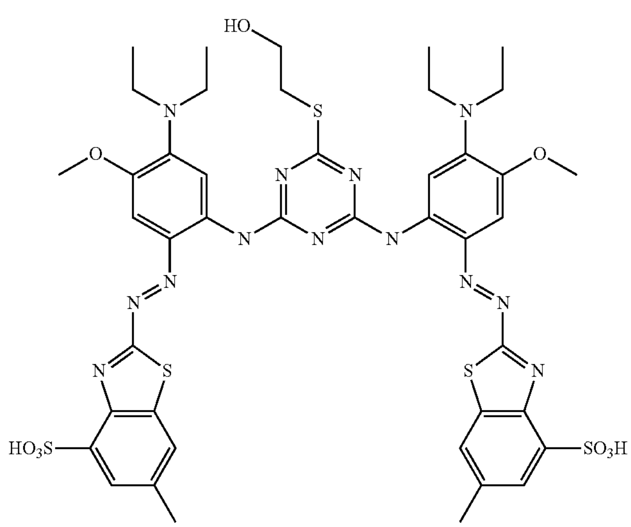 [SMILES: CCN(CC)c1cc(Nc2nc(Nc3cc(N(CC)CC)c(OC)cc3/N=N/c3nc4c(S(=O)(=O)O)cc(C)cc4s3)nc(SCCO)n2)c(/N=N/c2nc3c(S(=O)(=O)O)cc(C)cc3s2)cc1OC] |

TABLE 1-continued
| Example | Structure |
|---|---|
| 1-37 | 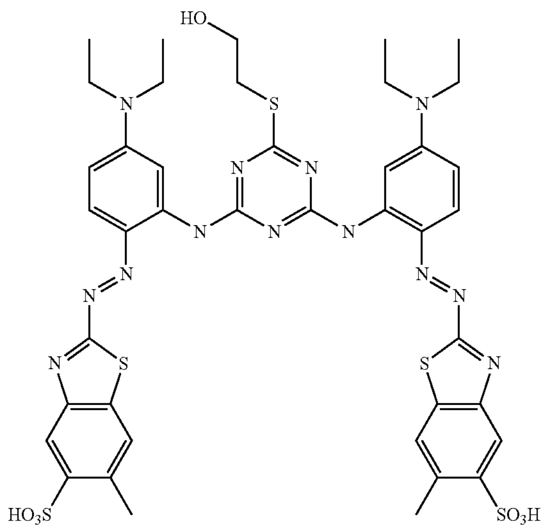 [SMILES: CCN(CC)c1ccc(/N=N/c2nc3cc(S(=O)(=O)O)c(C)cc3s2)c(Nc2nc(Nc3cc(N(CC)CC)ccc3/N=N/c3nc4cc(S(=O)(=O)O)c(C)cc4s3)nc(SCCO)n2)c1] |
| 1-38 | 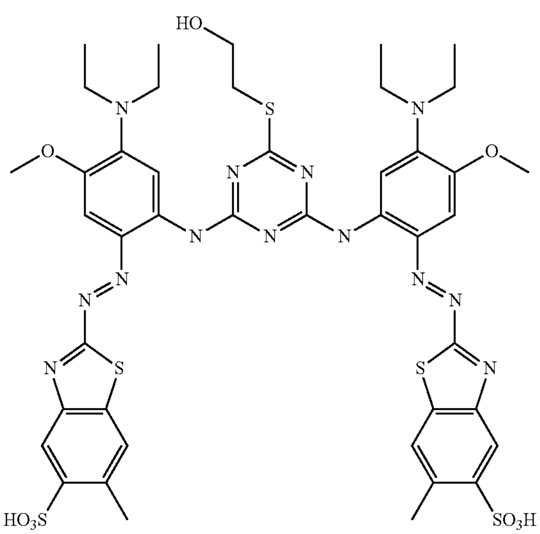 |
| 1-39 | 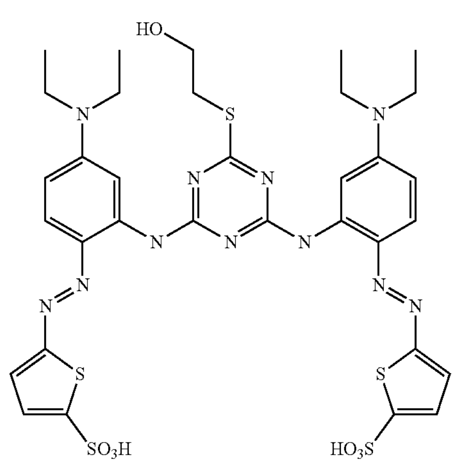 [SMILES: CCN(CC)c1ccc(/N=N/c2ccc(S(=O)(=O)O)s2)c(Nc2nc(Nc3cc(N(CC)CC)ccc3/N=N/c3ccc(S(=O)(=O)O)s3)nc(SCCO)n2)c1] |

TABLE 1-continued
| Example | Structure |
|---|---|
| 1-40 | 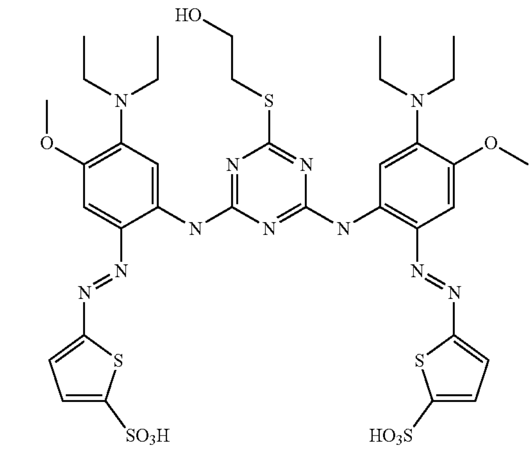 [SMILES: CCN(CC)c1cc(Nc2nc(Nc3cc(N(CC)CC)c(OC)cc3/N=N/c3ccc(S(=O)(=O)O)s3)nc(SCCO)n2)c(/N=N/c2ccc(S(=O)(=O)O)s2)cc1OC] |
| 1-41 | 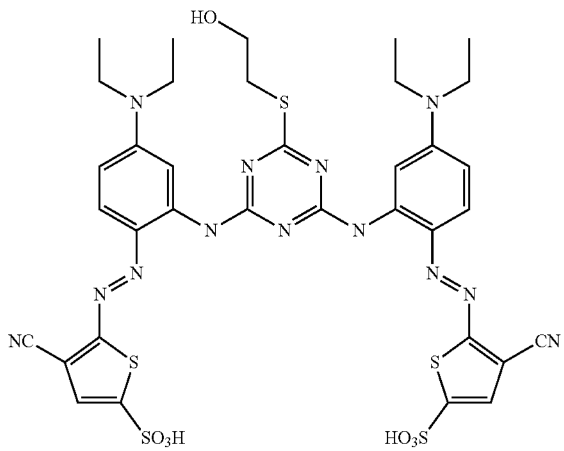 [SMILES: CCN(CC)c1ccc(/N=N/c2sc(S(=O)(=O)O)cc2C#N)c(Nc2nc(Nc3cc(N(CC)CC)ccc3/N=N/c3sc(S(=O)(=O)O)cc3C#N)nc(SCCO)n2)c1] |
| 1-42 | 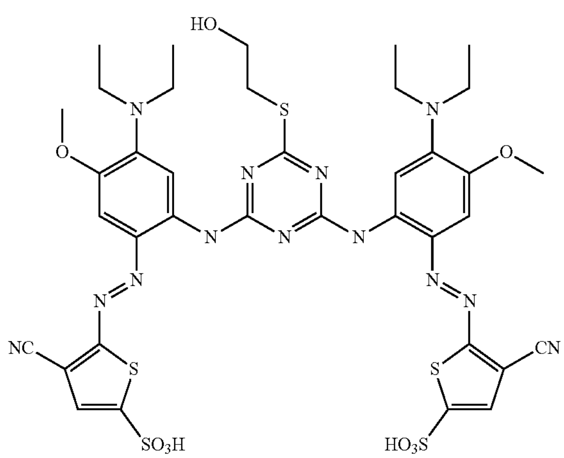 [SMILES: CCN(CC)c1cc(Nc2nc(Nc3cc(N(CC)CC)c(OC)cc3/N=N/c3sc(S(=O)(=O)O)cc3C#N)nc(SCCO)n2)c(/N=N/c2sc(S(=O)(=O)O)cc2C#N)cc1OC] |

TABLE 1-continued
| Example | Structure |
| --- | --- |
| 1-43 | 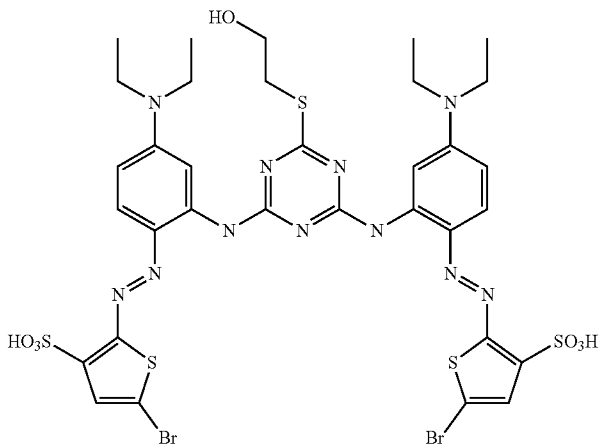 [SMILES: CCN(CC)c1ccc(/N=N/c2sc(Br)cc2S(=O)(=O)O)c(Nc2nc(Nc3cc(N(CC)CC)ccc3/N=N/c3sc(Br)cc3S(=O)(=O)O)nc(SCCO)n2)c1] |
| 1-44 | 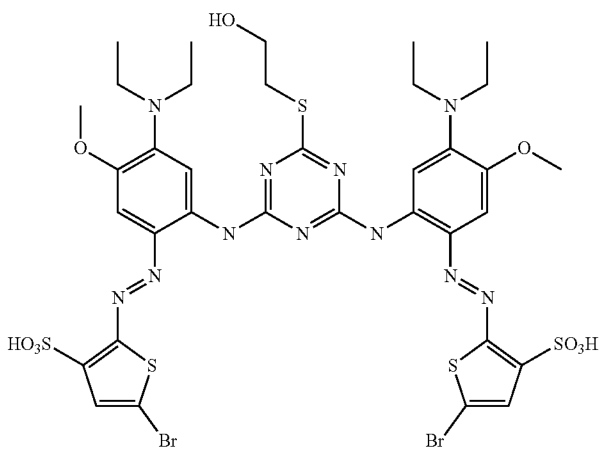 [SMILES: CCN(CC)c1cc(Nc2nc(Nc3cc(N(CC)CC)c(OC)cc3/N=N/c3sc(Br)cc3S(=O)(=O)O)nc(SCCO)n2)c(/N=N/c2sc(Br)cc2S(=O)(=O)O)cc1OC] |
| 1-45 | 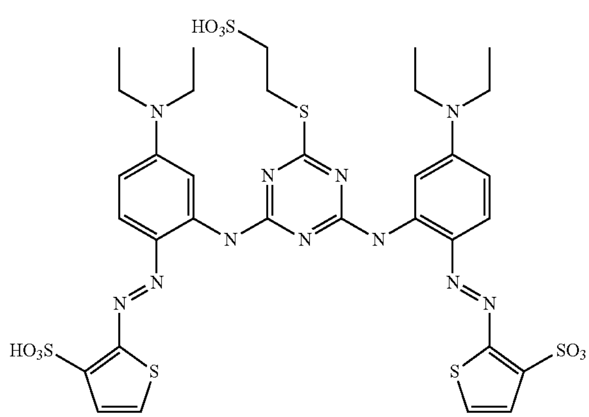 |

TABLE 1-continued
| Example | Structure |
| --- | --- |
| 1-46 | 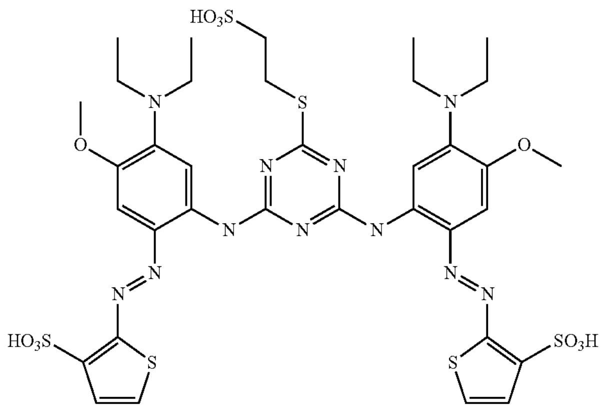 [SMILES: CCN(CC)c1cc(Nc2nc(Nc3cc(N(CC)CC)c(OC)cc3/N=N/c3sccc3S(=O)(=O)O)nc(SCCS(=O)(=O)O)n2)c(/N=N/c2sccc2S(=O)(=O)O)cc1OC] |
| 1-47 | 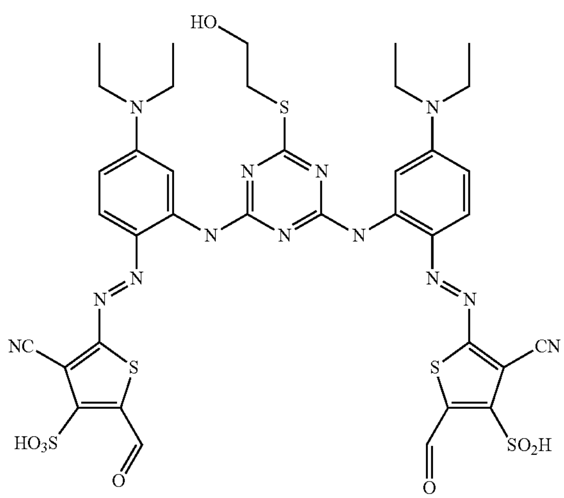 |
| 1-48 | 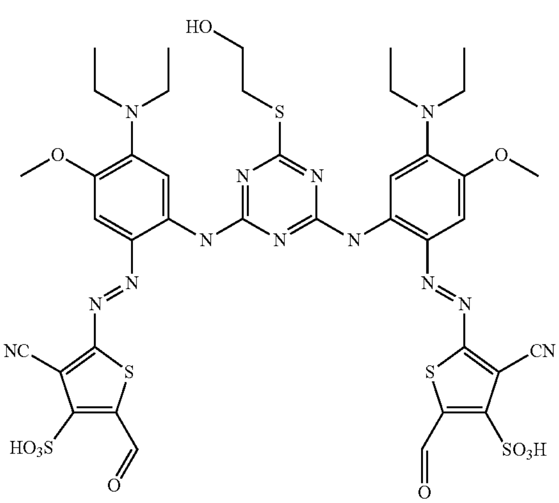 |

TABLE 1-continued
| Example | Structure |
|---|---|
| 1-49 | 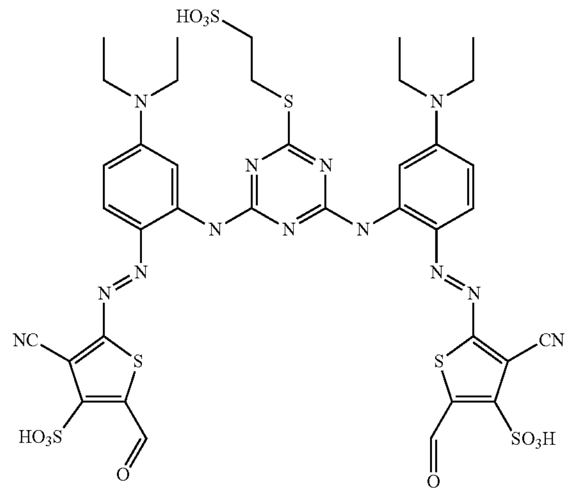 [SMILES: CCN(CC)c1ccc(/N=N/c2sc(C=O)c(S(=O)(=O)O)c2C#N)c(Nc2nc(Nc3cc(N(CC)CC)ccc3/N=N/c3sc(C=O)c(S(=O)(=O)O)c3C#N)nc(SCCS(=O)(=O)O)n2)c1] |
| 1-50 | 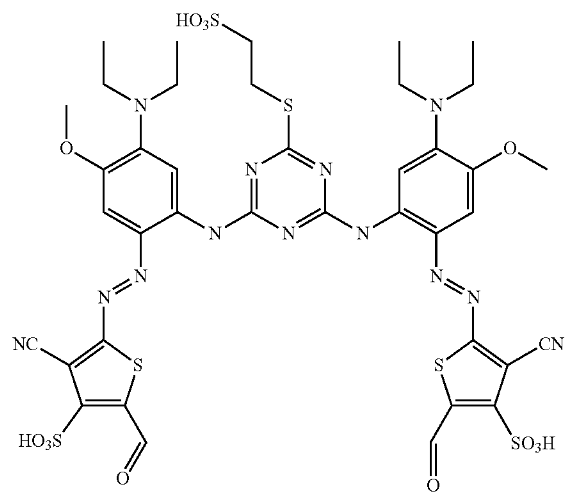 [SMILES: CCN(CC)c1cc(Nc2nc(Nc3cc(N(CC)CC)c(OC)cc3/N=N/c3sc(C=O)c(S(=O)(=O)O)c3C#N)nc(SCCS(=O)(=O)O)n2)c(/N=N/c2sc(C=O)c(S(=O)(=O)O)c2C#N)cc1OC] |
| 1-51 | 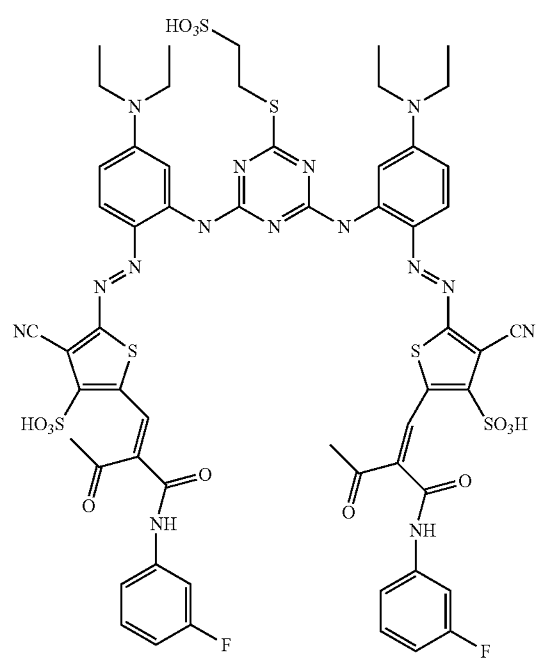 [SMILES: CCN(CC)c1ccc(/N=N/c2sc(/C=C(/C(C)=O)C(=O)Nc3cccc(F)c3)c(S(=O)(=O)O)c2C#N)c(Nc2nc(Nc3cc(N(CC)CC)ccc3/N=N/c3sc(/C=C(\C(C)=O)C(=O)Nc4cccc(F)c4)c(S(=O)(=O)O)c3C#N)nc(SCCS(=O)(=O)O)n2)c1] |

TABLE 1-continued
| Example | Structure |
| --- | --- |
| 1-52 | 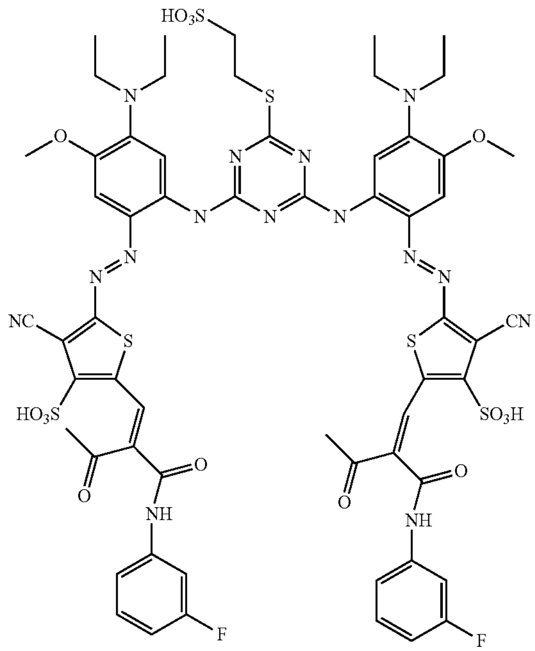 |
| 1-53 | 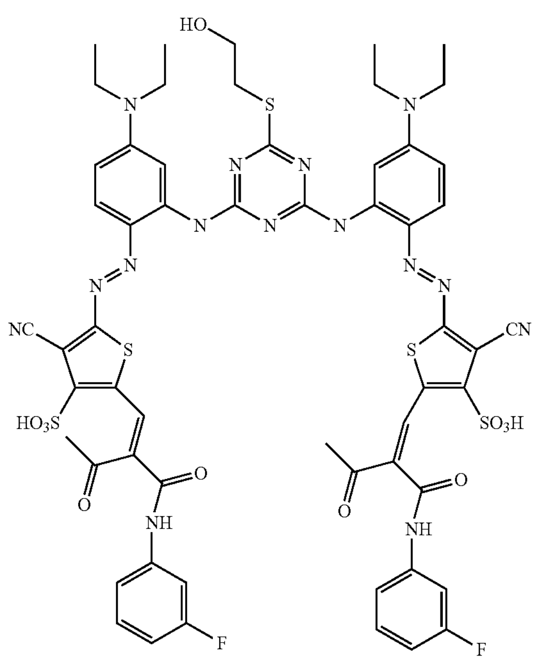 [SMILES: CCN(CC)c1ccc(/N=N/c2sc(/C=C(/C(C)=O)C(=O)Nc3cccc(F)c3)c(S(=O)(=O)O)c2C#N)c(Nc2nc(Nc3cc(N(CC)CC)ccc3/N=N/c3sc(/C=C(\C(C)=O)C(=O)Nc4cccc(F)c4)c(S(=O)(=O)O)c3C#N)nc(SCCO)n2)c1] |

TABLE 1-continued
| Example | Structure |
|---|---|
| 1-54 | 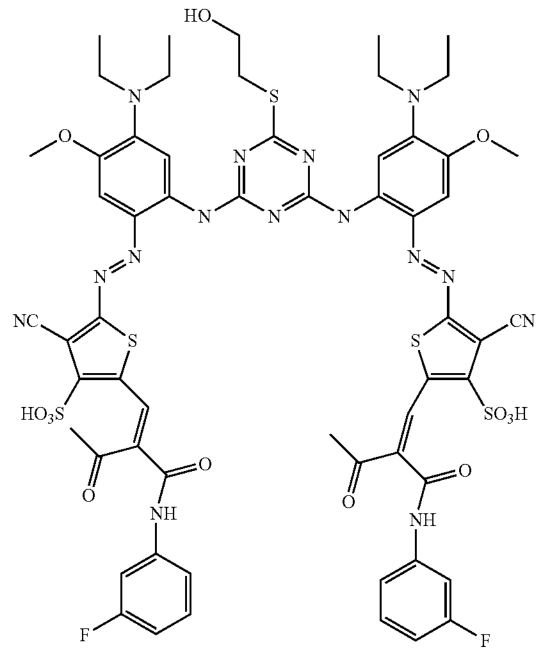 |
| 1-55 | 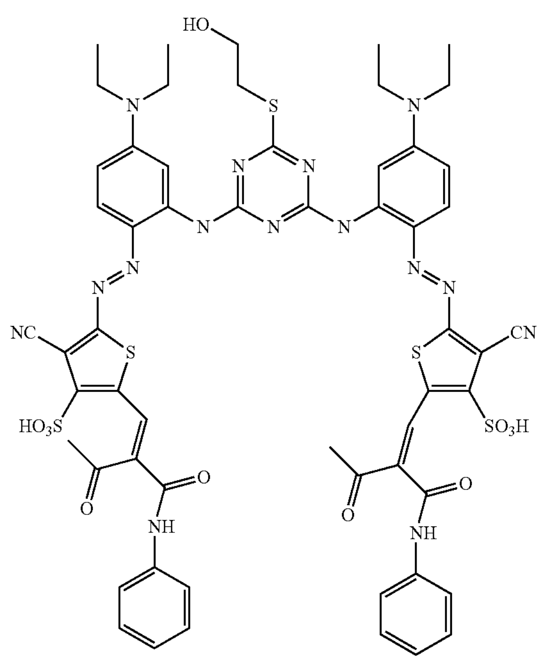 [SMILES: CCN(CC)c1ccc(/N=N/c2sc(/C=C(/C(C)=O)C(=O)Nc3ccccc3)c(S(=O)(=O)O)c2C#N)c(Nc2nc(Nc3cc(N(CC)CC)ccc3/N=N/c3sc(/C=C(\C(C)=O)C(=O)Nc4ccccc4)c(S(=O)(=O)O)c3C#N)nc(SCCO)n2)c1] |

TABLE 1-continued
| Example | Structure |
| --- | --- |
| 1-56 | 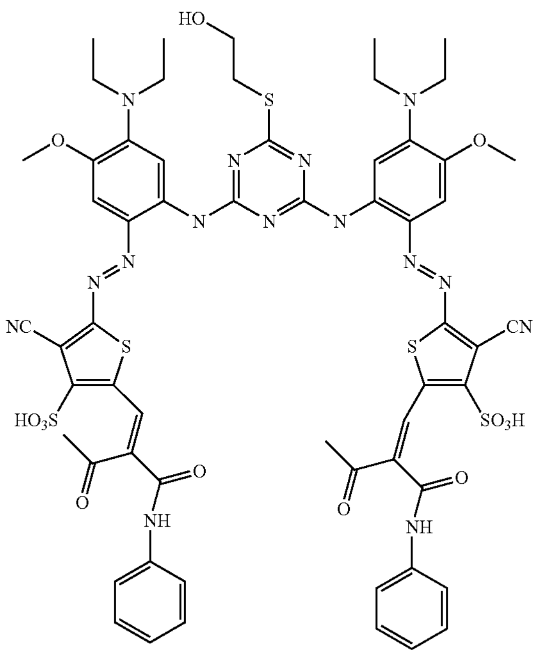 |
| 1-57 | 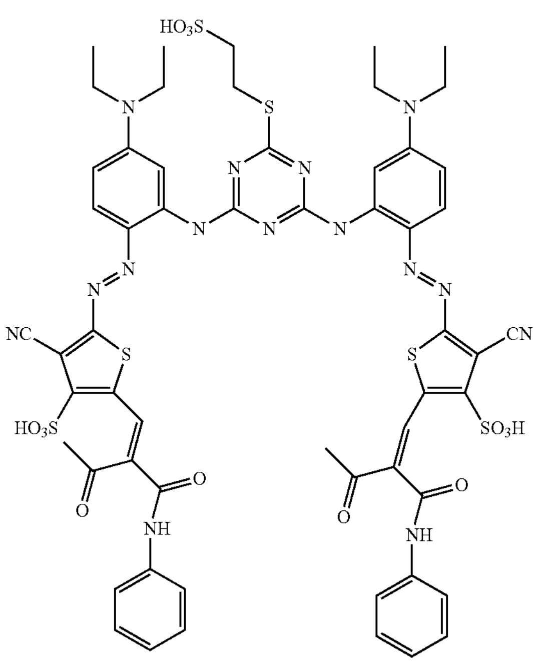 [SMILES: CCN(CC)c1ccc(/N=N/c2sc(/C=C(/C(C)=O)C(=O)Nc3ccccc3)c(S(=O)(=O)O)c2C#N)c(Nc2nc(Nc3cc(N(CC)CC)ccc3/N=N/c3sc(/C=C(\C(C)=O)C(=O)Nc4ccccc4)c(S(=O)(=O)O)c3C#N)nc(SCCS(=O)(=O)O)n2)c1] |

TABLE 1-continued
| Example | Structure |
| --- | --- |
| 1-58 | 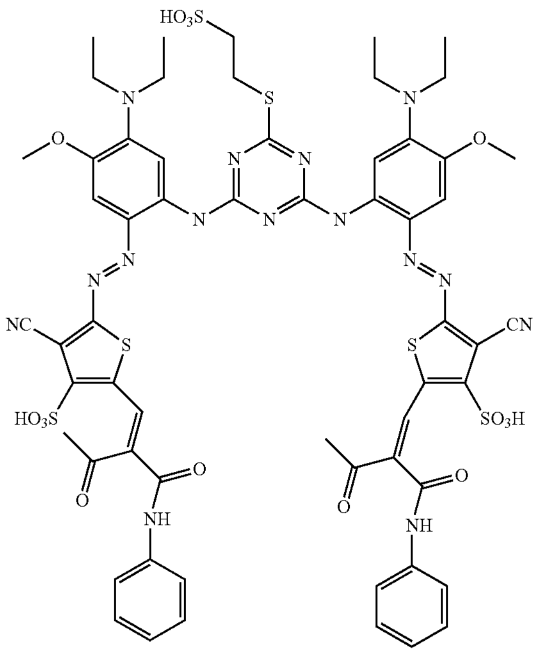 |
| 1-59 | 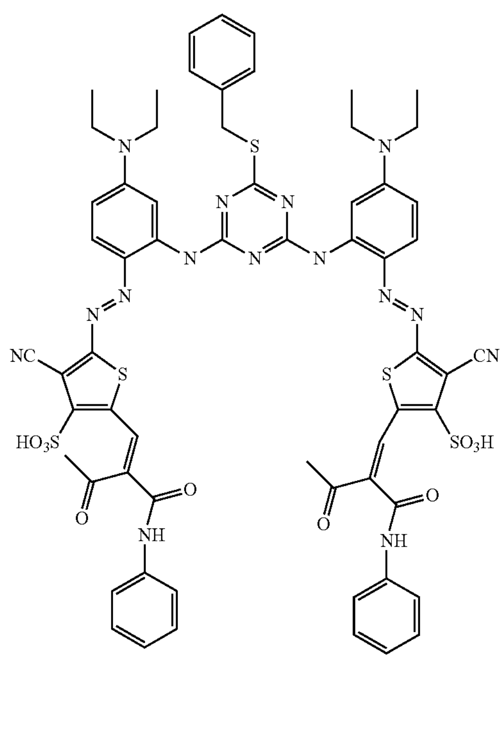 [SMILES: CCN(CC)c1ccc(/N=N/c2sc(/C=C(/C(C)=O)C(=O)Nc3ccccc3)c(S(=O)(=O)O)c2C#N)c(Nc2nc(Nc3cc(N(CC)CC)ccc3/N=N/c3sc(/C=C(\C(C)=O)C(=O)Nc4ccccc4)c(S(=O)(=O)O)c3C#N)nc(SCc3ccccc3)n2)c1] |

TABLE 1-continued
| Example | Structure |
|---|---|
| 1-60 | 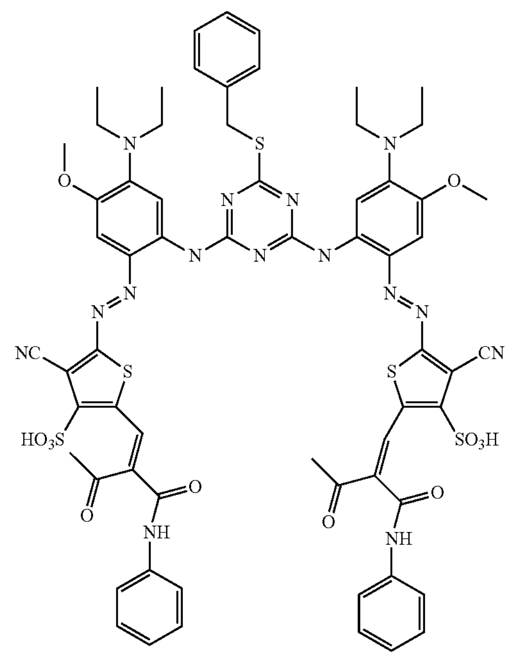 [SMILES: CCN(CC)c1cc(Nc2nc(Nc3cc(N(CC)CC)c(OC)cc3/N=N/c3sc(/C=C(\C(C)=O)C(=O)Nc4ccccc4)c(S(=O)(=O)O)c3C#N)nc(SCc3ccccc3)n2)c(/N=N/c2sc(/C=C(/C(C)=O)C(=O)Nc3ccccc3)c(S(=O)(=O)O)c2C#N)cc1OC] |
| 1-61 | 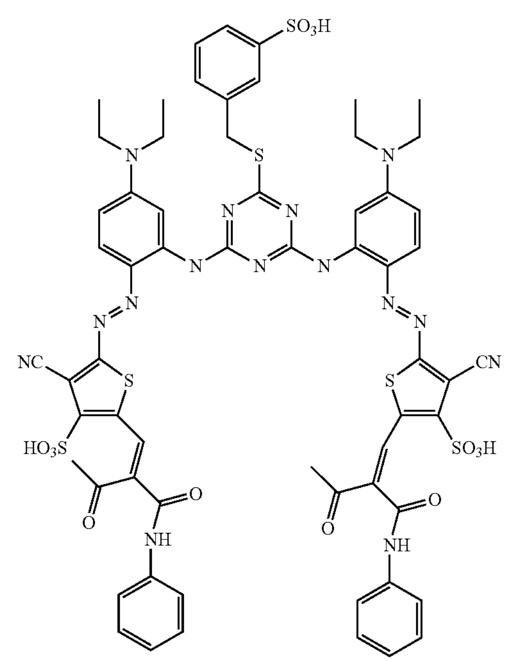 [SMILES: CCN(CC)c1ccc(/N=N/c2sc(/C=C(/C(C)=O)C(=O)Nc3ccccc3)c(S(=O)(=O)O)c2C#N)c(Nc2nc(Nc3cc(N(CC)CC)ccc3/N=N/c3sc(/C=C(\C(C)=O)C(=O)Nc4ccccc4)c(S(=O)(=O)O)c3C#N)nc(SCc3cccc(S(=O)(=O)O)c3)n2)c1] |

TABLE 1-continued
| Example | Structure |
| --- | --- |
| 1-62 | 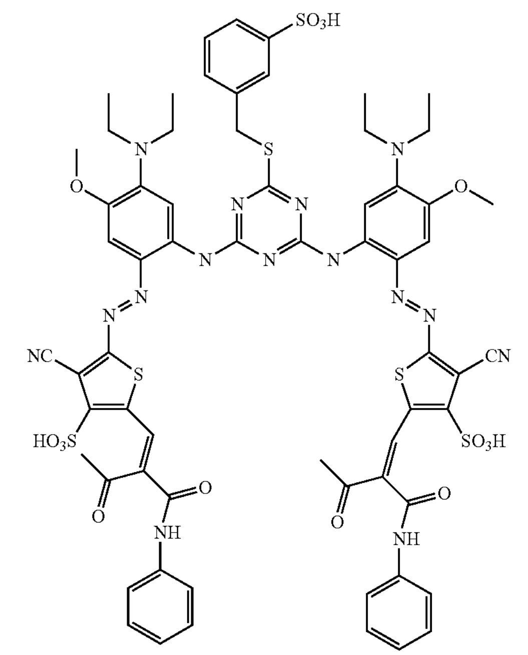 [SMILES: CCN(CC)c1cc(Nc2nc(Nc3cc(N(CC)CC)c(OC)cc3/N=N/c3sc(/C=C(\C(C)=O)C(=O)Nc4ccccc4)c(S(=O)(=O)O)c3C#N)nc(SCc3cccc(S(=O)(=O)O)c3)n2)c(/N=N/c2sc(/C=C(/C(C)=O)C(=O)Nc3ccccc3)c(S(=O)(=O)O)c2C#N)cc1OC] |
| 1-63 | 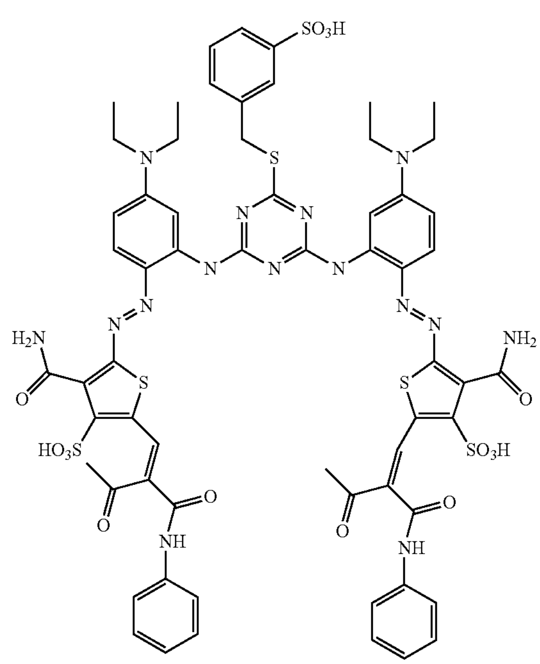 [SMILES: CCN(CC)c1ccc(/N=N/c2sc(/C=C(/C(C)=O)C(=O)Nc3ccccc3)c(S(=O)(=O)O)c2C(N)=O)c(Nc2nc(Nc3cc(N(CC)CC)ccc3/N=N/c3sc(/C=C(\C(C)=O)C(=O)Nc4ccccc4)c(S(=O)(=O)O)c3C(N)=O)nc(SCc3cccc(S(=O)(=O)O)c3)n2)c1] |

TABLE 1-continued
| Example | Structure |
| --- | --- |
| 1-64 | 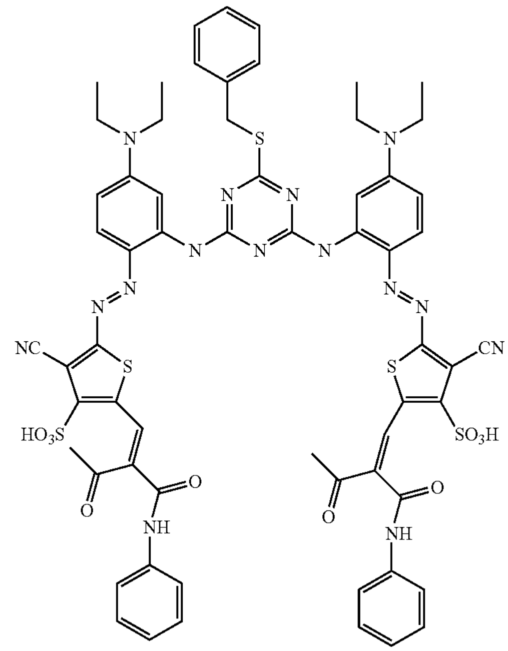 [SMILES: CCN(CC)c1ccc(/N=N/c2sc(/C=C(/C(C)=O)C(=O)Nc3ccccc3)c(S(=O)(=O)O)c2C#N)c(Nc2nc(Nc3cc(N(CC)CC)ccc3/N=N/c3sc(/C=C(\C(C)=O)C(=O)Nc4ccccc4)c(S(=O)(=O)O)c3C#N)nc(SCc3ccccc3)n2)c1] |
| 1-65 | 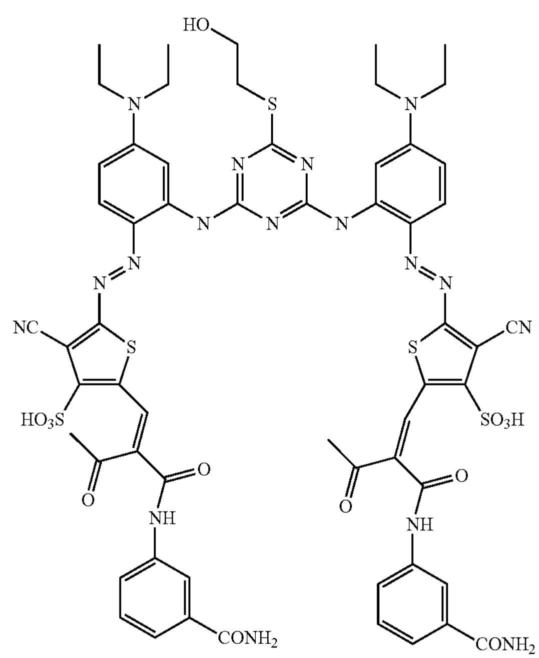 [SMILES: CCN(CC)c1ccc(/N=N/c2sc(/C=C(/C(C)=O)C(=O)Nc3cccc(C(N)=O)c3)c(S(=O)(=O)O)c2C#N)c(Nc2nc(Nc3cc(N(CC)CC)ccc3/N=N/c3sc(/C=C(\C(C)=O)C(=O)Nc4cccc(C(N)=O)c4)c(S(=O)(=O)O)c3C#N)nc(SCCO)n2)c1] |

TABLE 1-continued
| Example | Structure |
| --- | --- |
| 1-66 | 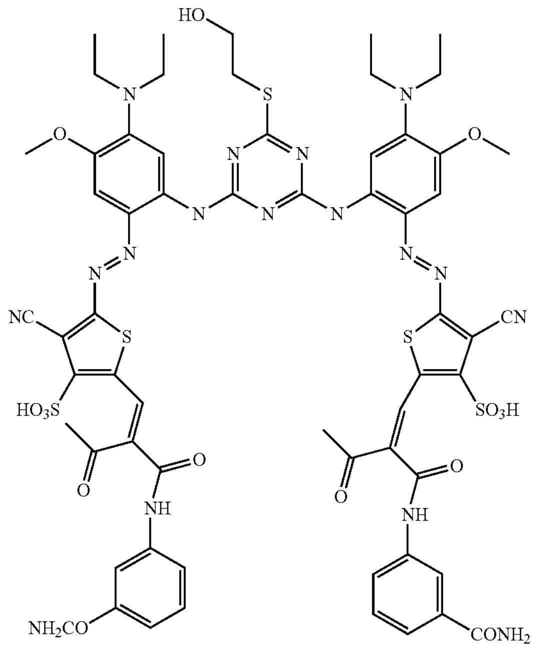 |
| 1-67 | 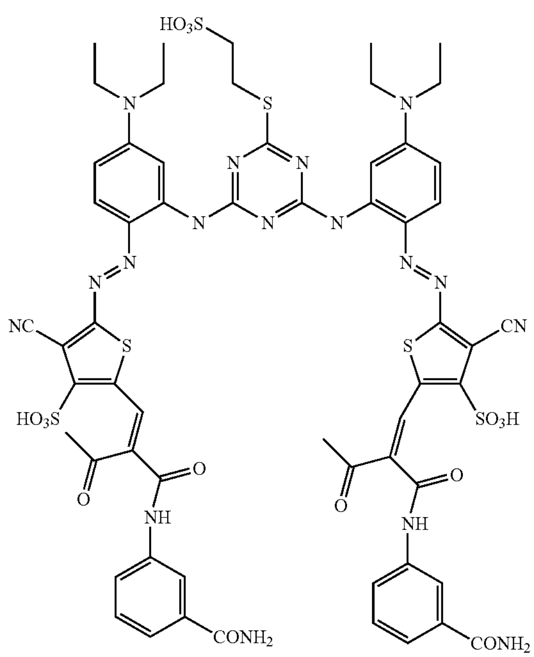 [SMILES: CCN(CC)c1ccc(/N=N/c2sc(/C=C(/C(C)=O)C(=O)Nc3cccc(C(N)=O)c3)c(S(=O)(=O)O)c2C#N)c(Nc2nc(Nc3cc(N(CC)CC)ccc3/N=N/c3sc(/C=C(\C(C)=O)C(=O)Nc4cccc(C(N)=O)c4)c(S(=O)(=O)O)c3C#N)nc(SCCS(=O)(=O)O)n2)c1] |

TABLE 1-continued
| Example | Structure |
| --- | --- |
| 1-68 | 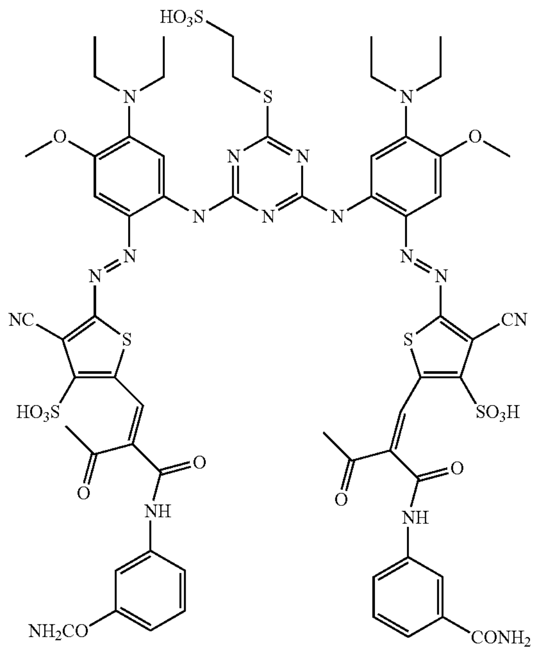 |
| 1-69 | 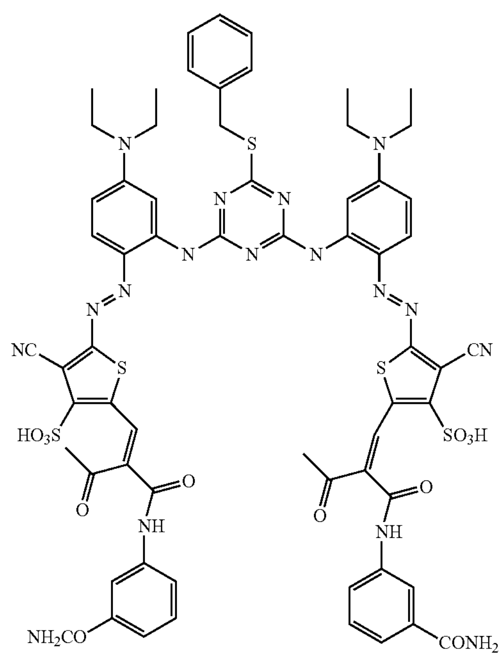 |

TABLE 1-continued
| Example | Structure |
|---|---|
| 1-70 | 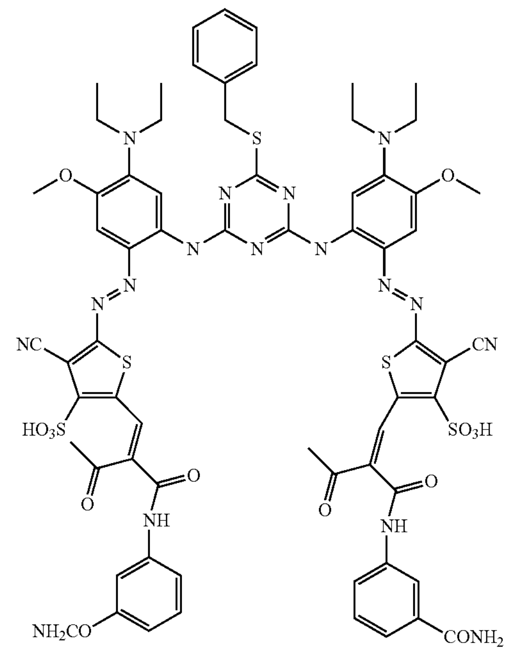 |
| 1-71 | 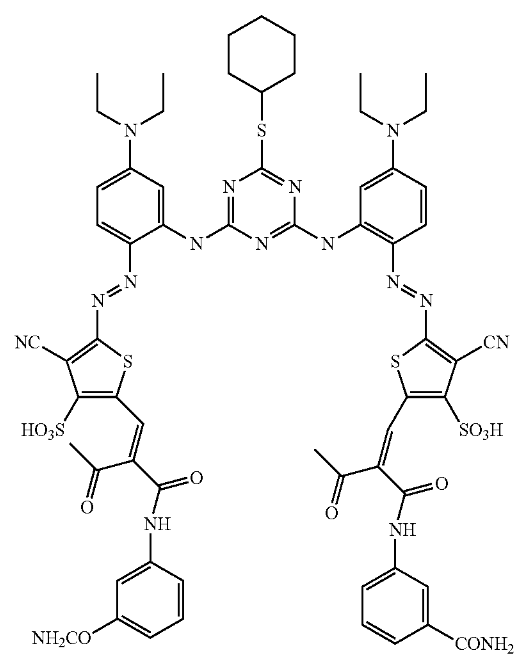 |

TABLE 1-continued
| Example | Structure |
| --- | --- |
| 1-72 | 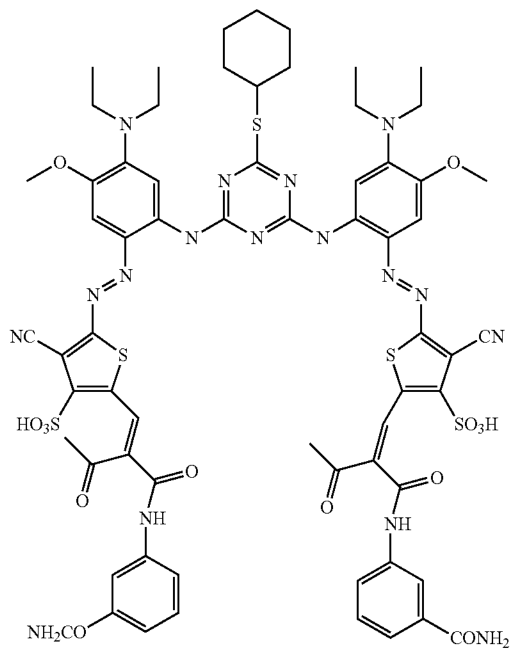 |
| 1-73 | 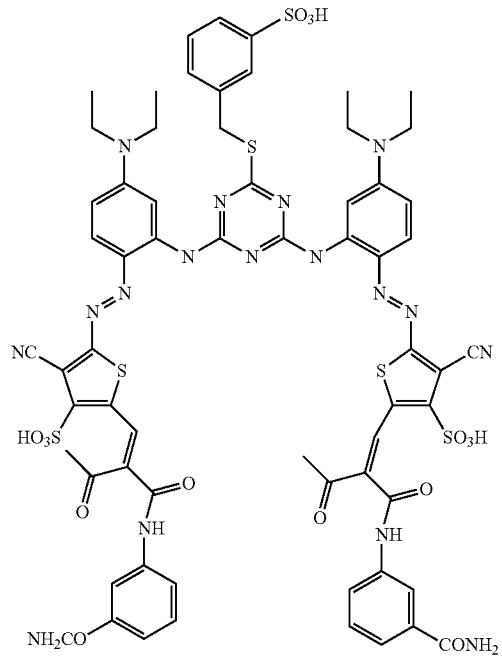 |

TABLE 1-continued
| Example | Structure |
|---|---|
| 1-74 | 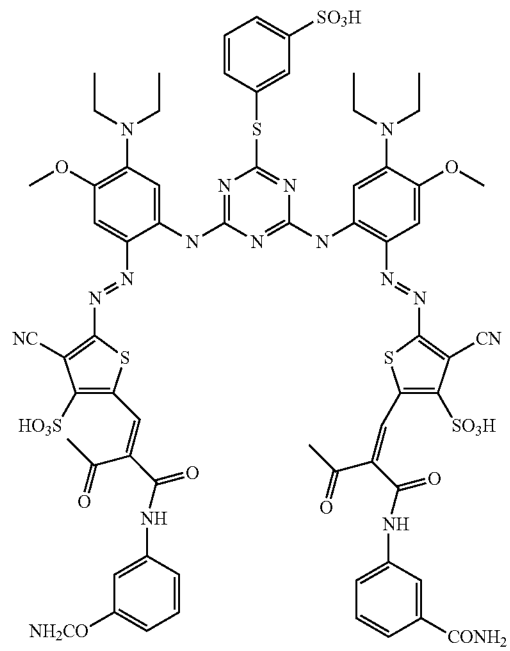 |
| 1-75 | 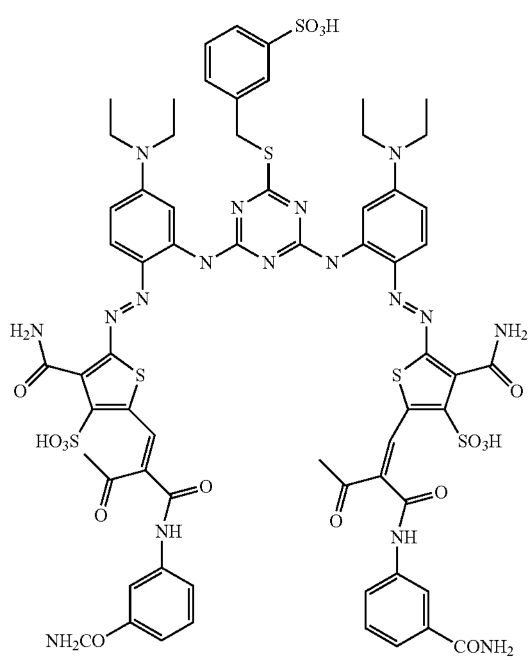 |

TABLE 1-continued
| Example | Structure |
|---|---|
| 1-76 | 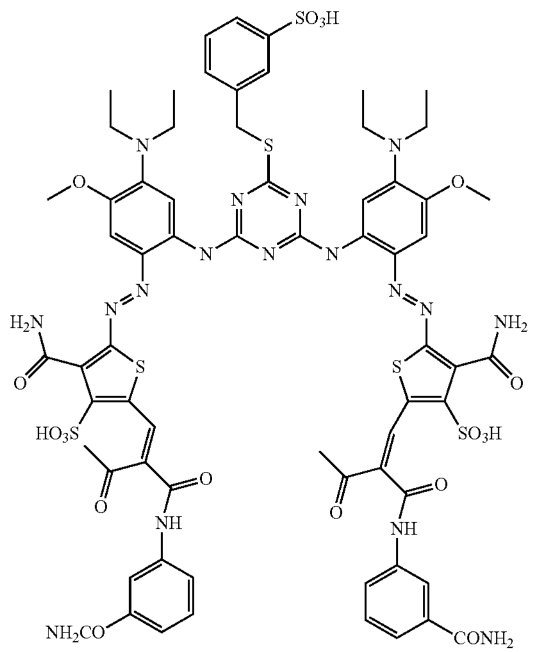 |
| 1-77 | 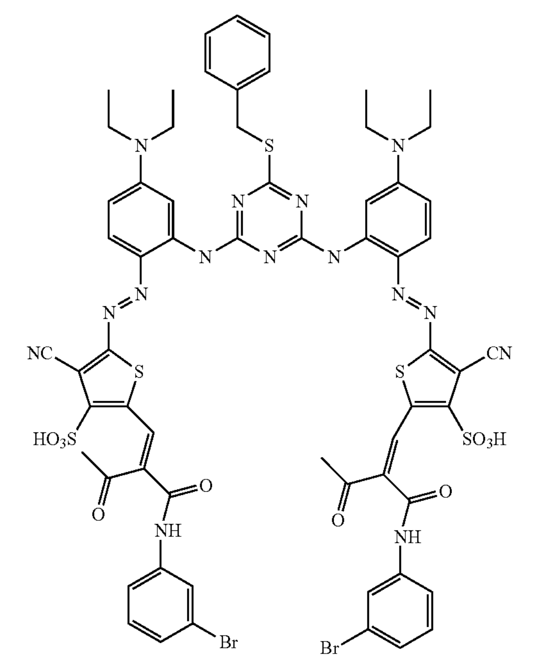 [SMILES: CCN(CC)c1ccc(/N=N/c2sc(/C=C(/C(C)=O)C(=O)Nc3cccc(Br)c3)c(S(=O)(=O)O)c2C#N)c(Nc2nc(Nc3cc(N(CC)CC)ccc3/N=N/c3sc(/C=C(\C(C)=O)C(=O)Nc4cccc(Br)c4)c(S(=O)(=O)O)c3C#N)nc(SCc3ccccc3)n2)c1] |

TABLE 1-continued
| Example | Structure |
|---|---|
| 1-78 | 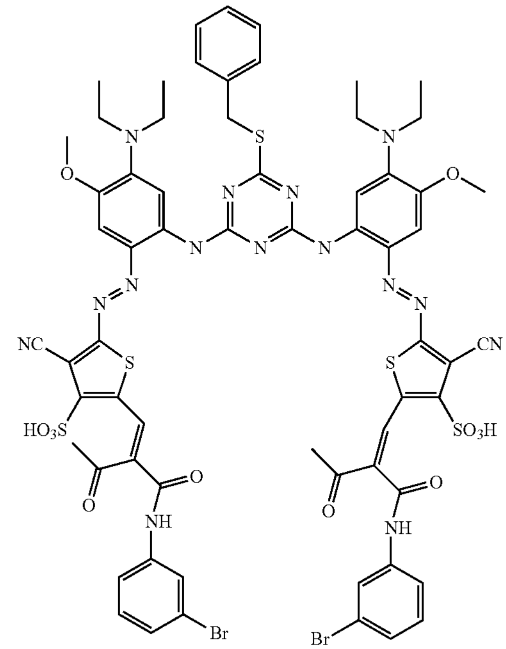 [SMILES: CCN(CC)c1cc(Nc2nc(Nc3cc(N(CC)CC)c(OC)cc3/N=N/c3sc(/C=C(\C(C)=O)C(=O)Nc4cccc(Br)c4)c(S(=O)(=O)O)c3C#N)nc(SCc3ccccc3)n2)c(/N=N/c2sc(/C=C(/C(C)=O)C(=O)Nc3cccc(Br)c3)c(S(=O)(=O)O)c2C#N)cc1OC] |
| 1-79 | 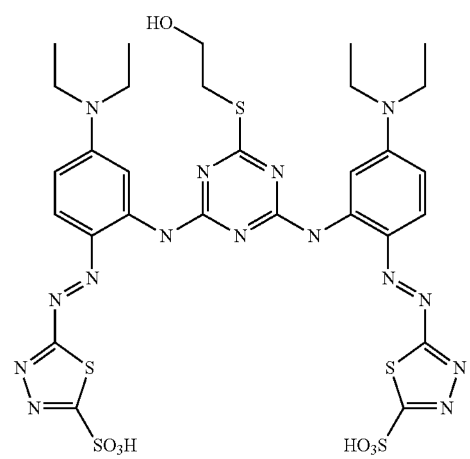 [SMILES: CCN(CC)c1ccc(/N=N/c2nnc(S(=O)(=O)O)s2)c(Nc2nc(Nc3cc(N(CC)CC)ccc3/N=N/c3nnc(S(=O)(=O)O)s3)nc(SCCO)n2)c1] |
| 1-80 | 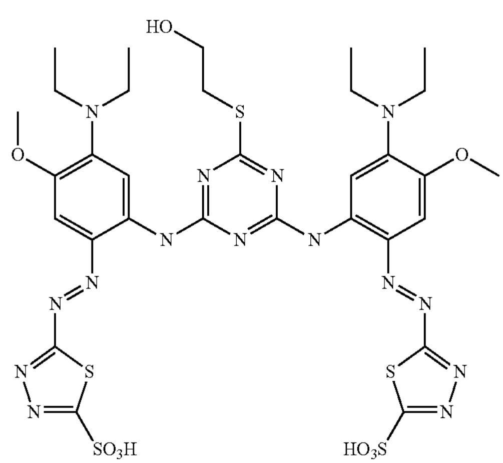 [SMILES: CCN(CC)c1cc(Nc2nc(Nc3cc(N(CC)CC)c(OC)cc3/N=N/c3nnc(S(=O)(=O)O)s3)nc(SCCO)n2)c(/N=N/c2nnc(S(=O)(=O)O)s2)cc1OC] |

TABLE 1-continued
| Example | Structure |
| --- | --- |
| 1-81 | 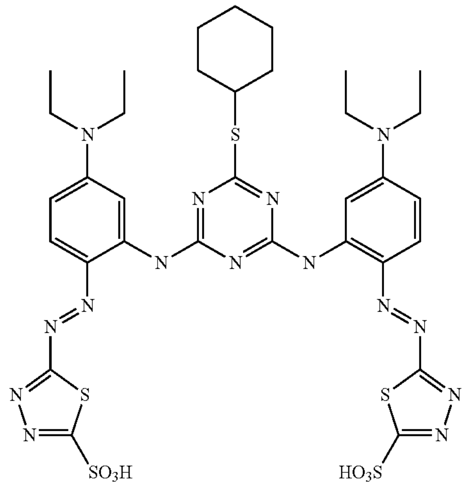 [SMILES: CCN(CC)c1ccc(/N=N/c2nnc(S(=O)(=O)O)s2)c(Nc2nc(Nc3cc(N(CC)CC)ccc3/N=N/c3nnc(S(=O)(=O)O)s3)nc(SC3CCCCC3)n2)c1] |
| 1-82 | 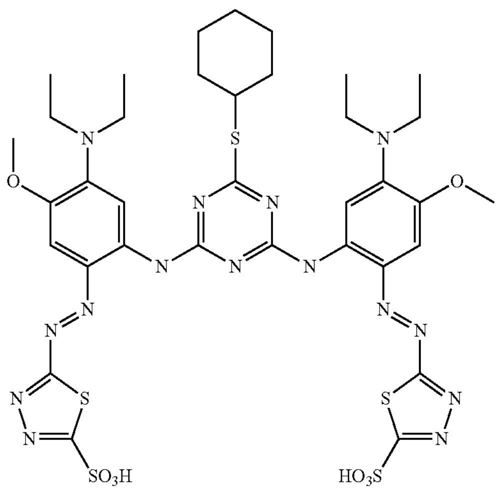 [SMILES: CCN(CC)c1cc(Nc2nc(Nc3cc(N(CC)CC)c(OC)cc3/N=N/c3nnc(S(=O)(=O)O)s3)nc(SC3CCCCC3)n2)c(/N=N/c2nnc(S(=O)(=O)O)s2)cc1OC] |
| 1-83 | 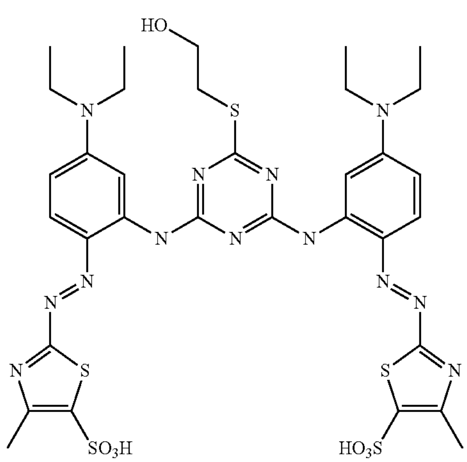 |

TABLE 1-continued
| Example | Structure |
| --- | --- |
| 1-84 | 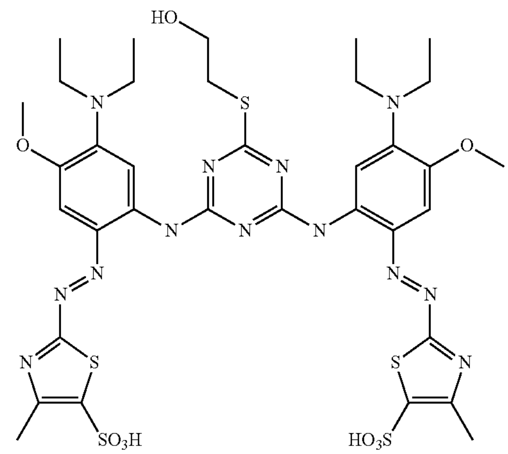 |
| 1-85 | 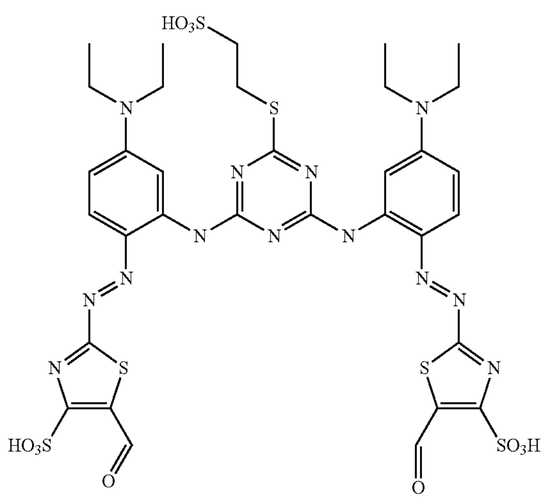 [SMILES: CCN(CC)c1ccc(/N=N/c2nc(S(=O)(=O)O)c(C=O)s2)c(Nc2nc(Nc3cc(N(CC)CC)ccc3/N=N/c3nc(S(=O)(=O)O)c(C=O)s3)nc(SCCS(=O)(=O)O)n2)c1] |
| 1-86 | 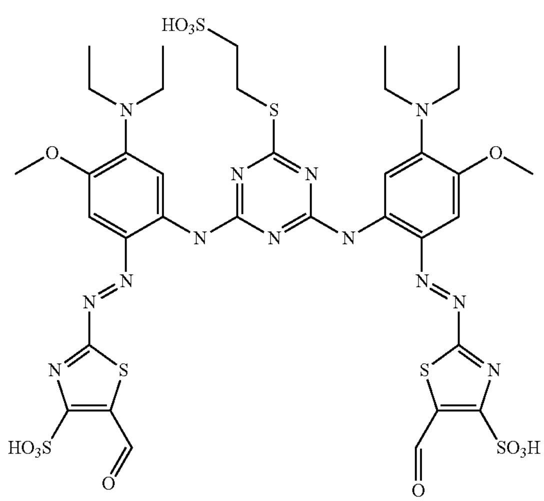 |

TABLE 1-continued
| Example | Structure |
|---|---|
| 1-87 | 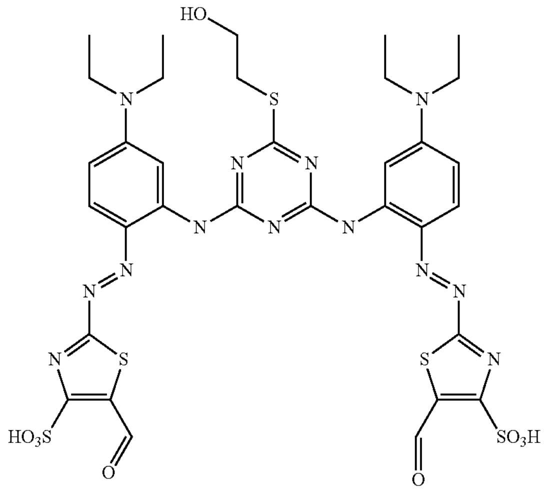 [SMILES: CCN(CC)c1ccc(/N=N/c2nc(S(=O)(=O)O)c(C=O)s2)c(Nc2nc(Nc3cc(N(CC)CC)ccc3/N=N/c3nc(S(=O)(=O)O)c(C=O)s3)nc(SCCO)n2)c1] |
| 1-88 | 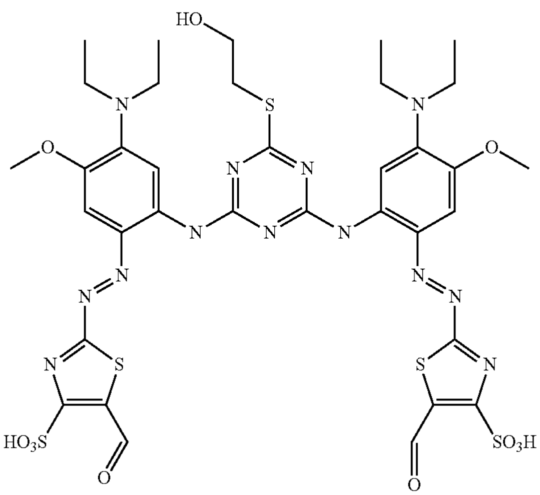 |
| 1-89 | 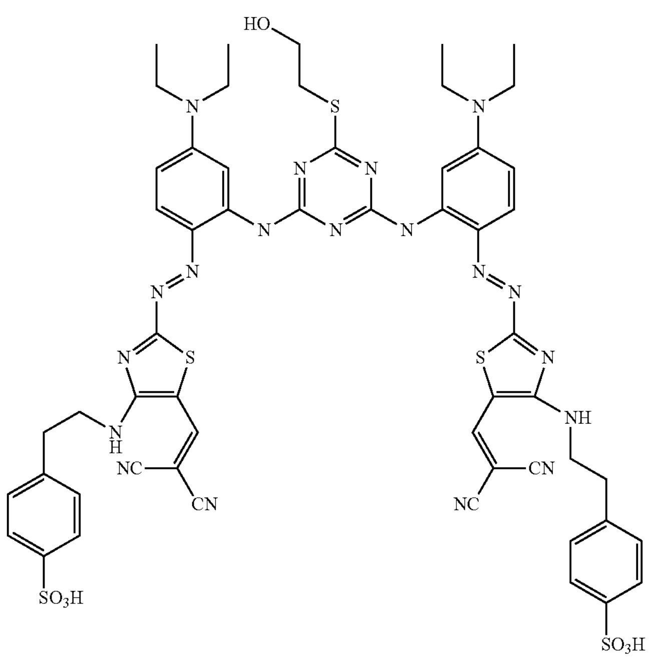 [SMILES: CCN(CC)c1ccc(/N=N/c2nc(NCCc3ccc(S(=O)(=O)O)cc3)c(C=C(C#N)C#N)s2)c(Nc2nc(Nc3cc(N(CC)CC)ccc3/N=N/c3nc(NCCc4ccc(S(=O)(=O)O)cc4)c(C=C(C#N)C#N)s3)nc(SCCO)n2)c1] |

TABLE 1-continued
| Example | Structure |
|---|---|
| 1-90 | 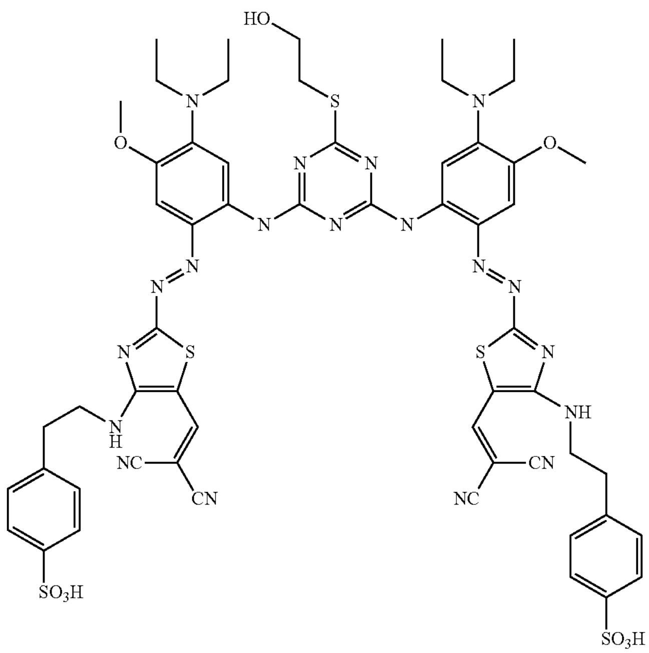 [SMILES: CCN(CC)c1cc(Nc2nc(Nc3cc(N(CC)CC)c(OC)cc3/N=N/c3nc(NCCc4ccc(S(=O)(=O)O)cc4)c(C=C(C#N)C#N)s3)nc(SCCO)n2)c(/N=N/c2nc(NCCc3ccc(S(=O)(=O)O)cc3)c(C=C(C#N)C#N)s2)cc1OC] |
| 1-91 | 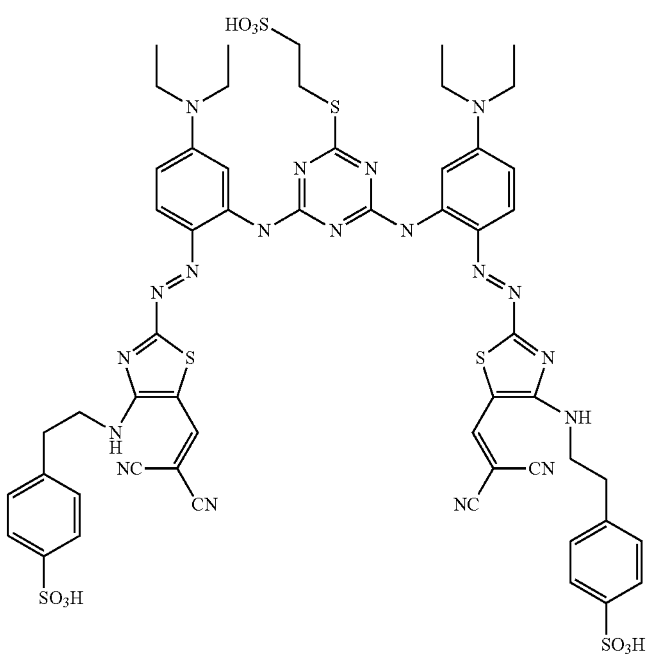 [SMILES: CCN(CC)c1ccc(/N=N/c2nc(NCCc3ccc(S(=O)(=O)O)cc3)c(C=C(C#N)C#N)s2)c(Nc2nc(Nc3cc(N(CC)CC)ccc3/N=N/c3nc(NCCc4ccc(S(=O)(=O)O)cc4)c(C=C(C#N)C#N)s3)nc(SCCS(=O)(=O)O)n2)c1] |

TABLE 1-continued
| Example | Structure |
| --- | --- |
| 1-92 | 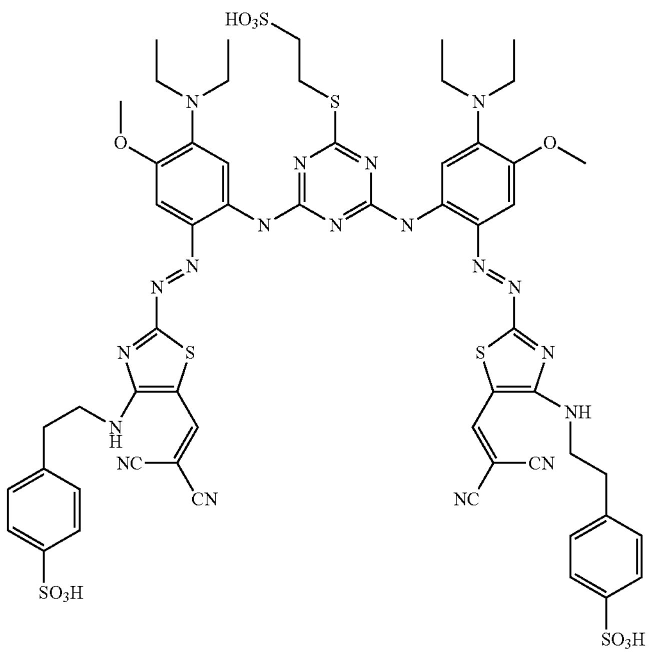 [SMILES: CCN(CC)c1cc(Nc2nc(Nc3cc(N(CC)CC)c(OC)cc3/N=N/c3nc(NCCc4ccc(S(=O)(=O)O)cc4)c(C=C(C#N)C#N)s3)nc(SCCS(=O)(=O)O)n2)c(/N=N/c2nc(NCCc3ccc(S(=O)(=O)O)cc3)c(C=C(C#N)C#N)s2)cc1OC] |
| 1-93 | 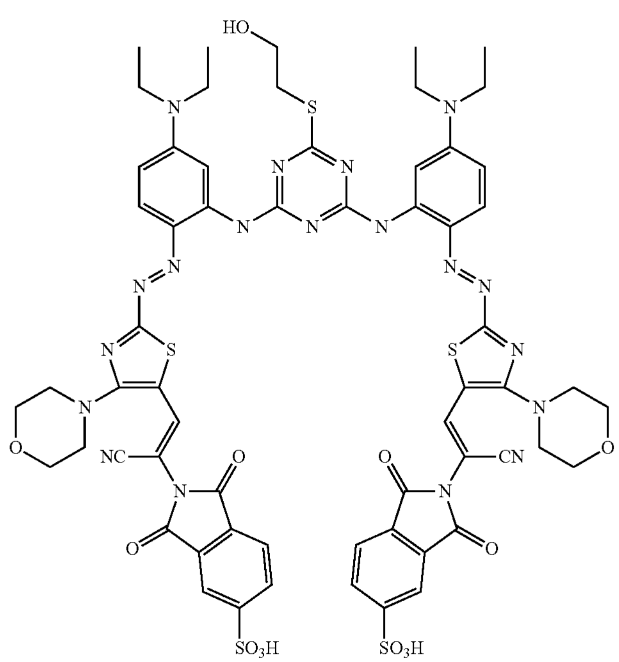 [SMILES: CCN(CC)c1ccc(/N=N/c2nc(N3CCOCC3)c(/C=C(\C#N)N3C(=O)c4ccc(S(=O)(=O)O)cc4C3=O)s2)c(Nc2nc(Nc3cc(N(CC)CC)ccc3/N=N/c3nc(N4CCOCC4)c(/C=C(\C#N)N4C(=O)c5ccc(S(=O)(=O)O)cc5C4=O)s3)nc(SCCO)n2)c1] |

TABLE 1-continued
| Example | Structure |
| --- | --- |
| 1-94 | 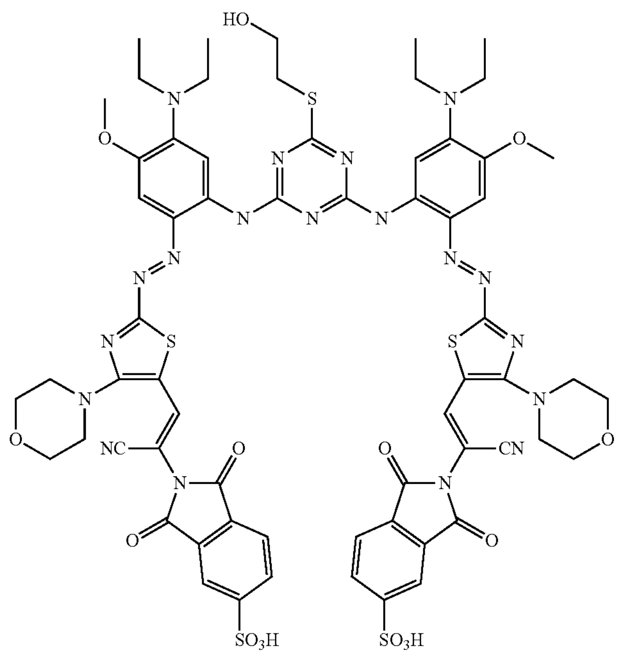 [SMILES: CCN(CC)c1cc(Nc2nc(Nc3cc(N(CC)CC)c(OC)cc3/N=N/c3nc(N4CCOCC4)c(/C=C(\C#N)N4C(=O)c5ccc(S(=O)(=O)O)cc5C4=O)s3)nc(SCCO)n2)c(/N=N/c2nc(N3CCOCC3)c(/C=C(\C#N)N3C(=O)c4ccc(S(=O)(=O)O)cc4C3=O)s2)cc1OC] |
| 1-95 | 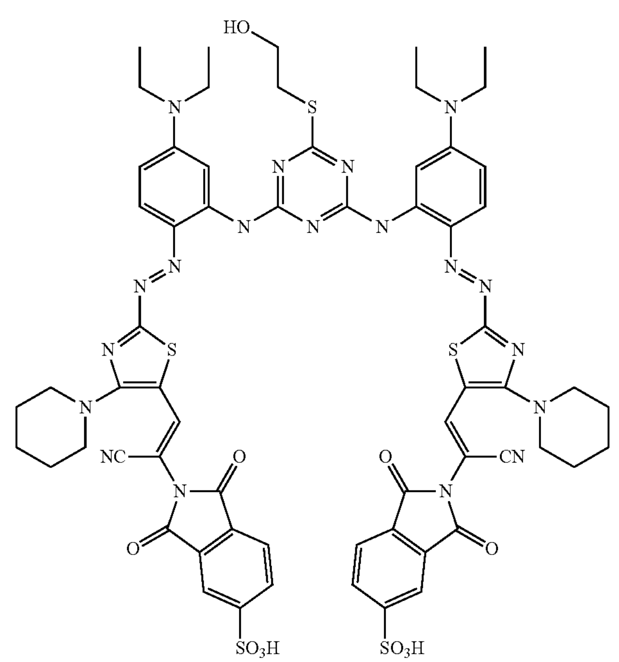 [SMILES: CCN(CC)c1ccc(/N=N/c2nc(N3CCCCC3)c(/C=C(\C#N)N3C(=O)c4ccc(S(=O)(=O)O)cc4C3=O)s2)c(Nc2nc(Nc3cc(N(CC)CC)ccc3/N=N/c3nc(N4CCCCC4)c(/C=C(\C#N)N4C(=O)c5ccc(S(=O)(=O)O)cc5C4=O)s3)nc(SCCO)n2)c1] |

TABLE 1-continued
| Example | Structure |
| --- | --- |
| 1-96 | 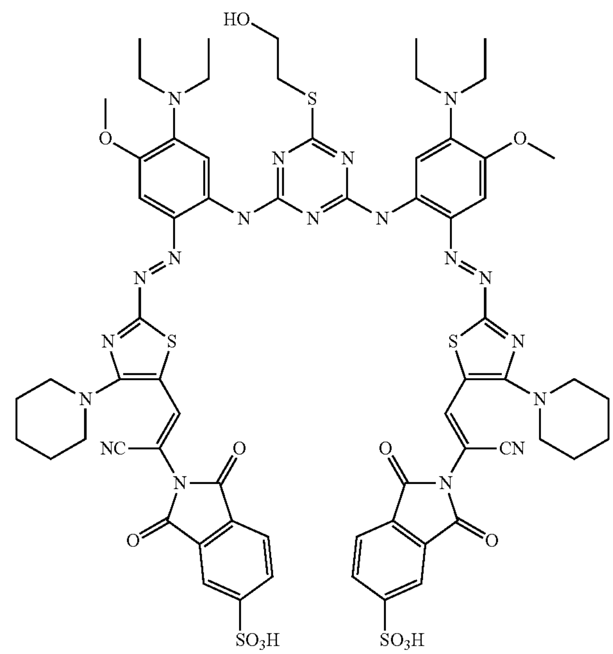 [SMILES: CCN(CC)c1cc(Nc2nc(Nc3cc(N(CC)CC)c(OC)cc3/N=N/c3nc(N4CCCCC4)c(/C=C(\C#N)N4C(=O)c5ccc(S(=O)(=O)O)cc5C4=O)s3)nc(SCCO)n2)c(/N=N/c2nc(N3CCCCC3)c(/C=C(\C#N)N3C(=O)c4ccc(S(=O)(=O)O)cc4C3=O)s2)cc1OC] |
| 1-97 | 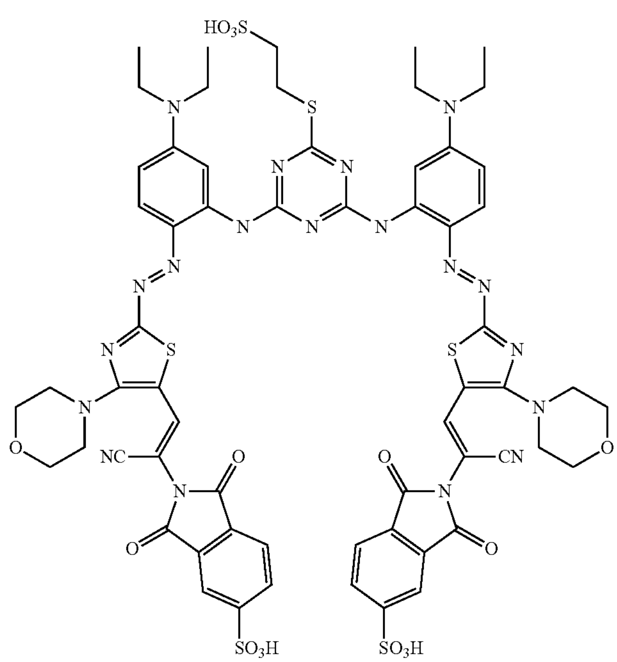 [SMILES: CCN(CC)c1ccc(/N=N/c2nc(N3CCOCC3)c(/C=C(\C#N)N3C(=O)c4ccc(S(=O)(=O)O)cc4C3=O)s2)c(Nc2nc(Nc3cc(N(CC)CC)ccc3/N=N/c3nc(N4CCOCC4)c(/C=C(\C#N)N4C(=O)c5ccc(S(=O)(=O)O)cc5C4=O)s3)nc(SCCS(=O)(=O)O)n2)c1] |

TABLE 1-continued
| Example | Structure |
|---|---|
| 1-98 | 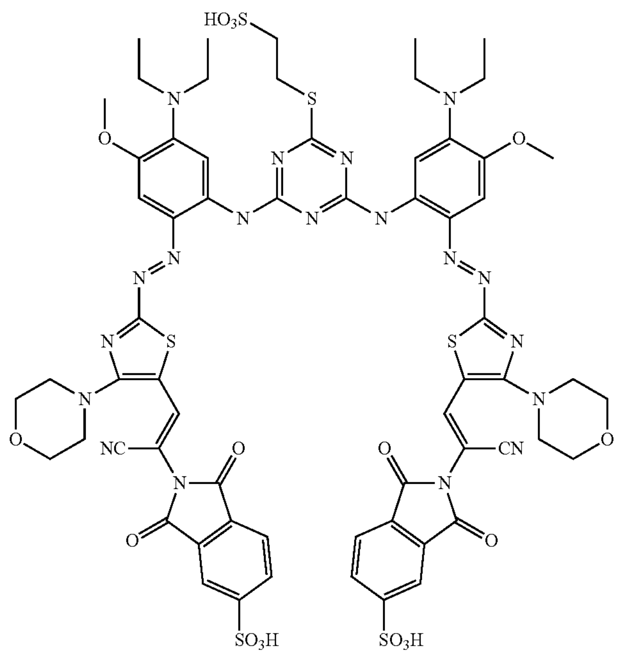 [SMILES: CCN(CC)c1cc(Nc2nc(Nc3cc(N(CC)CC)c(OC)cc3/N=N/c3nc(N4CCOCC4)c(/C=C(\C#N)N4C(=O)c5ccc(S(=O)(=O)O)cc5C4=O)s3)nc(SCCS(=O)(=O)O)n2)c(/N=N/c2nc(N3CCOCC3)c(/C=C(\C#N)N3C(=O)c4ccc(S(=O)(=O)O)cc4C3=O)s2)cc1OC] |
| 1-99 | 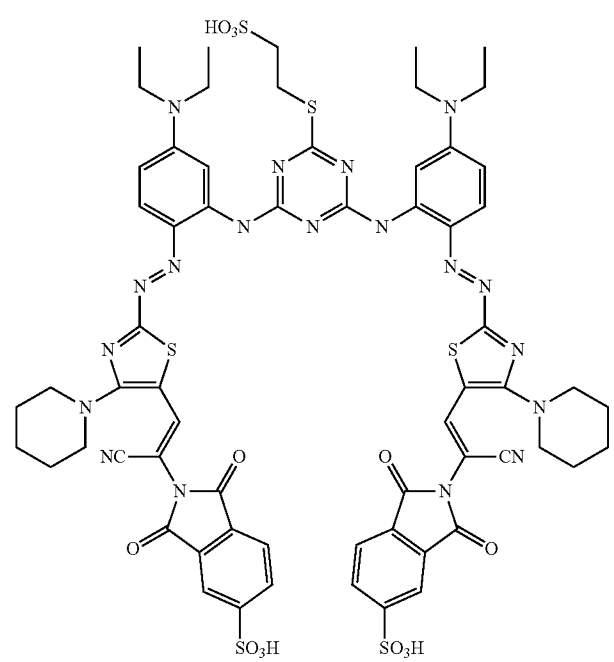 [SMILES: CCN(CC)c1ccc(/N=N/c2nc(N3CCCCC3)c(/C=C(\C#N)N3C(=O)c4ccc(S(=O)(=O)O)cc4C3=O)s2)c(Nc2nc(Nc3cc(N(CC)CC)ccc3/N=N/c3nc(N4CCCCC4)c(/C=C(\C#N)N4C(=O)c5ccc(S(=O)(=O)O)cc5C4=O)s3)nc(SCCS(=O)(=O)O)n2)c1] |

TABLE 1-continued
| Example | Structure |
| --- | --- |
| 1-100 | 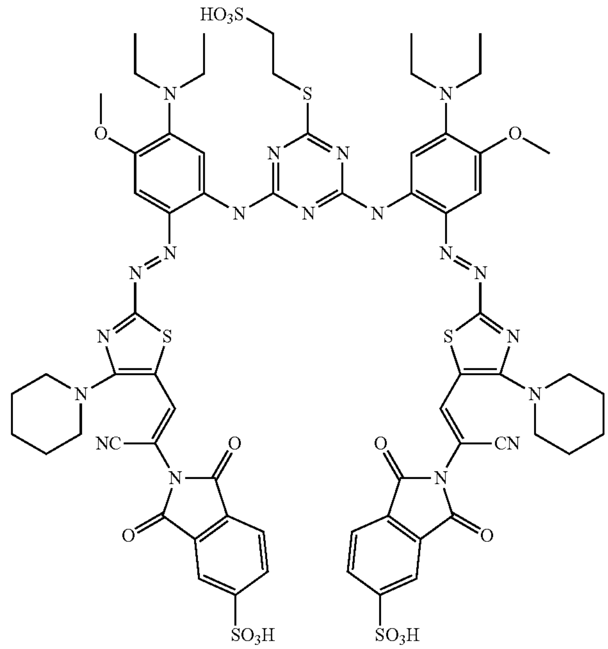 [SMILES: CCN(CC)c1cc(Nc2nc(Nc3cc(N(CC)CC)c(OC)cc3/N=N/c3nc(N4CCCCC4)c(/C=C(\C#N)N4C(=O)c5ccc(S(=O)(=O)O)cc5C4=O)s3)nc(SCCS(=O)(=O)O)n2)c(/N=N/c2nc(N3CCCCC3)c(/C=C(\C#N)N3C(=O)c4ccc(S(=O)(=O)O)cc4C3=O)s2)cc1OC] |
| 1-101 | 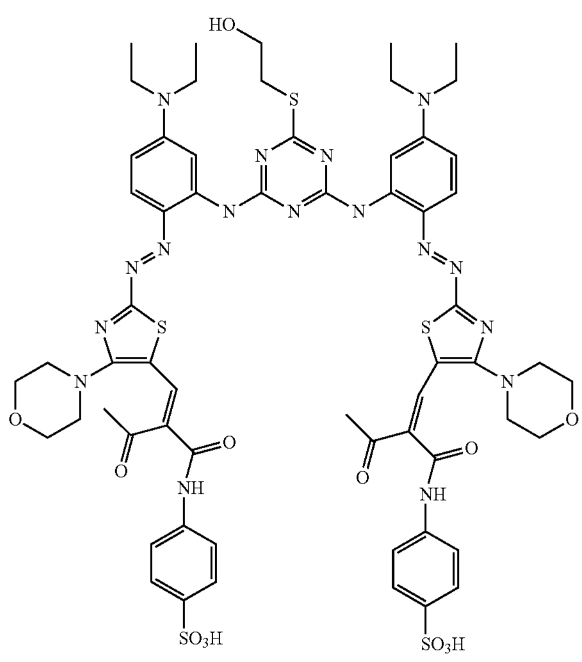 [SMILES: CCN(CC)c1ccc(/N=N/c2nc(N3CCOCC3)c(/C=C(/C(C)=O)C(=O)Nc3ccc(S(=O)(=O)O)cc3)s2)c(Nc2nc(Nc3cc(N(CC)CC)ccc3/N=N/c3nc(N4CCOCC4)c(/C=C(\C(C)=O)C(=O)Nc4ccc(S(=O)(=O)O)cc4)s3)nc(SCCO)n2)c1] |

TABLE 1-continued
| Example | Structure |
|---|---|
| 1-102 | 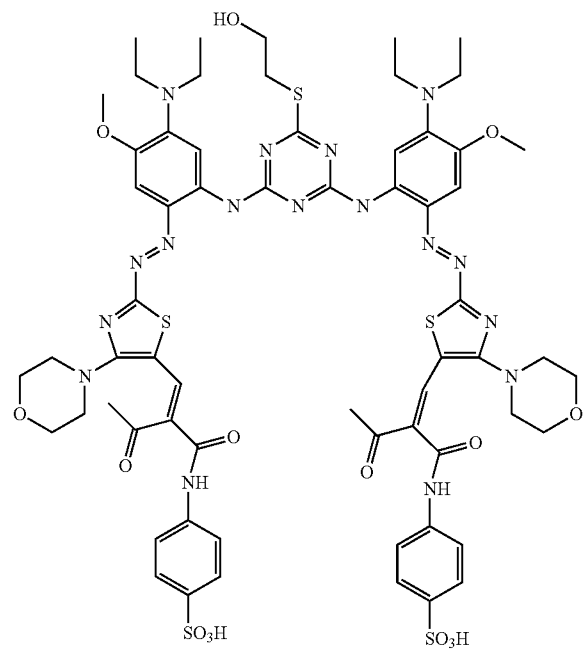 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4ccc(S(=O)(=O)O)cc4)s3)nc(SCCO)n2)c(/N=N/c2nc(N3CCOCC3)c(/C=C(/C(C)=O)C(=O)Nc3ccc(S(=O)(=O)O)cc3)s2)cc1OC] |
| 1-103 | 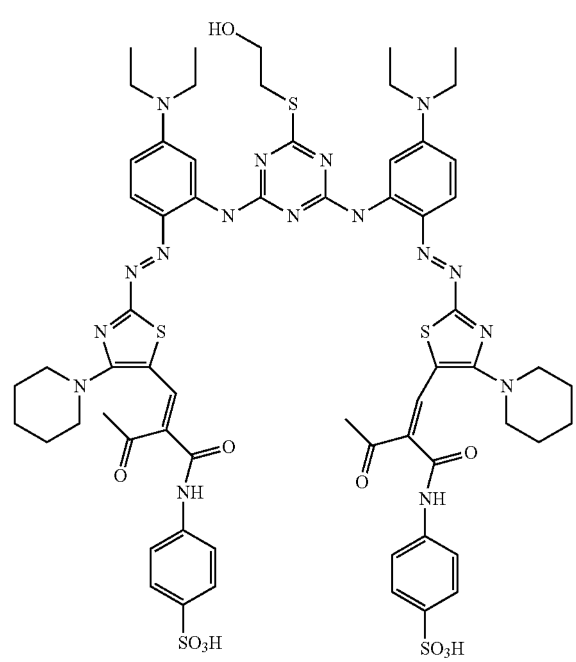 [SMILES: CCN(CC)c1ccc(/N=N/c2nc(N3CCCCC3)c(/C=C(/C(C)=O)C(=O)Nc3ccc(S(=O)(=O)O)cc3)s2)c(Nc2nc(Nc3cc(N(CC)CC)ccc3/N=N/c3nc(N4CCCCC4)c(/C=C(\C(C)=O)C(=O)Nc4ccc(S(=O)(=O)O)cc4)s3)nc(SCCO)n2)c1] |

TABLE 1-continued
| Example | Structure |
| --- | --- |
| 1-104 | 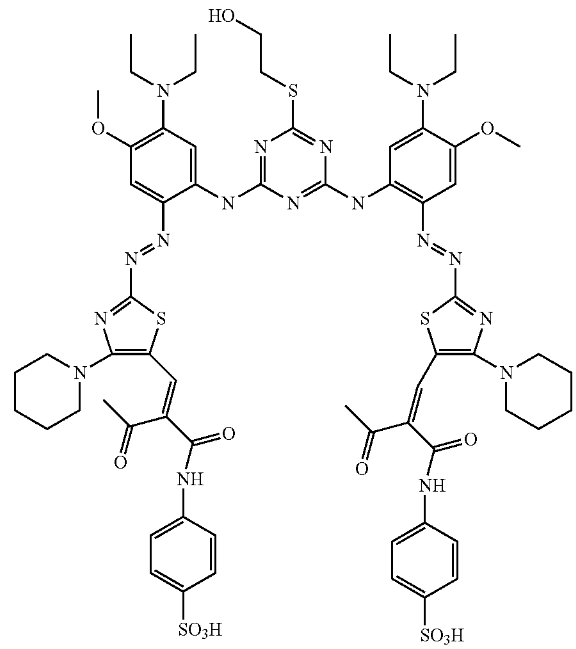 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4ccc(S(=O)(=O)O)cc4)s3)nc(SCCO)n2)c(/N=N/c2nc(N3CCCCC3)c(/C=C(/C(C)=O)C(=O)Nc3ccc(S(=O)(=O)O)cc3)s2)cc1OC] |
| 1-105 | 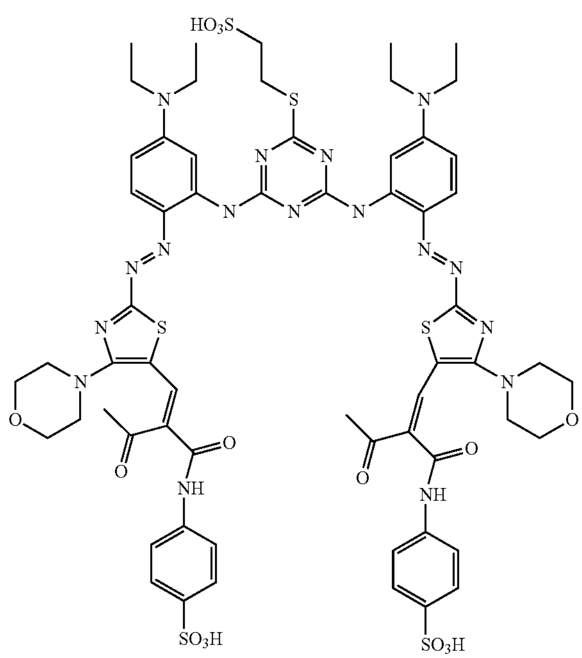 [SMILES: CCN(CC)c1ccc(/N=N/c2nc(N3CCOCC3)c(/C=C(/C(C)=O)C(=O)Nc3ccc(S(=O)(=O)O)cc3)s2)c(Nc2nc(Nc3cc(N(CC)CC)ccc3/N=N/c3nc(N4CCOCC4)c(/C=C(\C(C)=O)C(=O)Nc4ccc(S(=O)(=O)O)cc4)s3)nc(SCCS(=O)(=O)O)n2)c1] |

TABLE 1-continued
| Example | Structure |
| --- | --- |
| 1-106 | 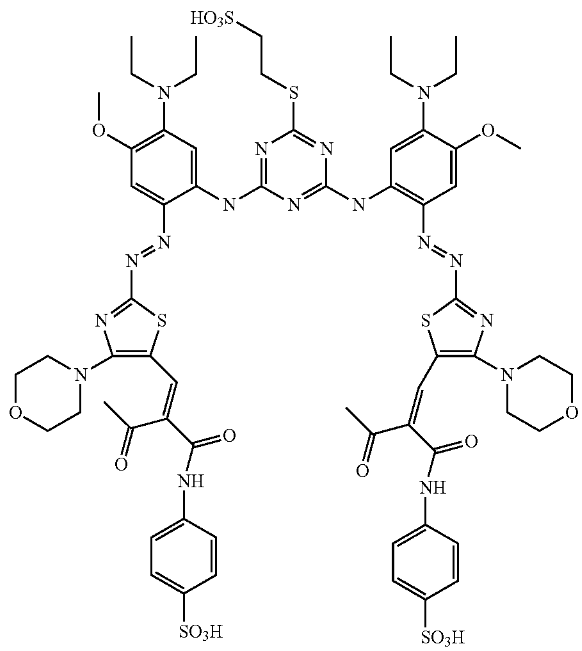 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4ccc(S(=O)(=O)O)cc4)s3)nc(SCCS(=O)(=O)O)n2)c(/N=N/c2nc(N3CCOCC3)c(/C=C(/C(C)=O)C(=O)Nc3ccc(S(=O)(=O)O)cc3)s2)cc1OC] |
| 1-107 | 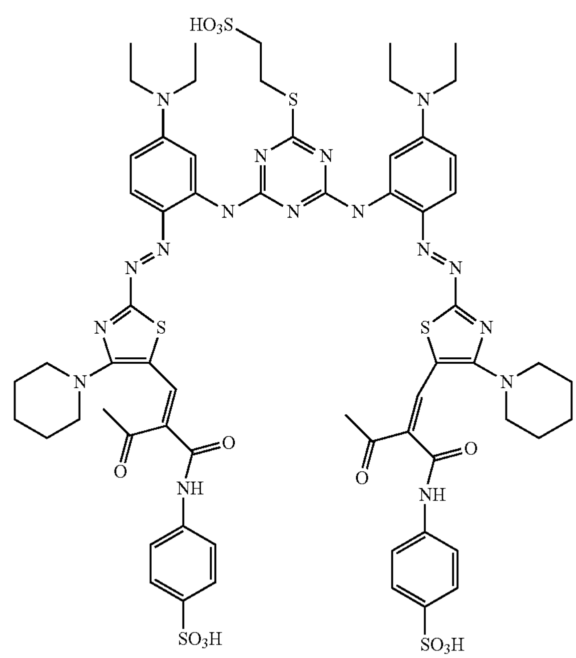 [SMILES: CCN(CC)c1ccc(/N=N/c2nc(N3CCCCC3)c(/C=C(/C(C)=O)C(=O)Nc3ccc(S(=O)(=O)O)cc3)s2)c(Nc2nc(Nc3cc(N(CC)CC)ccc3/N=N/c3nc(N4CCCCC4)c(/C=C(\C(C)=O)C(=O)Nc4ccc(S(=O)(=O)O)cc4)s3)nc(SCCS(=O)(=O)O)n2)c1] |

TABLE 1-continued
| Example | Structure |
|---|---|
| 1-108 | 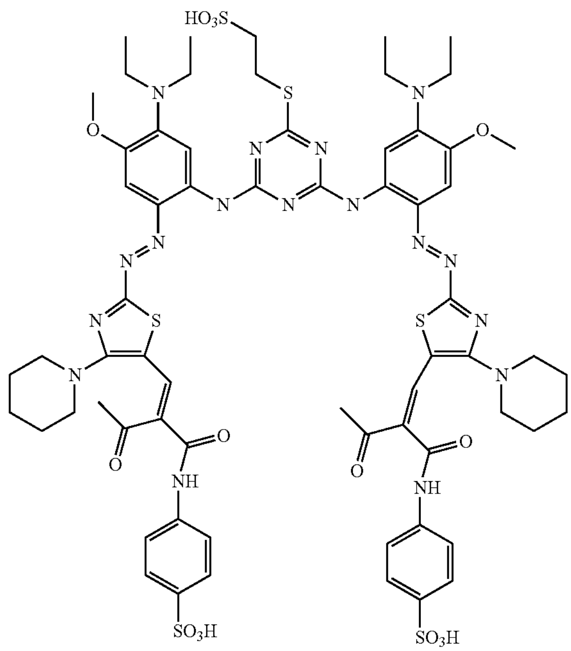 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4ccc(S(=O)(=O)O)cc4)s3)nc(SCCS(=O)(=O)O)n2)c(/N=N/c2nc(N3CCCCC3)c(/C=C(/C(C)=O)C(=O)Nc3ccc(S(=O)(=O)O)cc3)s2)cc1OC] |
| 1-109 | 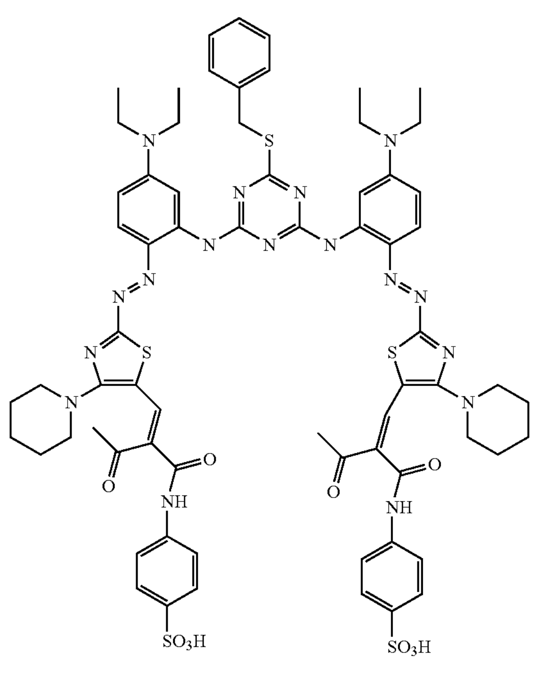 [SMILES: CCN(CC)c1ccc(/N=N/c2nc(N3CCCCC3)c(/C=C(/C(C)=O)C(=O)Nc3ccc(S(=O)(=O)O)cc3)s2)c(Nc2nc(Nc3cc(N(CC)CC)ccc3/N=N/c3nc(N4CCCCC4)c(/C=C(\C(C)=O)C(=O)Nc4ccc(S(=O)(=O)O)cc4)s3)nc(SCc3ccccc3)n2)c1] |

TABLE 1-continued
| Example | Structure |
| --- | --- |
| 1-110 | 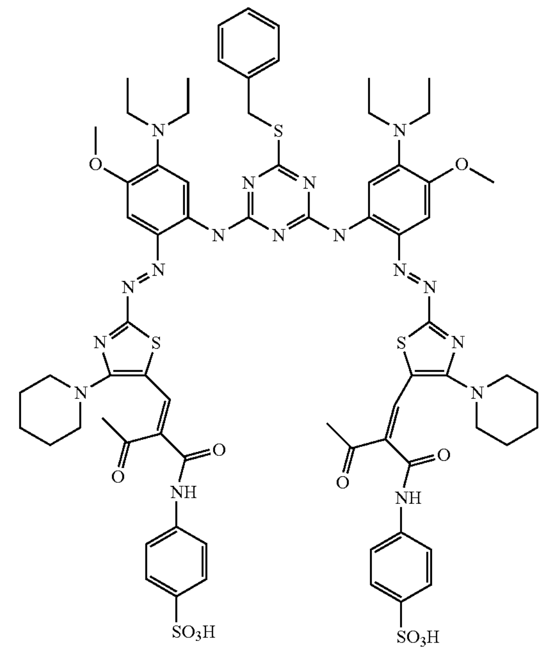 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4ccc(S(=O)(=O)O)cc4)s3)nc(SCc3ccccc3)n2)c(/N=N/c2nc(N3CCCCC3)c(/C=C(/C(C)=O)C(=O)Nc3ccc(S(=O)(=O)O)cc3)s2)cc1OC] |
| 1-111 | 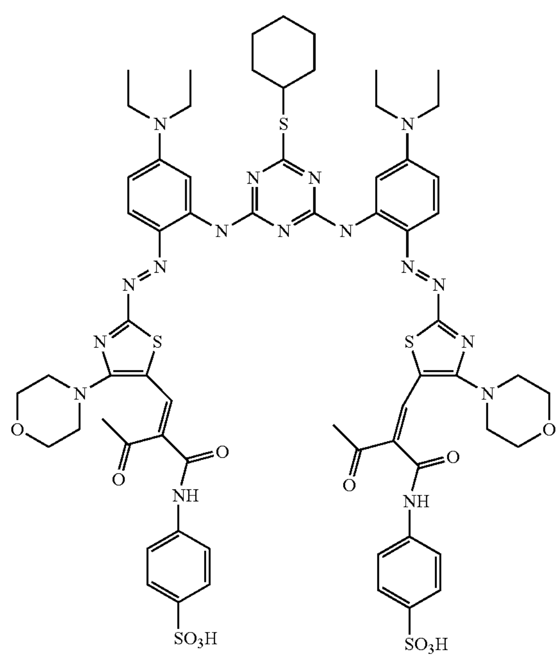 [SMILES: CCN(CC)c1ccc(/N=N/c2nc(N3CCOCC3)c(/C=C(/C(C)=O)C(=O)Nc3ccc(S(=O)(=O)O)cc3)s2)c(Nc2nc(Nc3cc(N(CC)CC)ccc3/N=N/c3nc(N4CCOCC4)c(/C=C(\C(C)=O)C(=O)Nc4ccc(S(=O)(=O)O)cc4)s3)nc(SC3CCCCC3)n2)c1] |

TABLE 1-continued
| Example | Structure |
| --- | --- |
| 1-112 | 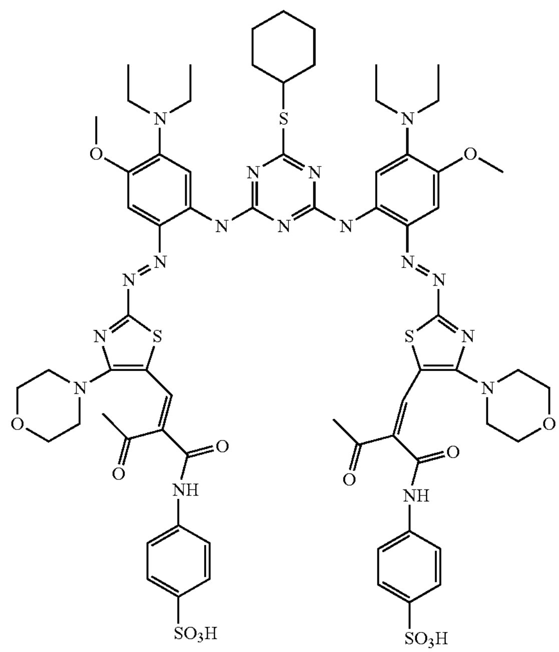 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4ccc(S(=O)(=O)O)cc4)s3)nc(SC3CCCCC3)n2)c(/N=N/c2nc(N3CCOCC3)c(/C=C(/C(C)=O)C(=O)Nc3ccc(S(=O)(=O)O)cc3)s2)cc1OC] |
| 1-113 | 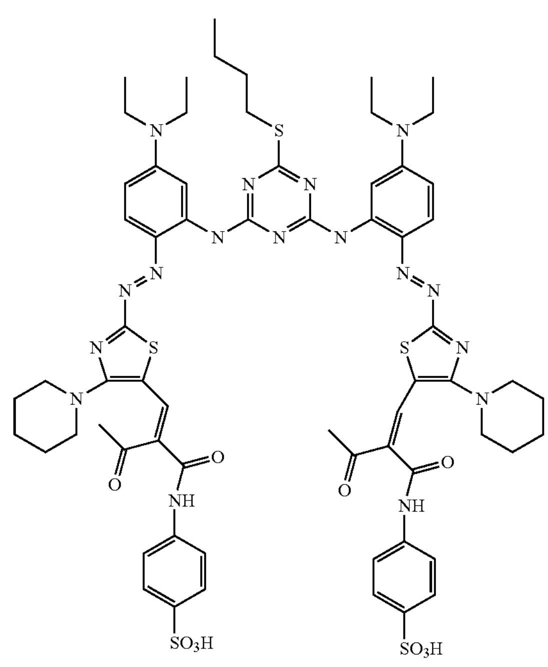 [SMILES: CCCCSc1nc(Nc2cc(N(CC)CC)ccc2/N=N/c2nc(N3CCCCC3)c(/C=C(/C(C)=O)C(=O)Nc3ccc(S(=O)(=O)O)cc3)s2)nc(Nc2cc(N(CC)CC)ccc2/N=N/c2nc(N3CCCCC3)c(/C=C(\C(C)=O)C(=O)Nc3ccc(S(=O)(=O)O)cc3)s2)n1] |

TABLE 1-continued
| Example | Structure |
| --- | --- |
| 1-114 | 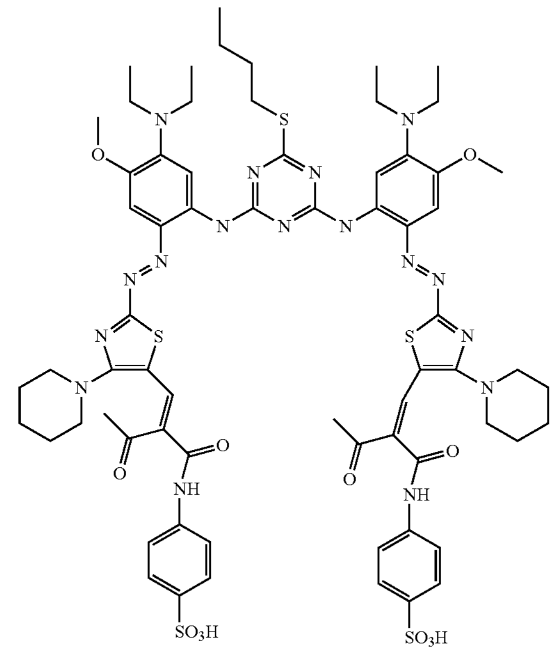 [SMILES: CCCCSc1nc(Nc2cc(N(CC)CC)c(OC)cc2/N=N/c2nc(N3CCCCC3)c(/C=C(/C(C)=O)C(=O)Nc3ccc(S(=O)(=O)O)cc3)s2)nc(Nc2cc(N(CC)CC)c(OC)cc2/N=N/c2nc(N3CCCCC3)c(/C=C(\C(C)=O)C(=O)Nc3ccc(S(=O)(=O)O)cc3)s2)n1] |
| 1-115 | 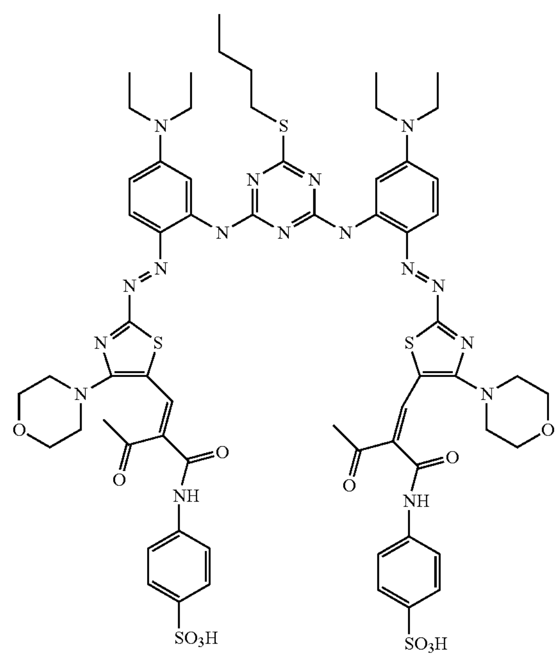 [SMILES: CCCCSc1nc(Nc2cc(N(CC)CC)ccc2/N=N/c2nc(N3CCOCC3)c(/C=C(/C(C)=O)C(=O)Nc3ccc(S(=O)(=O)O)cc3)s2)nc(Nc2cc(N(CC)CC)ccc2/N=N/c2nc(N3CCOCC3)c(/C=C(\C(C)=O)C(=O)Nc3ccc(S(=O)(=O)O)cc3)s2)n1] |

TABLE 1-continued
| Example | Structure |
| --- | --- |
| 1-116 | 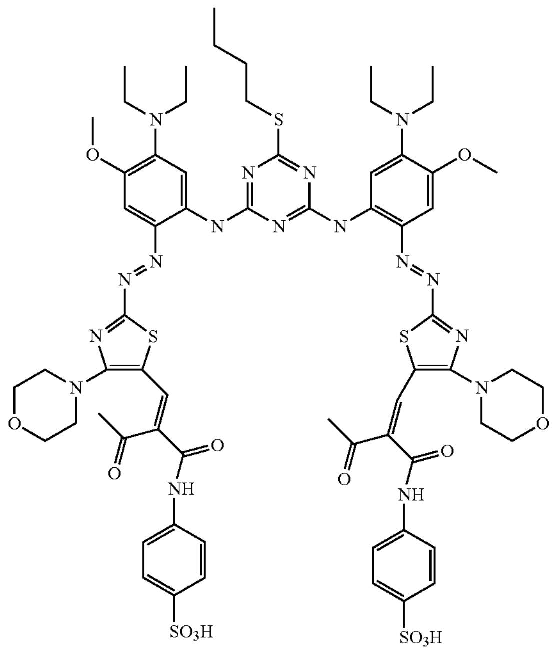 [SMILES: CCCCSc1nc(Nc2cc(N(CC)CC)c(OC)cc2/N=N/c2nc(N3CCOCC3)c(/C=C(/C(C)=O)C(=O)Nc3ccc(S(=O)(=O)O)cc3)s2)nc(Nc2cc(N(CC)CC)c(OC)cc2/N=N/c2nc(N3CCOCC3)c(/C=C(\C(C)=O)C(=O)Nc3ccc(S(=O)(=O)O)cc3)s2)n1] |
| 1-117 | 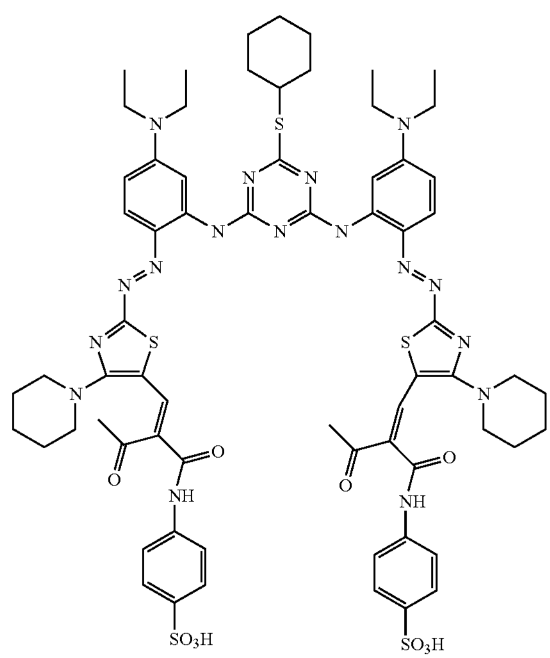 [SMILES: CCN(CC)c1ccc(/N=N/c2nc(N3CCCCC3)c(/C=C(/C(C)=O)C(=O)Nc3ccc(S(=O)(=O)O)cc3)s2)c(Nc2nc(Nc3cc(N(CC)CC)ccc3/N=N/c3nc(N4CCCCC4)c(/C=C(\C(C)=O)C(=O)Nc4ccc(S(=O)(=O)O)cc4)s3)nc(SC3CCCCC3)n2)c1] |

TABLE 1-continued
| Example | Structure |
|---|---|
| 1-118 | 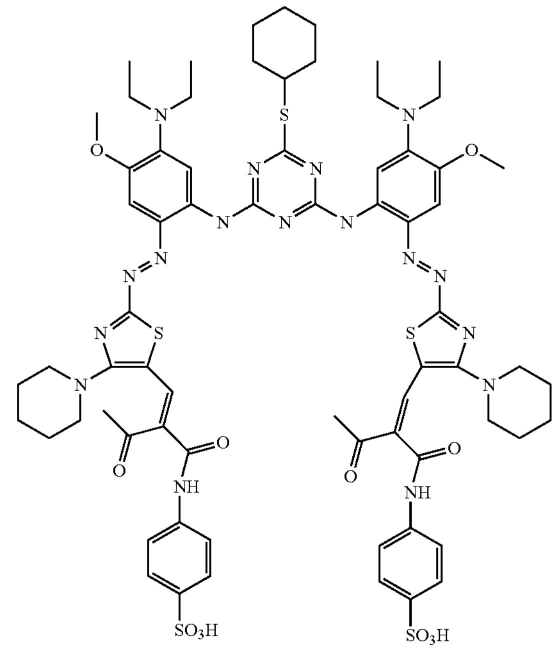 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4ccc(S(=O)(=O)O)cc4)s3)nc(SC3CCCCC3)n2)c(/N=N/c2nc(N3CCCCC3)c(/C=C(/C(C)=O)C(=O)Nc3ccc(S(=O)(=O)O)cc3)s2)cc1OC] |
| 1-119 | 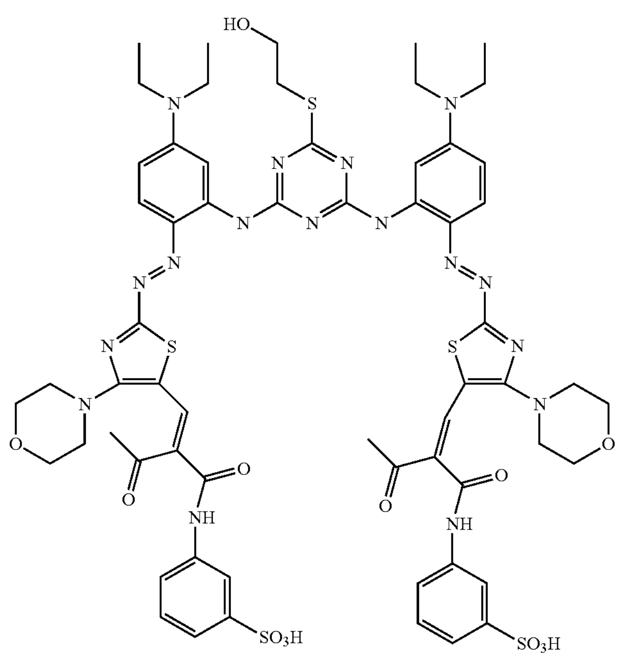 [SMILES: CCN(CC)c1ccc(/N=N/c2nc(N3CCOCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCOCC4)c(/C=C(\C(C)=O)C(=O)Nc4cccc(S(=O)(=O)O)c4)s3)nc(SCCO)n2)c1] |

TABLE 1-continued
| Example | Structure |
|---|---|
| 1-120 | 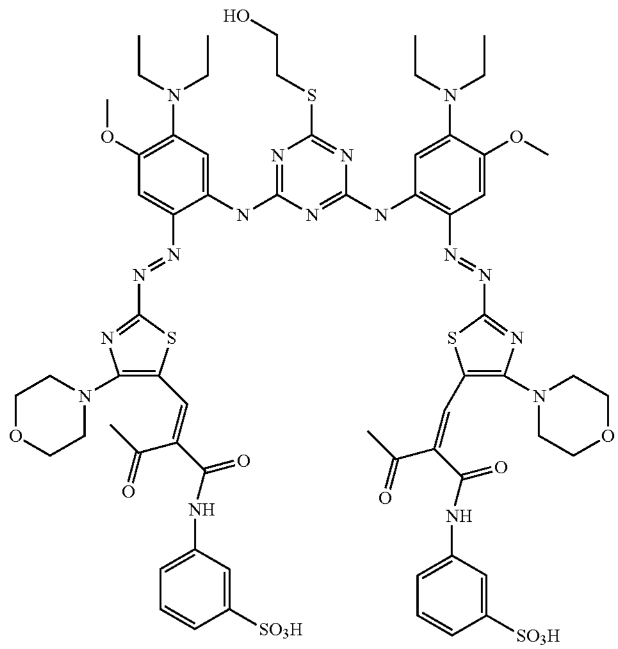 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4cccc(S(=O)(=O)O)c4)s3)nc(SCCO)n2)c(/N=N/c2nc(N3CCOCC3)c(/C=C(/C(C)=O)C(=O)Nc3cccc(S(=O)(=O)O)c3)s2)cc1OC] |
| 1-121 | 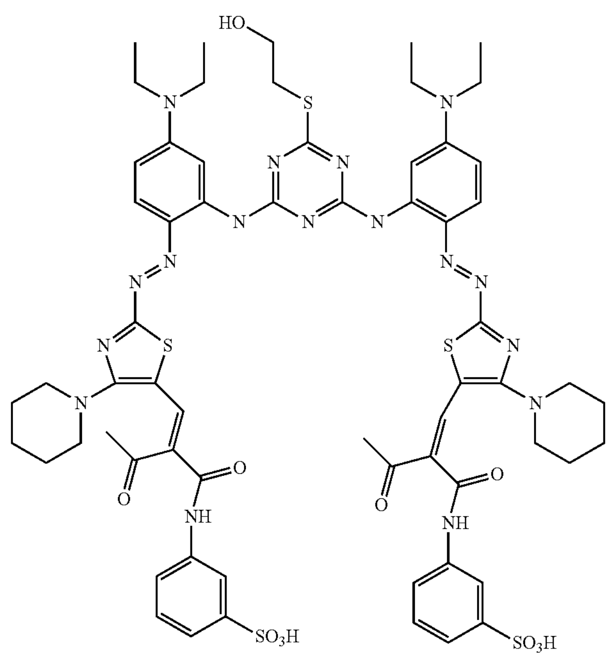 [SMILES: CCN(CC)c1ccc(/N=N/c2nc(N3CCCCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCCCC4)c(/C=C(\C(C)=O)C(=O)Nc4cccc(S(=O)(=O)O)c4)s3)nc(SCCO)n2)c1] |

TABLE 1-continued
| Example | Structure |
|---|---|
| 1-122 | 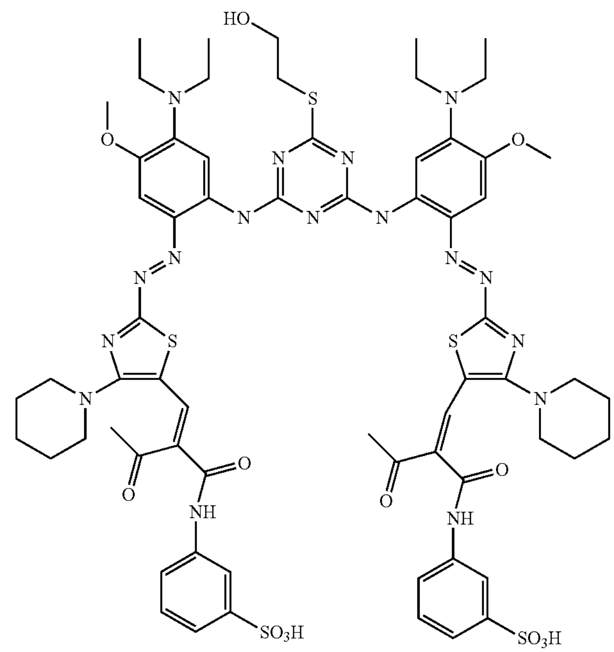 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4cccc(S(=O)(=O)O)c4)s3)nc(SCCO)n2)c(/N=N/c2nc(N3CCCCC3)c(/C=C(/C(C)=O)C(=O)Nc3cccc(S(=O)(=O)O)c3)s2)cc1OC] |
| 1-123 | 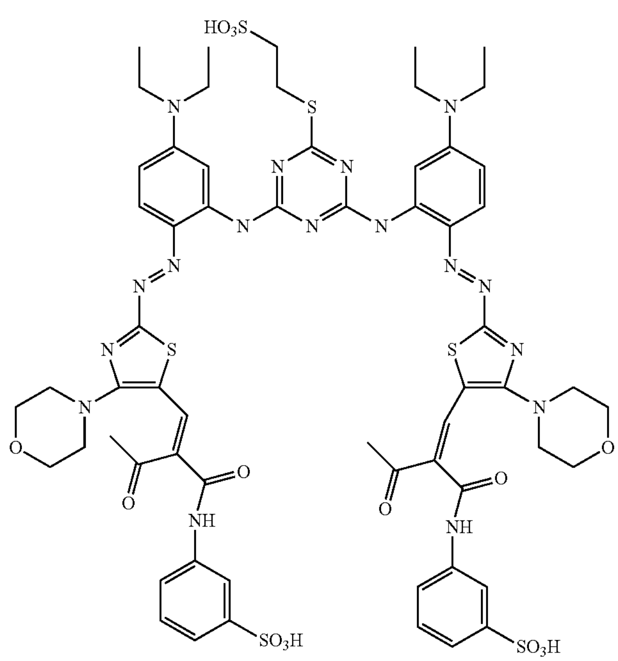 [SMILES: CCN(CC)c1ccc(/N=N/c2nc(N3CCOCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCOCC4)c(/C=C(\C(C)=O)C(=O)Nc4cccc(S(=O)(=O)O)c4)s3)nc(SCCS(=O)(=O)O)n2)c1] |

TABLE 1-continued
| Example | Structure |
|---|---|
| 1-124 | 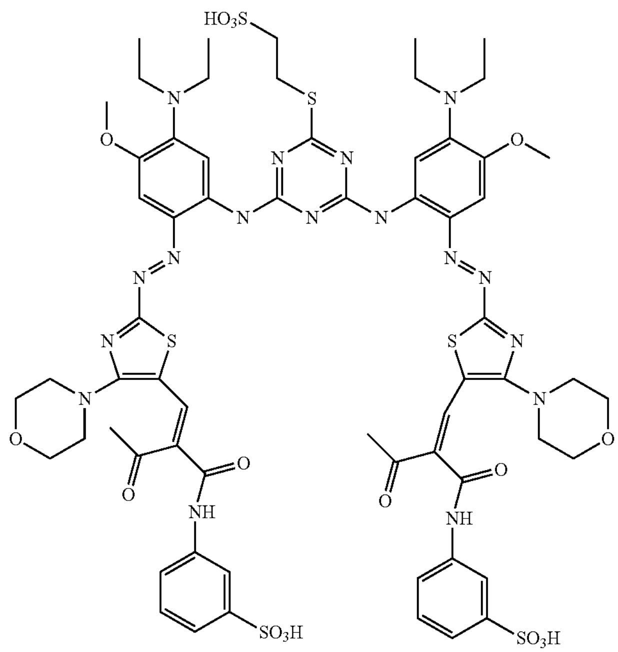 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4cccc(S(=O)(=O)O)c4)s3)nc(SCCS(=O)(=O)O)n2)c(/N=N/c2nc(N3CCOCC3)c(/C=C(/C(C)=O)C(=O)Nc3cccc(S(=O)(=O)O)c3)s2)cc1OC] |
| 1-125 | 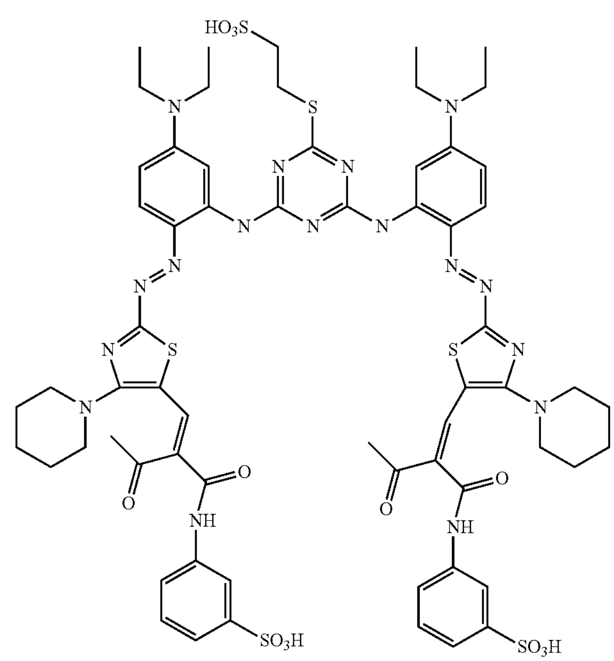 [SMILES: CCN(CC)c1ccc(/N=N/c2nc(N3CCCCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCCCC4)c(/C=C(\C(C)=O)C(=O)Nc4cccc(S(=O)(=O)O)c4)s3)nc(SCCS(=O)(=O)O)n2)c1] |

TABLE 1-continued
| Example | Structure |
|---|---|
| 1-126 | 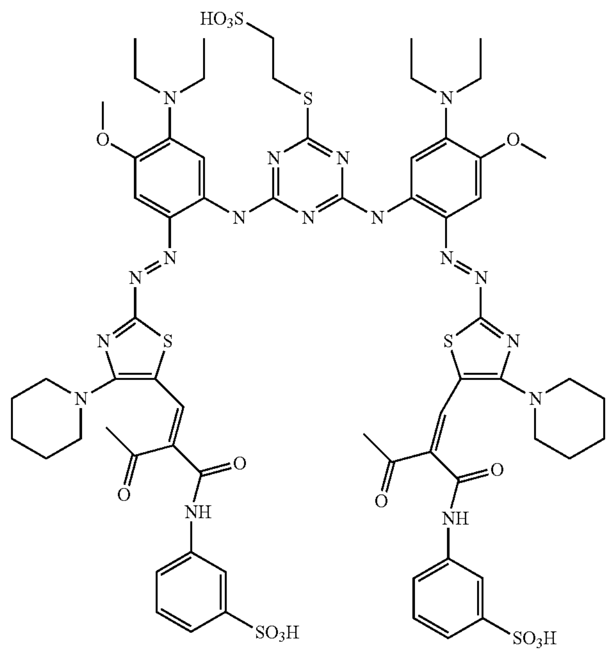 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4cccc(S(=O)(=O)O)c4)s3)nc(SCCS(=O)(=O)O)n2)c(/N=N/c2nc(N3CCCCC3)c(/C=C(/C(C)=O)C(=O)Nc3cccc(S(=O)(=O)O)c3)s2)cc1OC] |
| 1-127 | 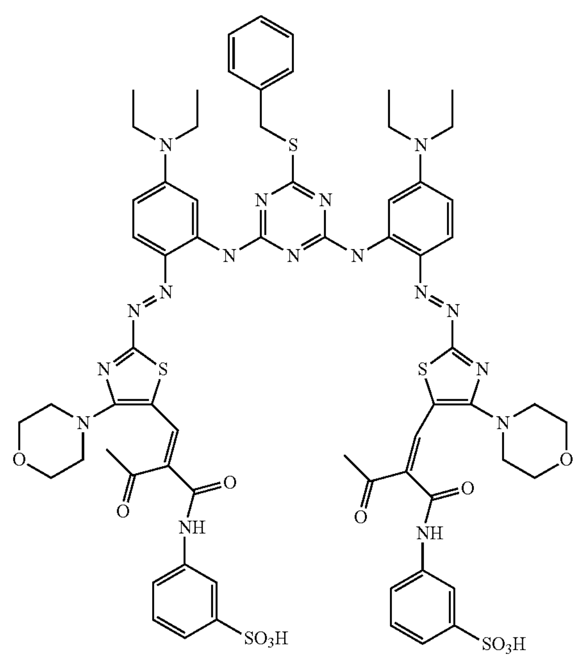 [SMILES: CCN(CC)c1ccc(/N=N/c2nc(N3CCOCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCOCC4)c(/C=C(\C(C)=O)C(=O)Nc4cccc(S(=O)(=O)O)c4)s3)nc(SCc3ccccc3)n2)c1] |

TABLE 1-continued
| Example | Structure |
| --- | --- |
| 1-128 | 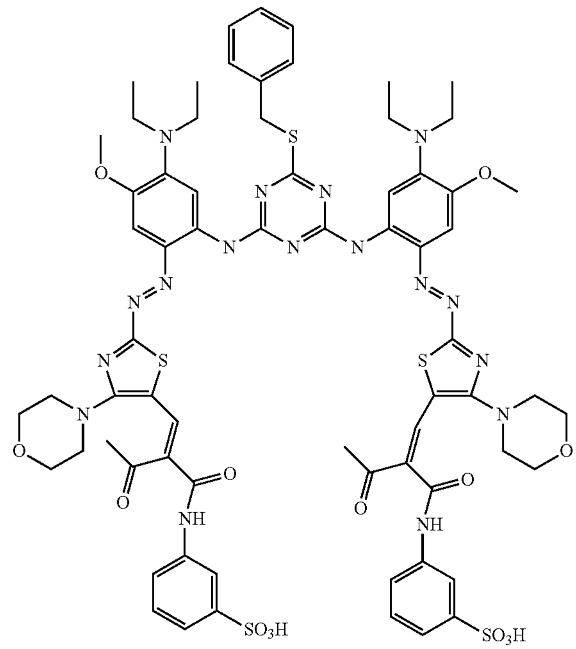 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4cccc(S(=O)(=O)O)c4)s3)nc(SCc3ccccc3)n2)c(/N=N/c2nc(N3CCOCC3)c(/C=C(/C(C)=O)C(=O)Nc3cccc(S(=O)(=O)O)c3)s2)cc1OC] |
| 1-129 | 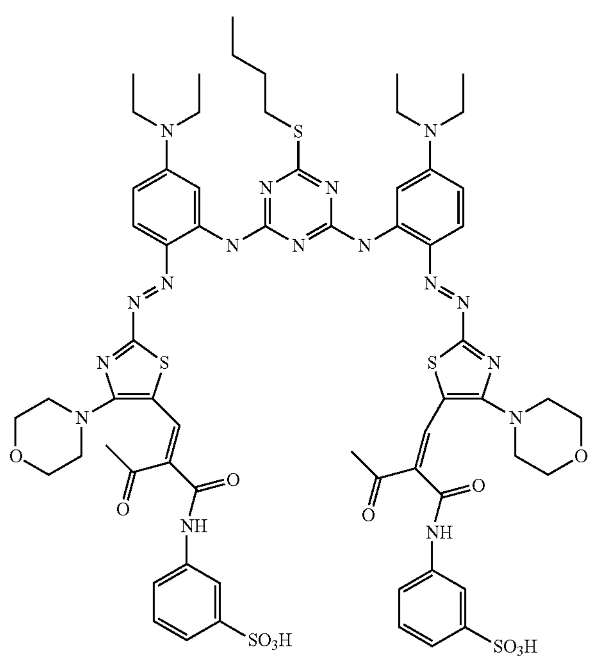 [SMILES: CCCCSc1nc(Nc2cc(N(CC)CC)ccc2/N=N/c2nc(N3CCOCC3)c(/C=C(/C(C)=O)C(=O)Nc3cccc(S(=O)(=O)O)c3)s2)nc(Nc2cc(N(CC)CC)ccc2/N=N/c2nc(N3CCOCC3)c(/C=C(\C(C)=O)C(=O)Nc3cccc(S(=O)(=O)O)c3)s2)n1] |

TABLE 1-continued
| Example | Structure |
|---|---|
| 1-130 | 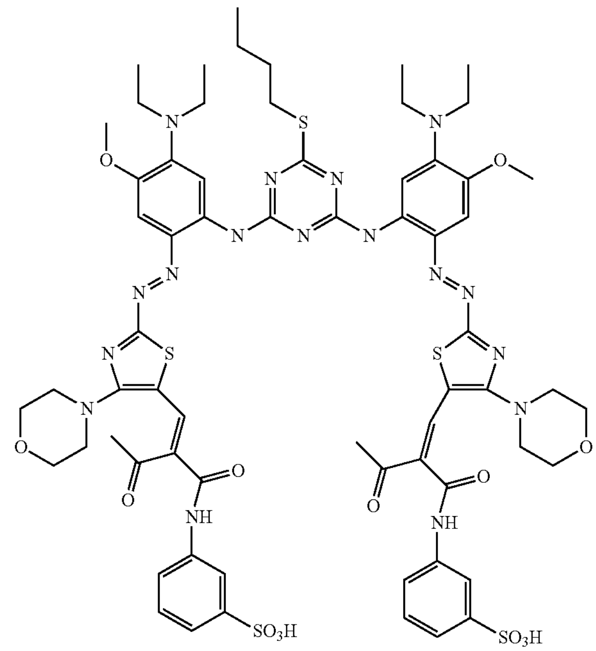 [SMILES: CCCCSc1nc(Nc2cc(N(CC)CC)c(OC)cc2/N=N/c2nc(N3CCOCC3)c(/C=C(/C(C)=O)C(=O)Nc3cccc(S(=O)(=O)O)c3)s2)nc(Nc2cc(N(CC)CC)c(OC)cc2/N=N/c2nc(N3CCOCC3)c(/C=C(\C(C)=O)C(=O)Nc3cccc(S(=O)(=O)O)c3)s2)n1] |
| 1-131 | 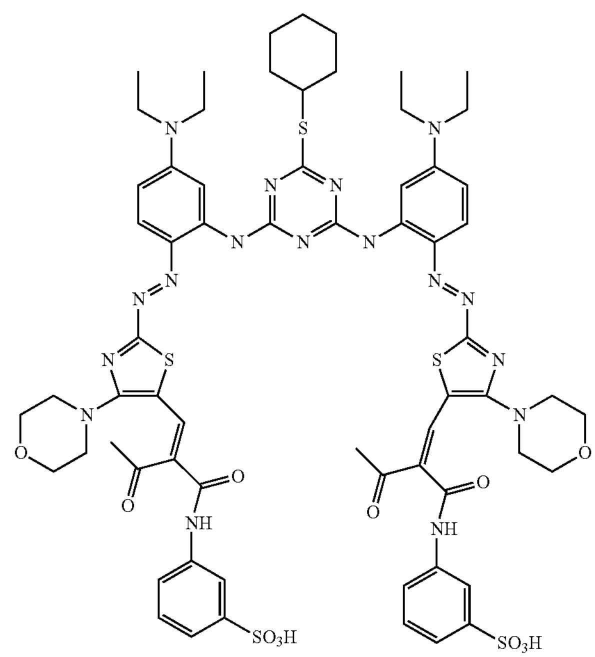 [SMILES: CCN(CC)c1ccc(/N=N/c2nc(N3CCOCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCOCC4)c(/C=C(\C(C)=O)C(=O)Nc4cccc(S(=O)(=O)O)c4)s3)nc(SC3CCCCC3)n2)c1] |

TABLE 1-continued
| Example | Structure |
|---|---|
| 1-132 | 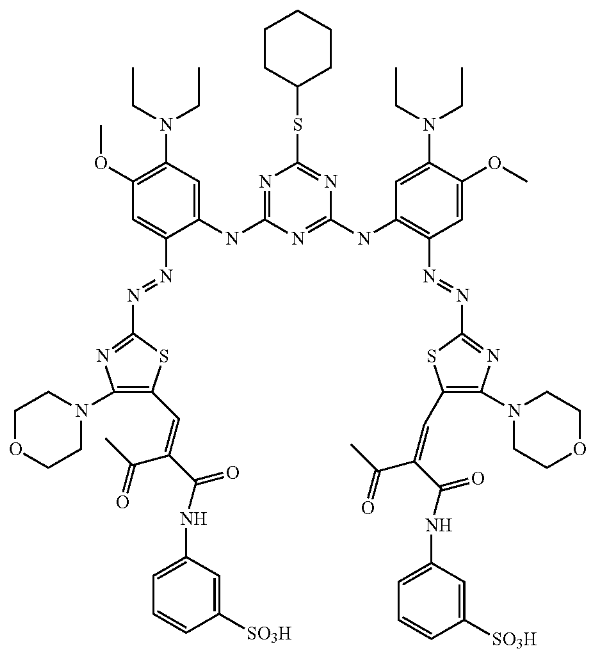 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4cccc(S(=O)(=O)O)c4)s3)nc(SC3CCCCC3)n2)c(/N=N/c2nc(N3CCOCC3)c(/C=C(/C(C)=O)C(=O)Nc3cccc(S(=O)(=O)O)c3)s2)cc1OC] |
| 1-133 | 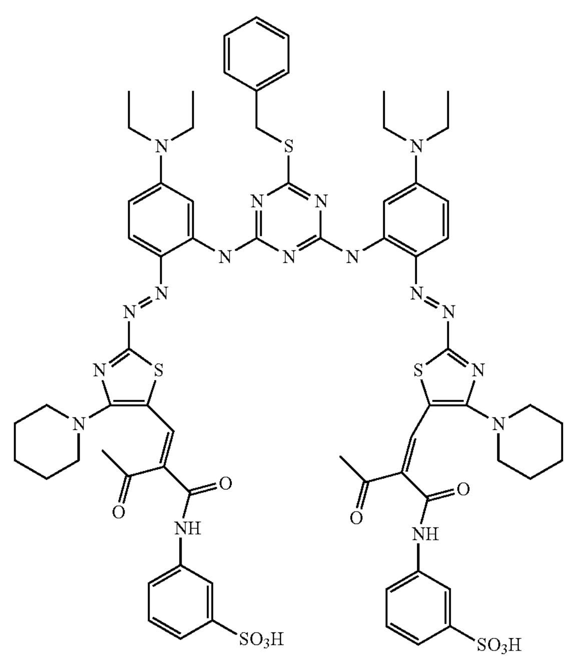 [SMILES: CCN(CC)c1ccc(/N=N/c2nc(N3CCCCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCCCC4)c(/C=C(\C(C)=O)C(=O)Nc4cccc(S(=O)(=O)O)c4)s3)nc(SCc3ccccc3)n2)c1] |

TABLE 1-continued
| Example | Structure |
|---|---|
| 1-134 | 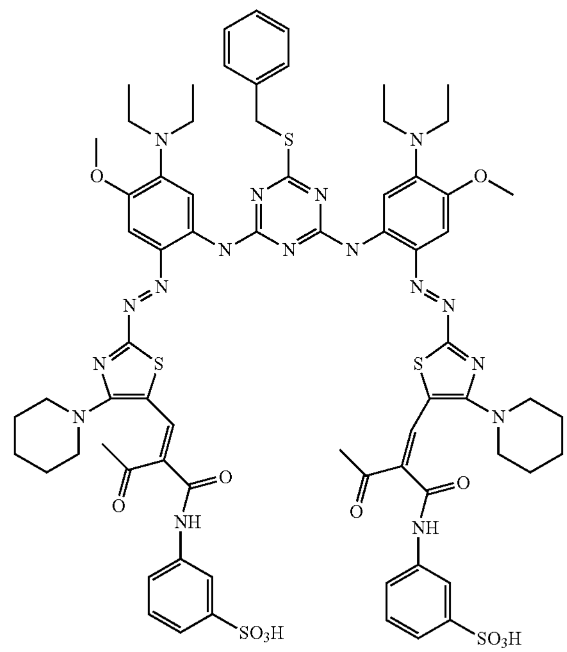 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4cccc(S(=O)(=O)O)c4)s3)nc(SCc3ccccc3)n2)c(/N=N/c2nc(N3CCCCC3)c(/C=C(/C(C)=O)C(=O)Nc3cccc(S(=O)(=O)O)c3)s2)cc1OC] |
| 1-135 | 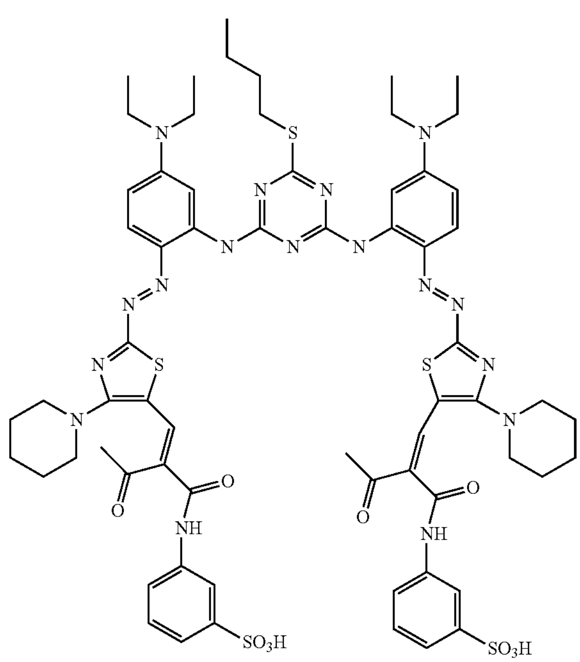 [SMILES: CCCCSc1nc(Nc2cc(N(CC)CC)ccc2/N=N/c2nc(N3CCCCC3)c(/C=C(/C(C)=O)C(=O)Nc3cccc(S(=O)(=O)O)c3)s2)nc(Nc2cc(N(CC)CC)ccc2/N=N/c2nc(N3CCCCC3)c(/C=C(\C(C)=O)C(=O)Nc3cccc(S(=O)(=O)O)c3)s2)n1] |

TABLE 1-continued
| Example | Structure |
|---|---|
| 1-136 | 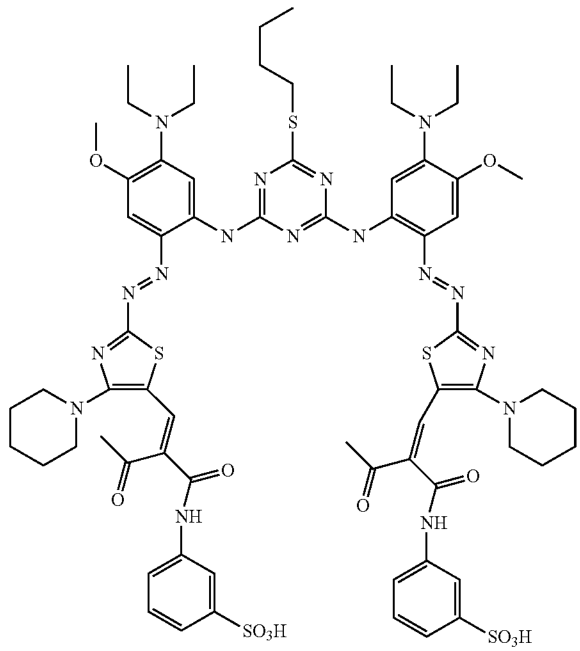 [SMILES: CCCCSc1nc(Nc2cc(N(CC)CC)c(OC)cc2/N=N/c2nc(N3CCCCC3)c(/C=C(/C(C)=O)C(=O)Nc3cccc(S(=O)(=O)O)c3)s2)nc(Nc2cc(N(CC)CC)c(OC)cc2/N=N/c2nc(N3CCCCC3)c(/C=C(\C(C)=O)C(=O)Nc3cccc(S(=O)(=O)O)c3)s2)n1] |
| 1-137 | 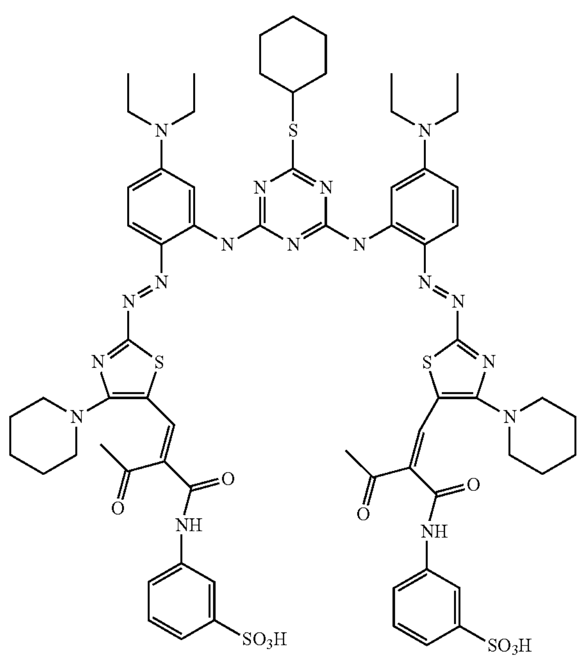 [SMILES: CCN(CC)c1ccc(/N=N/c2nc(N3CCCCC3)c(/C=C(/C(C)=O)C(=O)Nc3cccc(S(=O)(=O)O)c3)s2)c(Nc2nc(Nc3cc(N(CC)CC)ccc3/N=N/c3nc(N4CCCCC4)c(/C=C(\C(C)=O)C(=O)Nc4cccc(S(=O)(=O)O)c4)s3)nc(SC3CCCCC3)n2)c1] |

TABLE 1-continued
| Example | Structure |
| --- | --- |
| 1-138 | 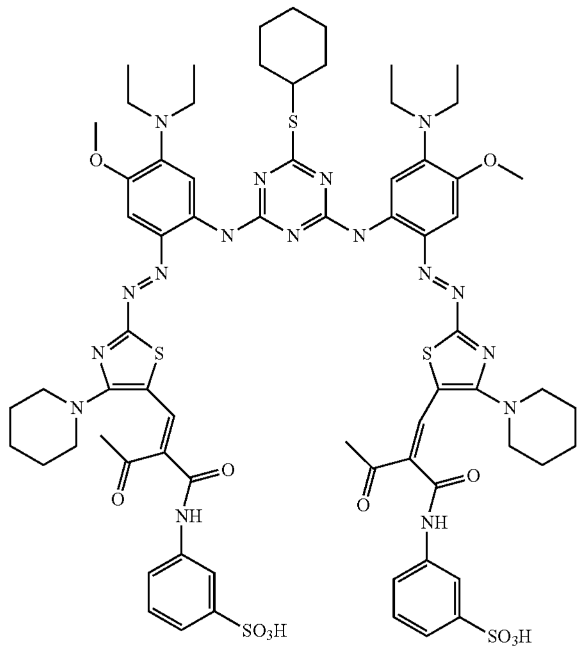 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4cccc(S(=O)(=O)O)c4)s3)nc(SC3CCCCC3)n2)c(/N=N/c2nc(N3CCCCC3)c(/C=C(/C(C)=O)C(=O)Nc3cccc(S(=O)(=O)O)c3)s2)cc1OC] |
| 1-139 | 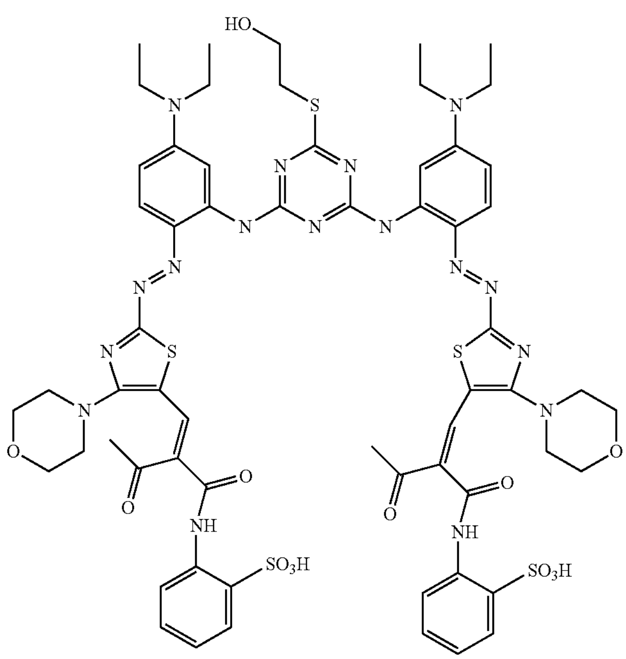 [SMILES: CCN(CC)c1ccc(/N=N/c2nc(N3CCOCC3)c(/C=C(/C(C)=O)C(=O)Nc3ccccc3S(=O)(=O)O)s2)c(Nc2nc(Nc3cc(N(CC)CC)ccc3/N=N/c3nc(N4CCOCC4)c(/C=C(\C(C)=O)C(=O)Nc4ccccc4S(=O)(=O)O)s3)nc(SCCO)n2)c1] |

TABLE 1-continued
| Example | Structure |
|---|---|
| 1-140 | 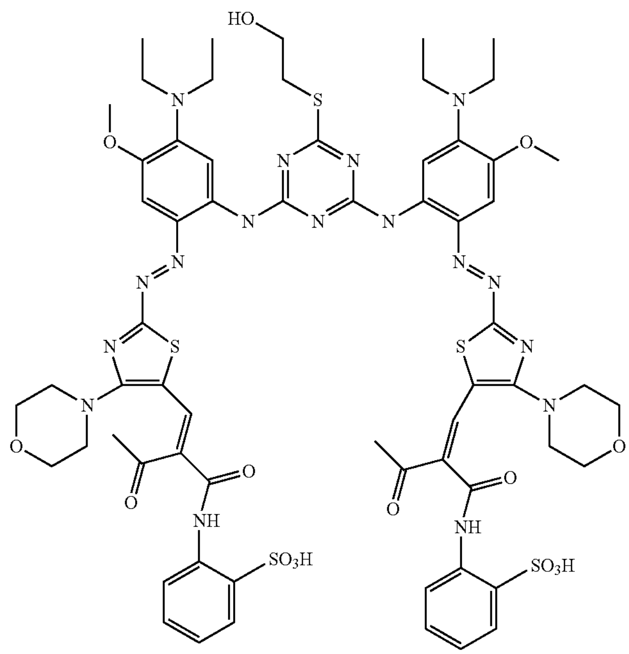 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4ccccc4S(=O)(=O)O)s3)nc(SCCO)n2)c(/N=N/c2nc(N3CCOCC3)c(/C=C(/C(C)=O)C(=O)Nc3ccccc3S(=O)(=O)O)s2)cc1OC] |
| 1-141 | 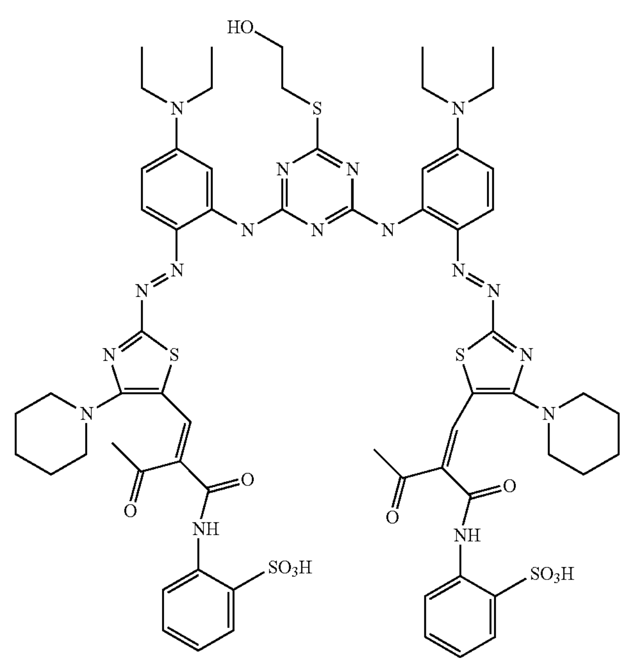 [SMILES: CCN(CC)c1ccc(/N=N/c2nc(N3CCCCC3)c(/C=C(/C(C)=O)C(=O)Nc3ccccc3S(=O)(=O)O)s2)c(Nc2nc(Nc3cc(N(CC)CC)ccc3/N=N/c3nc(N4CCCCC4)c(/C=C(\C(C)=O)C(=O)Nc4ccccc4S(=O)(=O)O)s3)nc(SCCO)n2)c1] |

TABLE 1-continued
| Example | Structure |
|---|---|
| 1-142 | 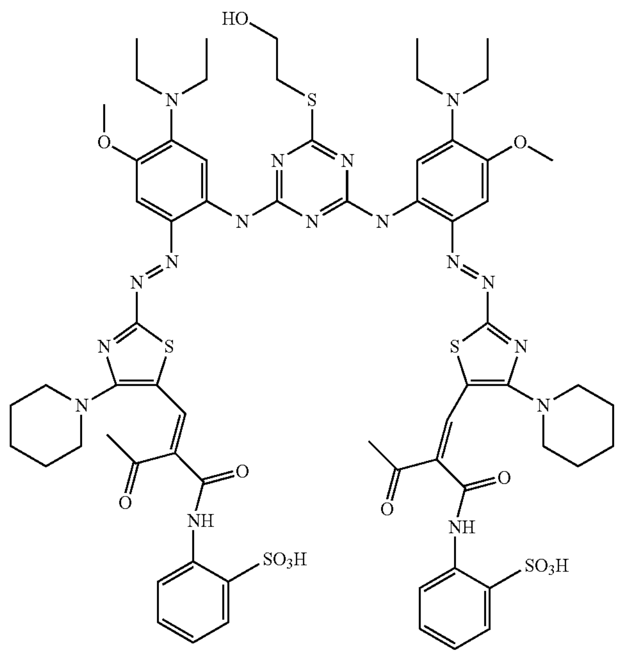 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4ccccc4S(=O)(=O)O)s3)nc(SCCO)n2)c(/N=N/c2nc(N3CCCCC3)c(/C=C(/C(C)=O)C(=O)Nc3ccccc3S(=O)(=O)O)s2)cc1OC] |
| 1-143 | 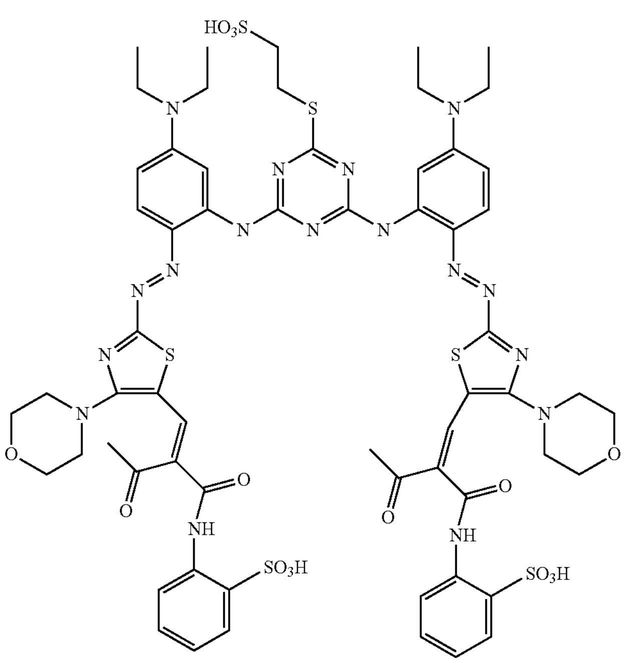 [SMILES: CCN(CC)c1ccc(/N=N/c2nc(N3CCOCC3)c(/C=C(/C(C)=O)C(=O)Nc3ccccc3S(=O)(=O)O)s2)c(Nc2nc(Nc3cc(N(CC)CC)ccc3/N=N/c3nc(N4CCOCC4)c(/C=C(\C(C)=O)C(=O)Nc4ccccc4S(=O)(=O)O)s3)nc(SCCS(=O)(=O)O)n2)c1] |

TABLE 1-continued
| Example | Structure |
|---|---|
| 1-144 | 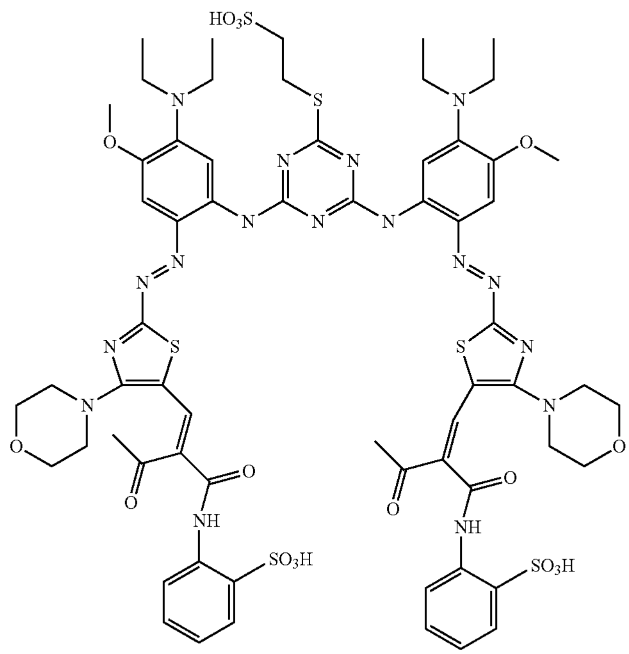 [SMILES: CCN(CC)c1cc(Nc2nc(Nc3cc(N(CC)CC)c(OC)cc3/N=N/c3nc(N4CCOCC4)c(/C=C(\C(C)=O)C(=O)Nc4ccccc4S(=O)(=O)O)s3)nc(SCCS(=O)(=O)O)n2)c(/N=N/c2nc(N3CCOCC3)c(/C=C(/C(C)=O)C(=O)Nc3ccccc3S(=O)(=O)O)s2)cc1OC] |
| 1-145 | 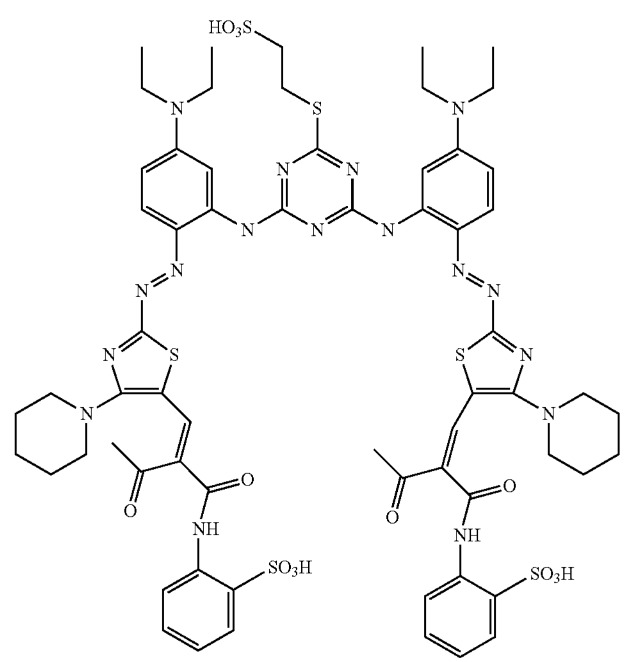 [SMILES: CCN(CC)c1ccc(/N=N/c2nc(N3CCCCC3)c(/C=C(/C(C)=O)C(=O)Nc3ccccc3S(=O)(=O)O)s2)c(Nc2nc(Nc3cc(N(CC)CC)ccc3/N=N/c3nc(N4CCCCC4)c(/C=C(\C(C)=O)C(=O)Nc4ccccc4S(=O)(=O)O)s3)nc(SCCS(=O)(=O)O)n2)c1] |

TABLE 1-continued
| Example | Structure |
| --- | --- |
| 1-146 | 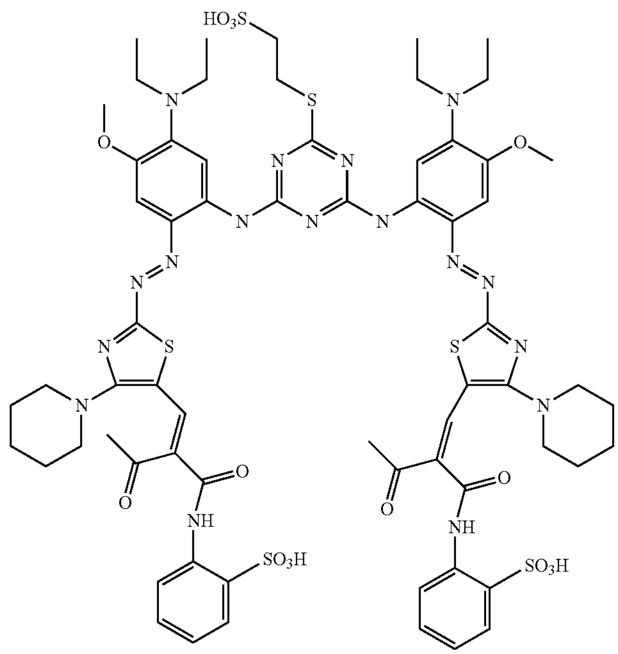 [SMILES: CCN(CC)c1cc(Nc2nc(Nc3cc(N(CC)CC)c(OC)cc3/N=N/c3nc(N4CCCCC4)c(/C=C(\C(C)=O)C(=O)Nc4ccccc4S(=O)(=O)O)s3)nc(SCCS(=O)(=O)O)n2)c(/N=N/c2nc(N3CCCCC3)c(/C=C(/C(C)=O)C(=O)Nc3ccccc3S(=O)(=O)O)s2)cc1OC] |
| 1-147 | 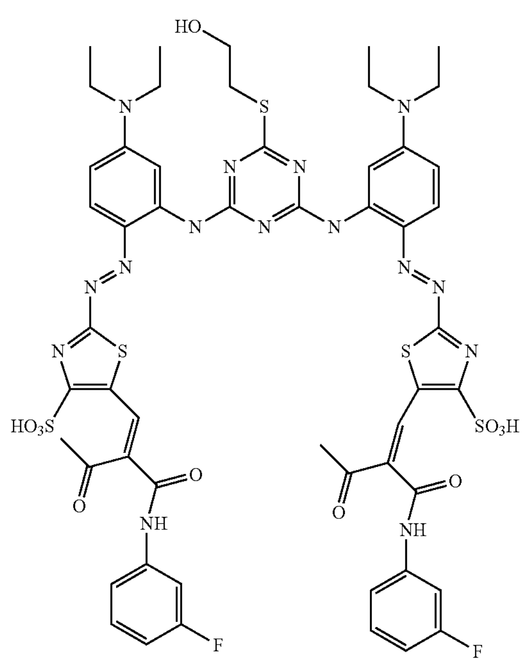 [SMILES: CCN(CC)c1ccc(/N=N/c2nc(S(=O)(=O)O)c(/C=C(/C(C)=O)C(=O)Nc3cccc(F)c3)s2)c(Nc2nc(Nc3cc(N(CC)CC)ccc3/N=N/c3nc(S(=O)(=O)O)c(/C=C(\C(C)=O)C(=O)Nc4cccc(F)c4)s3)nc(SCCO)n2)c1] |

TABLE 1-continued
| Example | Structure |
|---|---|
| 1-148 | 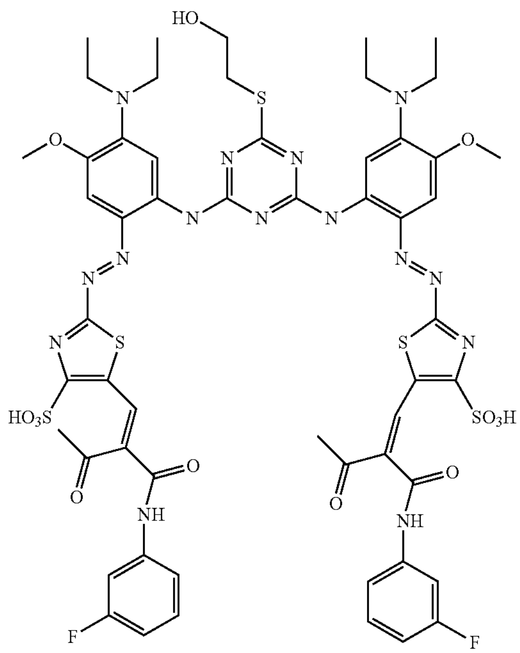 |
| 1-149 | 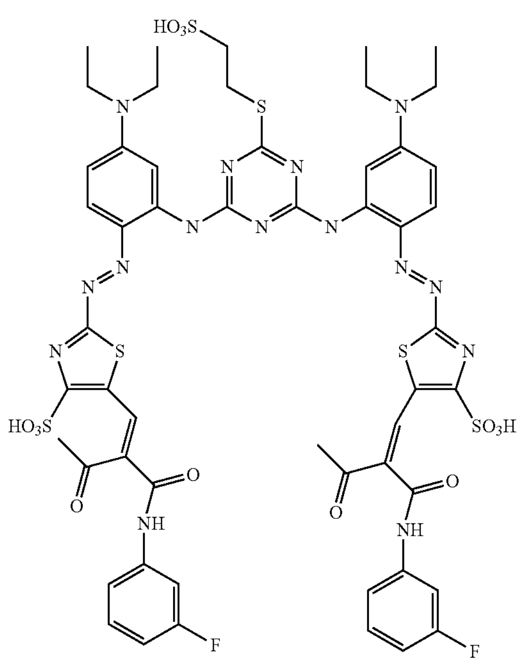 [SMILES: CCN(CC)c1ccc(/N=N/c2nc(S(=O)(=O)O)c(/C=C(/C(C)=O)C(=O)Nc3cccc(F)c3)s2)c(Nc2nc(Nc3cc(N(CC)CC)ccc3/N=N/c3nc(S(=O)(=O)O)c(/C=C(\C(C)=O)C(=O)Nc4cccc(F)c4)s3)nc(SCCS(=O)(=O)O)n2)c1] |

TABLE 1-continued
| Example | Structure |
|---|---|
| 1-150 | 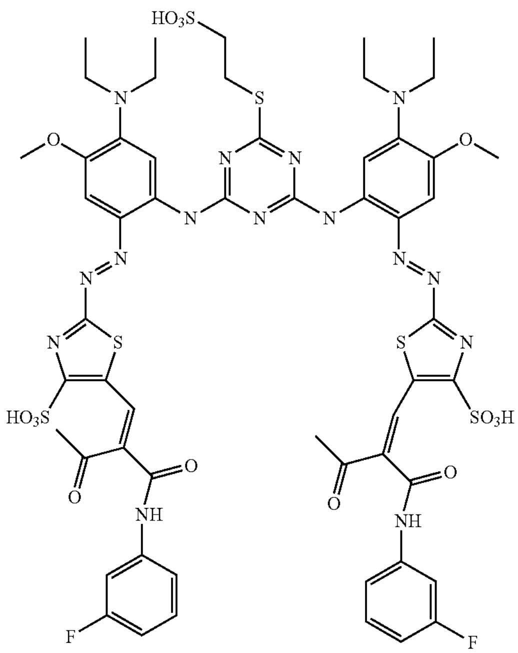 |
| 1-151 | 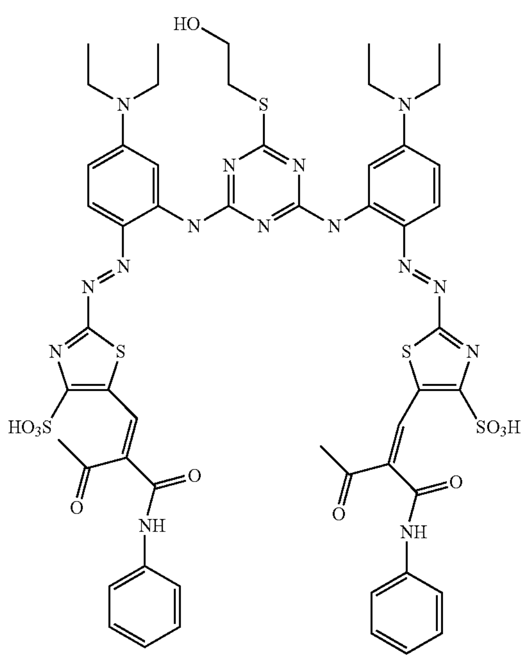 [SMILES: CCN(CC)c1ccc(/N=N/c2nc(S(=O)(=O)O)c(/C=C(/C(C)=O)C(=O)Nc3ccccc3)s2)c(Nc2nc(Nc3cc(N(CC)CC)ccc3/N=N/c3nc(S(=O)(=O)O)c(/C=C(\C(C)=O)C(=O)Nc4ccccc4)s3)nc(SCCO)n2)c1] |

TABLE 1-continued
| Example | Structure |
| --- | --- |
| 1-152 | 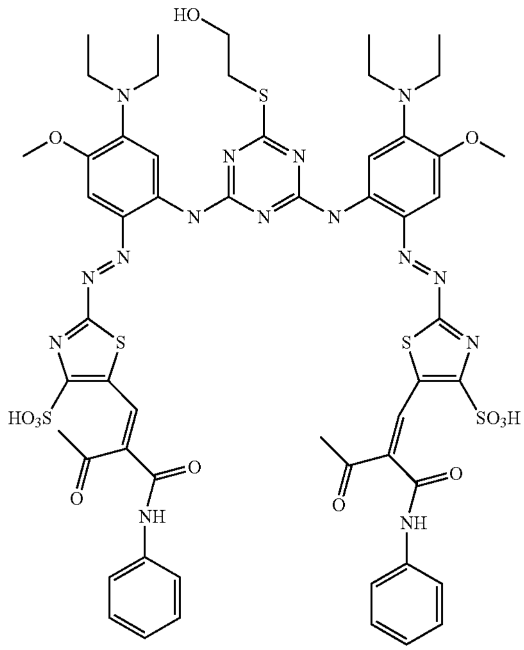 |
| 1-153 | 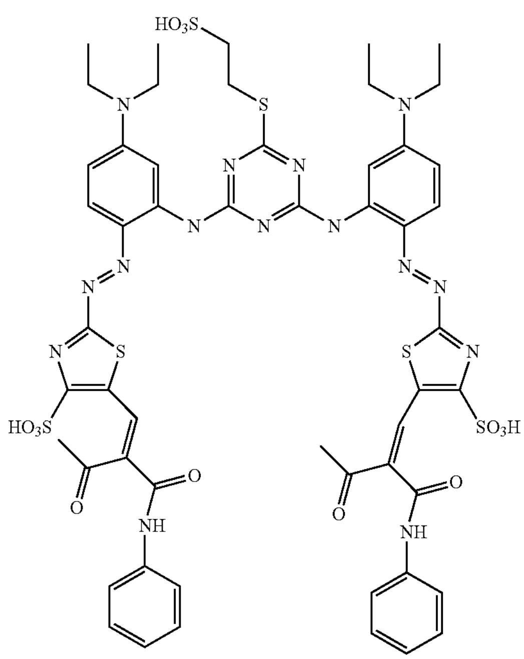 [SMILES: CCN(CC)c1ccc(/N=N/c2nc(S(=O)(=O)O)c(/C=C(/C(C)=O)C(=O)Nc3ccccc3)s2)c(Nc2nc(Nc3cc(N(CC)CC)ccc3/N=N/c3nc(S(=O)(=O)O)c(/C=C(\C(C)=O)C(=O)Nc4ccccc4)s3)nc(SCCS(=O)(=O)O)n2)c1] |

TABLE 1-continued
| Example | Structure |
| --- | --- |
| 1-154 | 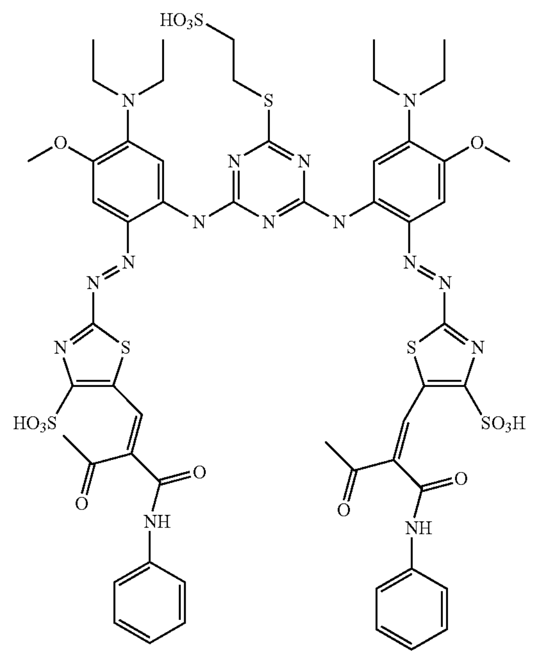 |
| 1-155 | 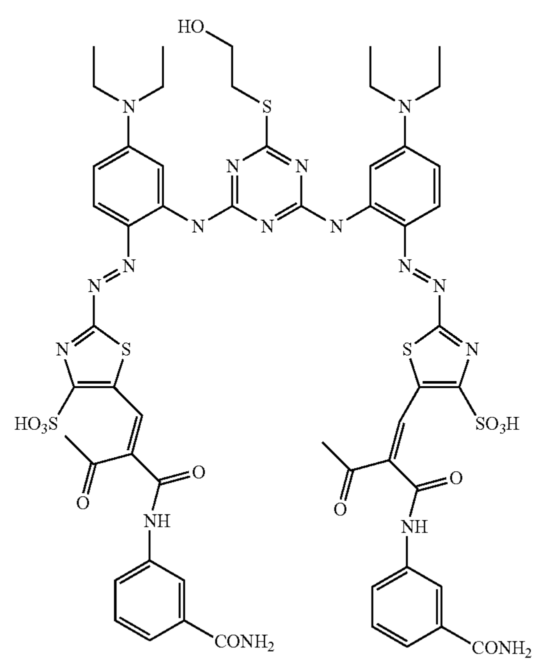 [SMILES: CCN(CC)c1ccc(/N=N/c2nc(S(=O)(=O)O)c(/C=C(/C(C)=O)C(=O)Nc3cccc(C(N)=O)c3)s2)c(Nc2nc(Nc3cc(N(CC)CC)ccc3/N=N/c3nc(S(=O)(=O)O)c(/C=C(\C(C)=O)C(=O)Nc4cccc(C(N)=O)c4)s3)nc(SCCO)n2)c1] |

TABLE 1-continued
| Example | Structure |
| --- | --- |
| 1-156 | 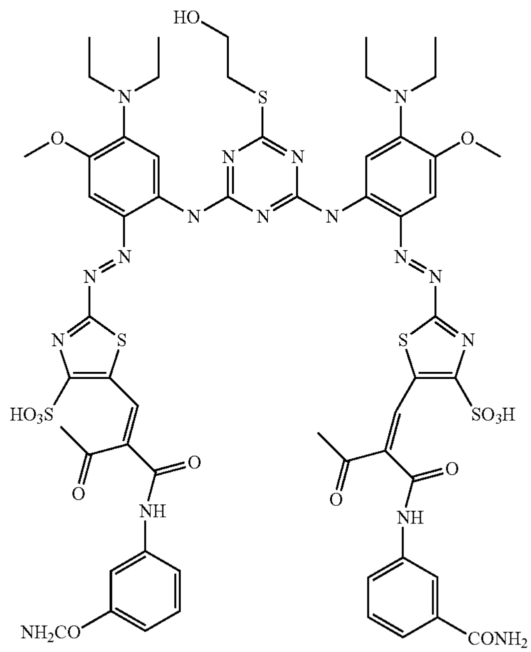 |
| 1-157 | 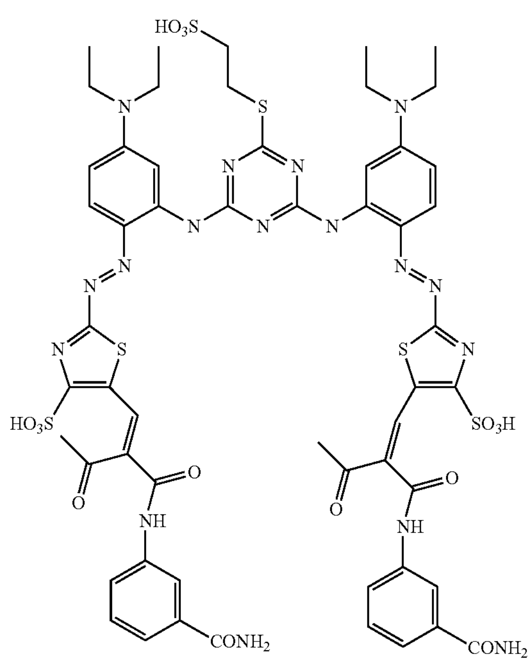 [SMILES: CCN(CC)c1ccc(/N=N/c2nc(S(=O)(=O)O)c(/C=C(/C(C)=O)C(=O)Nc3cccc(C(N)=O)c3)s2)c(Nc2nc(Nc3cc(N(CC)CC)ccc3/N=N/c3nc(S(=O)(=O)O)c(/C=C(\C(C)=O)C(=O)Nc4cccc(C(N)=O)c4)s3)nc(SCCS(=O)(=O)O)n2)c1] |

TABLE 1-continued
| Example | Structure |
| --- | --- |
| 1-158 | 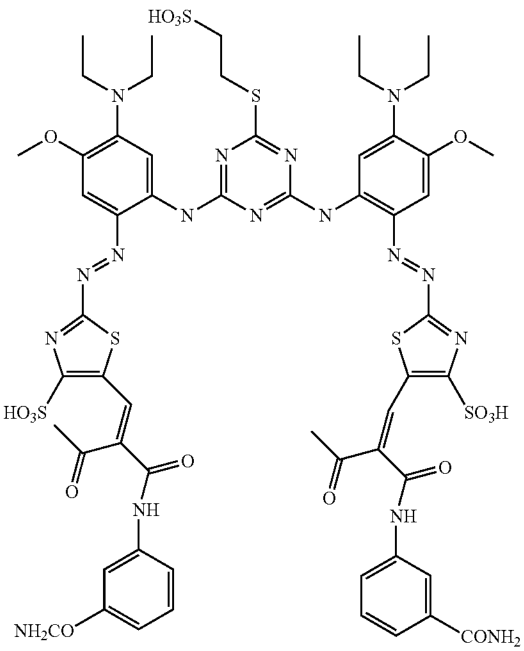 |
| 1-159 | 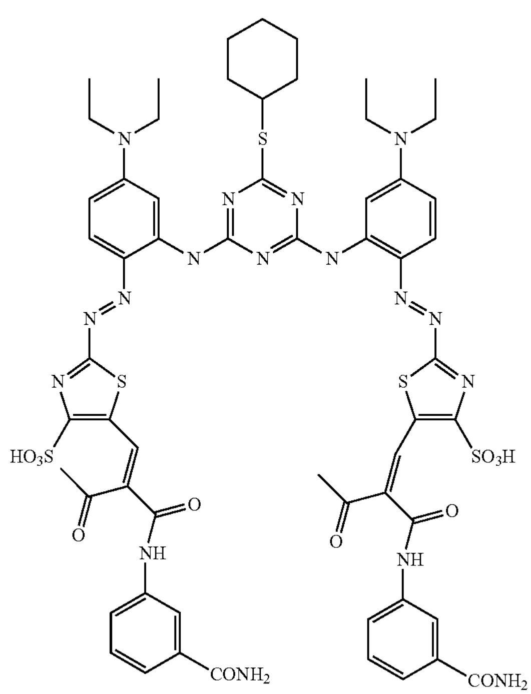 [SMILES: CCN(CC)c1ccc(/N=N/c2nc(S(=O)(=O)O)c(/C=C(/C(C)=O)C(=O)Nc3cccc(C(N)=O)c3)s2)c(Nc2nc(Nc3cc(N(CC)CC)ccc3/N=N/c3nc(S(=O)(=O)O)c(/C=C(\C(C)=O)C(=O)Nc4cccc(C(N)=O)c4)s3)nc(SC3CCCCC3)n2)c1] |

TABLE 1-continued
| Example | Structure |
| --- | --- |
| 1-160 | 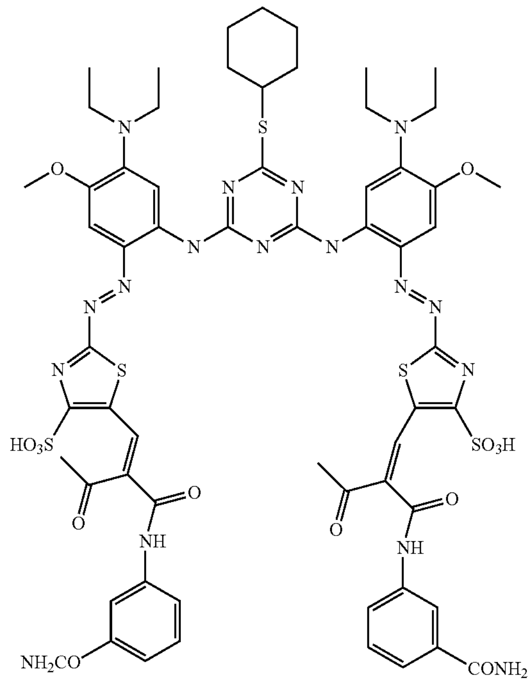 |
| 1-161 | 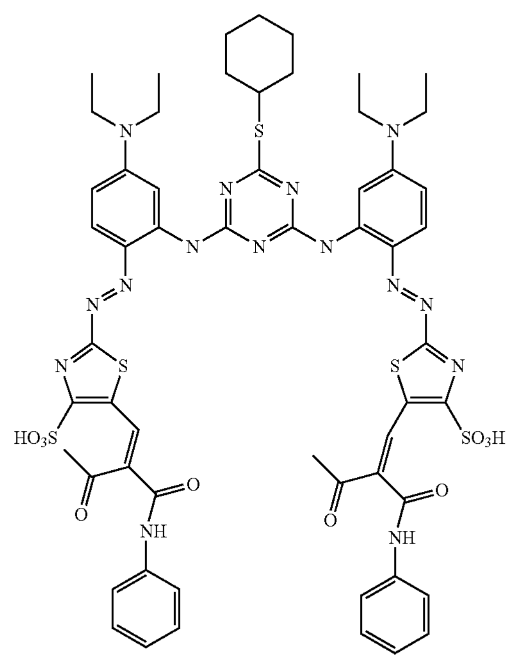 [SMILES: CCN(CC)c1ccc(/N=N/c2nc(S(=O)(=O)O)c(/C=C(/C(C)=O)C(=O)Nc3ccccc3)s2)c(Nc2nc(Nc3cc(N(CC)CC)ccc3/N=N/c3nc(S(=O)(=O)O)c(/C=C(\C(C)=O)C(=O)Nc4ccccc4)s3)nc(SC3CCCCC3)n2)c1] |

TABLE 1-continued
| Example | Structure |
| --- | --- |
| 1-162 | 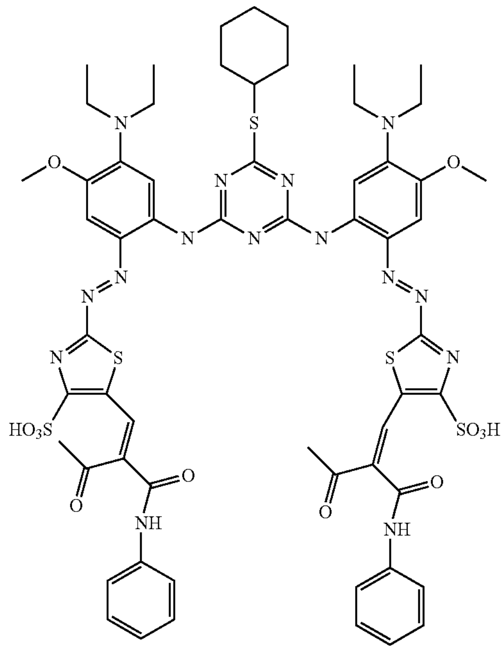 |
| 1-163 | 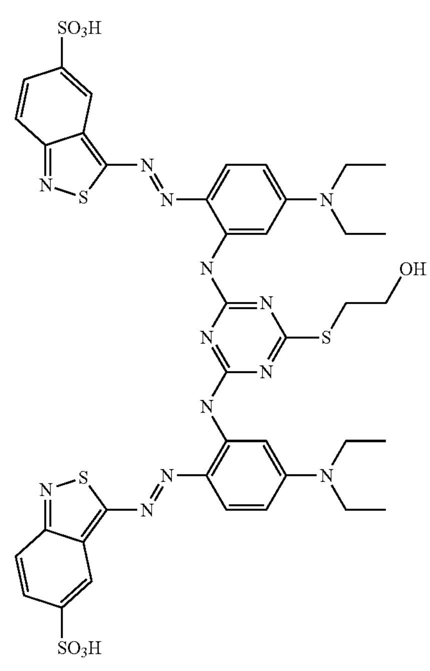 [SMILES: CCN(CC)c1ccc(/N=N/c2snc3ccc(S(=O)(=O)O)cc23)c(Nc2nc(Nc3cc(N(CC)CC)ccc3/N=N/c3snc4ccc(S(=O)(=O)O)cc34)nc(SCCO)n2)c1] |

TABLE 1-continued
| Example | Structure |
| --- | --- |
| 1-164 | 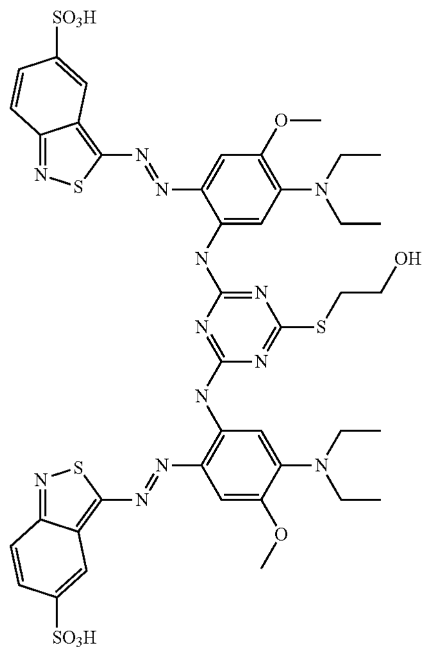 [SMILES: CCN(CC)c1cc(Nc2nc(Nc3cc(N(CC)CC)c(OC)cc3/N=N/c3snc4ccc(S(=O)(=O)O)cc34)nc(SCCO)n2)c(/N=N/c2snc3ccc(S(=O)(=O)O)cc23)cc1OC] |
| 1-165 | 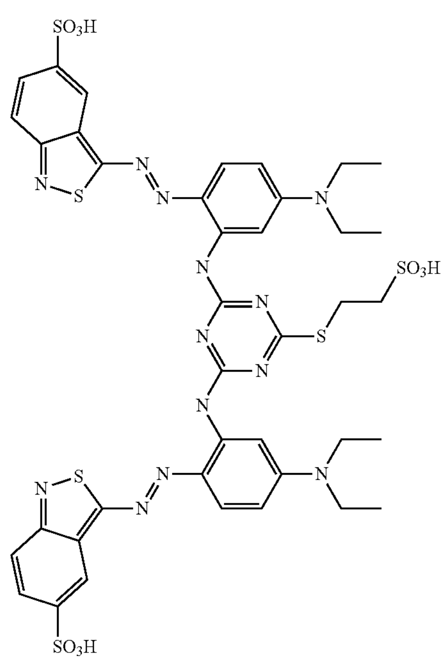 [SMILES: CCN(CC)c1ccc(/N=N/c2snc3ccc(S(=O)(=O)O)cc23)c(Nc2nc(Nc3cc(N(CC)CC)ccc3/N=N/c3snc4ccc(S(=O)(=O)O)cc34)nc(SCCS(=O)(=O)O)n2)c1] |

TABLE 1-continued
| Example | Structure |
| --- | --- |
| 1-166 | 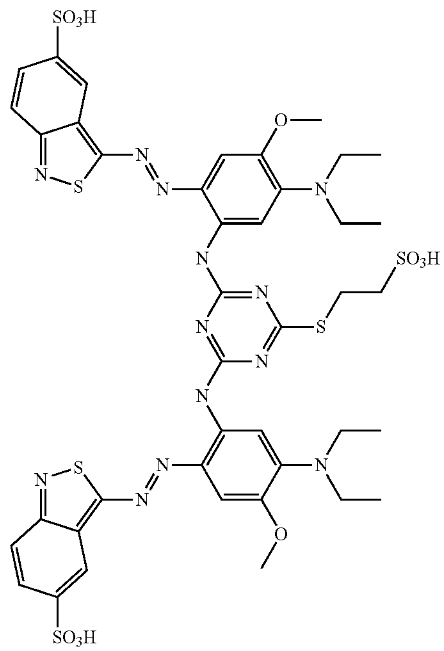 [SMILES: CCN(CC)c1cc(Nc2nc(Nc3cc(N(CC)CC)c(OC)cc3/N=N/c3snc4ccc(S(=O)(=O)O)cc34)nc(SCCS(=O)(=O)O)n2)c(/N=N/c2snc3ccc(S(=O)(=O)O)cc23)cc1OC] |
| 1-167 | 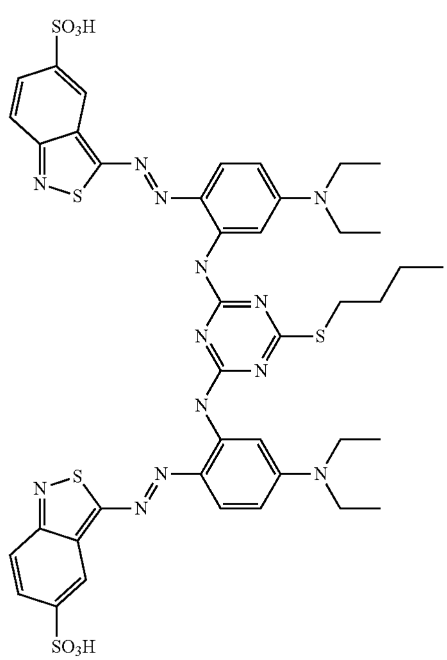 [SMILES: CCCCSc1nc(Nc2cc(N(CC)CC)ccc2/N=N/c2snc3ccc(S(=O)(=O)O)cc23)nc(Nc2cc(N(CC)CC)ccc2/N=N/c2snc3ccc(S(=O)(=O)O)cc23)n1] |

TABLE 1-continued
| Example | Structure |
|---|---|
| 1-168 | 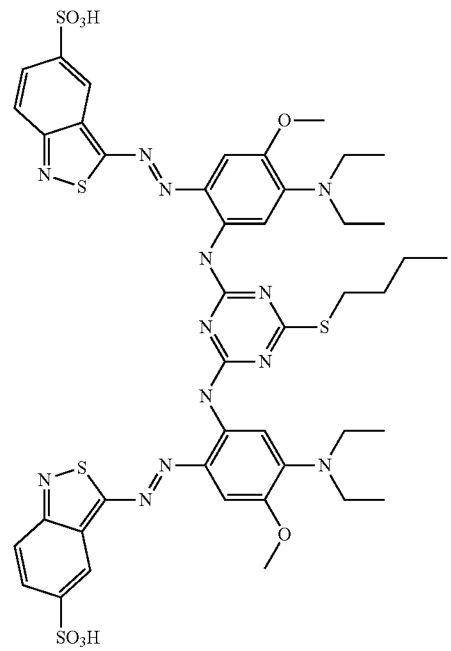 [SMILES: CCCCSc1nc(Nc2cc(N(CC)CC)c(OC)cc2/N=N/c2snc3ccc(S(=O)(=O)O)cc23)nc(Nc2cc(N(CC)CC)c(OC)cc2/N=N/c2snc3ccc(S(=O)(=O)O)cc23)n1] |
| 1-169 | 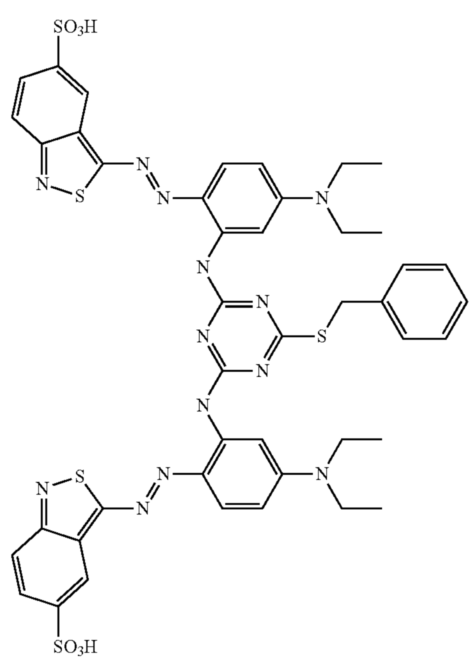 [SMILES: CCN(CC)c1ccc(/N=N/c2snc3ccc(S(=O)(=O)O)cc23)c(Nc2nc(Nc3cc(N(CC)CC)ccc3/N=N/c3snc4ccc(S(=O)(=O)O)cc34)nc(SCc3ccccc3)n2)c1] |

TABLE 1-continued
| Example | Structure |
| --- | --- |
| 1-170 | 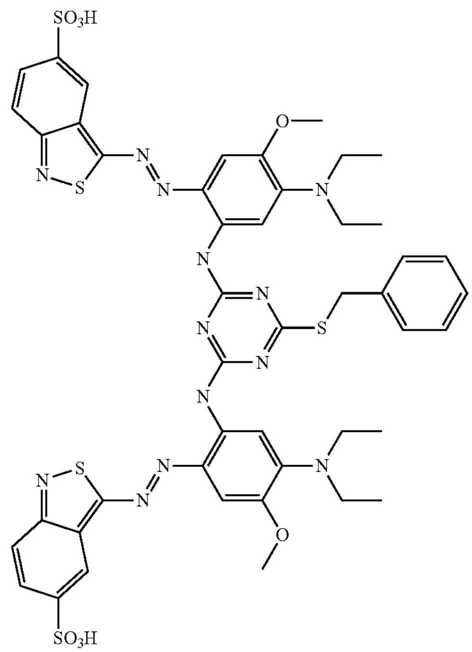 [SMILES: CCN(CC)c1cc(Nc2nc(Nc3cc(N(CC)CC)c(OC)cc3/N=N/c3snc4ccc(S(=O)(=O)O)cc34)nc(SCc3ccccc3)n2)c(/N=N/c2snc3ccc(S(=O)(=O)O)cc23)cc1OC] |
| 1-171 | 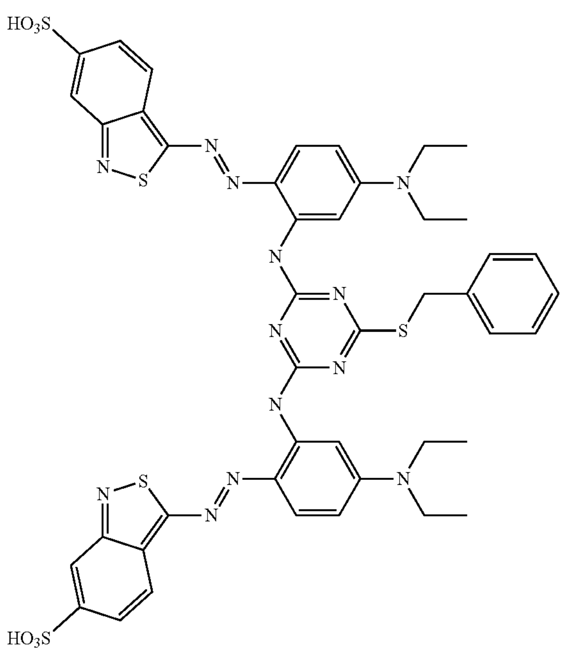 [SMILES: CCN(CC)c1ccc(/N=N/c2snc3cc(S(=O)(=O)O)ccc23)c(Nc2nc(Nc3cc(N(CC)CC)ccc3/N=N/c3snc4cc(S(=O)(=O)O)ccc34)nc(SCc3ccccc3)n2)c1] |

TABLE 1-continued
| Example | Structure |
| --- | --- |
| 1-172 | 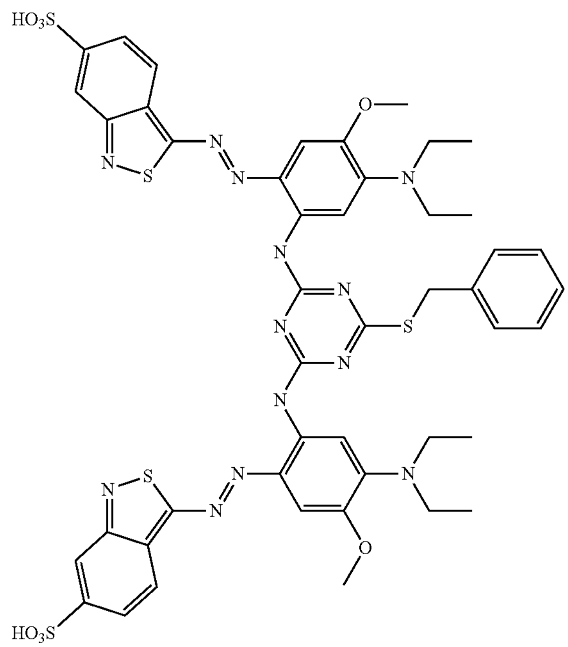 [SMILES: CCN(CC)c1cc(Nc2nc(Nc3cc(N(CC)CC)c(OC)cc3/N=N/c3snc4cc(S(=O)(=O)O)ccc34)nc(SCc3ccccc3)n2)c(/N=N/c2snc3cc(S(=O)(=O)O)ccc23)cc1OC] |
| 1-173 | 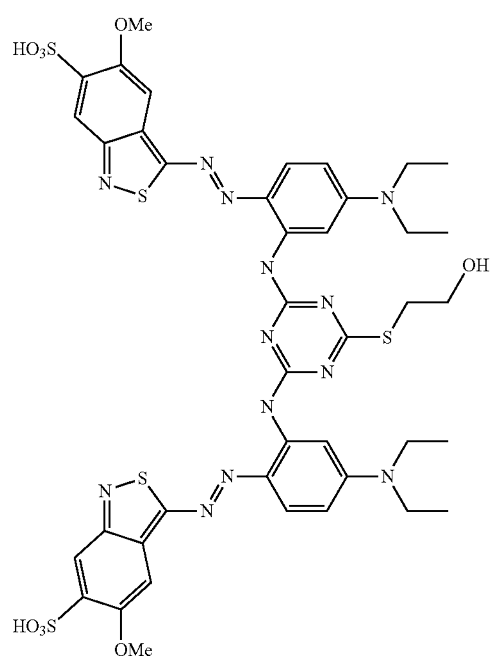 [SMILES: CCN(CC)c1ccc(/N=N/c2snc3cc(S(=O)(=O)O)c(OC)cc23)c(Nc2nc(Nc3cc(N(CC)CC)ccc3/N=N/c3snc4cc(S(=O)(=O)O)c(OC)cc34)nc(SCCO)n2)c1] |

TABLE 1-continued
| Example | Structure |
|---|---|
| 1-174 | 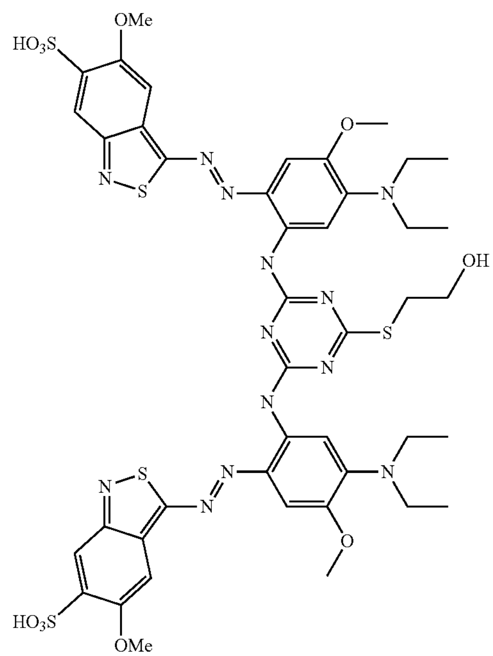 [SMILES: CCN(CC)c1cc(Nc2nc(Nc3cc(N(CC)CC)c(OC)cc3/N=N/c3snc4cc(S(=O)(=O)O)c(OC)cc34)nc(SCCO)n2)c(/N=N/c2snc3cc(S(=O)(=O)O)c(OC)cc23)cc1OC] |
| 1-175 | 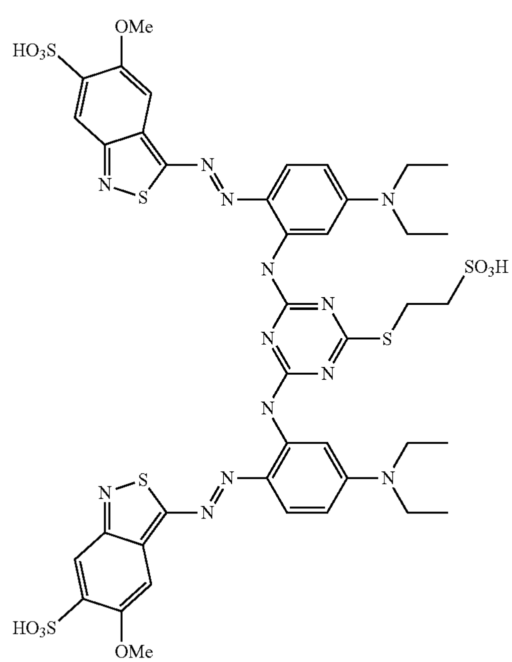 [SMILES: CCN(CC)c1ccc(/N=N/c2snc3cc(S(=O)(=O)O)c(OC)cc23)c(Nc2nc(Nc3cc(N(CC)CC)ccc3/N=N/c3snc4cc(S(=O)(=O)O)c(OC)cc34)nc(SCCS(=O)(=O)O)n2)c1] |

TABLE 1-continued
| Example | Structure |
| --- | --- |
| 1-176 | 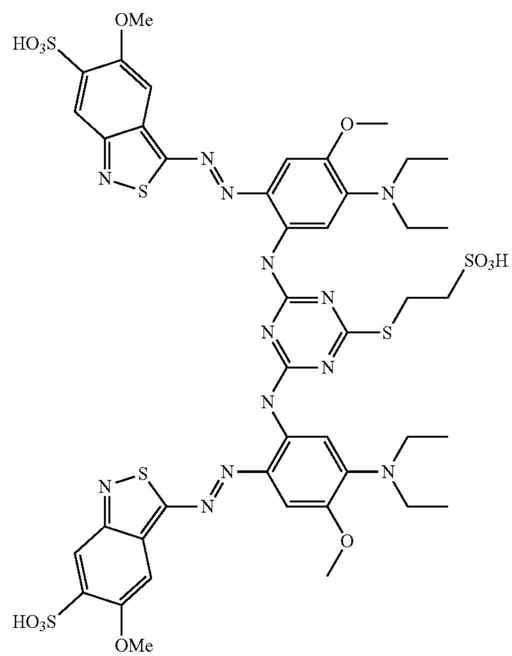 [SMILES: CCN(CC)c1cc(Nc2nc(Nc3cc(N(CC)CC)c(OC)cc3/N=N/c3snc4cc(S(=O)(=O)O)c(OC)cc34)nc(SCCS(=O)(=O)O)n2)c(/N=N/c2snc3cc(S(=O)(=O)O)c(OC)cc23)cc1OC] |
| 1-177 | 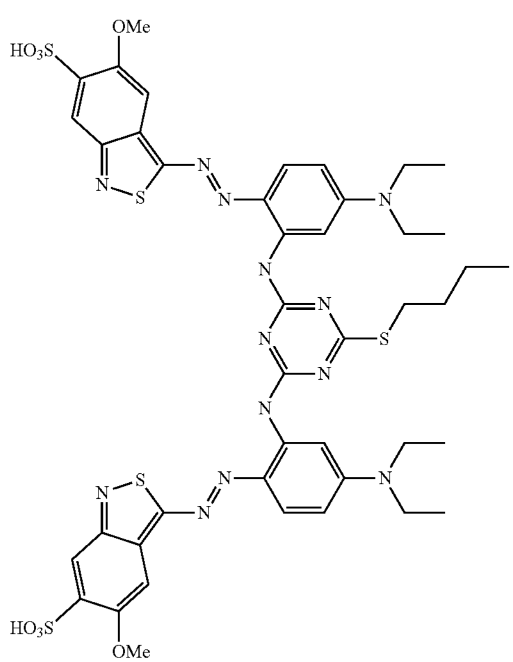 [SMILES: CCCCSc1nc(Nc2cc(N(CC)CC)ccc2/N=N/c2snc3cc(S(=O)(=O)O)c(OC)cc23)nc(Nc2cc(N(CC)CC)ccc2/N=N/c2snc3cc(S(=O)(=O)O)c(OC)cc23)n1] |

TABLE 1-continued
| Example | Structure |
|---|---|
| 1-178 | 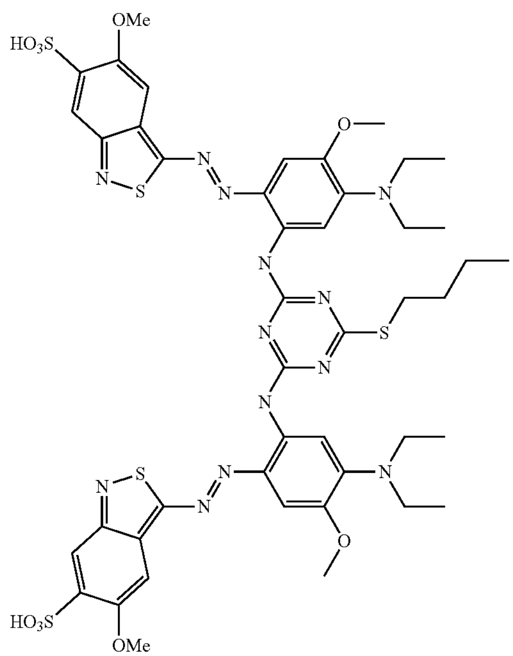 [SMILES: CCCCSc1nc(Nc2cc(N(CC)CC)c(OC)cc2/N=N/c2snc3cc(S(=O)(=O)O)c(OC)cc23)nc(Nc2cc(N(CC)CC)c(OC)cc2/N=N/c2snc3cc(S(=O)(=O)O)c(OC)cc23)n1] |
| 1-179 | 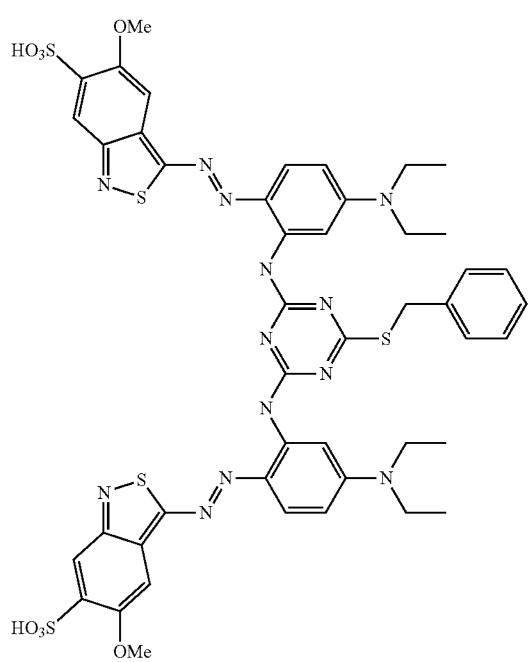 [SMILES: CCN(CC)c1ccc(/N=N/c2snc3cc(S(=O)(=O)O)c(OC)cc23)c(Nc2nc(Nc3cc(N(CC)CC)ccc3/N=N/c3snc4cc(S(=O)(=O)O)c(OC)cc34)nc(SCc3ccccc3)n2)c1] |

TABLE 1-continued
| Example | Structure |
| --- | --- |
| 1-180 | 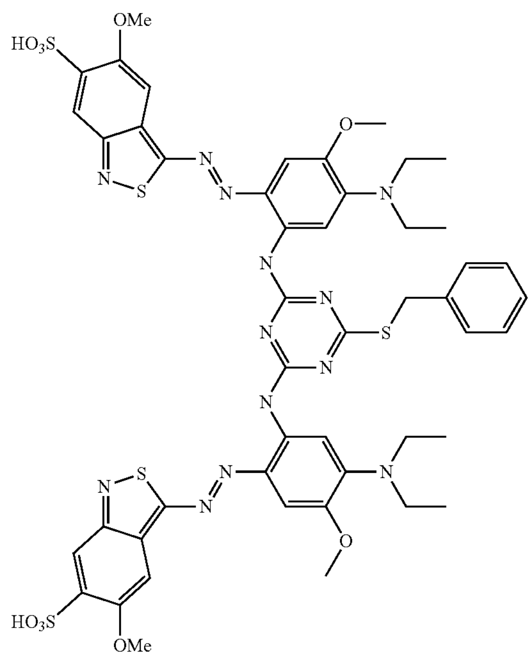 [SMILES: CCN(CC)c1cc(Nc2nc(Nc3cc(N(CC)CC)c(OC)cc3/N=N/c3snc4cc(S(=O)(=O)O)c(OC)cc34)nc(SCc3ccccc3)n2)c(/N=N/c2snc3cc(S(=O)(=O)O)c(OC)cc23)cc1OC] |
| 1-181 | 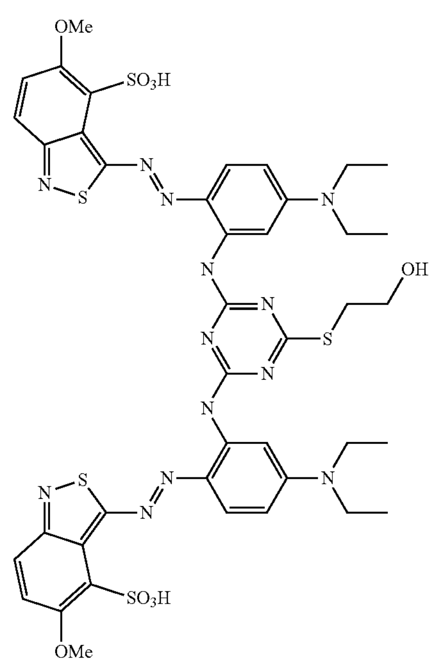 [SMILES: CCN(CC)c1ccc(/N=N/c2snc3ccc(OC)c(S(=O)(=O)O)c23)c(Nc2nc(Nc3cc(N(CC)CC)ccc3/N=N/c3snc4ccc(OC)c(S(=O)(=O)O)c34)nc(SCCO)n2)c1] |

TABLE 1-continued
| Example | Structure |
| --- | --- |
| 1-182 | 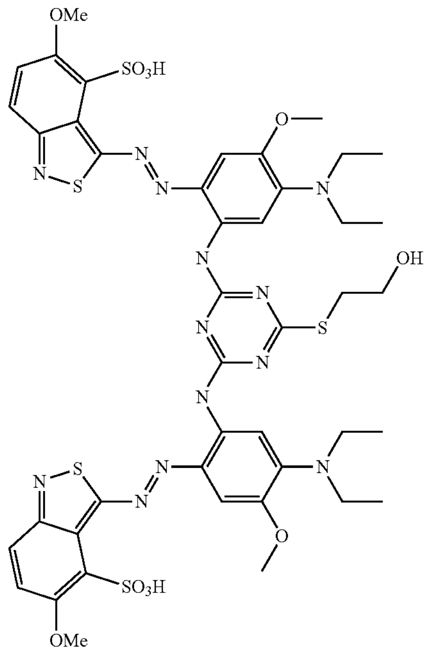 [SMILES: CCN(CC)c1cc(Nc2nc(Nc3cc(N(CC)CC)c(OC)cc3/N=N/c3snc4ccc(OC)c(S(=O)(=O)O)c34)nc(SCCO)n2)c(/N=N/c2snc3ccc(OC)c(S(=O)(=O)O)c23)cc1OC] |
| 1-183 | 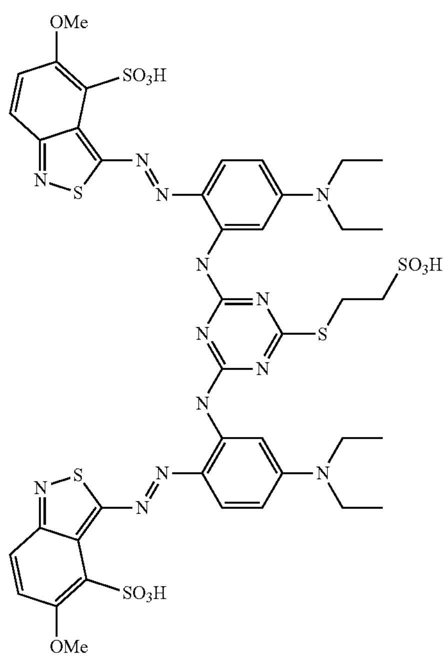 [SMILES: CCN(CC)c1ccc(/N=N/c2snc3ccc(OC)c(S(=O)(=O)O)c23)c(Nc2nc(Nc3cc(N(CC)CC)ccc3/N=N/c3snc4ccc(OC)c(S(=O)(=O)O)c34)nc(SCCS(=O)(=O)O)n2)c1] |

TABLE 1-continued
| Example | Structure |
|---|---|
| 1-184 | 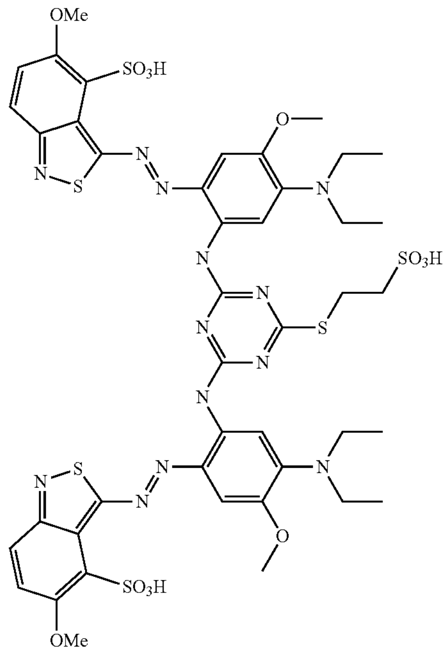 [SMILES: CCN(CC)c1cc(Nc2nc(Nc3cc(N(CC)CC)c(OC)cc3/N=N/c3snc4ccc(OC)c(S(=O)(=O)O)c34)nc(SCCS(=O)(=O)O)n2)c(/N=N/c2snc3ccc(OC)c(S(=O)(=O)O)c23)cc1OC] |
| 1-185 | 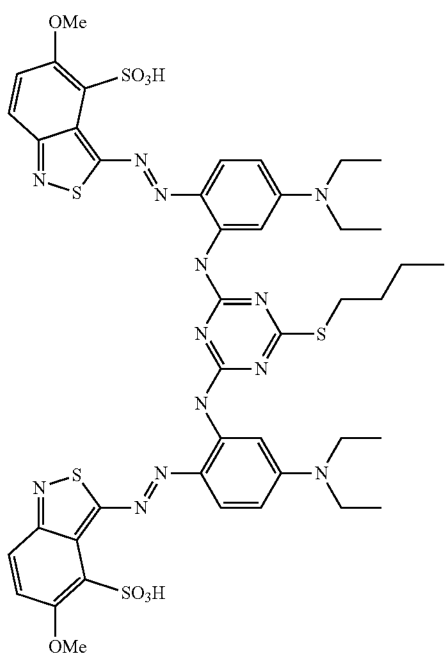 [SMILES: CCCCSc1nc(Nc2cc(N(CC)CC)ccc2/N=N/c2snc3ccc(OC)c(S(=O)(=O)O)c23)nc(Nc2cc(N(CC)CC)ccc2/N=N/c2snc3ccc(OC)c(S(=O)(=O)O)c23)n1] |

TABLE 1-continued
| Example | Structure |
|---|---|
| 1-186 | 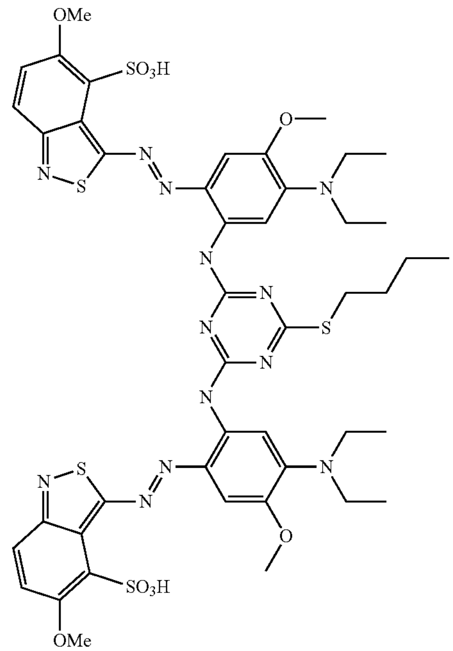 [SMILES: CCCCSc1nc(Nc2cc(N(CC)CC)c(OC)cc2/N=N/c2snc3ccc(OC)c(S(=O)(=O)O)c23)nc(Nc2cc(N(CC)CC)c(OC)cc2/N=N/c2snc3ccc(OC)c(S(=O)(=O)O)c23)n1] |
| 1-187 | 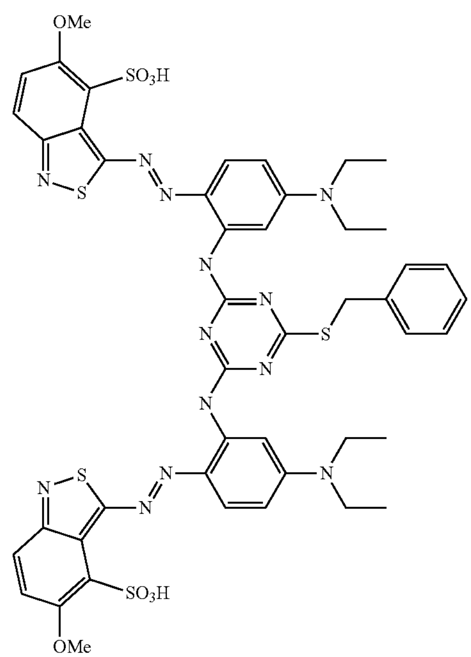 [SMILES: CCN(CC)c1ccc(/N=N/c2snc3ccc(OC)c(S(=O)(=O)O)c23)c(Nc2nc(Nc3cc(N(CC)CC)ccc3/N=N/c3snc4ccc(OC)c(S(=O)(=O)O)c34)nc(SCc3ccccc3)n2)c1] |

TABLE 1-continued
| Example | Structure |
|---|---|
| 1-188 | 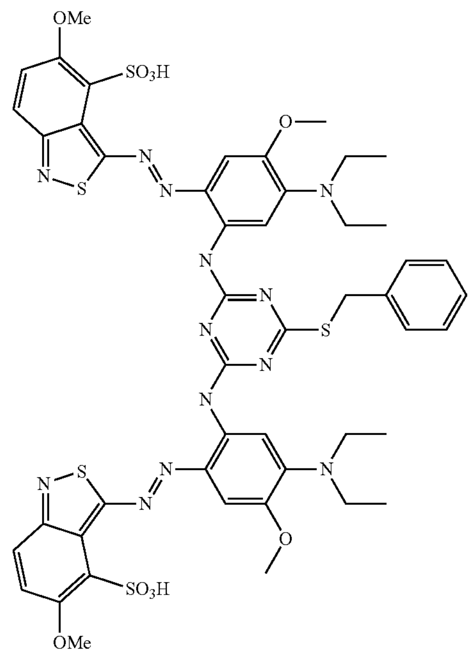 [SMILES: CCN(CC)c1cc(Nc2nc(Nc3cc(N(CC)CC)c(OC)cc3/N=N/c3snc4ccc(OC)c(S(=O)(=O)O)c34)nc(SCc3ccccc3)n2)c(/N=N/c2snc3ccc(OC)c(S(=O)(=O)O)c23)cc1OC] |
| 1-189 | 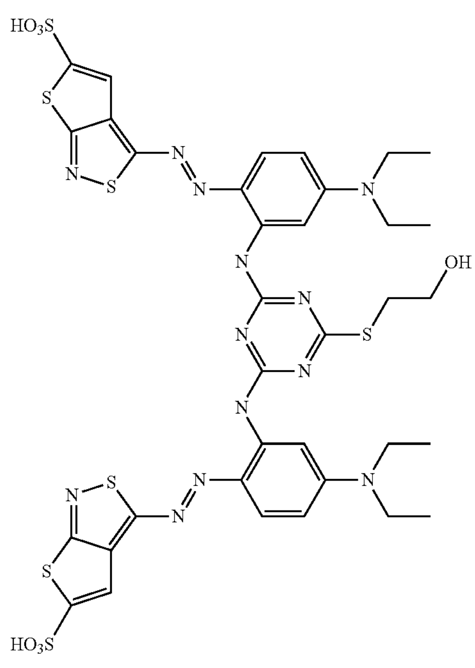 [SMILES: CCN(CC)c1ccc(/N=N/c2snc3sc(S(=O)(=O)O)cc23)c(Nc2nc(Nc3cc(N(CC)CC)ccc3/N=N/c3snc4sc(S(=O)(=O)O)cc34)nc(SCCO)n2)c1] |

TABLE 1-continued
| Example | Structure |
|---|---|
| 1-190 | 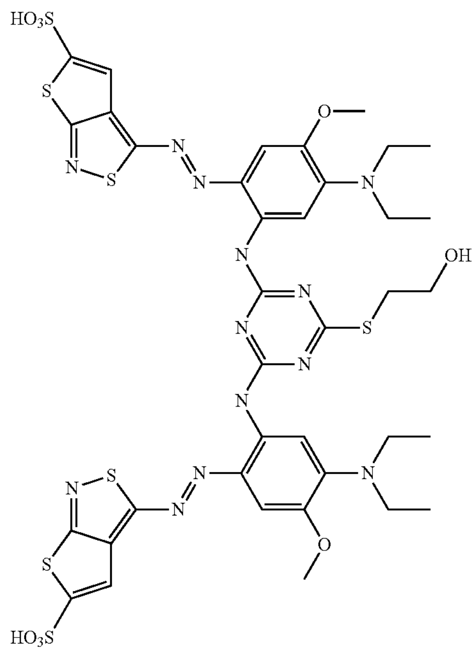 [SMILES: CCN(CC)c1cc(Nc2nc(Nc3cc(N(CC)CC)c(OC)cc3/N=N/c3snc4sc(S(=O)(=O)O)cc34)nc(SCCO)n2)c(/N=N/c2snc3sc(S(=O)(=O)O)cc23)cc1OC] |
| 1-191 | 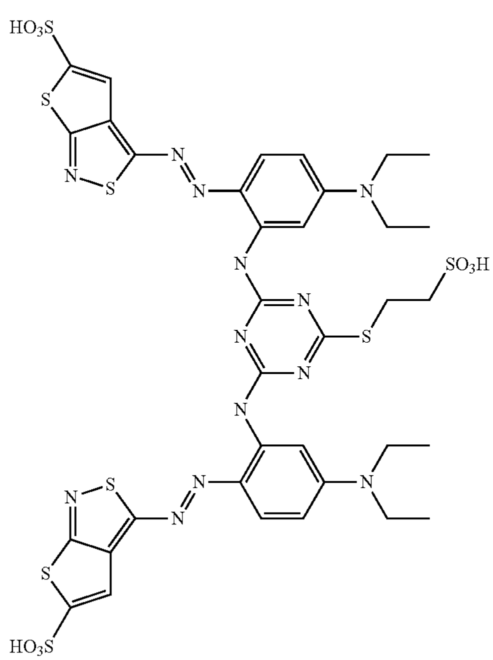 [SMILES: CCN(CC)c1ccc(/N=N/c2snc3sc(S(=O)(=O)O)cc23)c(Nc2nc(Nc3cc(N(CC)CC)ccc3/N=N/c3snc4sc(S(=O)(=O)O)cc34)nc(SCCS(=O)(=O)O)n2)c1] |

TABLE 1-continued
| Example | Structure |
|---|---|
| 1-192 | 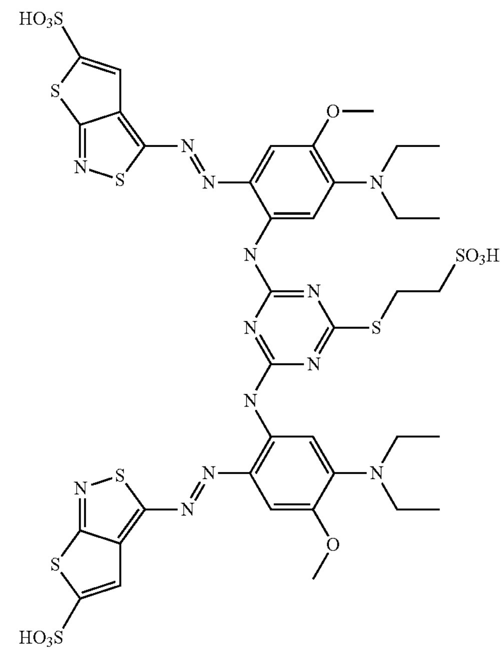 [SMILES: CCN(CC)c1cc(Nc2nc(Nc3cc(N(CC)CC)c(OC)cc3/N=N/c3snc4sc(S(=O)(=O)O)cc34)nc(SCCS(=O)(=O)O)n2)c(/N=N/c2snc3sc(S(=O)(=O)O)cc23)cc1OC] |
| 1-193 | 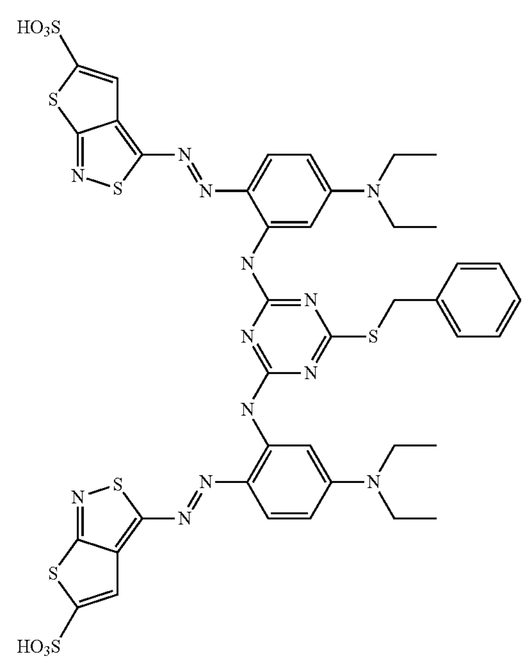 [SMILES: CCN(CC)c1ccc(/N=N/c2snc3sc(S(=O)(=O)O)cc23)c(Nc2nc(Nc3cc(N(CC)CC)ccc3/N=N/c3snc4sc(S(=O)(=O)O)cc34)nc(SCc3ccccc3)n2)c1] |

TABLE 1-continued
| Example | Structure |
|---|---|
| 1-194 | 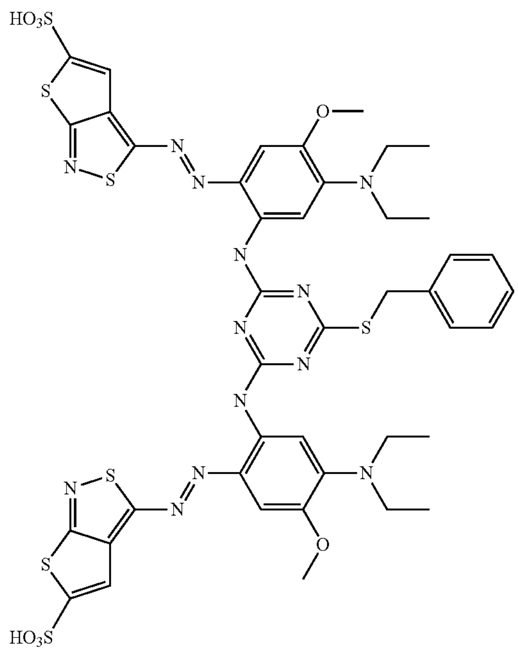 [SMILES: CCN(CC)c1cc(Nc2nc(Nc3cc(N(CC)CC)c(OC)cc3/N=N/c3snc4sc(S(=O)(=O)O)cc34)nc(SCc3ccccc3)n2)c(/N=N/c2snc3sc(S(=O)(=O)O)cc23)cc1OC] |
| 1-195 | 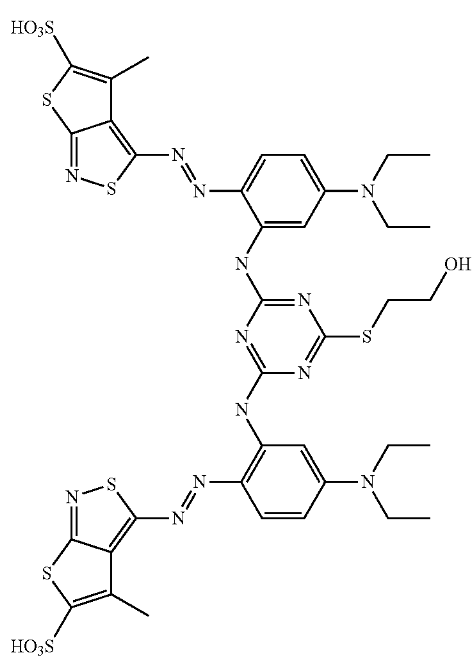 [SMILES: CCN(CC)c1ccc(/N=N/c2snc3sc(S(=O)(=O)O)c(C)c23)c(Nc2nc(Nc3cc(N(CC)CC)ccc3/N=N/c3snc4sc(S(=O)(=O)O)c(C)c34)nc(SCCO)n2)c1] |

TABLE 1-continued
| Example | Structure |
| --- | --- |
| 1-196 | 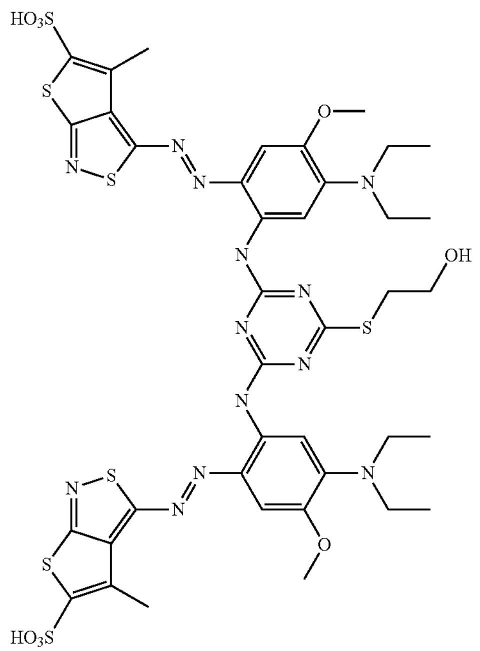 [SMILES: CCN(CC)c1cc(Nc2nc(Nc3cc(N(CC)CC)c(OC)cc3/N=N/c3snc4sc(S(=O)(=O)O)c(C)c34)nc(SCCO)n2)c(/N=N/c2snc3sc(S(=O)(=O)O)c(C)c23)cc1OC] |
| 1-197 | 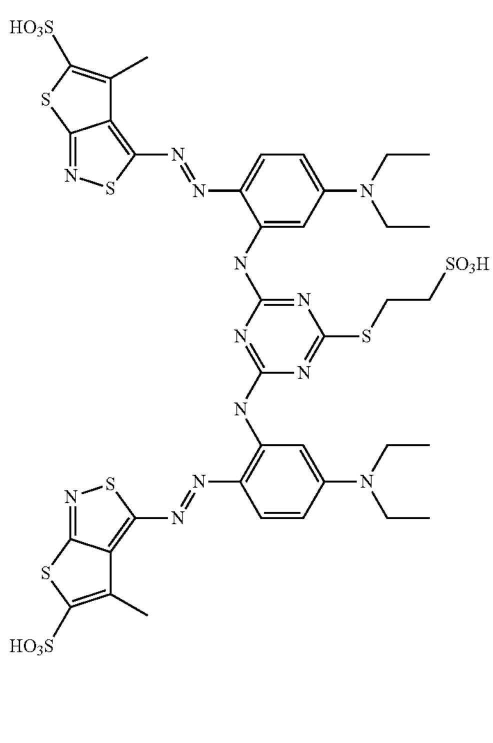 [SMILES: CCN(CC)c1ccc(/N=N/c2snc3sc(S(=O)(=O)O)c(C)c23)c(Nc2nc(Nc3cc(N(CC)CC)ccc3/N=N/c3snc4sc(S(=O)(=O)O)c(C)c34)nc(SCCS(=O)(=O)O)n2)c1] |

TABLE 1-continued
| Example | Structure |
| --- | --- |
| 1-198 | 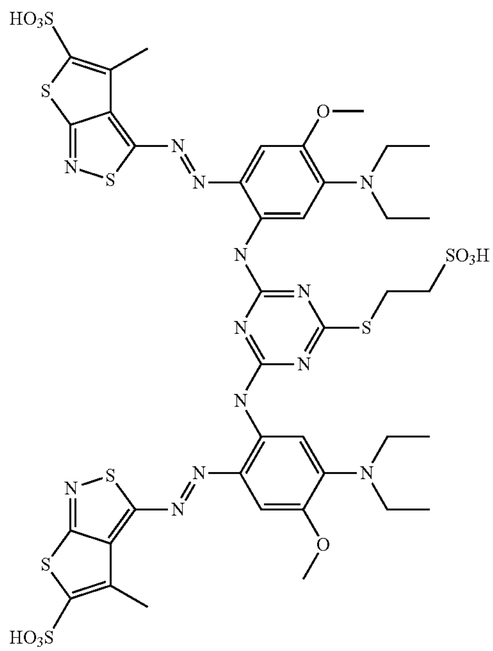 [SMILES: CCN(CC)c1cc(Nc2nc(Nc3cc(N(CC)CC)c(OC)cc3/N=N/c3snc4sc(S(=O)(=O)O)c(C)c34)nc(SCCS(=O)(=O)O)n2)c(/N=N/c2snc3sc(S(=O)(=O)O)c(C)c23)cc1OC] |
| 1-199 | 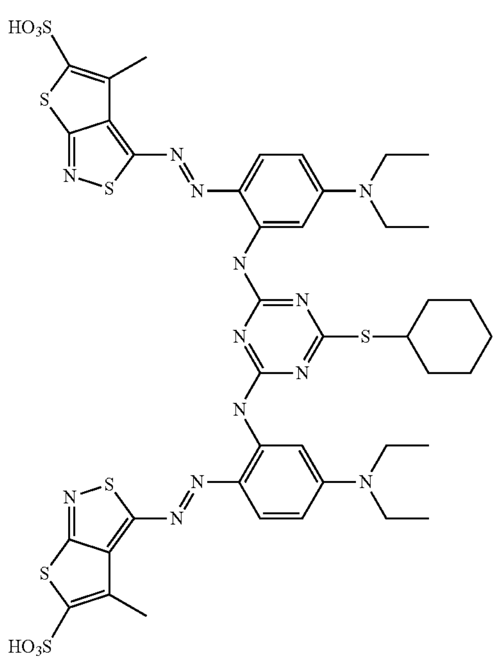 [SMILES: CCN(CC)c1ccc(/N=N/c2snc3sc(S(=O)(=O)O)c(C)c23)c(Nc2nc(Nc3cc(N(CC)CC)ccc3/N=N/c3snc4sc(S(=O)(=O)O)c(C)c34)nc(SC3CCCCC3)n2)c1] |

TABLE 1-continued
| Example | Structure |
| --- | --- |
| 1-200 | 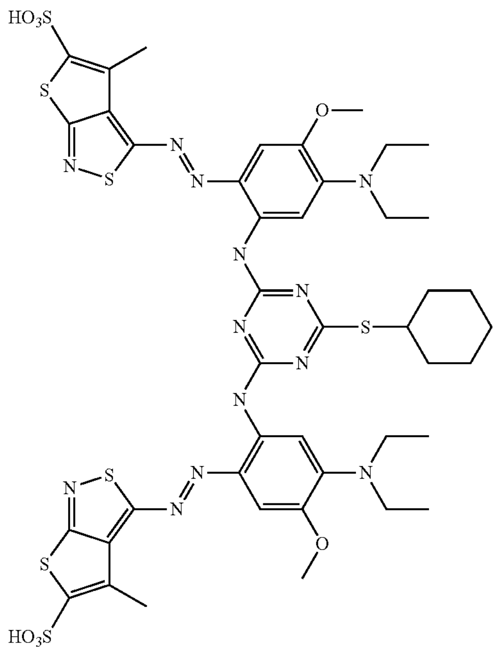 [SMILES: CCN(CC)c1cc(Nc2nc(Nc3cc(N(CC)CC)c(OC)cc3/N=N/c3snc4sc(S(=O)(=O)O)c(C)c34)nc(SC3CCCCC3)n2)c(/N=N/c2snc3sc(S(=O)(=O)O)c(C)c23)cc1OC] |
| 1-201 | 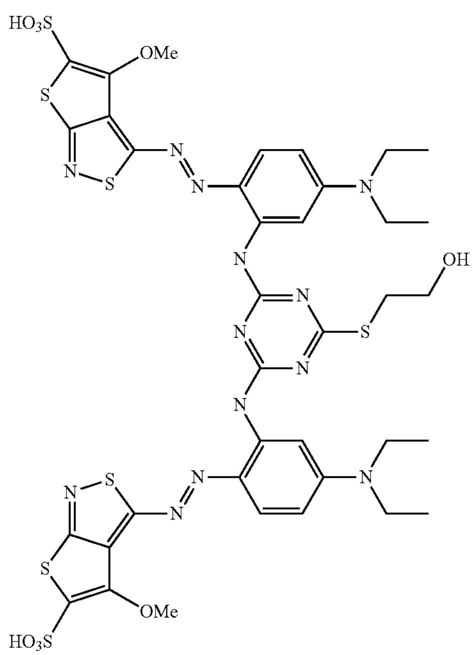 [SMILES: CCN(CC)c1ccc(/N=N/c2snc3sc(S(=O)(=O)O)c(OC)c23)c(Nc2nc(Nc3cc(N(CC)CC)ccc3/N=N/c3snc4sc(S(=O)(=O)O)c(OC)c34)nc(SCCO)n2)c1] |

TABLE 1-continued
| Example | Structure |
|---|---|
| 1-202 | 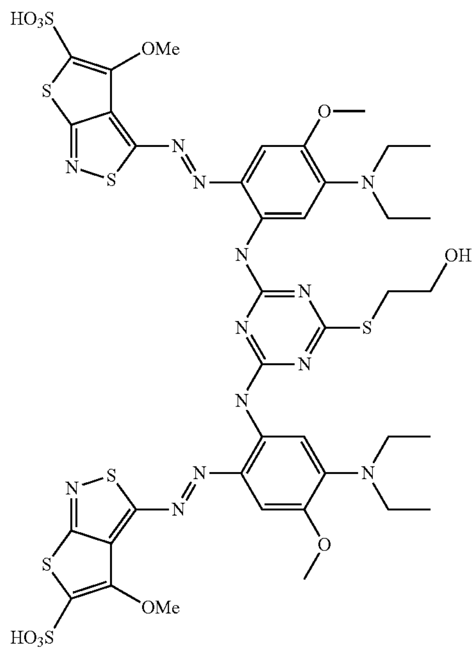 [SMILES: CCN(CC)c1cc(Nc2nc(Nc3cc(N(CC)CC)c(OC)cc3/N=N/c3snc4sc(S(=O)(=O)O)c(OC)c34)nc(SCCO)n2)c(/N=N/c2snc3sc(S(=O)(=O)O)c(OC)c23)cc1OC] |
| 1-203 | 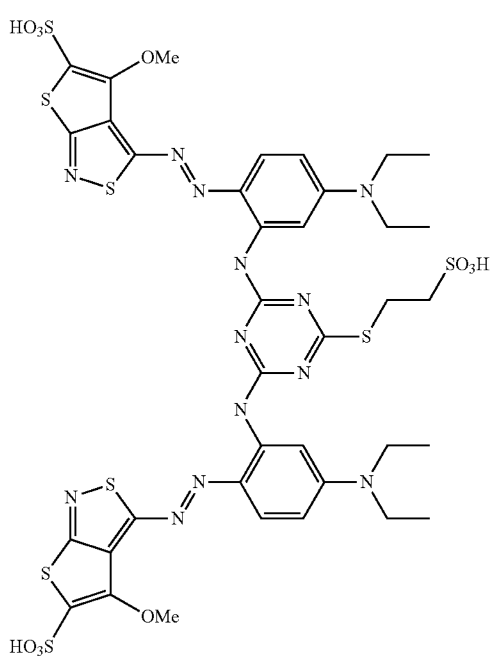 [SMILES: CCN(CC)c1ccc(/N=N/c2snc3sc(S(=O)(=O)O)c(OC)c23)c(Nc2nc(Nc3cc(N(CC)CC)ccc3/N=N/c3snc4sc(S(=O)(=O)O)c(OC)c34)nc(SCCS(=O)(=O)O)n2)c1] |

TABLE 1-continued
| Example | Structure |
|---|---|
| 1-204 | 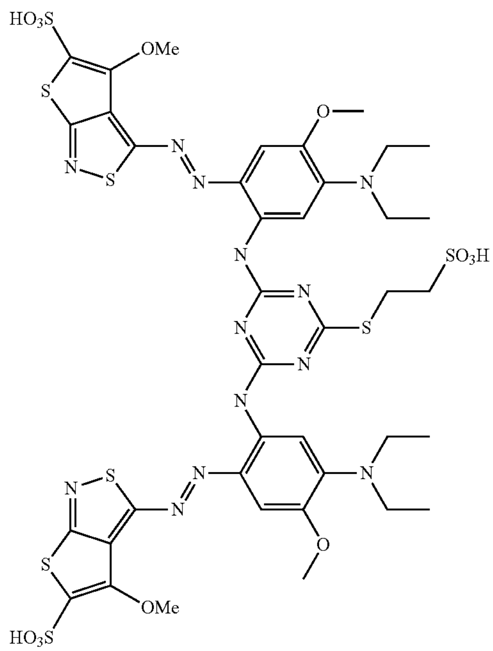 [SMILES: CCN(CC)c1cc(Nc2nc(Nc3cc(N(CC)CC)c(OC)cc3/N=N/c3snc4sc(S(=O)(=O)O)c(OC)c34)nc(SCCS(=O)(=O)O)n2)c(/N=N/c2snc3sc(S(=O)(=O)O)c(OC)c23)cc1OC] |
| 1-205 | 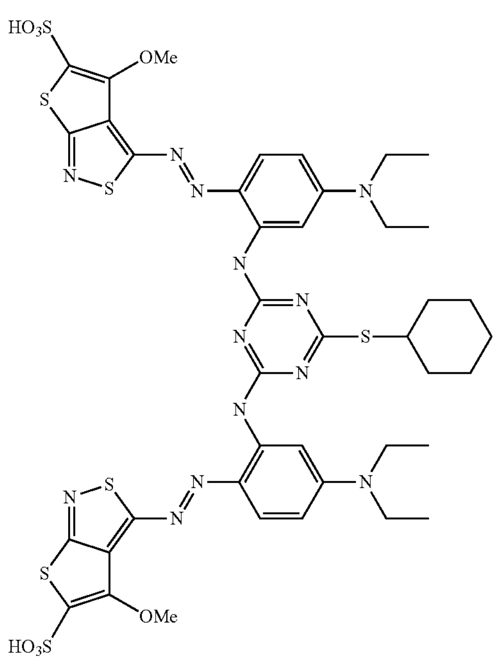 [SMILES: CCN(CC)c1ccc(/N=N/c2snc3sc(S(=O)(=O)O)c(OC)c23)c(Nc2nc(Nc3cc(N(CC)CC)ccc3/N=N/c3snc4sc(S(=O)(=O)O)c(OC)c34)nc(SC3CCCCC3)n2)c1] |

TABLE 1-continued
| Example | Structure |
| --- | --- |
| 1-206 | 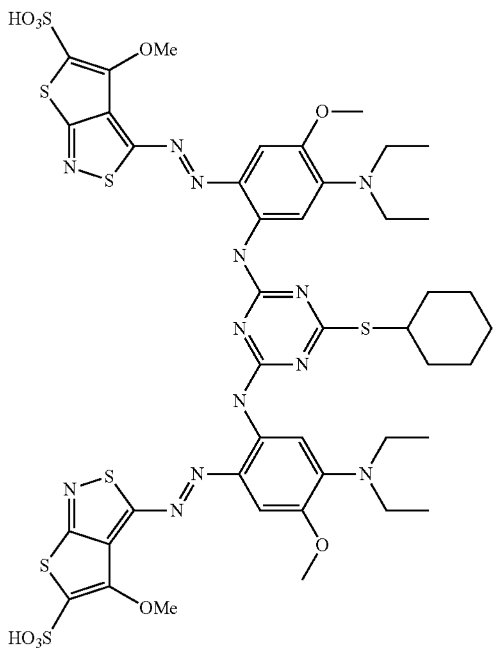 [SMILES: CCN(CC)c1cc(Nc2nc(Nc3cc(N(CC)CC)c(OC)cc3/N=N/c3snc4sc(S(=O)(=O)O)c(OC)c34)nc(SC3CCCCC3)n2)c(/N=N/c2snc3sc(S(=O)(=O)O)c(OC)c23)cc1OC] |
| 1-207 | 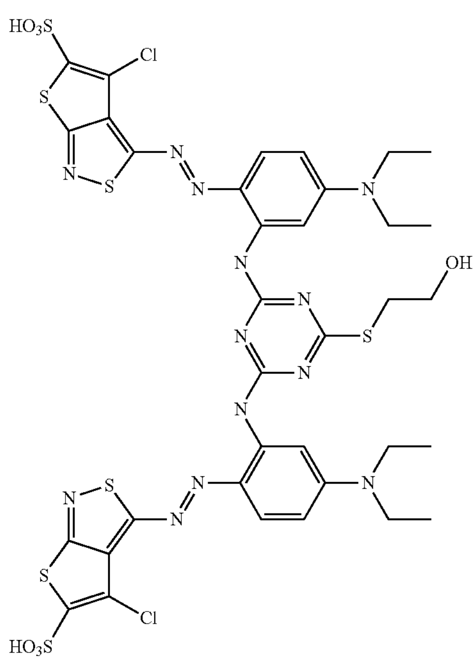 [SMILES: CCN(CC)c1ccc(/N=N/c2snc3sc(S(=O)(=O)O)c(Cl)c23)c(Nc2nc(Nc3cc(N(CC)CC)ccc3/N=N/c3snc4sc(S(=O)(=O)O)c(Cl)c34)nc(SCCO)n2)c1] |

TABLE 1-continued
| Example | Structure |
|---|---|
| 1-208 | 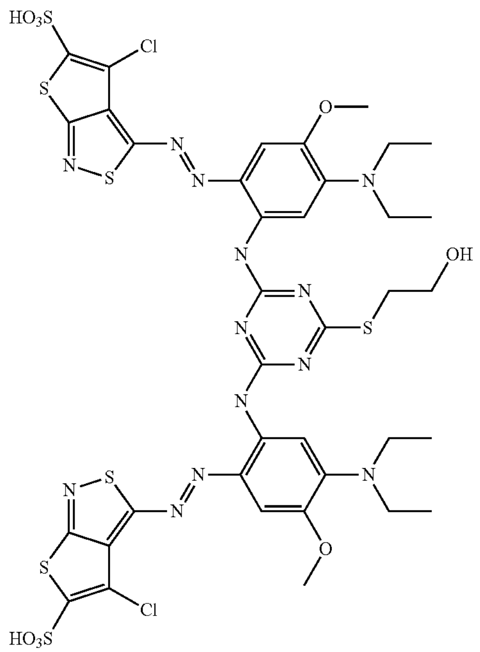 [SMILES: CCN(CC)c1cc(Nc2nc(Nc3cc(N(CC)CC)c(OC)cc3/N=N/c3snc4sc(S(=O)(=O)O)c(Cl)c34)nc(SCCO)n2)c(/N=N/c2snc3sc(S(=O)(=O)O)c(Cl)c23)cc1OC] |
| 1-209 | 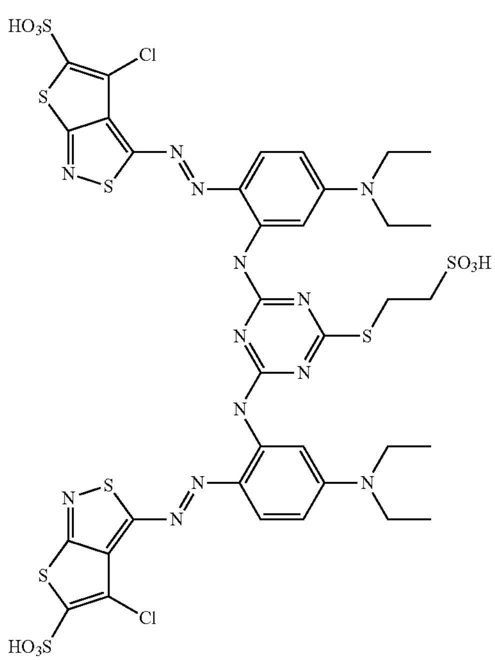 [SMILES: CCN(CC)c1ccc(/N=N/c2snc3sc(S(=O)(=O)O)c(Cl)c23)c(Nc2nc(Nc3cc(N(CC)CC)ccc3/N=N/c3snc4sc(S(=O)(=O)O)c(Cl)c34)nc(SCCS(=O)(=O)O)n2)c1] |

TABLE 1-continued
| Example | Structure |
| --- | --- |
| 1-210 | 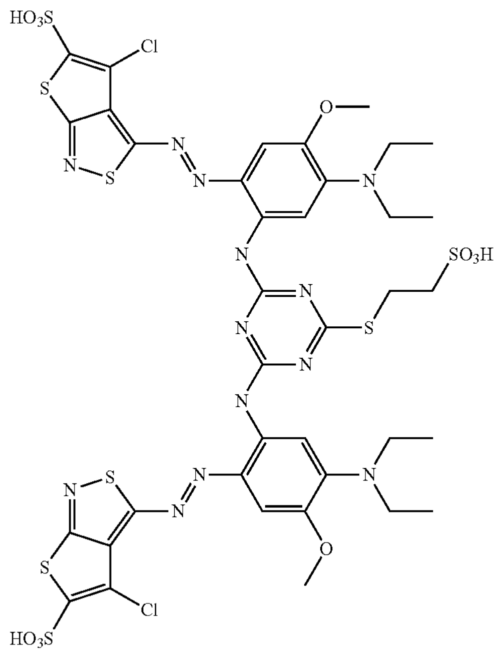 [SMILES: CCN(CC)c1cc(Nc2nc(Nc3cc(N(CC)CC)c(OC)cc3/N=N/c3snc4sc(S(=O)(=O)O)c(Cl)c34)nc(SCCS(=O)(=O)O)n2)c(/N=N/c2snc3sc(S(=O)(=O)O)c(Cl)c23)cc1OC] |
| 1-211 | 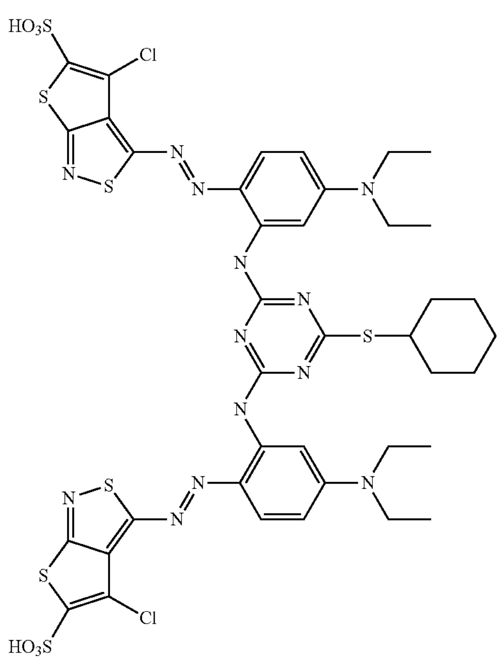 [SMILES: CCN(CC)c1ccc(/N=N/c2snc3sc(S(=O)(=O)O)c(Cl)c23)c(Nc2nc(Nc3cc(N(CC)CC)ccc3/N=N/c3snc4sc(S(=O)(=O)O)c(Cl)c34)nc(SC3CCCCC3)n2)c1] |

TABLE 1-continued
| Example | Structure |
| --- | --- |
| 1-212 | 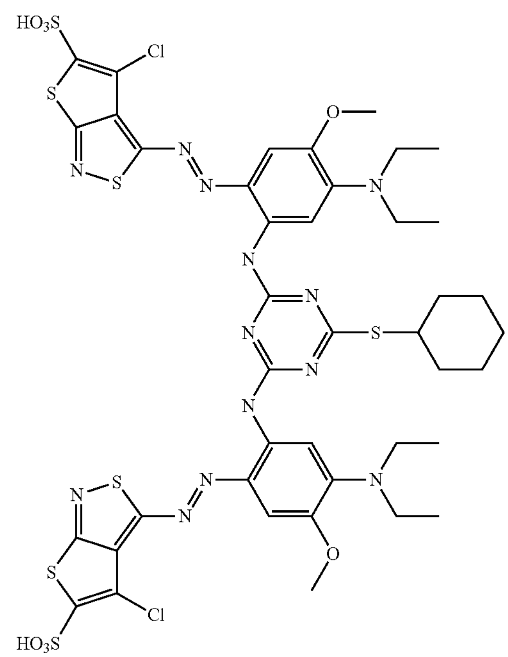 [SMILES: CCN(CC)c1cc(Nc2nc(Nc3cc(N(CC)CC)c(OC)cc3/N=N/c3snc4sc(S(=O)(=O)O)c(Cl)c34)nc(SC3CCCCC3)n2)c(/N=N/c2snc3sc(S(=O)(=O)O)c(Cl)c23)cc1OC] |
| 1-213 | 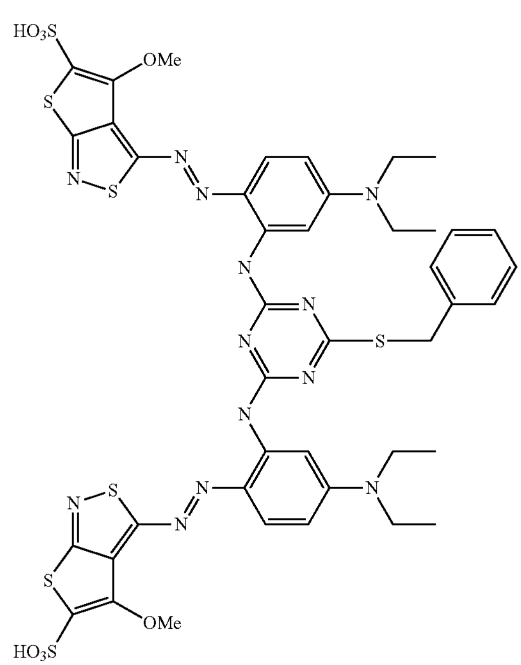 [SMILES: CCN(CC)c1ccc(/N=N/c2snc3sc(S(=O)(=O)O)c(OC)c23)c(Nc2nc(Nc3cc(N(CC)CC)ccc3/N=N/c3snc4sc(S(=O)(=O)O)c(OC)c34)nc(SCc3ccccc3)n2)c1] |

TABLE 1-continued
| Example | Structure |
|---|---|
| 1-214 | 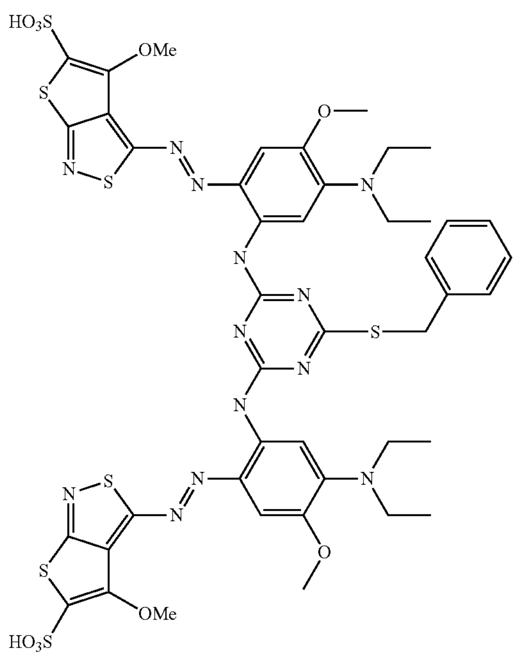 [SMILES: CCN(CC)c1cc(Nc2nc(Nc3cc(N(CC)CC)c(OC)cc3/N=N/c3snc4sc(S(=O)(=O)O)c(OC)c34)nc(SCc3ccccc3)n2)c(/N=N/c2snc3sc(S(=O)(=O)O)c(OC)c23)cc1OC] |
| 1-215 | 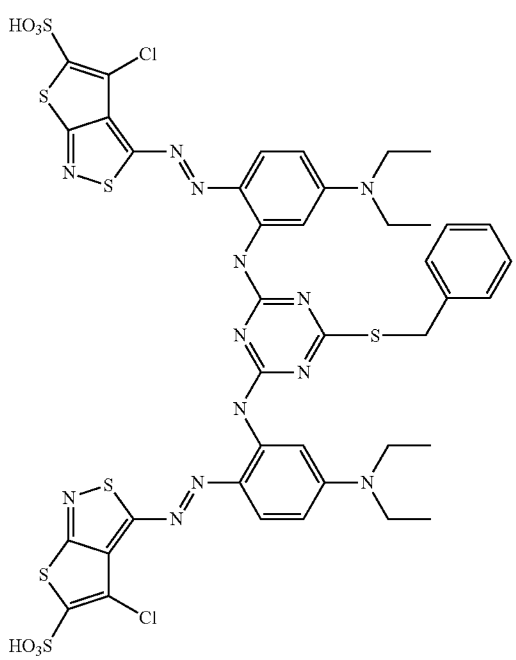 [SMILES: CCN(CC)c1ccc(/N=N/c2snc3sc(S(=O)(=O)O)c(Cl)c23)c(Nc2nc(Nc3cc(N(CC)CC)ccc3/N=N/c3snc4sc(S(=O)(=O)O)c(Cl)c34)nc(SCc3ccccc3)n2)c1] |

TABLE 1-continued
| Example | Structure |
| --- | --- |
| 1-216 | 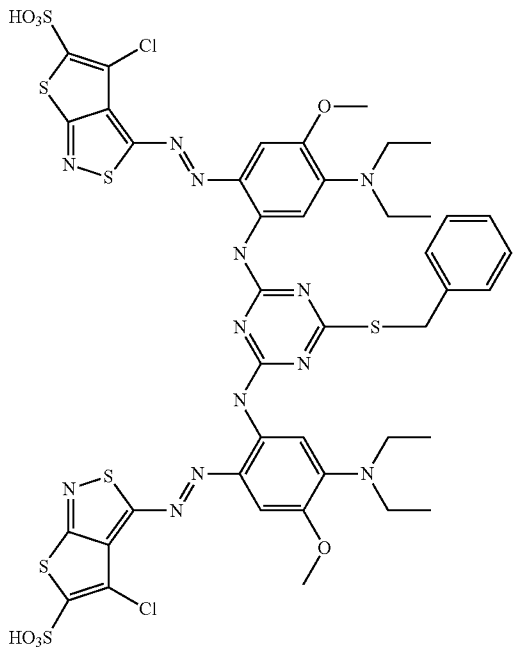 [SMILES: CCN(CC)c1cc(Nc2nc(Nc3cc(N(CC)CC)c(OC)cc3/N=N/c3snc4sc(S(=O)(=O)O)c(Cl)c34)nc(SCc3ccccc3)n2)c(/N=N/c2snc3sc(S(=O)(=O)O)c(Cl)c23)cc1OC] |
| 1-217 | 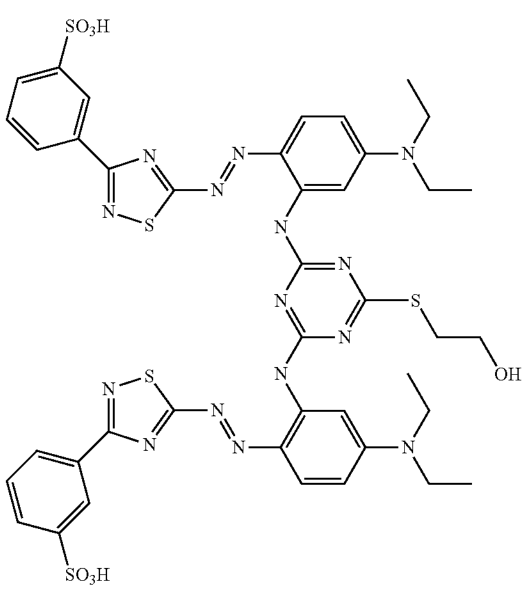 [SMILES: CCN(CC)c1ccc(/N=N/c2nc(-c3cccc(S(=O)(=O)O)c3)ns2)c(Nc2nc(Nc3cc(N(CC)CC)ccc3/N=N/c3nc(-c4cccc(S(=O)(=O)O)c4)ns3)nc(SCCO)n2)c1] |

TABLE 1-continued
| Example | Structure |
|---|---|
| 1-218 | 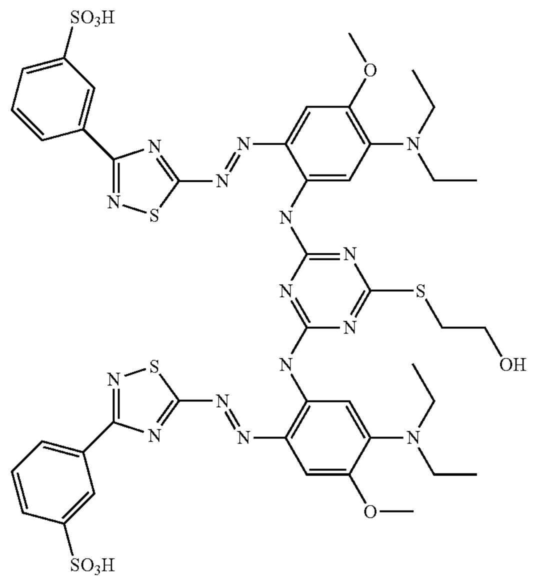 [SMILES: CCN(CC)c1cc(Nc2nc(Nc3cc(N(CC)CC)c(OC)cc3/N=N/c3nc(-c4cccc(S(=O)(=O)O)c4)ns3)nc(SCCO)n2)c(/N=N/c2nc(-c3cccc(S(=O)(=O)O)c3)ns2)cc1OC] |
| 1-219 | 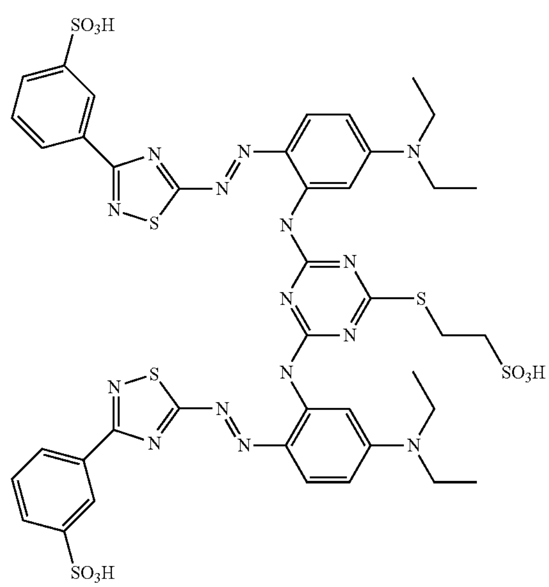 [SMILES: CCN(CC)c1ccc(/N=N/c2nc(-c3cccc(S(=O)(=O)O)c3)ns2)c(Nc2nc(Nc3cc(N(CC)CC)ccc3/N=N/c3nc(-c4cccc(S(=O)(=O)O)c4)ns3)nc(SCCS(=O)(=O)O)n2)c1] |

TABLE 1-continued
| Example | Structure |
| --- | --- |
| 1-220 | 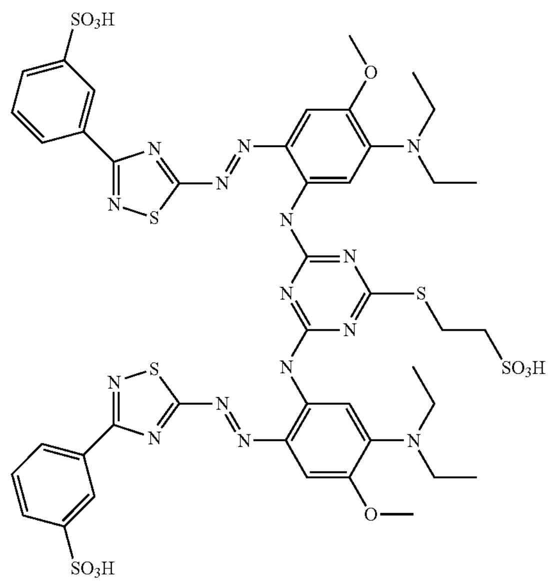 [SMILES: CCN(CC)c1cc(Nc2nc(Nc3cc(N(CC)CC)c(OC)cc3/N=N/c3nc(-c4cccc(S(=O)(=O)O)c4)ns3)nc(SCCS(=O)(=O)O)n2)c(/N=N/c2nc(-c3cccc(S(=O)(=O)O)c3)ns2)cc1OC] |
| 1-221 | 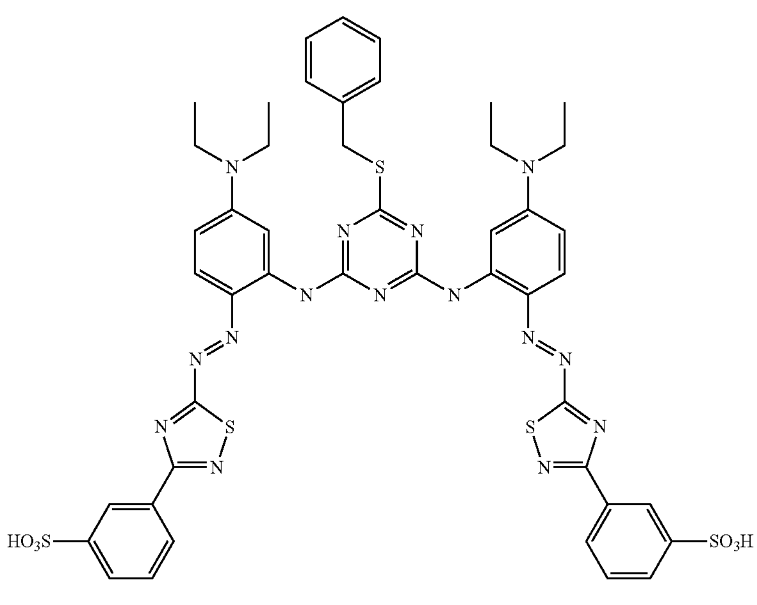 [SMILES: CCN(CC)c1ccc(/N=N/c2nc(-c3cccc(S(=O)(=O)O)c3)ns2)c(Nc2nc(Nc3cc(N(CC)CC)ccc3/N=N/c3nc(-c4cccc(S(=O)(=O)O)c4)ns3)nc(SCc3ccccc3)n2)c1] |

TABLE 1-continued
| Example | Structure |
|---|---|
| 1-222 | 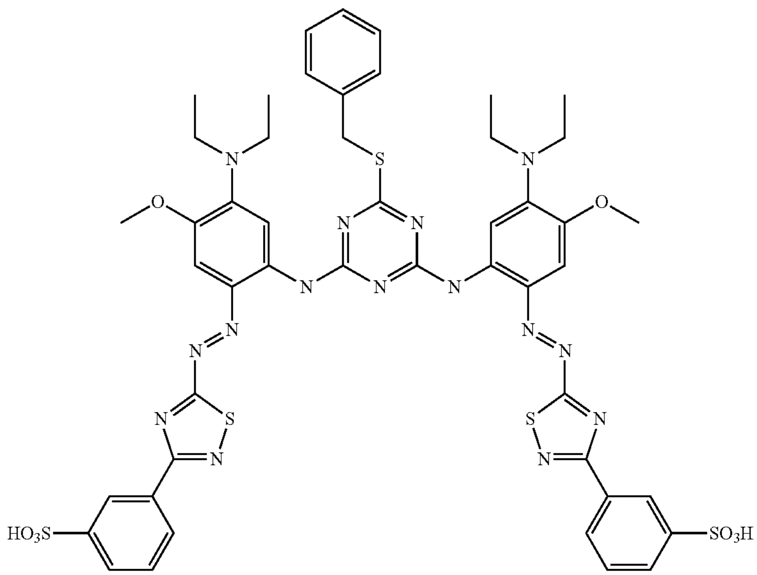 [SMILES: CCN(CC)c1cc(Nc2nc(Nc3cc(N(CC)CC)c(OC)cc3/N=N/c3nc(-c4cccc(S(=O)(=O)O)c4)ns3)nc(SCc3ccccc3)n2)c(/N=N/c2nc(-c3cccc(S(=O)(=O)O)c3)ns2)cc1OC] |
| 1-223 | 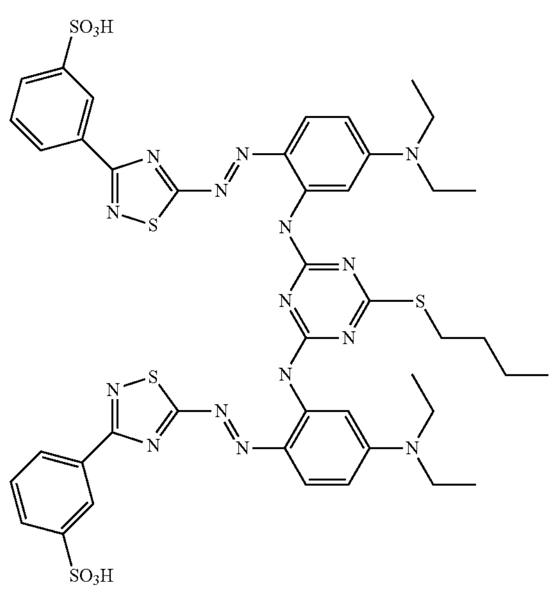 [SMILES: CCCCSc1nc(Nc2cc(N(CC)CC)ccc2/N=N/c2nc(-c3cccc(S(=O)(=O)O)c3)ns2)nc(Nc2cc(N(CC)CC)ccc2/N=N/c2nc(-c3cccc(S(=O)(=O)O)c3)ns2)n1] |

TABLE 1-continued
| Example | Structure |
|---|---|
| 1-224 | 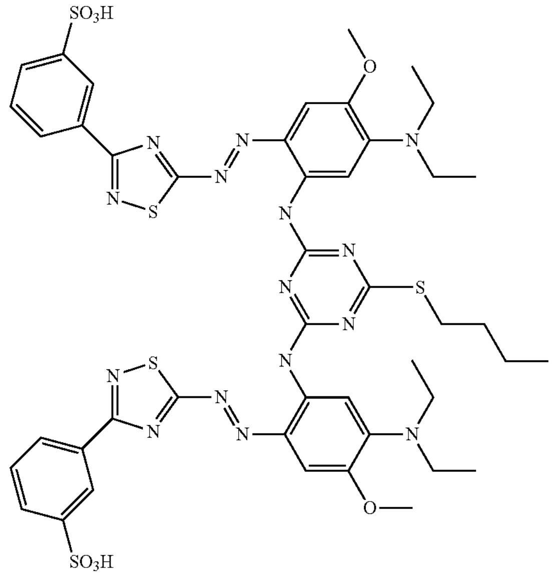 [SMILES: CCCCSc1nc(Nc2cc(N(CC)CC)c(OC)cc2/N=N/c2nc(-c3cccc(S(=O)(=O)O)c3)ns2)nc(Nc2cc(N(CC)CC)c(OC)cc2/N=N/c2nc(-c3cccc(S(=O)(=O)O)c3)ns2)n1] |
| 1-225 | 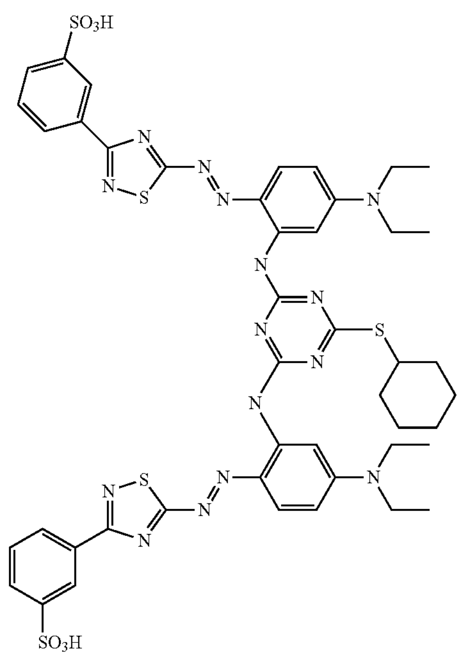 [SMILES: CCN(CC)c1ccc(/N=N/c2nc(-c3cccc(S(=O)(=O)O)c3)ns2)c(Nc2nc(Nc3cc(N(CC)CC)ccc3/N=N/c3nc(-c4cccc(S(=O)(=O)O)c4)ns3)nc(SC3CCCCC3)n2)c1] |

TABLE 1-continued
| Example | Structure |
|---|---|
| 1-226 | 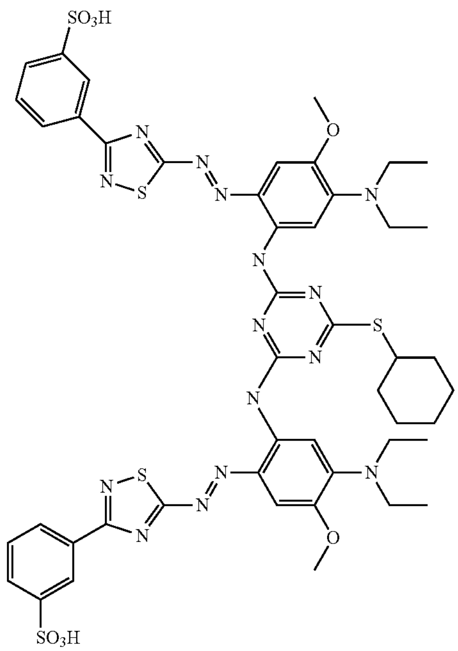 [SMILES: CCN(CC)c1cc(Nc2nc(Nc3cc(N(CC)CC)c(OC)cc3/N=N/c3nc(-c4cccc(S(=O)(=O)O)c4)ns3)nc(SC3CCCCC3)n2)c(/N=N/c2nc(-c3cccc(S(=O)(=O)O)c3)ns2)cc1OC] |
| 1-227 | 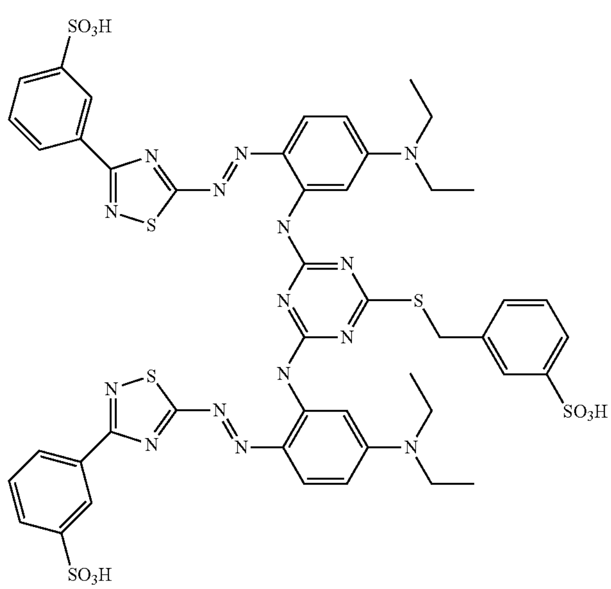 [SMILES: CCN(CC)c1ccc(/N=N/c2nc(-c3cccc(S(=O)(=O)O)c3)ns2)c(Nc2nc(Nc3cc(N(CC)CC)ccc3/N=N/c3nc(-c4cccc(S(=O)(=O)O)c4)ns3)nc(SCc3cccc(S(=O)(=O)O)c3)n2)c1] |

TABLE 1-continued
| Example | Structure |
| --- | --- |
| 1-228 | 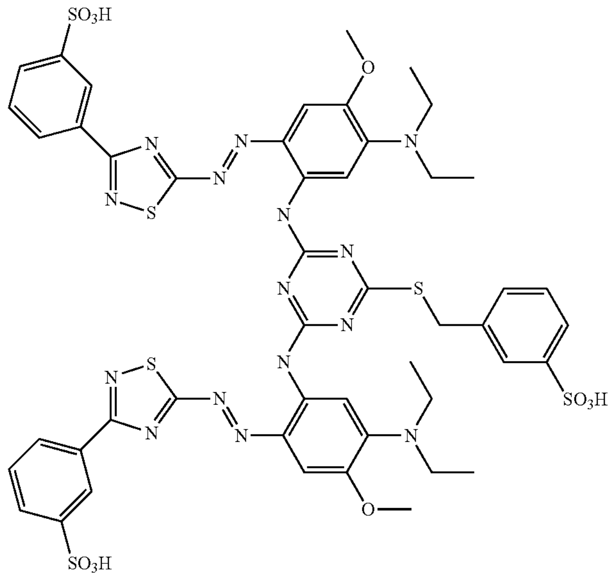 [SMILES: CCN(CC)c1cc(Nc2nc(Nc3cc(N(CC)CC)c(OC)cc3/N=N/c3nc(-c4cccc(S(=O)(=O)O)c4)ns3)nc(SCc3cccc(S(=O)(=O)O)c3)n2)c(/N=N/c2nc(-c3cccc(S(=O)(=O)O)c3)ns2)cc1OC] |
| 1-229 | 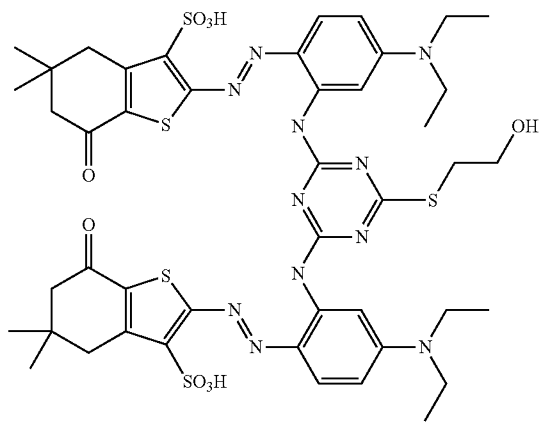 [SMILES: CCN(CC)c1ccc(/N=N/c2sc3c(c2S(=O)(=O)O)CC(C)(C)CC3=O)c(Nc2nc(Nc3cc(N(CC)CC)ccc3/N=N/c3sc4c(c3S(=O)(=O)O)CC(C)(C)CC4=O)nc(SCCO)n2)c1] |
| 1-230 | 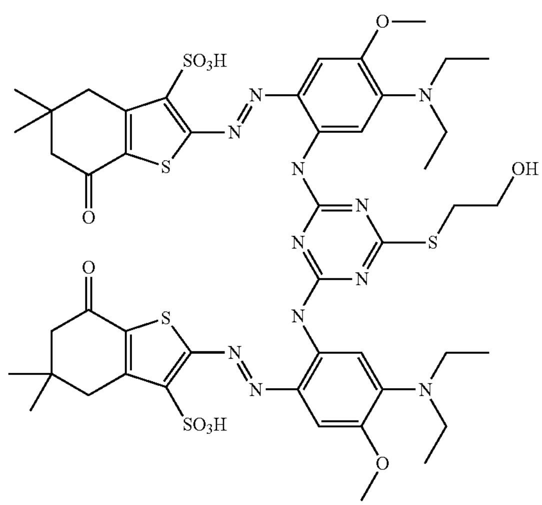 [SMILES: CCN(CC)c1cc(Nc2nc(Nc3cc(N(CC)CC)c(OC)cc3/N=N/c3sc4c(c3S(=O)(=O)O)CC(C)(C)CC4=O)nc(SCCO)n2)c(/N=N/c2sc3c(c2S(=O)(=O)O)CC(C)(C)CC3=O)cc1OC] |

TABLE 1-continued
| Example | Structure |
| --- | --- |
| 1-231 | 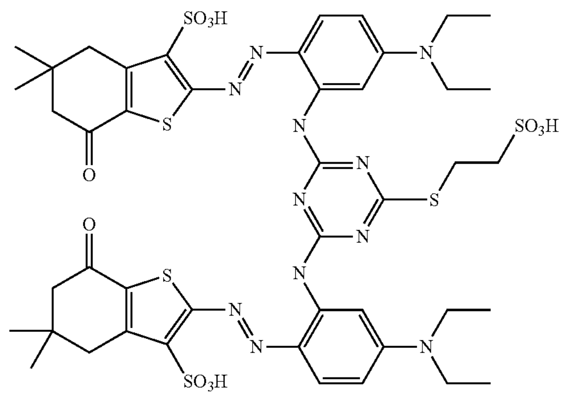 [SMILES: CCN(CC)c1ccc(/N=N/c2sc3c(c2S(=O)(=O)O)CC(C)(C)CC3=O)c(Nc2nc(Nc3cc(N(CC)CC)ccc3/N=N/c3sc4c(c3S(=O)(=O)O)CC(C)(C)CC4=O)nc(SCCS(=O)(=O)O)n2)c1] |
| 1-232 | 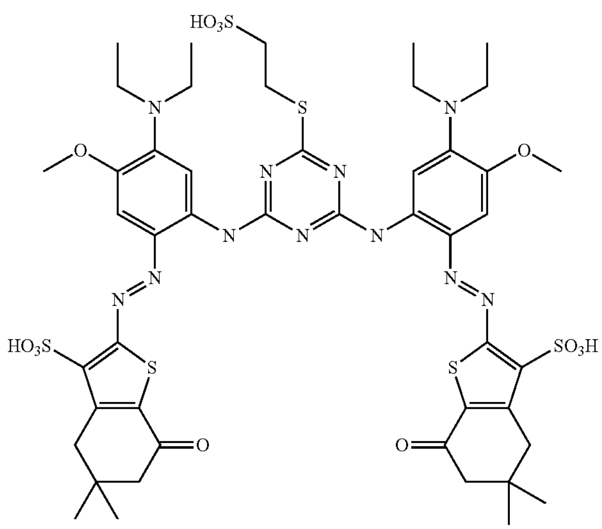 |
| 1-233 | 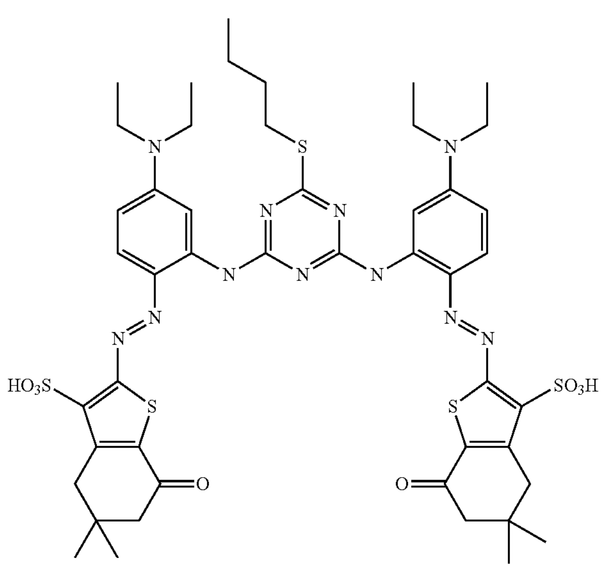 [SMILES: CCCCSc1nc(Nc2cc(N(CC)CC)ccc2/N=N/c2sc3c(c2S(=O)(=O)O)CC(C)(C)CC3=O)nc(Nc2cc(N(CC)CC)ccc2/N=N/c2sc3c(c2S(=O)(=O)O)CC(C)(C)CC3=O)n1] |

TABLE 1-continued
| Example | Structure |
| --- | --- |
| 1-234 | 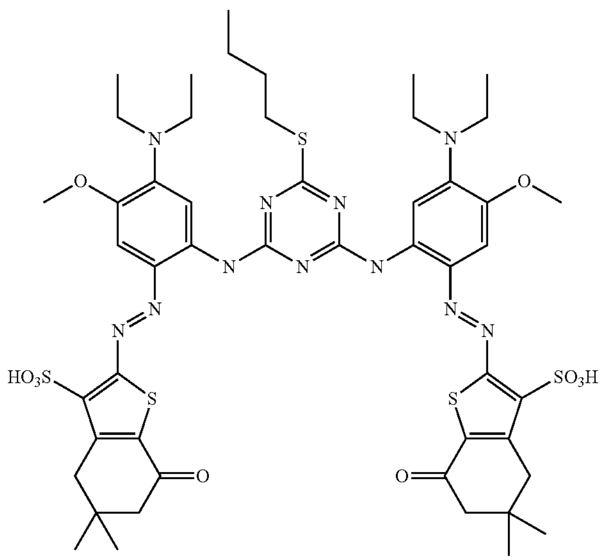 |
| 1-235 | 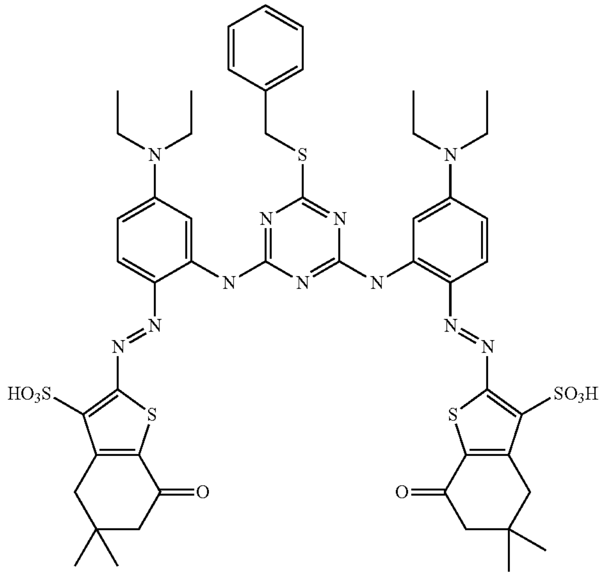 [SMILES: CCN(CC)c1ccc(/N=N/c2sc3c(c2S(=O)(=O)O)CC(C)(C)CC3=O)c(Nc2nc(Nc3cc(N(CC)CC)ccc3/N=N/c3sc4c(c3S(=O)(=O)O)CC(C)(C)CC4=O)nc(SCc3ccccc3)n2)c1] |

TABLE 1-continued
| Example | Structure |
|---|---|
| 1-236 | 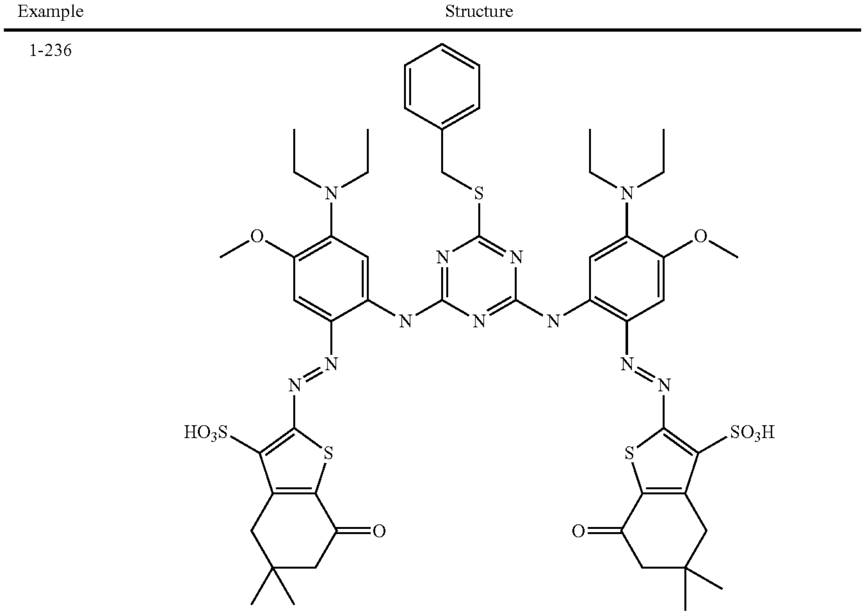 |
| 1-237 | 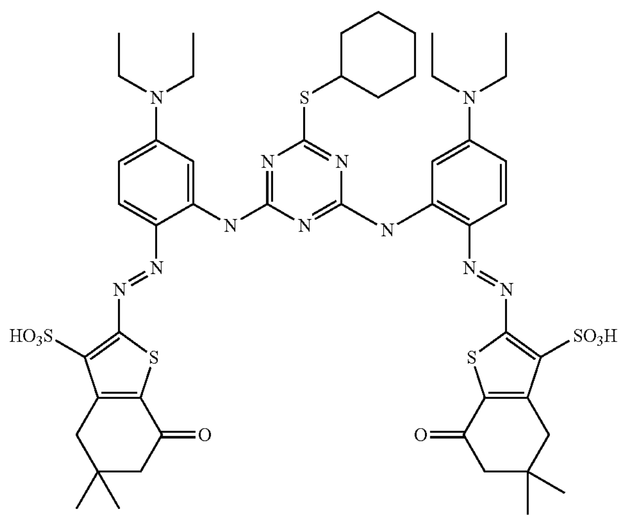 [SMILES: CCN(CC)c1ccc(/N=N/c2sc3c(c2S(=O)(=O)O)CC(C)(C)CC3=O)c(Nc2nc(Nc3cc(N(CC)CC)ccc3/N=N/c3sc4c(c3S(=O)(=O)O)CC(C)(C)CC4=O)nc(SC3CCCCC3)n2)c1] |
| 1-238 | 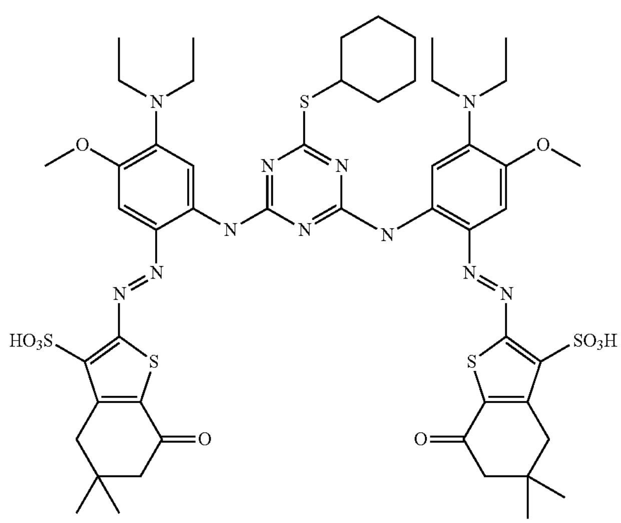 |

TABLE 1-continued
| Example | Structure |
|---|---|
| 1-239 | 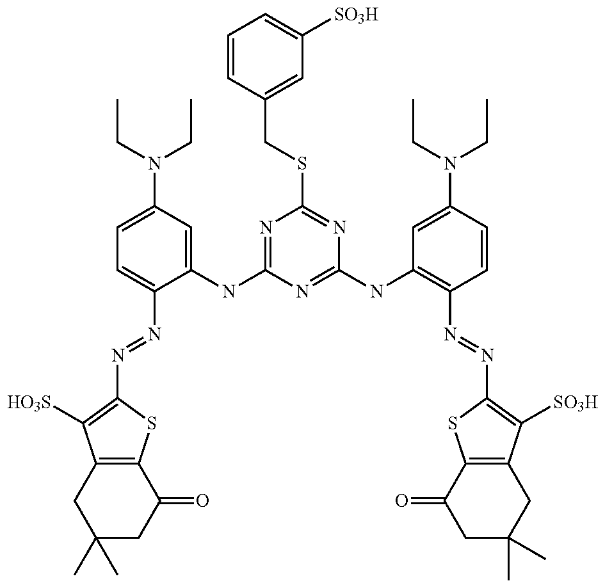 [SMILES: CCN(CC)c1ccc(/N=N/c2sc3c(c2S(=O)(=O)O)CC(C)(C)CC3=O)c(Nc2nc(Nc3cc(N(CC)CC)ccc3/N=N/c3sc4c(c3S(=O)(=O)O)CC(C)(C)CC4=O)nc(SCc3cccc(S(=O)(=O)O)c3)n2)c1] |
| 1-240 | 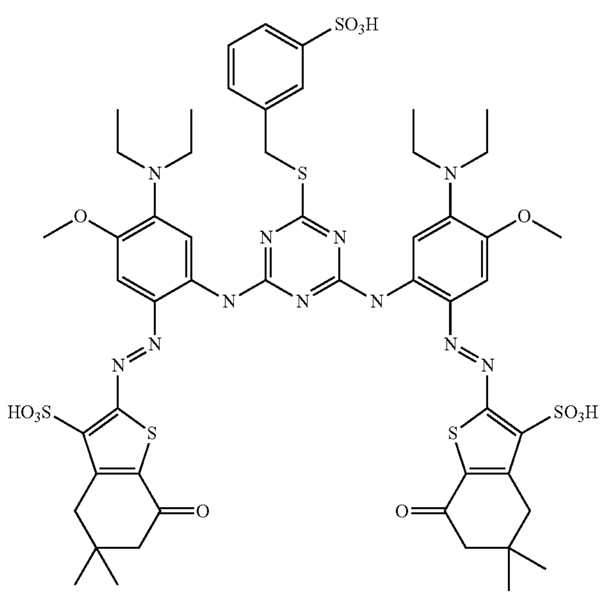 |

TABLE 1-continued
| Example | Structure |
|---|---|
| 1-241 | 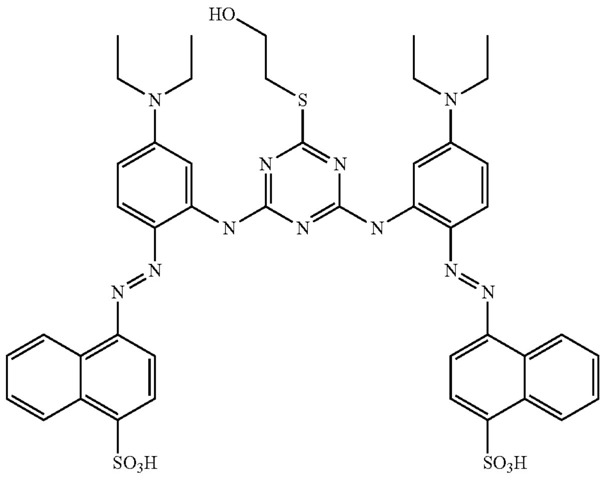 [SMILES: CCN(CC)c1ccc(/N=N/c2ccc(S(=O)(=O)O)c3ccccc23)c(Nc2nc(Nc3cc(N(CC)CC)ccc3/N=N/c3ccc(S(=O)(=O)O)c4ccccc34)nc(SCCO)n2)c1] |
| 1-242 | 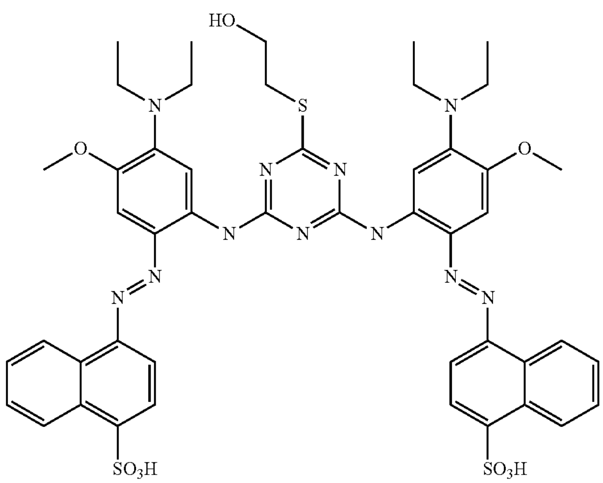 [SMILES: CCN(CC)c1cc(Nc2nc(Nc3cc(N(CC)CC)c(OC)cc3/N=N/c3ccc(S(=O)(=O)O)c4ccccc34)nc(SCCO)n2)c(/N=N/c2ccc(S(=O)(=O)O)c3ccccc23)cc1OC] |
| 1-243 | 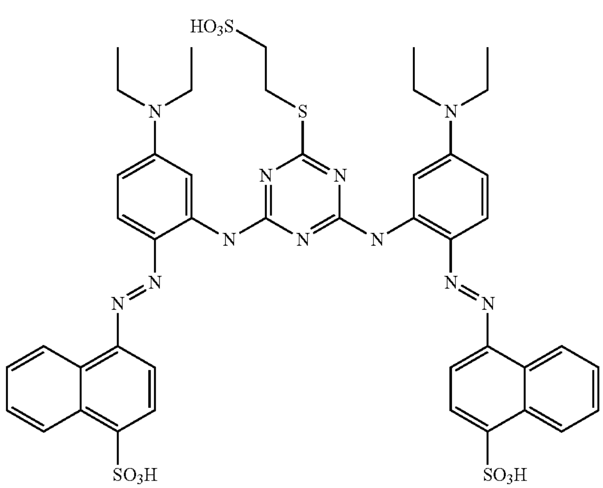 [SMILES: CCN(CC)c1ccc(/N=N/c2ccc(S(=O)(=O)O)c3ccccc23)c(Nc2nc(Nc3cc(N(CC)CC)ccc3/N=N/c3ccc(S(=O)(=O)O)c4ccccc34)nc(SCCS(=O)(=O)O)n2)c1] |

TABLE 1-continued
| Example | Structure |
|---|---|
| 1-244 | 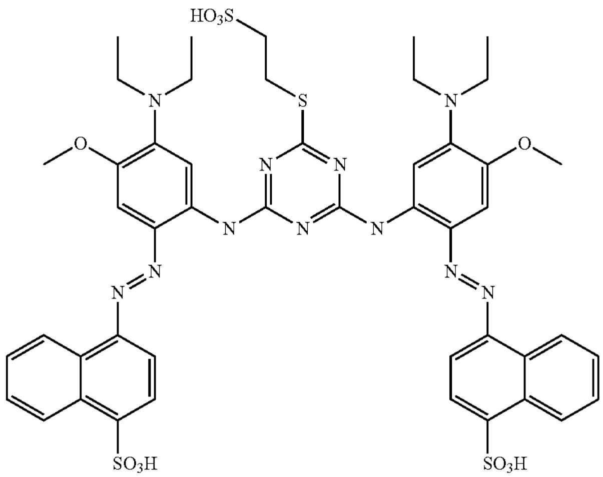 [SMILES: CCN(CC)c1cc(Nc2nc(Nc3cc(N(CC)CC)c(OC)cc3/N=N/c3ccc(S(=O)(=O)O)c4ccccc34)nc(SCCS(=O)(=O)O)n2)c(/N=N/c2ccc(S(=O)(=O)O)c3ccccc23)cc1OC] |
| 1-245 | 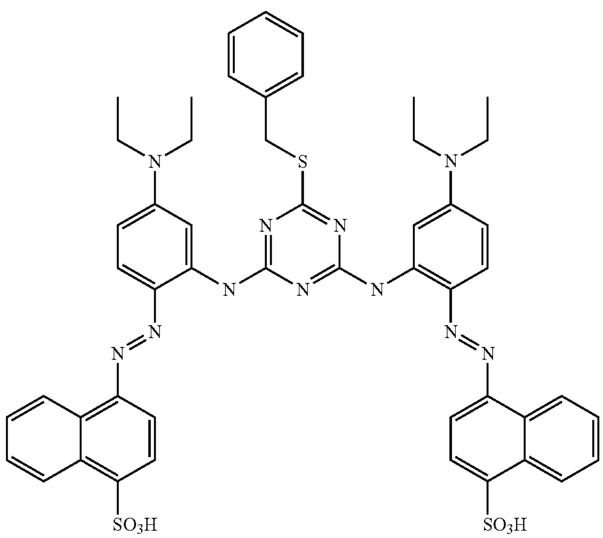 [SMILES: CCN(CC)c1ccc(/N=N/c2ccc(S(=O)(=O)O)c3ccccc23)c(Nc2nc(Nc3cc(N(CC)CC)ccc3/N=N/c3ccc(S(=O)(=O)O)c4ccccc34)nc(SCc3ccccc3)n2)c1] |
| 1-246 | 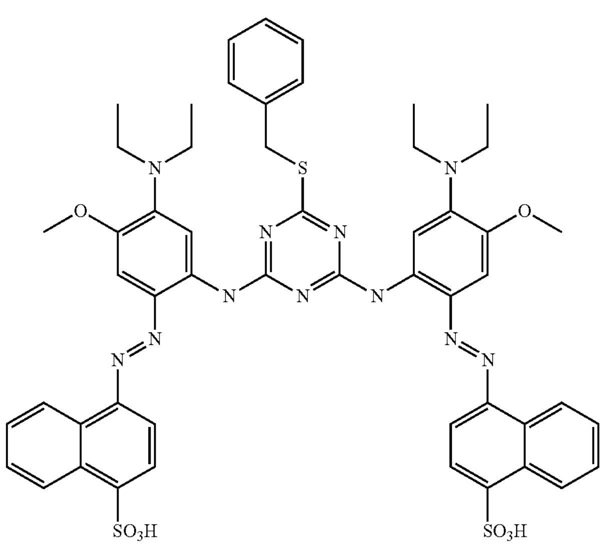 [SMILES: CCN(CC)c1cc(Nc2nc(Nc3cc(N(CC)CC)c(OC)cc3/N=N/c3ccc(S(=O)(=O)O)c4ccccc34)nc(SCc3ccccc3)n2)c(/N=N/c2ccc(S(=O)(=O)O)c3ccccc23)cc1OC] |

TABLE 1-continued
| Example | Structure |
| --- | --- |
| 1-247 | 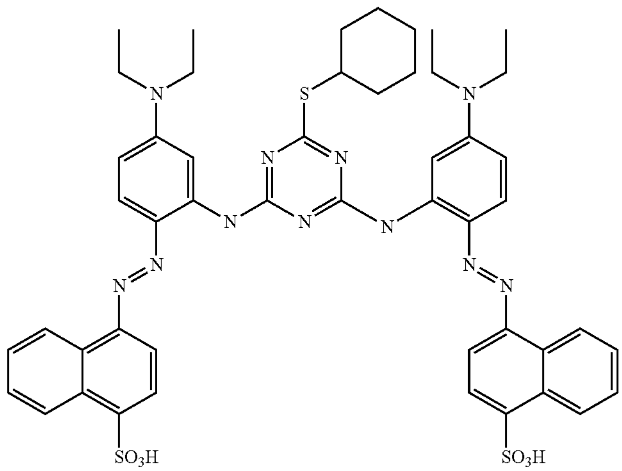 [SMILES: CCN(CC)c1ccc(/N=N/c2ccc(S(=O)(=O)O)c3ccccc23)c(Nc2nc(Nc3cc(N(CC)CC)ccc3/N=N/c3ccc(S(=O)(=O)O)c4ccccc34)nc(SC3CCCCC3)n2)c1] |
| 1-248 | 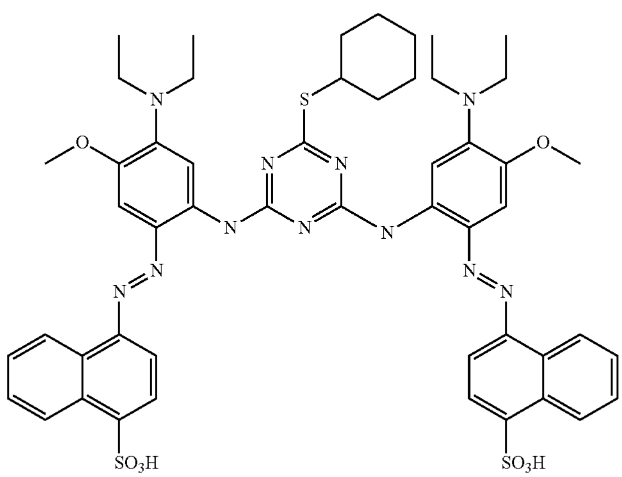 [SMILES: CCN(CC)c1cc(Nc2nc(Nc3cc(N(CC)CC)c(OC)cc3/N=N/c3ccc(S(=O)(=O)O)c4ccccc34)nc(SC3CCCCC3)n2)c(/N=N/c2ccc(S(=O)(=O)O)c3ccccc23)cc1OC] |
| 1-249 | 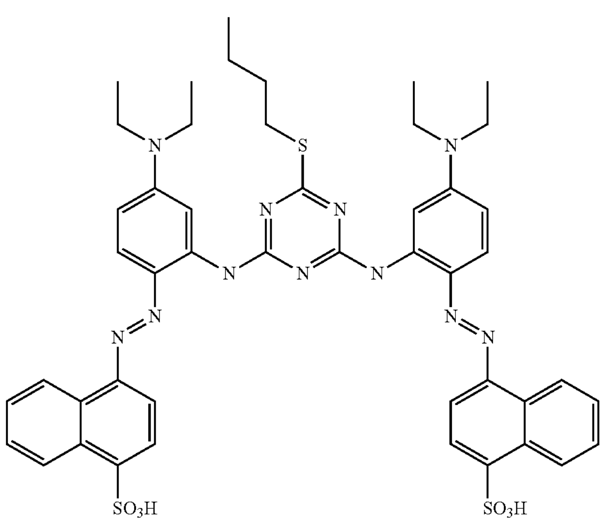 [SMILES: CCCCSc1nc(Nc2cc(N(CC)CC)ccc2/N=N/c2ccc(S(=O)(=O)O)c3ccccc23)nc(Nc2cc(N(CC)CC)ccc2/N=N/c2ccc(S(=O)(=O)O)c3ccccc23)n1] |

TABLE 1-continued
| Example | Structure |
|---|---|
| 1-250 | 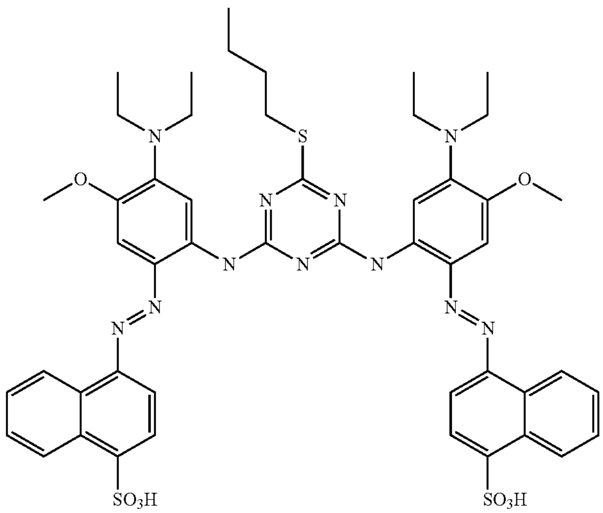 [SMILES: CCCCSc1nc(Nc2cc(N(CC)CC)c(OC)cc2/N=N/c2ccc(S(=O)(=O)O)c3ccccc23)nc(Nc2cc(N(CC)CC)c(OC)cc2/N=N/c2ccc(S(=O)(=O)O)c3ccccc23)n1] |
| 1-251 | 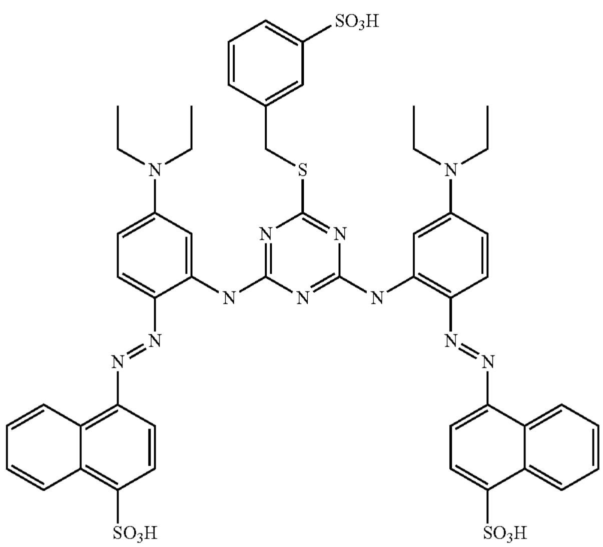 [SMILES: CCN(CC)c1ccc(/N=N/c2ccc(S(=O)(=O)O)c3ccccc23)c(Nc2nc(Nc3cc(N(CC)CC)ccc3/N=N/c3ccc(S(=O)(=O)O)c4ccccc34)nc(SCc3cccc(S(=O)(=O)O)c3)n2)c1] |
| 1-252 | 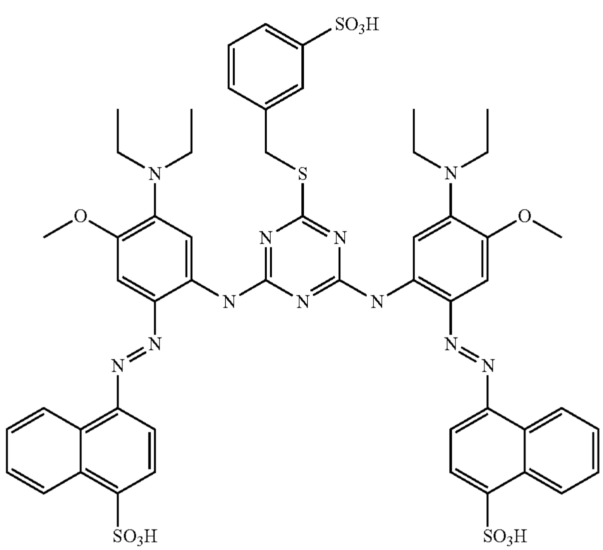 [SMILES: CCN(CC)c1cc(Nc2nc(Nc3cc(N(CC)CC)c(OC)cc3/N=N/c3ccc(S(=O)(=O)O)c4ccccc34)nc(SCc3cccc(S(=O)(=O)O)c3)n2)c(/N=N/c2ccc(S(=O)(=O)O)c3ccccc23)cc1OC] |

TABLE 1-continued
| Example | Structure |
|---|---|
| 1-253 | 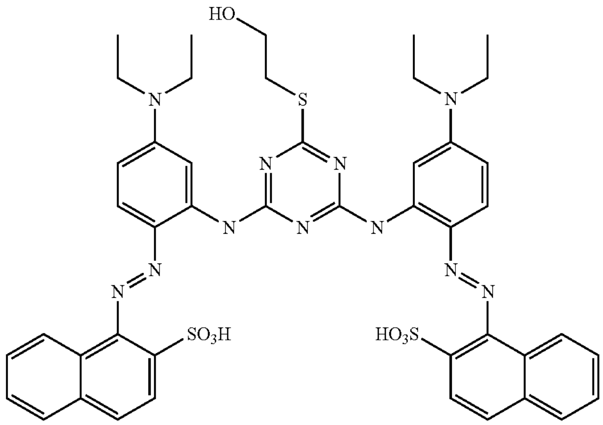 [SMILES: CCN(CC)c1ccc(/N=N/c2c(S(=O)(=O)O)ccc3ccccc23)c(Nc2nc(Nc3cc(N(CC)CC)ccc3/N=N/c3c(S(=O)(=O)O)ccc4ccccc34)nc(SCCO)n2)c1] |
| 1-254 | 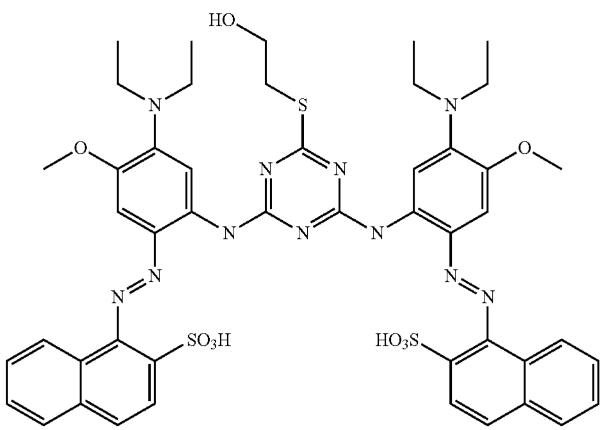 [SMILES: CCN(CC)c1cc(Nc2nc(Nc3cc(N(CC)CC)c(OC)cc3/N=N/c3c(S(=O)(=O)O)ccc4ccccc34)nc(SCCO)n2)c(/N=N/c2c(S(=O)(=O)O)ccc3ccccc23)cc1OC] |
| 1-255 | 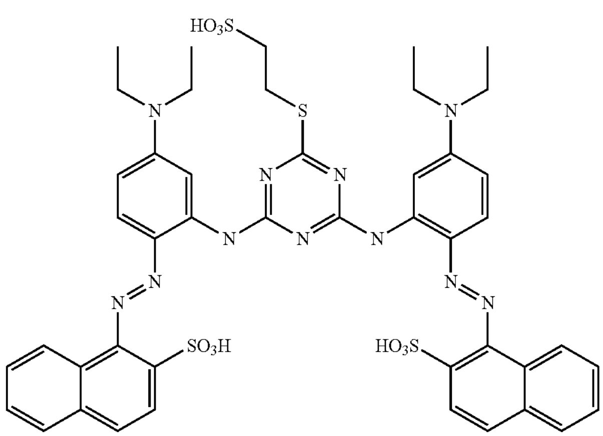 [SMILES: CCN(CC)c1ccc(/N=N/c2c(S(=O)(=O)O)ccc3ccccc23)c(Nc2nc(Nc3cc(N(CC)CC)ccc3/N=N/c3c(S(=O)(=O)O)ccc4ccccc34)nc(SCCS(=O)(=O)O)n2)c1] |

TABLE 1-continued
| Example | Structure |
|---|---|
| 1-256 | 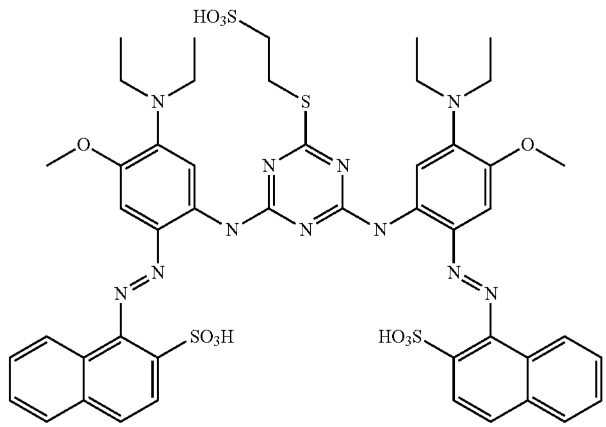 [SMILES: CCN(CC)c1cc(Nc2nc(Nc3cc(N(CC)CC)c(OC)cc3/N=N/c3c(S(=O)(=O)O)ccc4ccccc34)nc(SCCS(=O)(=O)O)n2)c(/N=N/c2c(S(=O)(=O)O)ccc3ccccc23)cc1OC] |
| 1-257 | 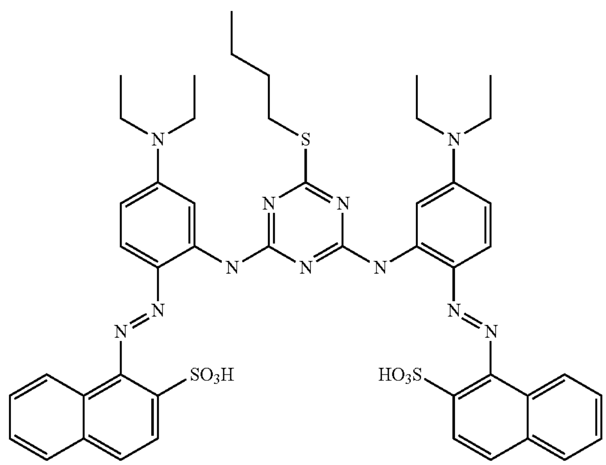 [SMILES: CCCCSc1nc(Nc2cc(N(CC)CC)ccc2/N=N/c2c(S(=O)(=O)O)ccc3ccccc23)nc(Nc2cc(N(CC)CC)ccc2/N=N/c2c(S(=O)(=O)O)ccc3ccccc23)n1] |
| 1-258 | 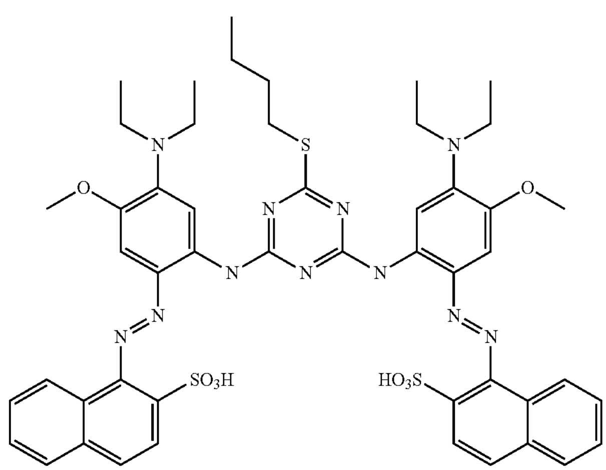 [SMILES: CCCCSc1nc(Nc2cc(N(CC)CC)c(OC)cc2/N=N/c2c(S(=O)(=O)O)ccc3ccccc23)nc(Nc2cc(N(CC)CC)c(OC)cc2/N=N/c2c(S(=O)(=O)O)ccc3ccccc23)n1] |

TABLE 1-continued
| Example | Structure |
| --- | --- |
| 1-259 | 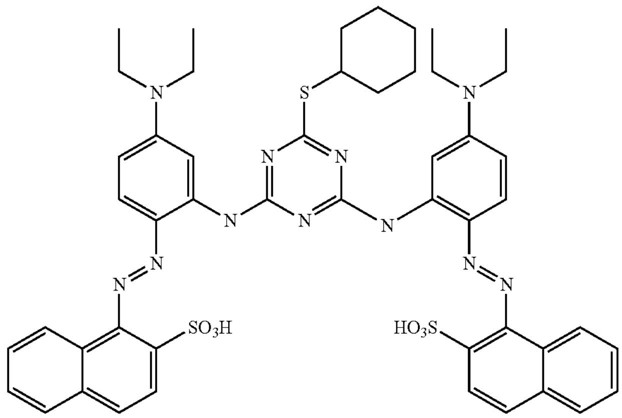 [SMILES: CCN(CC)c1ccc(/N=N/c2c(S(=O)(=O)O)ccc3ccccc23)c(Nc2nc(Nc3cc(N(CC)CC)ccc3/N=N/c3c(S(=O)(=O)O)ccc4ccccc34)nc(SC3CCCCC3)n2)c1] |
| 1-260 | 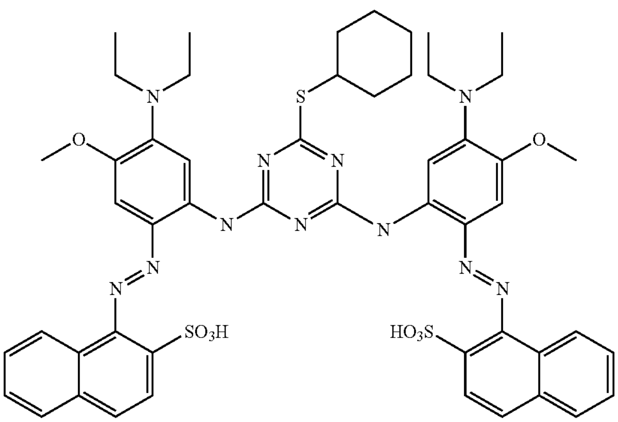 [SMILES: CCN(CC)c1cc(Nc2nc(Nc3cc(N(CC)CC)c(OC)cc3/N=N/c3c(S(=O)(=O)O)ccc4ccccc34)nc(SC3CCCCC3)n2)c(/N=N/c2c(S(=O)(=O)O)ccc3ccccc23)cc1OC] |
| 1-261 | 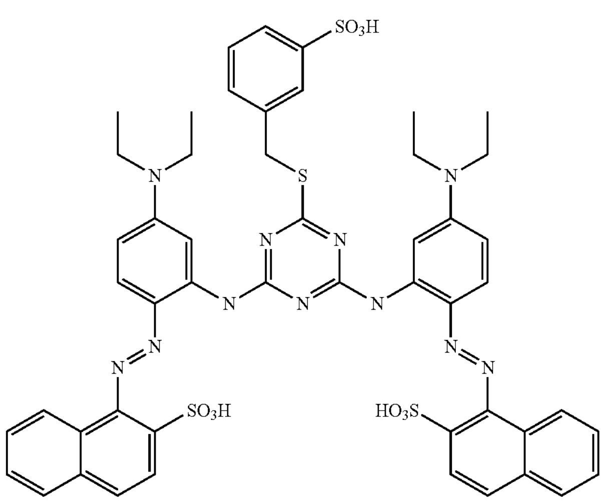 [SMILES: CCN(CC)c1ccc(/N=N/c2c(S(=O)(=O)O)ccc3ccccc23)c(Nc2nc(Nc3cc(N(CC)CC)ccc3/N=N/c3c(S(=O)(=O)O)ccc4ccccc34)nc(SCc3cccc(S(=O)(=O)O)c3)n2)c1] |

TABLE 1-continued
| Example | Structure |
|---|---|
| 1-262 | 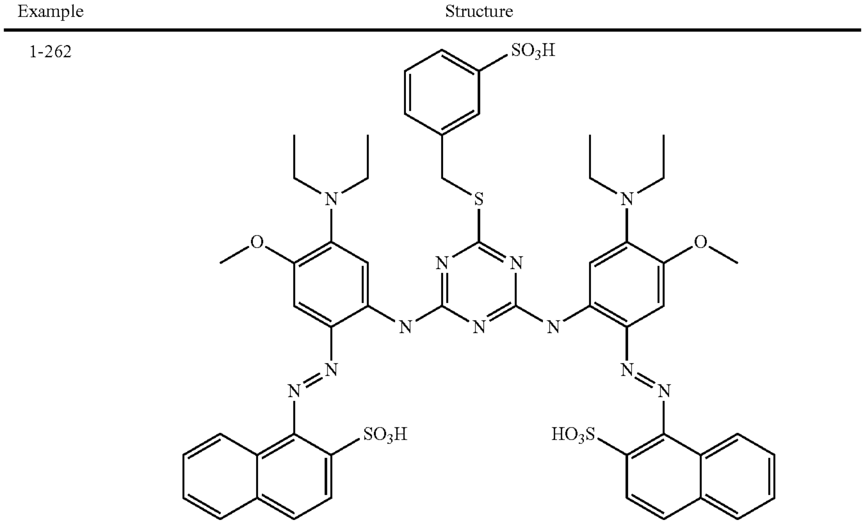 |
| 1-263 | 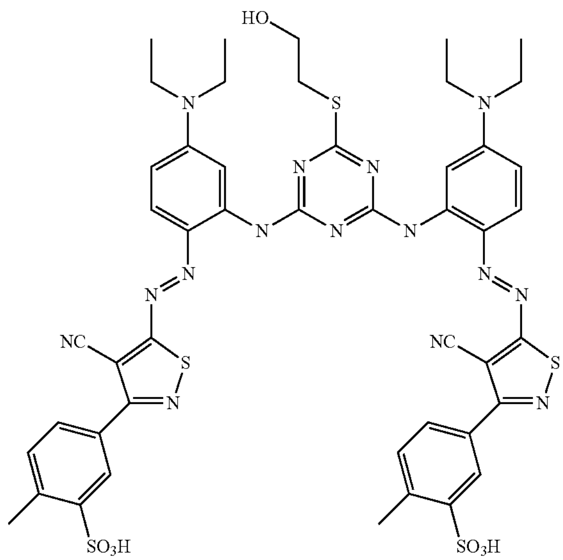 [SMILES: CCN(CC)c1ccc(/N=N/c2snc(-c3ccc(C)c(S(=O)(=O)O)c3)c2C#N)c(Nc2nc(Nc3cc(N(CC)CC)ccc3/N=N/c3snc(-c4ccc(C)c(S(=O)(=O)O)c4)c3C#N)nc(SCCO)n2)c1] |
| 1-264 | 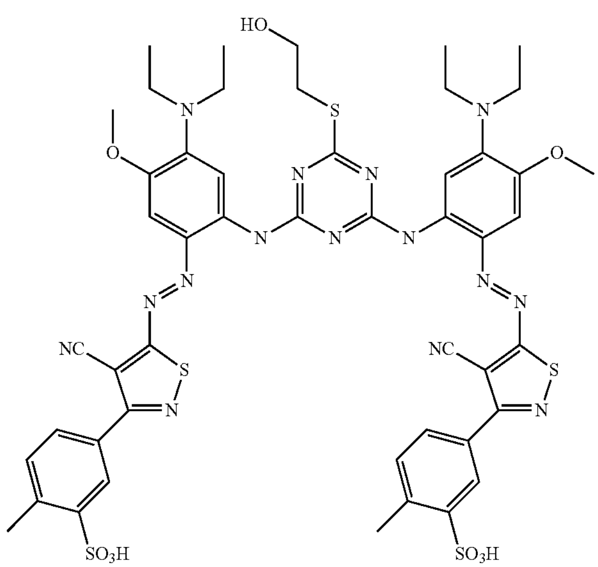 |

TABLE 1-continued
| Example | Structure |
|---|---|
| 1-265 | 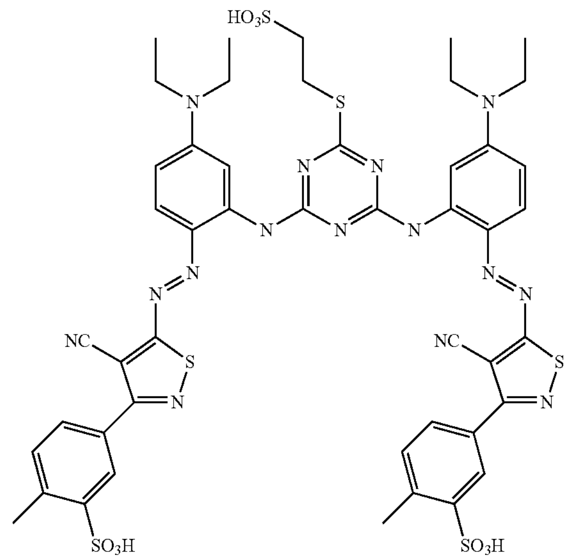 [SMILES: CCN(CC)c1ccc(/N=N/c2snc(-c3ccc(C)c(S(=O)(=O)O)c3)c2C#N)c(Nc2nc(Nc3cc(N(CC)CC)ccc3/N=N/c3snc(-c4ccc(C)c(S(=O)(=O)O)c4)c3C#N)nc(SCCS(=O)(=O)O)n2)c1] |
| 1-266 | 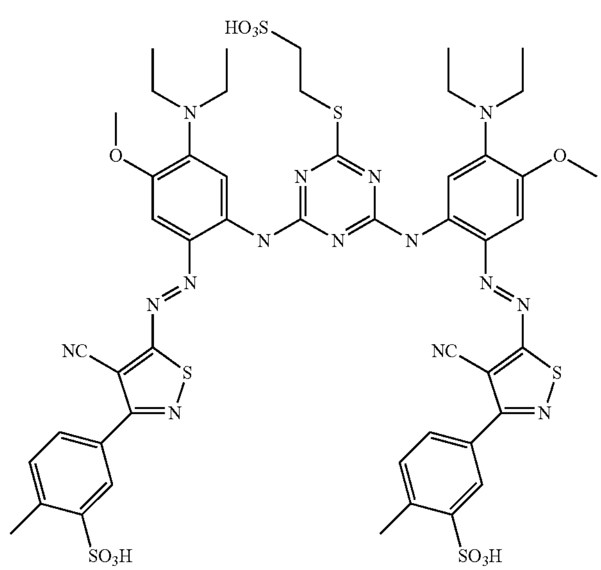 |

TABLE 1-continued
| Example | Structure |
| --- | --- |
| 1-267 | 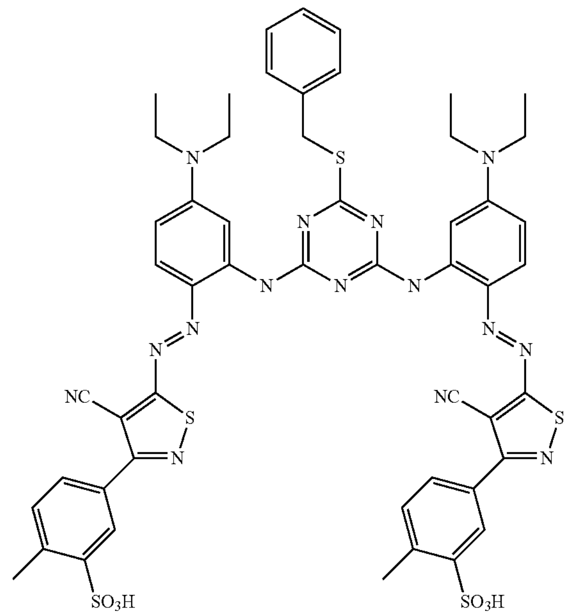 [SMILES: CCN(CC)c1ccc(/N=N/c2snc(-c3ccc(C)c(S(=O)(=O)O)c3)c2C#N)c(Nc2nc(Nc3cc(N(CC)CC)ccc3/N=N/c3snc(-c4ccc(C)c(S(=O)(=O)O)c4)c3C#N)nc(SCc3ccccc3)n2)c1] |
| 1-268 | 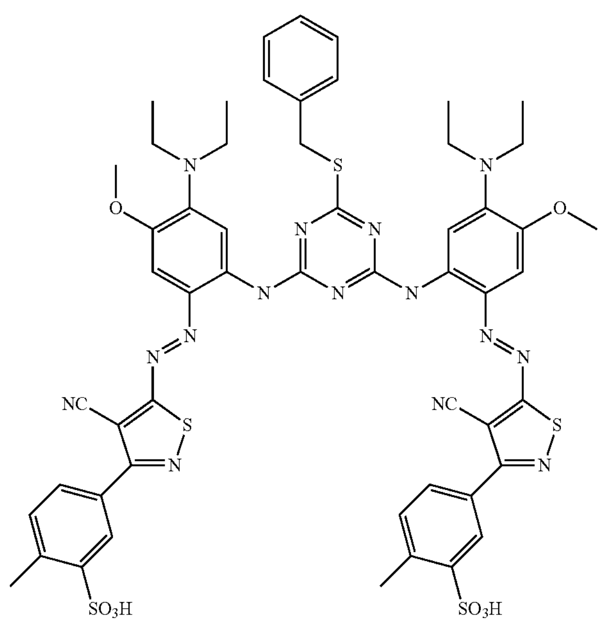 |

TABLE 1-continued
| Example | Structure |
|---|---|
| 1-269 | 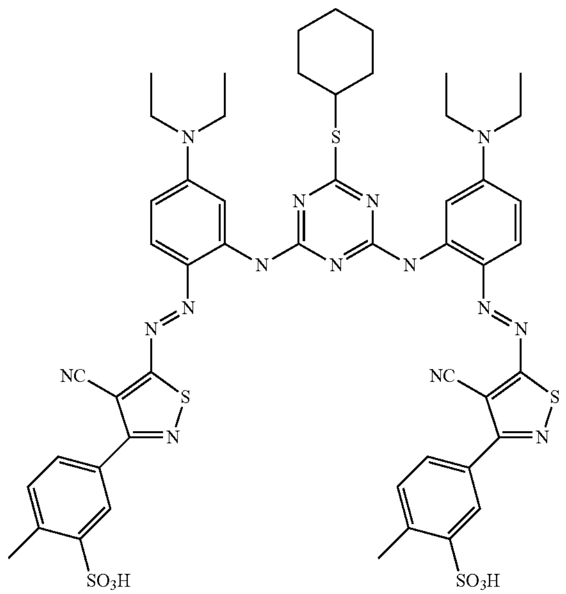 [SMILES: CCN(CC)c1ccc(/N=N/c2snc(-c3ccc(C)c(S(=O)(=O)O)c3)c2C#N)c(Nc2nc(Nc3cc(N(CC)CC)ccc3/N=N/c3snc(-c4ccc(C)c(S(=O)(=O)O)c4)c3C#N)nc(SC3CCCCC3)n2)c1] |
| 1-270 | 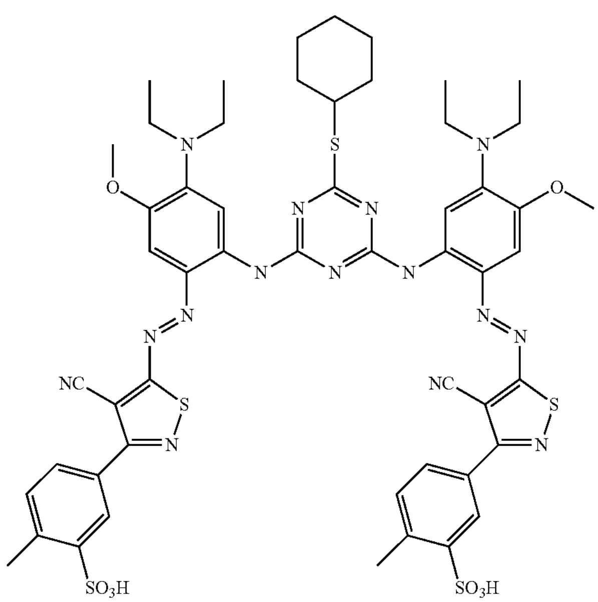 |

TABLE 1-continued
| Example | Structure |
| --- | --- |
| 1-271 | 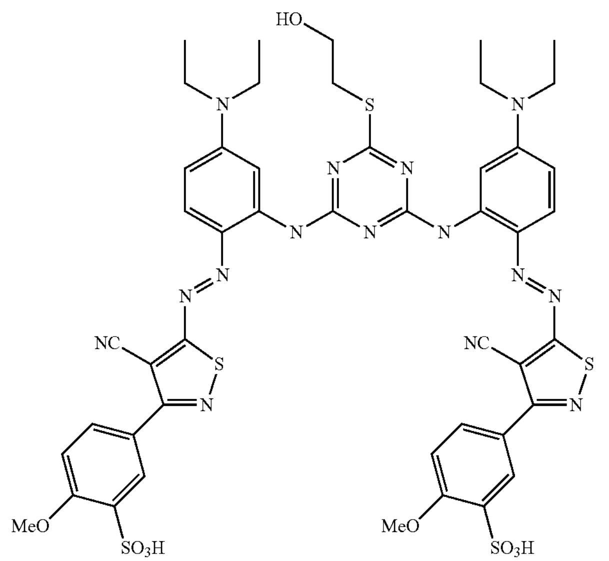 [SMILES: CCN(CC)c1ccc(/N=N/c2snc(-c3ccc(OC)c(S(=O)(=O)O)c3)c2C#N)c(Nc2nc(Nc3cc(N(CC)CC)ccc3/N=N/c3snc(-c4ccc(OC)c(S(=O)(=O)O)c4)c3C#N)nc(SCCO)n2)c1] |
| 1-272 | 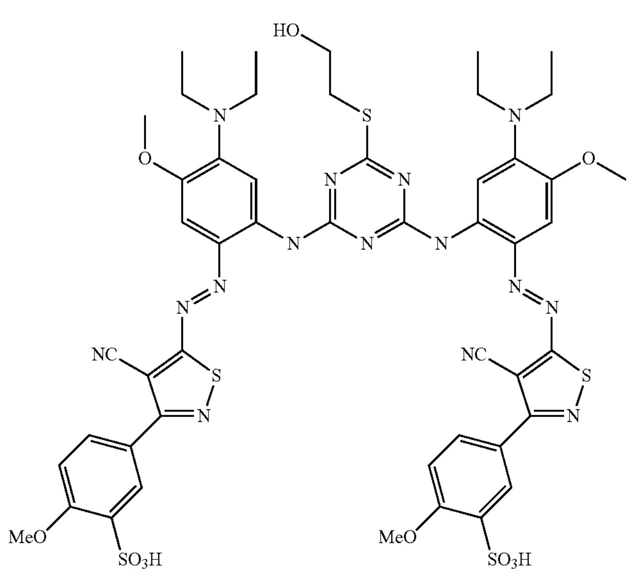 [SMILES: CCN(CC)c1cc(Nc2nc(Nc3cc(N(CC)CC)c(OC)cc3/N=N/c3snc(-c4ccc(OC)c(S(=O)(=O)O)c4)c3C#N)nc(SCCO)n2)c(/N=N/c2snc(-c3ccc(OC)c(S(=O)(=O)O)c3)c2C#N)cc1OC] |

TABLE 1-continued
| Example | Structure |
| --- | --- |
| 1-273 | 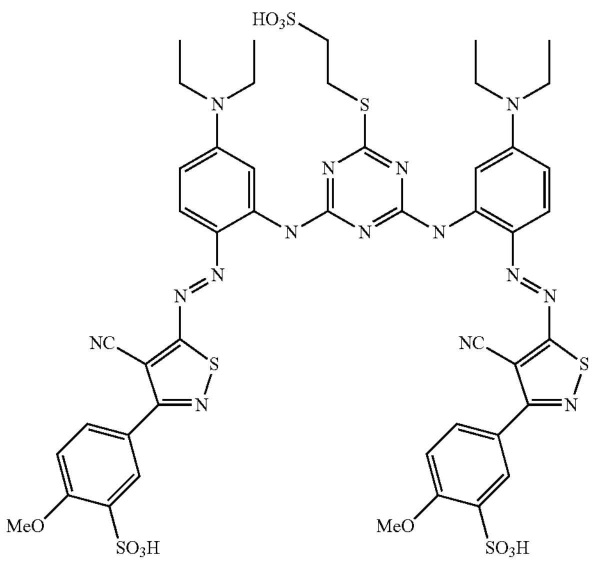 [SMILES: CCN(CC)c1ccc(/N=N/c2snc(-c3ccc(OC)c(S(=O)(=O)O)c3)c2C#N)c(Nc2nc(Nc3cc(N(CC)CC)ccc3/N=N/c3snc(-c4ccc(OC)c(S(=O)(=O)O)c4)c3C#N)nc(SCCS(=O)(=O)O)n2)c1] |
| 1-274 | 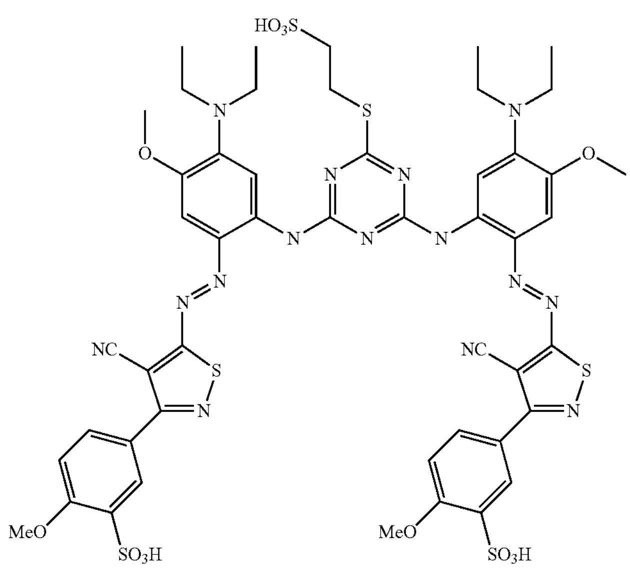 [SMILES: CCN(CC)c1cc(Nc2nc(Nc3cc(N(CC)CC)c(OC)cc3/N=N/c3snc(-c4ccc(OC)c(S(=O)(=O)O)c4)c3C#N)nc(SCCS(=O)(=O)O)n2)c(/N=N/c2snc(-c3ccc(OC)c(S(=O)(=O)O)c3)c2C#N)cc1OC] |

TABLE 1-continued
| Example | Structure |
|---|---|
| 1-275 | 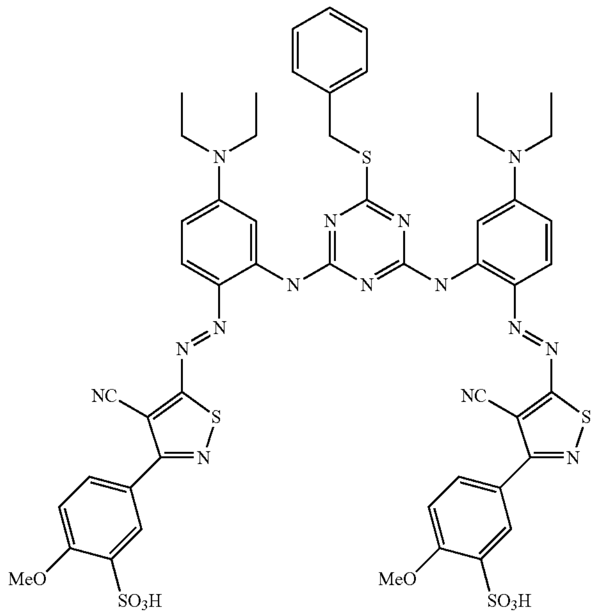 [SMILES: CCN(CC)c1ccc(/N=N/c2snc(-c3ccc(OC)c(S(=O)(=O)O)c3)c2C#N)c(Nc2nc(Nc3cc(N(CC)CC)ccc3/N=N/c3snc(-c4ccc(OC)c(S(=O)(=O)O)c4)c3C#N)nc(SCc3ccccc3)n2)c1] |
| 1-276 | 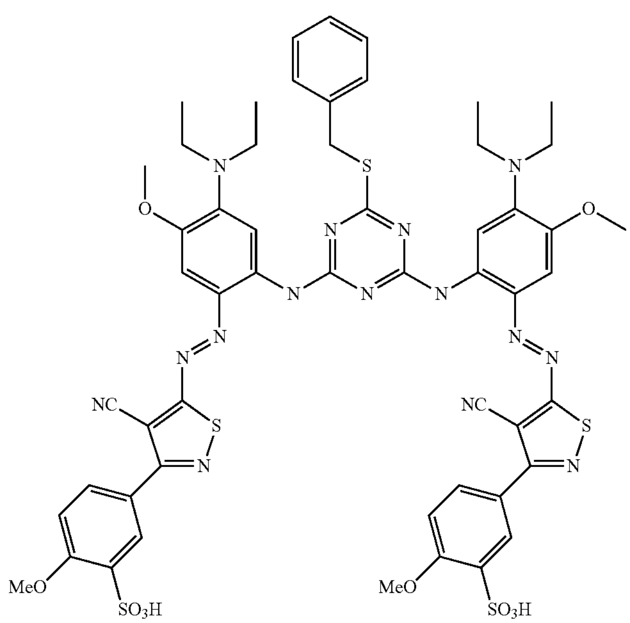 [SMILES: CCN(CC)c1cc(Nc2nc(Nc3cc(N(CC)CC)c(OC)cc3/N=N/c3snc(-c4ccc(OC)c(S(=O)(=O)O)c4)c3C#N)nc(SCc3ccccc3)n2)c(/N=N/c2snc(-c3ccc(OC)c(S(=O)(=O)O)c3)c2C#N)cc1OC] |

TABLE 1-continued
| Example | Structure |
|---|---|
| 1-277 | 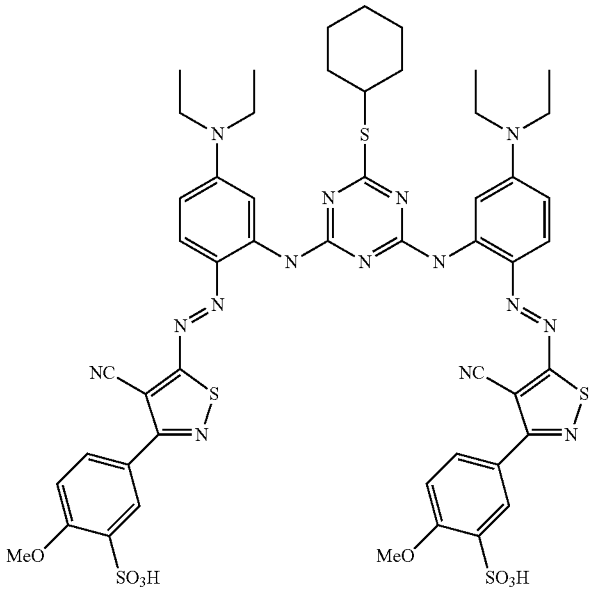 [SMILES: CCN(CC)c1ccc(/N=N/c2snc(-c3ccc(OC)c(S(=O)(=O)O)c3)c2C#N)c(Nc2nc(Nc3cc(N(CC)CC)ccc3/N=N/c3snc(-c4ccc(OC)c(S(=O)(=O)O)c4)c3C#N)nc(SC3CCCCC3)n2)c1] |
| 1-278 | 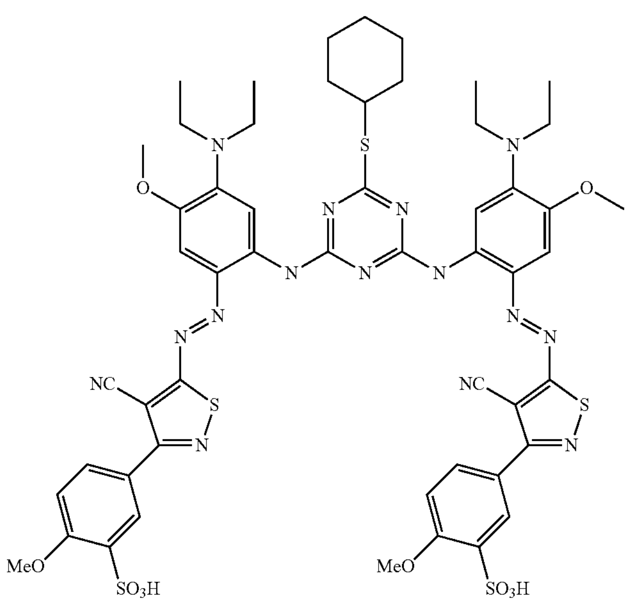 [SMILES: CCN(CC)c1cc(Nc2nc(Nc3cc(N(CC)CC)c(OC)cc3/N=N/c3snc(-c4ccc(OC)c(S(=O)(=O)O)c4)c3C#N)nc(SC3CCCCC3)n2)c(/N=N/c2snc(-c3ccc(OC)c(S(=O)(=O)O)c3)c2C#N)cc1OC] |

TABLE 1-continued
| Example | Structure |
| --- | --- |
| 1-279 | 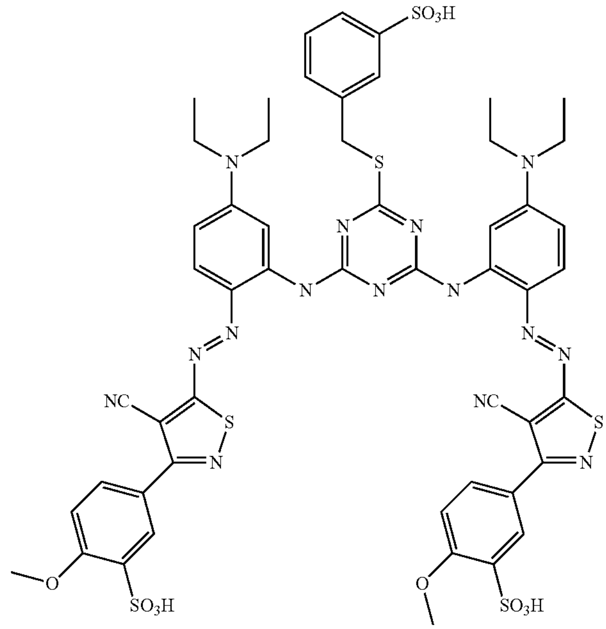 [SMILES: CCN(CC)c1ccc(/N=N/c2snc(-c3ccc(OC)c(S(=O)(=O)O)c3)c2C#N)c(Nc2nc(Nc3cc(N(CC)CC)ccc3/N=N/c3snc(-c4ccc(OC)c(S(=O)(=O)O)c4)c3C#N)nc(SCc3cccc(S(=O)(=O)O)c3)n2)c1] |
| 1-280 | 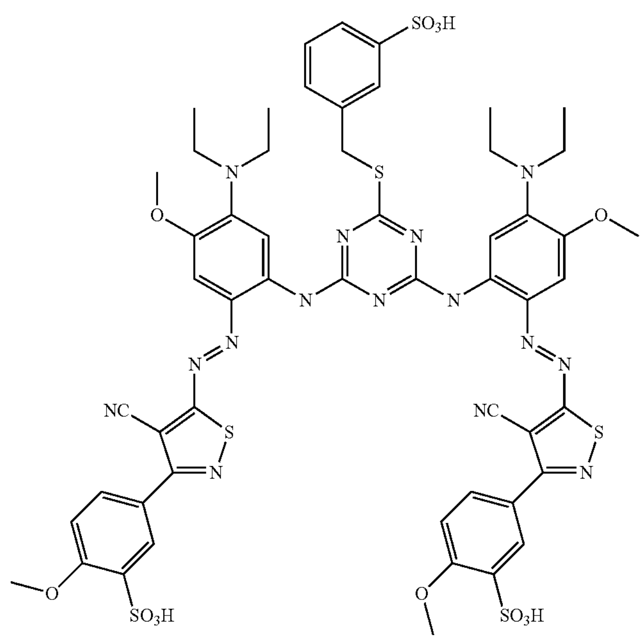 |

TABLE 1-continued
| Example | Structure |
|---|---|
| 1-281 | 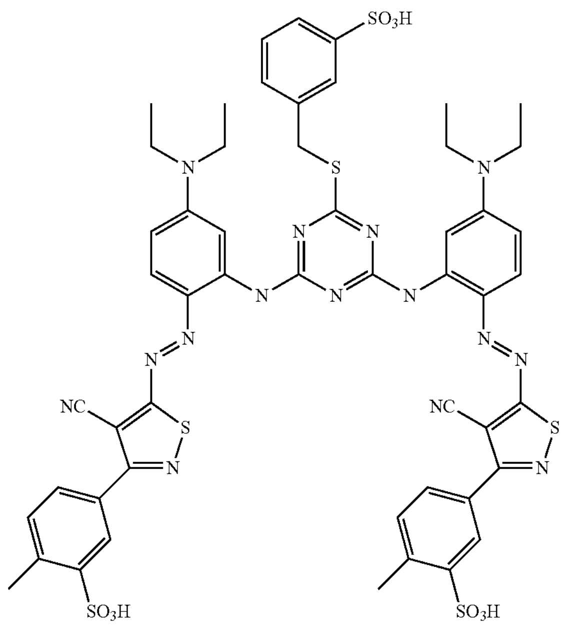 [SMILES: CCN(CC)c1ccc(/N=N/c2snc(-c3ccc(C)c(S(=O)(=O)O)c3)c2C#N)c(Nc2nc(Nc3cc(N(CC)CC)ccc3/N=N/c3snc(-c4ccc(C)c(S(=O)(=O)O)c4)c3C#N)nc(SCc3cccc(S(=O)(=O)O)c3)n2)c1] |
| 1-282 | 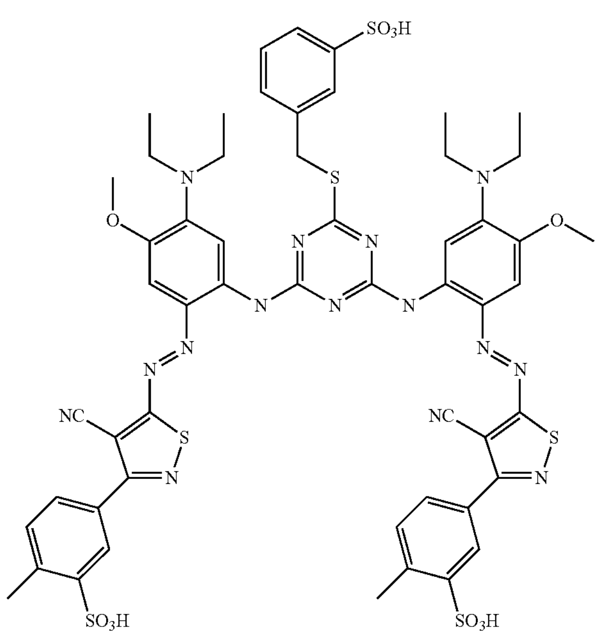 |

TABLE 1-continued
| Example | Structure |
| --- | --- |
| 1-283 | 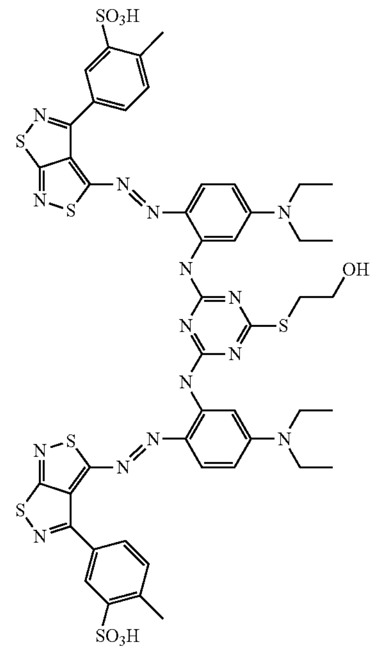 [SMILES: CCN(CC)c1ccc(/N=N/c2snc3snc(-c4ccc(C)c(S(=O)(=O)O)c4)c23)c(Nc2nc(Nc3cc(N(CC)CC)ccc3/N=N/c3snc4snc(-c5ccc(C)c(S(=O)(=O)O)c5)c34)nc(SCCO)n2)c1] |
| 1-284 | 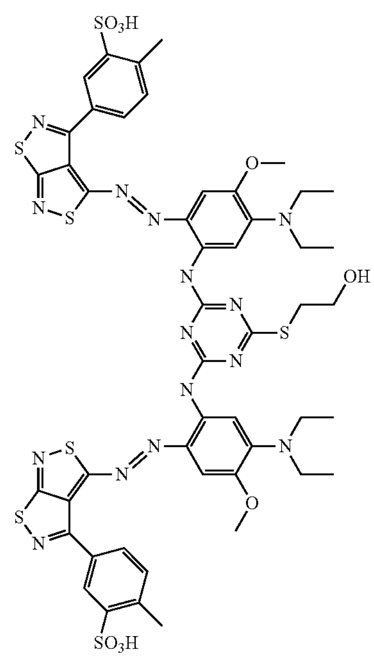 [SMILES: CCN(CC)c1cc(Nc2nc(Nc3cc(N(CC)CC)c(OC)cc3/N=N/c3snc4snc(-c5ccc(C)c(S(=O)(=O)O)c5)c34)nc(SCCO)n2)c(/N=N/c2snc3snc(-c4ccc(C)c(S(=O)(=O)O)c4)c23)cc1OC] |

TABLE 1-continued
| Example | Structure |
|---|---|
| 1-285 | 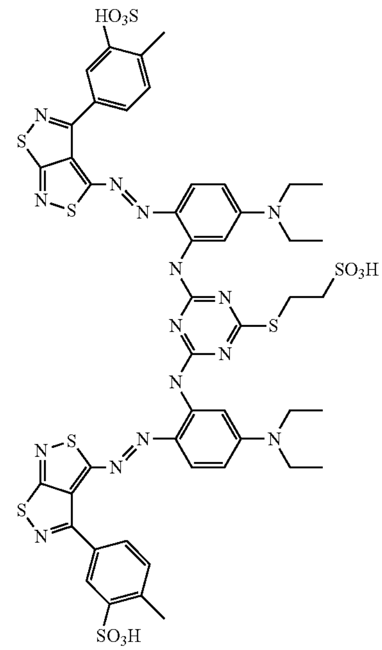 [SMILES: CCN(CC)c1ccc(/N=N/c2snc3snc(-c4ccc(C)c(S(=O)(=O)O)c4)c23)c(Nc2nc(Nc3cc(N(CC)CC)ccc3/N=N/c3snc4snc(-c5ccc(C)c(S(=O)(=O)O)c5)c34)nc(SCCS(=O)(=O)O)n2)c1] |
| 1-286 | 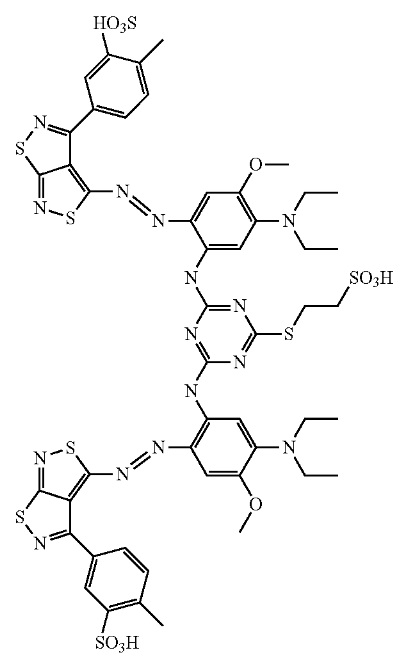 [SMILES: CCN(CC)c1cc(Nc2nc(Nc3cc(N(CC)CC)c(OC)cc3/N=N/c3snc4snc(-c5ccc(C)c(S(=O)(=O)O)c5)c34)nc(SCCS(=O)(=O)O)n2)c(/N=N/c2snc3snc(-c4ccc(C)c(S(=O)(=O)O)c4)c23)cc1OC] |

TABLE 1-continued

| Example | Structure |
|---|---|
| 1-287 | 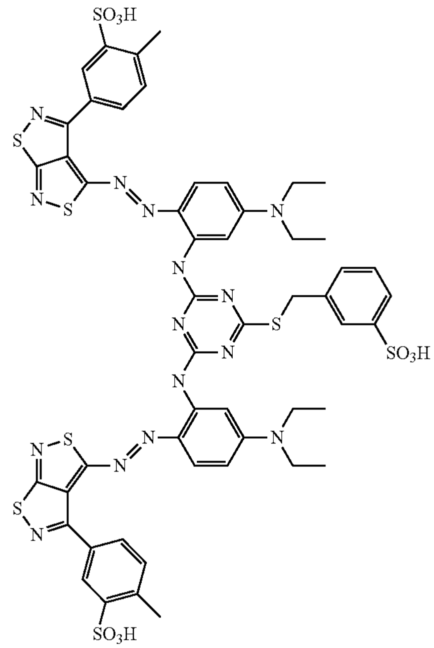 [SMILES: CCN(CC)c1ccc(/N=N/c2snc3snc(-c4ccc(C)c(S(=O)(=O)O)c4)c23)c(Nc2nc(Nc3cc(N(CC)CC)ccc3/N=N/c3snc4snc(-c5ccc(C)c(S(=O)(=O)O)c5)c34)nc(SCc3cccc(S(=O)(=O)O)c3)n2)c1] |
| 1-288 | 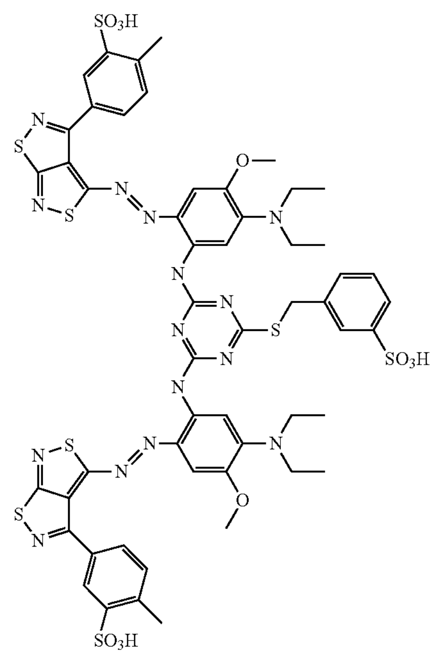 [SMILES: CCN(CC)c1cc(Nc2nc(Nc3cc(N(CC)CC)c(OC)cc3/N=N/c3snc4snc(-c5ccc(C)c(S(=O)(=O)O)c5)c34)nc(SCc3cccc(S(=O)(=O)O)c3)n2)c(/N=N/c2snc3snc(-c4ccc(C)c(S(=O)(=O)O)c4)c23)cc1OC] |

The dyes of the present invention can be used alone or as a mixture with other dyes according to the present invention and/or other substances.

Thus a chemical composition comprising one or more dye(s) as described above is also an aspect of the present invention.

A chemical composition consisting of two or more dyes as described above forms another preferred aspect of the present invention.

Also an aqueous solution for dying comprising one or more dye(s) as described above forms an aspect of the present invention.

A process for the production of a dye according to the invention, comprising a) diazotization of compounds of formulae (2) and (3)

$$D^1\text{-}NH_2 \quad (2)$$

$$D^2\text{-}NH_2 \quad (3),$$

wherein D and $D^2$ are defined as given in claim 1, b) reacting the products obtained in step a) with a compound of formula (4)

(4)

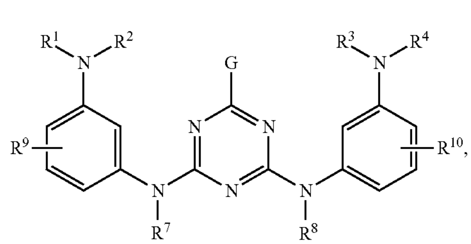

wherein $R^1$ to $R^{10}$ and G are defined as given above is another aspect of the present invention.

The diazotization of the compounds of formulae (2) and (3) can be performed by means of diazotization methods that are known to a person skilled in the art, preferably by using sodium nitrite or nitrosylsulfuric acid in acidic medium using inorganic acids such as hydrochloric acid, sulfuric acid or phosphoric acid or mixtures thereof or organic acids such as acetic acid or propionic acid or mixtures thereof. Also mixtures of inorganic acid with organic acids can be used advantageously.

The coupling reaction of the diazotized compounds of formulae (2) and (3) onto the compound of formula (4) can likewise be performed by known methods.

The compounds of the formula (2) to (4) are known and commercially available or can be synthesised by means of common chemical reactions known to a person skilled in the art.

The compound of formula (4) can for example be obtained by reacting 2,4,6-trichlorotriazine with the compounds of the formulae (5)-(8)

(5)

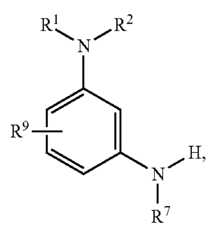

(6)

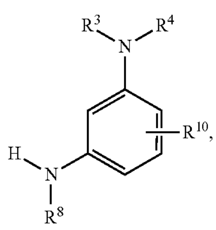

(7)

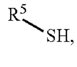

(8)

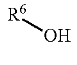

wherein $R^1$ to $R^{10}$ are defined as given above, according to condensation reactions which are known to a person skilled in the art.

The dyes of the present invention are suitable for dyeing and printing of natural, manufactured regenerated, modified or synthetic hydroxyl-amino-, and/or carboxamido-containing fiber materials and their blends by the application methods numerously described in the art for acid dyes.

Therefore, the present invention also is directed to a Process for dyeing or printing carboxamido- and/or hydroxyl-containing material, comprising contacting the carboxamido- and/or hydroxyl-containing material with a dye as described above.

The use of a dye as described above, a chemical composition as described above or of an aqueous solution as described above for dying fibers, as well as blends of such fibres selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers and Lyocell fibers forms another aspect of the present invention.

Still another aspect of the present invention is/are: Fiber and blends containing such fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising one or more dye(s) of the present invention either in chemically and/or physically bound form.

The above-mentioned substrates to be dyed can be present in various forms such as but not limited to yarn, woven fabric, loop-formingly knitted fabric or carpet. For instance in the form of sheetlike structures, such as paper and leather, in the form of films, such as nylon films, or in the form of a bulk mass, for example composed of polyamide and polyurethane, in particular in the form of fibers, for example cellulose fibers. The fibers are preferably textile fibers, for example in the form of woven fabrics or yarns or in the form of hanks or wound packages.

The dyes of the present invention and their salts and/or mixtures can be used as a single dyeing colorant in dyeing or printing processes or can be part of a di-, tri- or multi-component combination colorant in dyeing or in printing compositions. The di-, tri- or multi-component shade dyeings show similar fastness level as compared to dyeing performed with a single colorant component.

Dyes of the present invention and their salts or mixtures are highly compatible with other known and/or commercially available acid dyes and they can be used together with such dyes of related chromophores and similar technical performance to obtain specific hues. Similar technical performance includes: comparable build-up, comparable fastness properties and comparable exhaustion rates during dyeings.

The dyes according to the invention can be applied to the materials mentioned, especially the fiber materials mentioned, by the application techniques known for water-soluble dyes. This applies to both, dyeing and printing processes.

It applies in particular to the production of dyeings on fiber materials composed of wool or other natural polyamides or of synthetic polyamides and their mixtures with other fiber material. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in a sealed dyeing apparatus at temperatures of up to 106° C.

Since the water solubility of the dyes according to the invention is very good, they can also be used with advantage in customary continuous dyeing processes.

The dyes of the present invention can also be used in digital printing processes, in particular in digital textile printing. For this the dyes of the present invention need to be formulated in aqueous inks.

An Ink for digital textile printing, comprising a dye of the present invention is another aspect of the present invention.

The inks of the present invention comprise the dye of the present invention in amounts which preferably range from 0.1 to 50% by weight, more preferably from 0.5 to 30% by weight and most preferably from 1 to 15% by weight, based on the total weight of the ink.

If desired the inks may contain further dyes used in digital printing in addition to the one or more dyes of the present invention.

For the inks of the present invention to be used in the continuous flow process, a conductivity of 0.5 to 25 mS/m can be set by adding an electrolyte. Useful electrolytes include for example lithium nitrate and potassium nitrate. The inks of the present invention may include organic solvents at a total level of 1 to 50% by weight and preferably 5 to 30% by weight. Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 1 to 8 alkylene groups, for example: monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as for example: methylamine, ethylamine, triethylamine, diethylamine, dimethylamine, trimethylamine, dibutylamine, diethanolamine, triethanolamine, N-acetylethanolamine, N-formylethanolamine, ethylenediamine, urea derivatives, such as for example: urea, thiourea, N-methylurea, N,N'-epsilon dimethylurea, ethyleneurea, 1,1,3,3-tetramethylurea, amides, such as for example: dimethylformamide, dimethylacetamide, acetamide, ketones or keto alcohols, such as for example: acetone, diacetone alcohol, cyclic ethers, such as for example: tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolactone, trimethylpropane, 1,2-dimethoxypropane, dioxane ethyl acetate, ethylenediaminetetraacetate ethyl pentyl ether, 1,2-dimethoxypropane and trimethylpropane.

The inks of the present invention may further include customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Useful viscosity moderators include rheological additives, for example: polyvinylcaprolactam, polyvinylpyrrolidone and their copolymers polyetherpolyol, associative thickeners, polyurea, polyurethane, sodium alginates, modified galactomannans, polyetherurea, polyurethane, nonionic cellulose ethers.

As further additives the inks of the invention may include surface-active substances to set surface tensions of 20 to 65 mN/m, which are adapted if necessary as a function of the process used (thermal or piezo technology). Useful surface-active substances include for example: all surfactants, preferably nonionic surfactants, butyldiglycol, 1,2-hexanediol.

The inks of the present invention may further comprise customary additives, for example substances to inhibit fungal and bacterial growth in amounts from 0.01 to 1% by weight based on the total weight of the ink.

The inks may be prepared in a conventional manner by mixing the components in water.

The inks of the invention are particularly useful in inkjet printing processes for printing a wide variety of pretreated materials, such as silk, leather, wool, polyamide fibers and polyurethanes, and cellulosic fiber materials of any kind. Blend fabrics, for example blends of cotton, silk, wool with polyester fibers or polyamide fibers can similarly be printed.

In contrast to conventional textile printing, where the printing ink already contains all necessary chemicals, in digital or inkjet printing the auxiliaries have to be applied to the textile substrate in a separate pretreatment step.

The pretreatment of the textile substrate, for example cellulose and regenerated cellulose fibers and also silk and wool, is effected with an aqueous alkaline liquor prior to printing. In addition there is a need for thickeners to prevent flowing of the motives when the printing ink is applied, for example sodium alginates, modified polyacrylates or highly etherified galactomannans.

These pretreatment reagents are uniformly applied to the textile substrate in a defined amount using suitable applicators, for example using a 2- or 3-roll pad, contactless spraying technologies, by means of foam application or using appropriately adapted inkjet technologies, and subsequently dried.

The examples below serve to illustrate the invention. Parts and percentages are by weight unless noted otherwise.

The relationship between parts by weight and parts by volume is that of the kilogram to the liter.

EXAMPLE 1 a) 63.22 parts of hydrochloric acid (30%) were transferred into a 250 ml round bottom flask equipped with mechanical stirrer, temperature controller and condenser. 50 parts of 3-(diethylamino)acetanilide (A) were added slowly. The reaction mixture was heated to 80° C. gradually within 1 hour. The reaction mixture was kept at 80° C. until the reaction was completed. The reaction mixture was cooled down and diluted with deionized water. After the pH was adjusted to slightly alkaline with 90 parts of 30% NaOH solution the reaction mixture was extracted with organic solvent. The organic layer was washed three times with 500 parts of deionised water and dried over anhydrous sodium sulfate. The organic layer was distilled to dryness. 35 parts of the product (B) as dark brown viscous oil were obtained. The analytic data are consistent with the assigned structure for product (B).

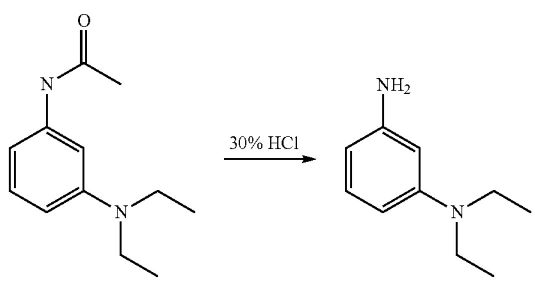

(A) (B)

b) 109 parts of acetonitrile and 109 parts of deionised water were transferred to a 1 l round bottom flask equipped with mechanical stirrer, temperature sensor and pH probe. The reaction mixture was cooled to 0 to 2° C. using an ice bath. 19.81 parts of cyanuric chloride (C) were then gradually added to the reaction mixture. 35.28 parts of 3-N,N-Diethylamino aniline (B) were dissolved in 50 parts of acetonitrile and added dropwise to the reaction mixture. The pH was maintained at values of 4 to 4.5 using sodium hydroxide solution and the temperature was maintained below 2° C. After 3 hours, the temperature was raised to room temperature and the pH was maintained at 5 to 5.5 using sodium hydroxide solution. The reaction mixture was stirred until completion. The reaction mixture was diluted with deionised water and the resulting solid was filtered and washed neutral. Upon drying 47.26 parts of solid (H) were obtained. The analytic data are consistent with the assigned structure for product (H).

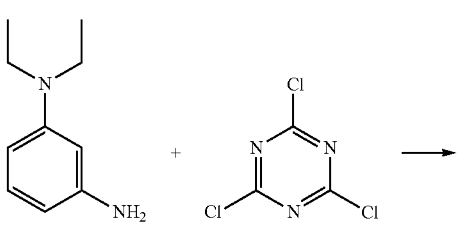

(B) (C)

-continued

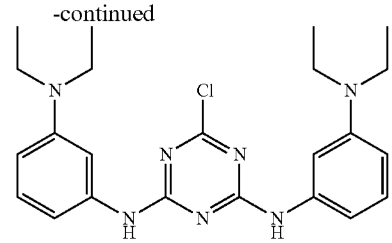

(H)

c) A reaction mixture comprising 10 parts of intermediate (H), 50 parts of acetonitrile, 2.26 parts of sodium bicarbonate dissolved in 3 parts of water and 2.71 parts of 2-mercapto ethanol (I) was heated to 80° C. until completion. After cooling to room temperature, the reaction mixture was diluted with deionised water. The pH of the reaction mixture was adjusted to 6.5 to 7 using hydrochloric acid solution. The slurry was stirred overnight and then filtered and washed neutral with deionised water. Upon drying 10.94 parts of the product (J) as a dark grey solid were obtained. The analytic data are consistent with the assigned structure for product (J).

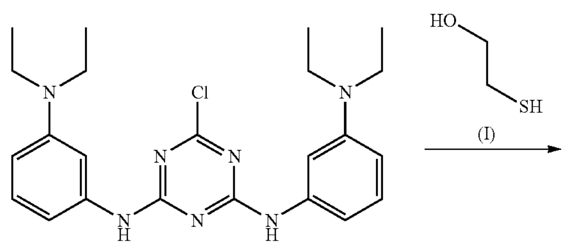

(H)

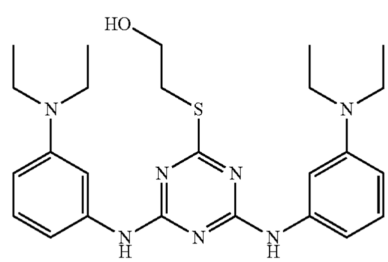

(J)

d) 8.16 parts of 3-amino-4-methyl phenylsulfanilic acid (K) were taken into 80 parts of deionised water. The pH of the mixture was adjusted to 6.3 when a clear solution was obtained. The solution was cooled down to 0 to 5° C. using an ice-salt mixture. 9.15 parts of 5N sodium nitrite solution were added dropwise into the reaction mixture, followed by fast addition of 15.07 parts of 37% HCl to the reaction mixture. The reaction mixture was stirred for 2.5 hours at 0 to 5° C. and the resulting diazonium salt was used for the following coupling step.

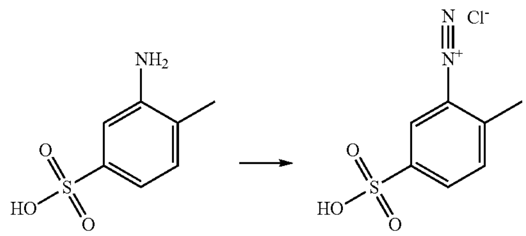

(K) (L)

e) 10 parts of the coupler (J) and 0.36 parts of sulphamic acid were mixed with 50 ml of deionised water and 150 ml of acetonitrile. The pH of the resulting mixture was adjusted to pH 2.5 using 37% hydrochloric acid. The reaction mixture was cooled down to 0 to 5° C. using ice-salt mixture. The diazonium salt (L) was added dropwise to the coupler solution while maintaining the pH between 2.5 and 5.5 using sodium hydroxide solution. The reaction mixture was stirred for 3 hrs and the reaction was completed. After distillation under reduced pressure the pH was adjusted to 5 using hydrochloric acid. Upon addition of sodium chloride, the resulting slurry was filtered and washed neutral. Upon drying 18.22 parts of the acid dye (1-1) were obtained. The analytical data is consistent with the assigned structure for the dye (1-1).

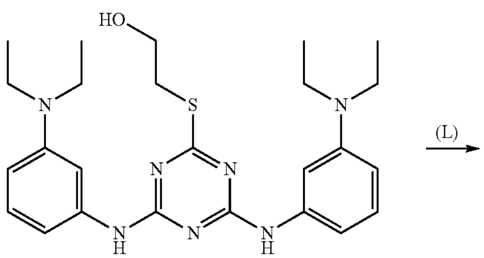

(J)

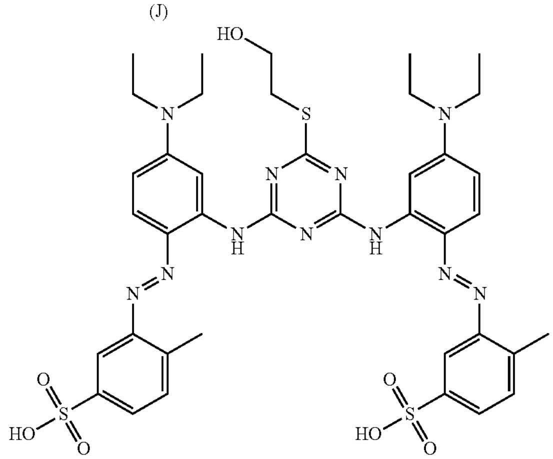

(1-1)

Through analogy, all the inventive dyes—and those in Table 1 in particular—can be obtained by processes similar to those described above in Example 1-1.

DYEING EXAMPLE 1

1 part of the dye, example 1-1 of this invention is dissolved in 2000 parts of water and 1 part of levelling assistant (based on condensation product of a higher aliphatic amine and ethylene oxide) and 6 parts of sodium acetate are added. The pH is then adjusted to 5 using acetic acid (80%). The dyebath is heated to 50° C. for 10 minutes and then entered with 100 parts of a woven polyamide-6 fabric. The temperature is raised to 98° C. over the course of 50 minutes and then dyeing is carried out at this temperature for 60 minutes. This is followed by cooling to 60° C. and removal of the dyed material. The polyamide-6 fabric is washed with hot and cold water, soaped and then spun dried. The scarlet dyeings obtained have very good light and wet fastness and also good levelness in the fibre.

DYEING EXAMPLE 2

1 part of the dye, example 1-1 of this invention is dissolved in 2000 parts of water and 1 part of levelling assistant (based on condensation product of a higher aliphatic amine and ethylene oxide) and 6 parts of sodium acetate are added. The pH is then adjusted to 5.5 using acetic acid (80%). The dyebath is heated to 50° C. for 10 minutes and then entered with 100 parts of a woven polyamide-6,6 fabric. The temperature is raised to 120° C. over the course of 50 minutes and then dyeing is carried out at this temperature for 60 minutes. This is followed by cooling to 60° C. and removal of the dyed material. The polyamide-6,6 fabric is washed with hot and cold water, soaped and then spun dried. The scarlet dyeings obtained have very good light and wet fastness and also good levelness in the fibre.

DYEING EXAMPLE 3

100 parts of polyamide-6 material are padded with a 1000 parts 50° C. liquor solution that consists of 40 parts of the dye, example 1-1, 100 parts of urea, 20 parts of a non ionic solubilizer based on butyldiglycol, 20 parts of acetic acid to adjust the pH to 4.0, 10 parts of levelling assistant (based on ethoxylated aminopropyl fatty acid amide) and 810 parts of water. The material is rolled up and placed into a steaming chamber at 85 to 98° C. for 3 to 6 hours. After fixation, the fabric is washed with hot and cold water, soaped and then spun dried. The scarlet dyeings obtained have very good light and wet fastness and also good levelness in the fibre.

DYEING EXAMPLE 4

1 part of the dye, example 1-1 of this invention is dissolved in 2000 parts of water and 5 parts of sodium sulphate, and 1 part of levelling assistant (based on condensation product of a higher aliphatic amine and ethylene oxide) and 5 parts of sodium acetate are added. The pH is then adjusted to 4.5 using acetic acid (80%). The dyebath is heated to 50° C. for 10 minutes and then entered with 100 parts of a woven wool fabric. The temperature is raised to 100° C. over the course of 50 minutes and then dyeing is carried out at this temperature for 60 minutes. This is followed by cooling to 90° C. and removal of the dyed material. The wool fabric is washed with hot and cold water, soaped and then spun and dried. The scarlet dyeings obtained have very good light and wet fastness and also good levelness in the fibre.

DYEING EXAMPLE 5

1 part of the dye, example 1-1 of this invention is dissolved in 1000 parts of water and 7.5 parts of sodium sulphate, and 1 part of a wetting agent (anionic) are added.

100 parts of bleached cotton knitted fabric are added to this solution. The dye bath is then heated up to 98° C. with a gradient of 2° C./min then dyeing is carried out at this temperature for 60 minutes. This is followed by cooling down to 80° C. At 80° C. the dyeing is continued for another 20 minutes. The dyed material is then removed and is washed with hot and cold water, soaped and then spun and dried. The scarlet dyeings obtained have very good light and wet fastness and also good levelness in the fibre.

DYEING EXAMPLE 6

3 parts of the dye, example 1-1 of this invention dissolved in 82 parts of deionized water are added into the dyebath with 15 parts of diethylene glycol at 60° C. On cooling, a scarlet printing ink is obtained. The scarlet printing ink can be used for ink jet printing on paper, polyamide or wool textiles.

DYEING EXAMPLE 7

4 parts of chemically bleached (pine wood) sulphite pulp is mixed up with 100 parts of 55° C. water. 1 part of the dye $1a^{161}$ of this invention is dissolved in 100 parts of hot water. 80 parts of this solution is given to the mixed-up pulp and mixed for 2 minutes. After that the mixture is sized with resin size in a conventional manner and mixed for another 2 minutes. 55 parts of this solution are then diluted with 2000 parts of cold water and the paper is produced out of this solution. The orange paper produced from the mixture has good wet fastnesses.

The invention claimed is:

1. A dye of formula (1)

(1)

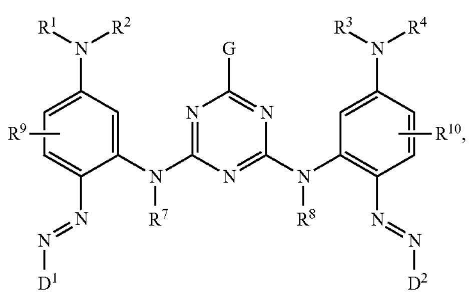

wherein independent from each other

G is a rest of formula (i) or (ii)

(i)

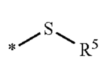

(ii)

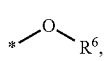

$R^1$, $R^2$, $R^3$ and $R^4$ is
hydrogen,
$(C_1-C_{12})$-alkyl,
$(C_2-C_6)$-alkenyl,
$(C_3-C_8)$-cycloalkyl or
aryl-$(C_1-C_{12})$-alkyl,
with the alkyl chain being linear or branched, and optionally being interrupted by one or more heteroatoms and/or substituted by one or more substituents selected from the group consisting of hydroxy, carboxy, $SO_3M$, halogen, cyano, nitro, acyl, trifluoromethyl, acyloxy, aryloyloxy and carbamoyl, $R^5$ and $R^6$ is
hydrogen,
$(C_1-C_{12})$-alkyl,
substituted $(C_1-C_{12})$-alkyl with the substituents being selected from the group consisting of hydroxy, carboxy, $SO_3M$, halogen, cyano, nitro, acyl, trifluoromethyl, acyloxy, aryloyloxy and carbamoyl,
$(C_3-C_8)$-cycloalkyl,
a group of formula (iii)

(iii)

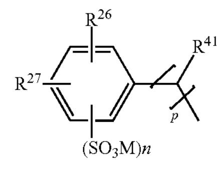

wherein
$R^{26}$ and $R^{27}$ are identical or different and are
hydrogen,
$(C_1-C_{12})$-alkyl,
$(C_1-C_{12})$-alkyl substituted by hydroxy, $(C_1-C_{12})$-alkoxy, trifluoromethyl, cyano, nitro, halogen, —NHCO$(C_1-C_6)$-alkyl, —$NHSO_2(C_1-C_6)$-alkyl, $CONH_2$ or $SO_2NH_2$,
$R^{41}$ is hydrogen or $(C_1-C_6)$-alkyl,
n is 0, 1 or 2,
p is 0 or 1 to 6,
or $(C_1-C_{12})$-alkyl, whereby the alkyl chain can be interrupted by one or more heteroatoms, $R^7$ and $R^8$ are identical or different and are
hydrogen,
$(C_1-C_6)$-alkyl or
phenyl, $R^9$ and $R^{10}$ are identical or different and are hydrogen, $(C_1-C_6)$-alkyl, $(C_1-C_6)$-alkoxy, trifluoromethyl, hydroxy, cyano, nitro, halogen, —NHCHO, —NHCO$(C_1-C_6)$-alkyl, —NHCOaryl, —$NHSO_2(C_1-C_6)$-alkyl or —$NHSO_2$aryl, $D^1$ and $D^2$ is a rest of a phenyl-, naphthyl- or heterocyclic-derivative, which comprises at least one group —$SO_3M$, wherein M is hydrogen, an alkali metal, ammonium, substituted or unsubstituted tetra$(C_1-C_{12})$-alkyl ammonium or one equivalent of an alkali earth metal.

2. The dye according to claim 1, wherein independent from each other $R^1$ to $R^4$ are identical and are hydrogen, $(C_1-C_4)$-alkyl or $(C_1-C_6)$-alkyl substituted by hydroxyl or cyano, $R^5$ and $R^6$ are identical and are
hydrogen,
$(C_1-C_6)$-alkyl,
$(C_1-C_6)$-alkyl substituted by hydroxy,
$(C_3-C_8)$-cycloalkyl or $(C_1-C_6)$-alkyl substituted by —$SO_3M$ or a group of formula (iii) as defined in claim 1, wherein each $R^{26}$ and $R^{27}$ independent from each other is
hydrogen,
$(C_1-C_6)$-alkyl,
$(C_1-C_6)$-alkyl substituted by hydroxy, $(C_1\text{-}C_6)$-alkoxy, trifluoromethyl, hydroxy, cyano, halogen, n is 0 or 1, p is 0 or 1 to 4, $R^7$ and $R^8$ are identical and are hydrogen, methyl or ethyl and $R^9$ and $R^{10}$ are identical and are hydrogen, methyl, ethyl, halogen, trifluoromethyl, methoxy or ethoxy.

3. The dye according to claim 1, having formula (1a), ($1a^1$), ($1a^2$) or ($1a^3$)

(1a)

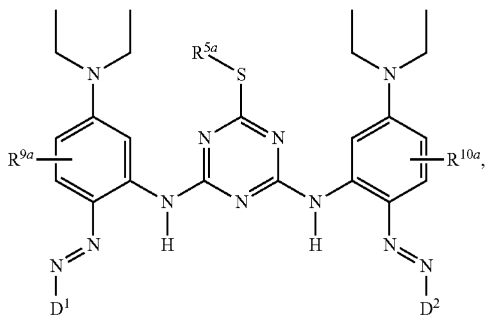

($1a^1$)

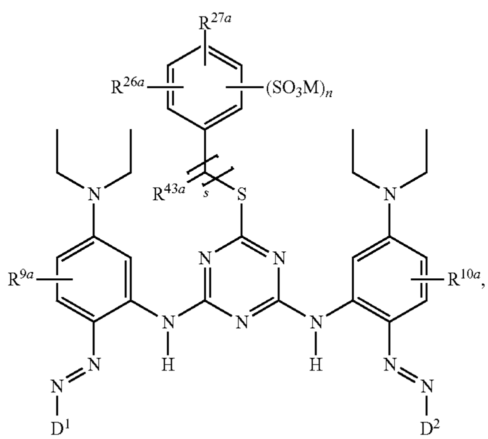

($1a^2$)

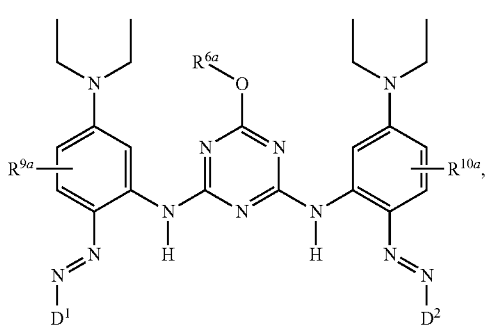

-continued ($1a^3$)

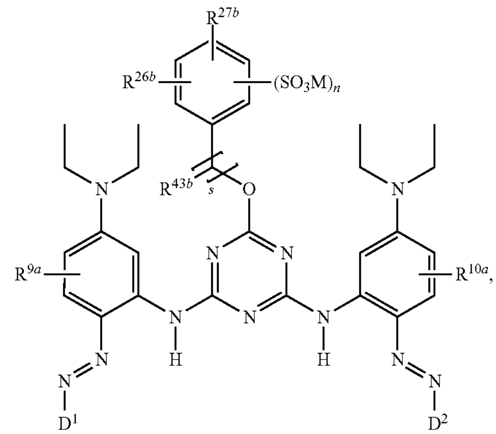

wherein $R^{5a}$ and $R^{6a}$ are hydrogen, $(C_1\text{-}C_6)$-alkyl, $(C_1\text{-}C_6)$-alkyl substituted by hydroxy, $(C_3\text{-}C_8)$-cycloalkyl or $(C_1\text{-}C_6)$-alkyl substituted by $SO_3M$, $R^{9a}$ and $R^{10a}$ are identical and are hydrogen or methoxy, each of $R^{26a}$, $R^{27a}$, $R^{26b}$ and $R^{27b}$ is hydrogen, $(C_1\text{-}C_4)$-alkyl, $(C_1\text{-}C_4)$-alkoxy, trifluoromethyl, cyano, nitro or halogen, $R^{43a}$ and $R^{43b}$ is hydrogen or $(C_1\text{-}C_4)$ alkyl, s is 0 or 1 to 6 and $D^1$ and $D^2$ are as defined in claim 1.

4. The dye according to claim 1, in which independent from each other $D^1$ and $D^2$ is selected from the group consisting of groups of formula (I) to (XIV):

(I)

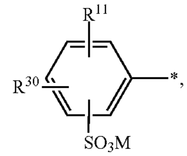

wherein $R^{11}$ and $R^{30}$ independent of each other is hydrogen, $(C_1\text{-}C_4)$-alkyl, $(C_1\text{-}C_4)$-alkoxy, trifluoromethyl, cyano, nitro, $NHC(O)R^{31}$, $CONH_2$, $S(O)_2R^{32}$ or halogen, $R^{31}$ and $R^{32}$ is hydrogen, $(C_1\text{-}C_4)$-alkyl or $(C_1\text{-}C_4)$-alkyl substituted by hydroxyl, M is hydrogen, an alkali metal, ammonium or one equivalent of an alkali earth metal, formula (II)

(II)

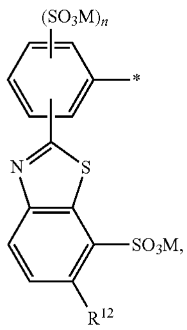

wherein $R^{12}$ is hydrogen or $(C_1-C_4)$-alkyl, n is 0 or 1 and

M is defined as given above, formula (III)

(III)

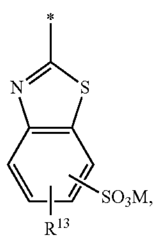

wherein $R^{13}$ is hydrogen, $(C_1-C_4)$-alkyl, $(C_1-C_4)$-alkoxy, cyano, nitro, $CONH_2$ or halogen and M is defined as given above, formula (IV)

(IV)

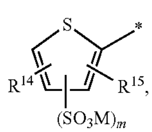

wherein $R^{14}$ is hydrogen, cyano, $CONH_2$, $C(O)R^{33}$ or $COOR^{34}$, $R^{33}$ is hydrogen or $(C_1-C_4)$-alkyl, $R^{34}$ is hydrogen or $(C_1-C_4)$-alkyl, $R^{15}$ is hydrogen, —CHO or a group of formula (a) or (c)

(a)

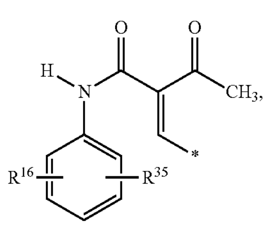

-continued (c)

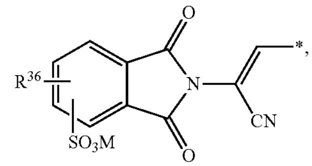

wherein $R^{16}$, $R^{35}$ and $R^{36}$ independent of each other is hydrogen, halogen, $(C_1-C_4)$-alkyl, $(C_1-C_4)$-alkoxy, $SO_3M$ or —$CONH_2$, m is 0 or 1 and M is defined as given above, formula (V)

(V)

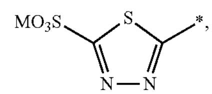

wherein

M is defined as given above, formula (VI)

(VI)

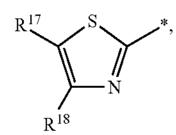

wherein $R^{17}$ is —$SO_3M$, —CHO, —CH—$C(CN)_2$, a group of formula (a) as defined above or a group of formula (b) or (d)

(b)

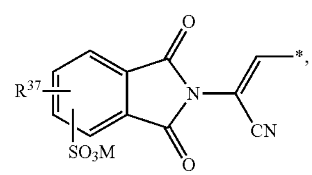

(d)

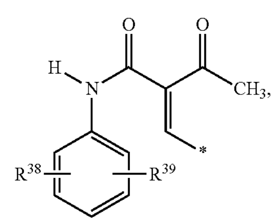

wherein $R^{37}$, $R^{38}$ and $R^{39}$ independent of each other is hydrogen, halogen, $(C_1-C_4)$-alkyl, $(C_1-C_4)$-alkoxy, $SO_3M$ or —$CONH_2$, $R^{18}$ is —$SO_3M$, $(C_1-C_4)$-alkyl, sulfophenyl $(C_1-C_4)$-alkylamino, $(C_1-C_{12})$-alkylamino, $(C_5-C_6)$-cycloalkylamino, morpholino or piperidino and M is defined as given above, formula (VII)

(VII)

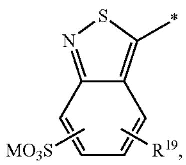

wherein $R^{19}$ is hydrogen, $(C_1-C_4)$-alkyl, $(C_1-C_4)$-alkoxy, nitro, $NHC(O)R^{40}$, $NHSO_2R^{47}$ or halogen, $R^{40}$ is hydrogen or $(C_1-C_6)$ alkyl, $R^{47}$ is $(C_1-C_6)$-alkyl, formula (VIII)

(VIII)

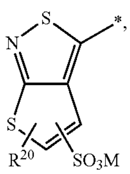

wherein $R^{20}$ is hydrogen, $(C_1-C_4)$-alkyl, $(C_1-C_4)$-alkoxy, cyano, nitro, $CONH_2$ or halogen, formula (IX)

(IX)

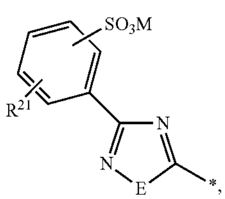

wherein $R^{21}$ is hydrogen, (C1-C4)-alkyl, (C1-C4)-alkoxy, halogen, cyano, nitro or CONH2 and E is sulphur or oxygen, formula (X)

(X)

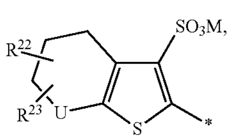

wherein $R^{22}$ and $R^{23}$ independent of each other is hydrogen, $(C_1-C_4)$-alkyl, $(C_1-C_4)$-alkoxy, halogen, cyano or $CONH_2$ and U is methylene or C═O, formula (XI)

(XI)

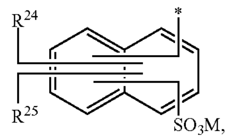

wherein $R^{24}$ and $R^{25}$ independent of each other is hydrogen, $(C_1-C_4)$-alkyl, $(C_1-C_4)$-alkoxy, halogen, cyano, nitro, trifluoromethyl or $CONH_2$, formula (XII)

(XII)

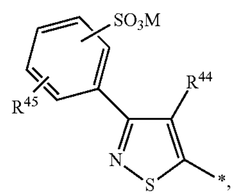

wherein $R^{44}$ and $R^{45}$ independent of each other is hydrogen, $(C_1-C_4)$-alkyl, $(C_1-C_4)$-alkoxy, halogen, cyano, nitro, trifluoromethyl, $CONH_2$ or $SO_3M$, formula (XIII)

(XIII)

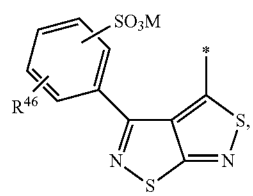

wherein $R^{46}$ is hydrogen, $(C_1-C_4)$-alkyl, $(C_1-C_4)$-alkoxy, halogen, cyano, nitro, trifluoromethyl, $CONH_2$ or $SO_3M$ and formula (XIV)

(XIV)

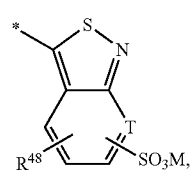

wherein $R^{48}$ is hydrogen, $(C_1-C_4)$-alkyl, $(C_1-C_4)$-alkoxy, nitro, $NHC(O)R^{49}$, $NHSO_2R^{50}$ or halogen, $R^{49}$ is hydrogen or $(C_1-C_6)$-alkyl, $R^{50}$ is $(C_1-C_6)$-alkyl;

and

M is defined as given above.

5. The dye according to claim 4, wherein $D^1$ and $D^2$ are identical.

6. A chemical composition comprising one or more dye(s) according to claim 1.

7. A chemical composition consisting of two or more dyes according to claim 1.

8. An aqueous solution for dying comprising one or more chemical compounds according to claim 1.

9. Process for the production of the dye according to claim 1, comprising a) diazotizating compounds of formulae (2) and (3)

$$D^1\text{-}NH_2 \quad (2)$$

$$D^2\text{-}NH_2 \quad (3),$$

wherein $D^1$ and $D^2$ are defined as given in claim 1, b) reacting the products obtained in step a) with a compound of formula (4)

(4)

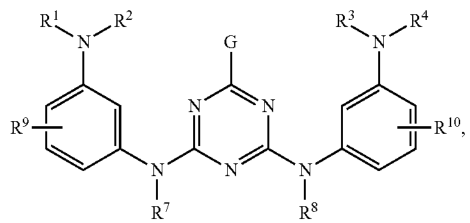

wherein $R^1$ to $R^{10}$ and G are defined as given in claim 1.

10. A process for dyeing or printing carboxamido- and/or hydroxyl-containing material, comprising contacting the carboxamido- and/or hydroxyl-containing material with the dye according to claim 1.

11. An ink for digital textile printing comprising the dye according to claim 1.

12. A process for dying a fiber or blend which comprises contacting the fiber or blend of fibers with the dye according to claim 1.

13. The process according to claim 12, wherein the fiber is selected from the group consisting of: synthetic fiber materials; nylon materials; nylon-6; nylon-6,6; aramid fibres; vegetable fibres; seed fibres; cotton; organic cotton; kapok; coir from coconut husk; bast fibers; flax; hemp; jute; kenaf; ramie; rattan; leaf fibres; sisal; henequen; banana; stalk fibres; bamboo; fibres from animals; wool; organic wool; silk; cashmere wool; alpaca fiber; mohair; Angora fibre; fur and leather materials; manufactured, regenerated and recycled fibres; cellulosic fibres; paper fibres; cellulosic regenerated fibres; viscose rayon fibres; acetate and triacetate fibers; Lyocell fibers and mixtures thereof.

14. A fiber or blends comprising one or more dye(s) according to claim 1 either in chemically and/or physically bound form.

15. The fiber or blends as claimed in claim 14, wherein the fiber is selected from the group consisting of: synthetic fiber materials; nylon materials; nylon-6; nylon-6,6; aramid fibres; vegetable fibres; seed fibres; cotton; organic cotton; kapok; coir from coconut husk; bast fibers; flax; hemp; jute; kenaf; ramie; rattan; leaf fibres; sisal; henequen; banana; stalk fibres; bamboo; fibres from animals; wool; organic wool; silk; cashmere wool; alpaca fiber; mohair; Angora fibre; fur and leather materials; manufactured, regenerated and recycled fibres; cellulosic fibres; paper fibres; cellulosic regenerated fibres; viscose rayon fibres; acetate and triacetate fibers; Lyocell fibers and mixtures thereof.

* * * * *